United States Patent [19]
Kirsch et al.

[11] Patent Number: 5,893,717
[45] Date of Patent: Apr. 13, 1999

[54] COMPUTERIZED METHOD AND SYSTEM FOR TEACHING PROSE, DOCUMENT AND QUANTITATIVE LITERACY

[75] Inventors: Irwin S. Kirsch, Yardley, Pa.; Peter B. Mosenthal, Dewitt, N.Y.; Mary Louise Lennon, Newton, Pa.; Saundra K. Young, Hopewell, N.J.; Debra Pisacreta, Skillman, N.J.; Janet M. Stumper, Stockton, N.J.; Thomas P. Florek, Trenton, N.J.; Sharon Z. Jaspan, Plainsboro, N.J.; Jeffrey B. Jenkins, Newtown, Pa.; Richard Lesh, Princeton, N.J.; Wendy Cohen, West Windsor, N.J.

[73] Assignee: Educational Testing Service, Princeton, N.J.

[21] Appl. No.: 08/190,349

[22] Filed: Feb. 1, 1994

[51] Int. Cl.⁶ ................................................ G09B 19/00
[52] U.S. Cl. ........................ 434/118; 434/323; 434/350; 434/362; 364/419.2; 395/927
[58] Field of Search ...................... 434/118, 169, 434/185, 204, 219, 234, 307 R, 322, 323, 350, 353, 359, 362, 365; 364/419.01, 419.08, 419.1; 395/11, 12, 100, 144–149, 152–154, 927

[56] References Cited

U.S. PATENT DOCUMENTS

| | | | |
|---|---|---|---|
| 4,867,685 | 9/1989 | Brush et al. | 434/234 |
| 4,895,518 | 1/1990 | Arnold et al. | 434/118 |
| 5,306,154 | 4/1994 | Ujita et al. | 434/362 X |
| 5,326,270 | 7/1994 | Ostby et al. | 434/118 X |
| 5,372,507 | 12/1994 | Goleh | 434/118 |
| 5,395,243 | 3/1995 | Lubin et al. | 434/118 |
| 5,421,730 | 6/1995 | Lasker, III et al. | 434/118 |

OTHER PUBLICATIONS

Educational Testing Service, "National Adult Literacy Survey," 1985.

Irwin S. Kirsch and Ann Jungeblut, "Literacy: Profiles of America's Young Adults," Educational Testing Service, 1986.

Peter Mosenthal and Irwin Kirsch, "Understanding Documents, Lists: The building blocks of documents," Journal of Reading, Oct. 1989, pp. 58–60.

Irwin S. Kirsch and Peter B. Mosenthal, "Understanding Documents, Building documents by combining simple lists," Journal of Reading, Nov. 1989, pp. 132–135.

(List continued on next page.)

*Primary Examiner*—Joe Cheng
*Attorney, Agent, or Firm*—Michael I. Chakansky

[57] ABSTRACT

A multimedia computerized literacy system providing for and enhancing the teaching of Literacy Skills to enable people to function more effectively in schools, society, and the workplace. The design of the system is based on the identification and understanding of the structures, contents, and strategies which underlie prose, document, and quantitative literacy. In particular, the system's design is based, in part, on the Knowledge Model Procedure, which builds upon a unique taxonomy of document structures, contents, and strategies in a way that facilitates the transfer of Literacy Skills across the wide array of document types, as well as across quantitative and prose Literacy Skills. In accordance with the Knowledge Model Procedure, the computerized literacy system, through a series of structure and use lessons, provides students with the skills to perform document, prose, and quantitative tasks of increasing complexity. The system uses specially designed exercise and practice tasks to enhance students' abilities to perform literacy tasks commonly required of adolescents and adults in modern society.

38 Claims, 334 Drawing Sheets

Microfiche Appendix Included
(14 Microfiche, 1278 Pages)

OTHER PUBLICATIONS

Peter B. Mosenthal and Irwin S. Kirsch, "Understanding Documents, Intersecting lists," Journal of Reading, Dec. 1989, pp. 210–213.

Irwin S. Kirsch and Peter B. Mosenthal, "Understanding Documents, Nested lists," Journal of Reading, Jan. 1990, pp. 294–297.

Peter B. Mosenthal and Irwin S. Kirsch, "Understanding Documents, Understanding graphs and charts, Part I," Journal of Reading, Feb. 1990, pp. 371–373.

Peter B. Mosenthal and Irwin S. Kirsch, "Understanding Documents, Understanding graphs and charts, Part II," Journal of Reading, Mar. 1990, pp. 454–457.

Irwin S. Kirsch and Peter B. Mosenthal, "Understanding Documents, Understanding forms, Part I," Journal of Reading, Apr. 1990, pp. 542–545.

Irwin S. Kirsch and Peter B. Mosenthal, "Understanding Documents, Understanding forms, Part II," Journal of Reading, May 1990, pp. 636–641.

Peter B. Mosenthal and Irwin S. Kirsch, "Understanding Documents, Understanding general reference maps," Journal of Reading, Sep. 1990, pp. 60–63.

Peter B. Mosenthal and Irwin S. Kirsch, "Understanding Documents, Understanding thematic maps," Journal of Reading, Oct. 1990, pp. 136–140.

Irwin S. Kirsch and Peter B. Mosenthal, "Understanding Documents, Mimetic documents: Pictures," Journal of Reading, Nov. 1990, pp. 216–220.

Irwin S. Kirsch and Peter B. Mosenthal, "Understanding Documents, Mimetic documents: Diagrams," Journal of Reading, Dec. 1990, pp. 290–294.

Peter B. Mosenthal and Irwin S. Kirsch, "Toward an Explanatory Model of Document Literacy," Discourse Processes 14, 1991, pp. 147–179.

Peter B. Mosenthal and Irwin S. Kirsch, "Understanding Documents, Mimetic documents: Process schematics," Journal of Reading, Feb. 1991, pp. 390–397.

Peter B. Mosenthal and Irwin S. Kirsch, "Understanding Documents, More mimetic documents: Procedural schematics," Journal of Reading, Mar. 1991, pp. 486–490.

Irwin S. Kirsch and Peter B. Mosenthal, "Understanding Documents, Understanding mimetic documents through 'knowledge modeling'," Journal of Reading, Apr. 1991, pp. 552–558.

Peter B. Mosenthal and Irwin S. Kirsch, "Understanding Documents, Information types in nonmimetic documents: A review of Biddle's wipe–clean slate," Journal of Reading, May 1991, pp. 654–660.

Peter B. Mosenthal and Irwin S. Kirsch, "Types of document knowledge: From structures to strategies," Journal of Reading, Sep. 1992, pp. 64–67.

Irwin S. Kirsch and Peter B. Mosenthal, "How to navigate a document using locate known/need–to–know strategies," Journal of Reading, Oct. 1992, pp. 140–144.

Peter B. Mosenthal and Irwin S. Kirsch, "Cycle strategies in document search: From here to there to wherever," Journal of Reading, Nov. 1992, pp. 238–242.

Irwin S. Kirsch and Peter B. Mosenthal, "Integration strategies: Higher order thinking applied to documents," Journal of Reading, Dec. 1992/Jan. 1993, pp. 322–327.

- What Are Simple Lists?
- More About Items
- More About Labels
- Recognizing Simple Lists
- How Lists Are Organized

FIG. 7

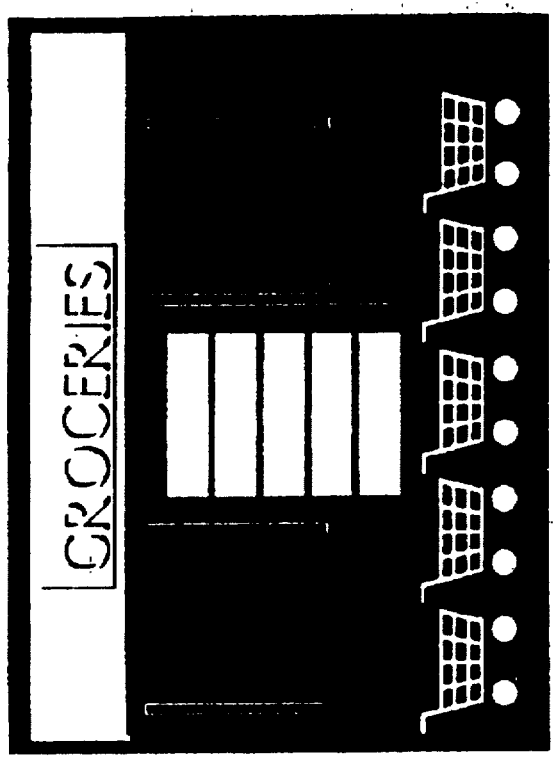
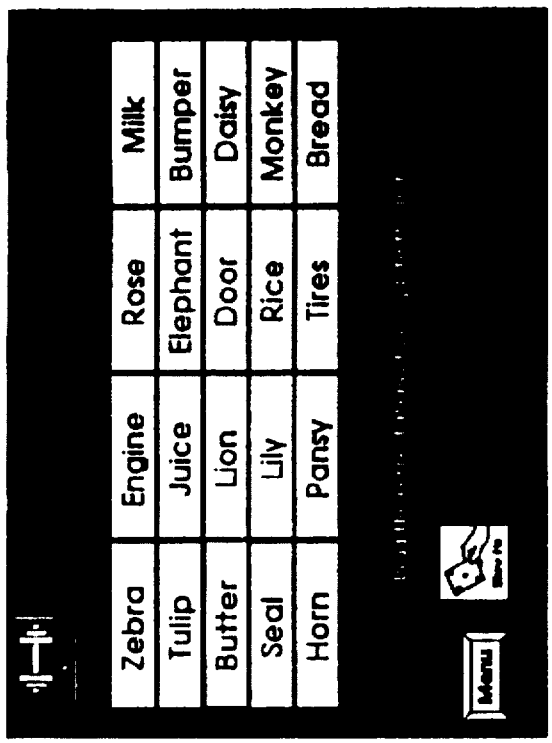
FIG. 8

| names: | things: | places: |
|---|---|---|
| Famous Left-Handed People | Basic Tools | Major U.S. Cities |
| Babe Ruth | hammer | Chicago |
| Paul McCartney | pliers | New York |
| Judy Garland | screwdriver | Atlanta |
| Gerald Ford | wrench | San Francisco |
| Harpo Marx | drill | Dallas |
| Harry Truman | saw | Los Angeles |
| Leonardo da Vinci | measuring tape | Boston |
| Jimmy Connors | | Detroit |
| Charlie Chaplin | | Washington, D.C |

FIG. 9

| dates: | times: | sizes: |
|---|---|---|
| Pay Days Jan. - April | High Tides at Golden Gate Bridge | Children's Clothing Sizes |
| 1/15 | 2:36 | 2T |
| 1/31 | 3:25 | 3T |
| 2/15 | 4:27 | 4T |
| 2/28 | 5:47 | 4 |
| 3/15 | 7:28 | 5 |
| 3/30 | 9:10 | 6 |
| 4/13 | 10:27 | 6X |
| 4/30 | 11:30 | |

FIG. 10

| signs | products |
|---|---|

<u>Warning Signs</u>
Right lane ends
Pedestrian crossing
Slippery when wet
Railroad crossing a video image showing
cat food products displays

FIG. 11

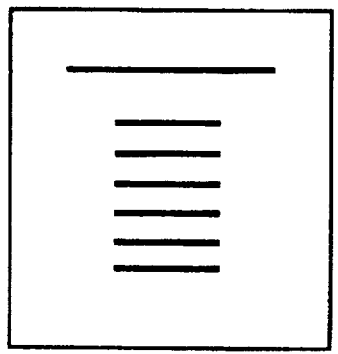 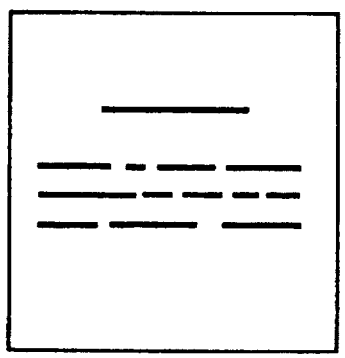 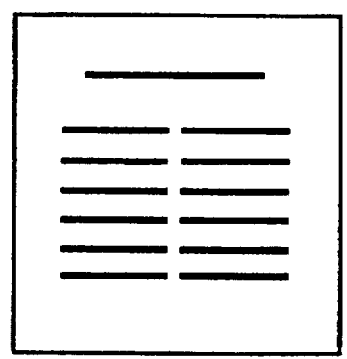
one column     a series     several columns
FIG. 15

Old El Paso  12 Taco Shells

- Tostado Shells
- Taco Seasoning
- Taco Sauce
- Refried Beans
- NACHIPS Tortilla Chips
- Enchilada Sauce
- Green Chiles
- Picante Salsa
- Chip Dips
- Pinto Beans
- Jalapeno Slices

FIG. 16

| REGIONAL AIRLINES DEPARTURES | | | |
|---|---|---|---|
| FLIGHT | TIME | TO | REMARKS |
| 4577 | 7:30 AM | Washington D.C. | Ex. Sat. & Sun. |
| 4578 | 11:10 AM | Allentown | Ex. Sat. & Sun. |
| 4579 | 1:00 PM | Washington D.C. | Ex. Sat. & Sun. |
| 4584 | 4:00 PM | Washington D.C. | Ex. Sat. & Sun. |

FIG. 17

Flags of the World
ALBANIA
ALGERIA
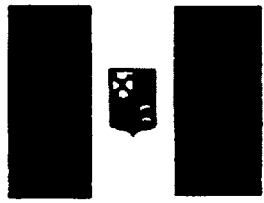
ANDORRA
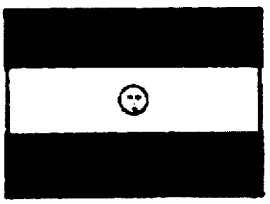
ARGENTINA
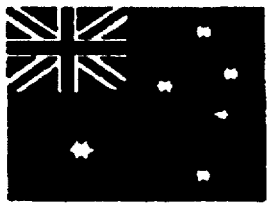
AUSTRALIA
AUSTRIA
FIG. 18

AVAILABLE ONLY IN THE FOLLOWING ZIP CODES:

TWINS

10:00 am
noon
4:00 pm
6:00 pm
8:00 pm
10:00 pm
Midnight
2:00 am

MOVIE SHOWTIMES

FIG. 20

21a — 
```
Ohio
Maryland
California
Iowa
Kansas
```

21b — 
```
California
Iowa
Kansas
Maryland
Ohio
```

21c — 
```
Maryland
Ohio
Iowa
Kansas
California
```

21d — 
```
California
Kansas
Iowa
Ohio
Maryland
```

FIG. 21

Question Words and Conditions

What Makes a List Hard to Use?

FIG. 22

- length

- organization

- distractors

FIG. 27

TOOLS NEEDED

- Caulking gun
- Single edged razor blades
- Putty knife or scraper
- Masking tape
- Matte knife
- Scrub brush and cleaning solution
- Clean, dry rags
- Ladder

FIG. 31

ZIP CODES FOR NAVY POST OFFICES
San Francisco, CA

| | | | |
|---|---|---|---|
| 96601 | 96607 | 96624 | 96630 |
| 96602 | 96614 | 96625 | 96631 |
| 96603 | 96619 | 96626 | 96633 |
| 96604 | 96621 | 96627 | 96634 |
| 96605 | 96622 | 96628 | 96635 |
| 96606 | 96623 | 96629 | 96636 |

FIG. 32

Question Set 1 - Aisle 1

Question Set 2 - We Do It All

Question Set 3 - Ingredients

FIG. 33

| Date | Place | Number | Charge |
|------|-------|--------|--------|
| May 10 | Washington, DC | 202-555-4916 | .45 |
| May 10 | Rochester, NY | 716-555-8876 | 1.23 |
| May 12 | Savannah, GA | 912-555-3440 | 2.15 |
| May 13 | Sacramento, CA | 916-555-7213 | .60 |

FIG. 36

| Best Picture | Year |
|---|---|
| Kramer vs. Kramer | 1979 |
| The Deer Hunter | 1978 |
| Annie Hall | 1977 |
| Rocky | 1976 |

FIG. 38

An order form is a combined list.
Which of these lists go together to
complete the ORDER FORM?

| Cost | Color | Channel |
|------|-------|---------|
| 12.50 | Red | 3 |
| 7.25 | Green | 7 |
| 15.00 | White | 12 |

| Material | Size |
|----------|------|
| Wood | 8 |
| Metal | 3T |
| Plastic | Large |

Drag the lists that complete the ORDER FORM

---

•••• ORDER BY PHONE ••••
800-555-0518    800-555-1446

ORDER FORM

| Item | | | |
|------|--|--|--|
| Dress | | | |
| T-shirt | | | |
| Pants | | | |

PLEASE INDICATE METHOD
OF PAYMENT ( Check One )
■ CHECK   ■ MONEY ORDER
■ C.O.D.   ■ DISCOVER
■ VISA    ■ MASTERCARD

SHIP TO ADDRESS:
NAME _____
ADDRESS _____
CITY _____
STATE _____ ZIP _____

FIG. 39

| REGIONAL AIRLINES DEPARTURES | | | |
|---|---|---|---|
| FLIGHT | TIMES | TO | REMARKS |
| 4577 | 7:30 AM | Washington D.C. | Ex. Sat. & Sun. |
| 4578 | 11:10 AM | Allentown | Ex. Sat. & Sun. |
| 4579 | 1:00 PM | Washington D.C. | Ex. Sat. & Sun. |
| 4584 | 4:00 PM | Washington D.C. | Ex. Sat. & Sun. |

FIG. 41

Average Ocean Depths

| Ocean | Depth in Feet | Area in Square Miles |
|---|---|---|
| Yellow Sea | 121 | 113,500 |
| Red Sea | 1,764 | 174,900 |
| Arctic Ocean | 3,407 | 5,105,700 |
| Gulf of Mexico | 5,297 | 582,100 |
| Atlantic Ocean | 11,730 | 33,420,000 |
| Pacific Ocean | 12,925 | 64,186,300 |

FIG. 42

CHINA TOWNE
Discount Office Furniture

| Item | Condition | Cost |
|---|---|---|
| 4 Drawer Legal Files | Excellent | $129 |
| 66 x 30 Pedestal Desk | Good | $279 |
| Wood Bookcase 39 x 30 | Excellent | $ 99 |
| Steel Shelves 48 x 18 | OK | $ 59 |
| Folding Table 36 x 96 | Good | $ 89 |
| Computer Desks | Fair | $ 89 |
| 4 Drawer Files - Used | Rough | $ 5 |
| 3 Drawer Files - Used | OK | $ 1 |
| Single Pedestal Desk | Excellent | $ 89 |
| Safe with combination | Excellent | $399 |

2320 Milton Ave., Solvay        (315) 488-0419

FIG. 43

RECOMMENDED SERVING SIZE 2 oz side dish
4 oz main dish

| DRY PASTA | | SIZE POT | WATER | SALT (if desired) | COOKED PASTA (approximate) |
|---|---|---|---|---|---|
| wt. | measure* | | | | |
| 2 oz. | 3/4 inch | 1-qt. | 1 qt. | 1/2 tsp. | 3/4 cup |
| 4 oz. | 1 inch | 2-qt. | 2 qt. | 1 tsp. | 1-1/2 cups |
| 8 oz. | 1/2 pkg. | 4-qt. | 3 qt. | 2 tsp. | 3 cups |
| 16 oz. | 1 pkg. | 6-qt. | 4 qt. | 1 tbsp. | 6-1/2 cups |

*To measure, hold a bundle of pasta 1/2 inch from end. Measure diameter at bottom.

FIG. 44

| | |
|---|---|
| Hamburger | $1.75 |
| Cheeseburger | $2.10 |
| Grilled Cheese | $1.95 |
| Turkey Breast | $3.00 |
| Roast Beef | $3.00 |
| Corned Beef | $3.75 |
| Pastrami | $3.00 |
| Reuben | $3.25 |

FIG. 45

Shipping & Handling

| Amount Ordered | Add |
|---|---|
| 0 - $10.00 | $2.25 |
| $10.01 - $20.00 | $3.25 |
| $20.01 - $40.00 | $4.25 |
| $40.01 - $60.00 | $5.25 |
| Over $60.00 | $6.25 |

Items ordered together are not necessarily shipped together.

FIG. 46

SUNDAY'S BROADCASTS

| SPORT | TIME | EVENT |
|---|---|---|
| Auto Racing | Noon | NASCAR Busch Clash |
| Tennis | Noon | Euro America's Cup finals |
| | 2:00 p.m. | Volvo women's finals |
| Basketball | 12:45 p.m. | Arizona at Oklahoma |
| | 1:00 p.m. | UNLV at N.C. State |
| | 2:30 p.m. | Purdue at Indiana |
| | 3:00 p.m. | NBA All-Star Game |
| | 4:30 p.m. | Duquesne at Temple |
| | 8:00 p.m. | Rhode Island at Houston |

FIG. 47

BIRTH DATES OF THE FIRST FIVE PRESIDENTS

★★★★★★★★★★★★

| George Washington | Feb. 22, 1732 |
|---|---|
| John Adams | Oct. 30, 1735 |
| Thomas Jefferson | Apr. 13, 1743 |
| James Madison | Mar. 16, 1751 |
| James Monroe | Apr. 28, 1758 |

FIG. 48

| | |
|---|---|
| Boneless Breaded Chicken | 2.59 |
| Tyson Chicken Wings | 2.79 |
| Marinated Chicken Breasts | 2.79 |
| Breaded Chicken Breasts | 2.59 |
| Tyson Cornish Hens | 1.29 |
| Tyson Buffalo Wings | 5.49 |

FIG. 49

| Date  | Number         | Minutes | Cost |
|-------|----------------|---------|------|
| Mar 1 | PA 215-936-1212 | 2       | .14  |
| Mar 3 | PA 215-342-0844 | 6       | .66  |
| Mar 5 | DE 302-737-4240 | 4       | 1.50 |
| Mar 5 | NJ 201-572-1760 | 2       | .20  |
| Mar 7 | PA 215-342-0844 | 3       | .19  |

Bell of Pennsylvania

Average Ocean Depths

| Ocean | Depth in Feet | Area in Square Miles |
|---|---|---|
| Yellow Sea | 121 | 113,500 |
| Red Sea | 1,764 | 174,900 |
| Arctic Ocean | 3,407 | 5,105,700 |
| Gulf of Mexico | 5,297 | 582,100 |
| Atlantic Ocean | 11,730 | 33,420,000 |
| Pacific Ocean | 12,925 | 64,186,300 |

Organized by depth - shallow to deep

FIG. 52

Average Ocean Depths

| Ocean | Depth in Feet | Area in Square Miles |
|---|---|---|
| Pacific Ocean | 12,925 | 64,186,300 |
| Atlantic Ocean | 11,730 | 33,420,000 |
| Gulf of Mexico | 5,297 | 582,100 |
| Arctic Ocean | 3,407 | 5,105,700 |
| Red Sea | 1,764 | 174,900 |
| Yellow Sea | 121 | 113,500 |

Organized by depth - deep to shallow

FIG. 53

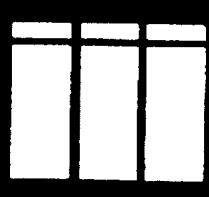  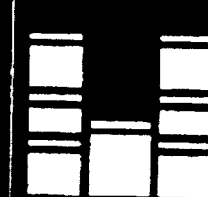 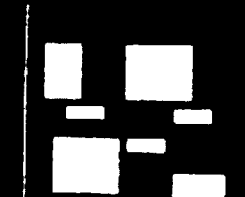
FIG. 56

Vehicle Rates

| | |
|---|---|
| Bicycles | $.25 |
| Motorcycles/Mopeds | 1.25 |
| Cars | 2.00 |
| (25¢ each extra passenger) | |
| Trucks (under 20 ft.) | 2.00 |
| Trucks (over 20 ft.) | 3.00 |
| Housecamper/Trailer | 3.00 |
| Buses | 3.00 |
| Tractor Trailer | 6.00 |

FIG. 57

**Conant Cafeteria
Serving Hours**

| Breakfast | 7:30 | to | 8:30 |
| A.M. Break | 9:30 | to | 10:30 |
| Lunch | 11:30 | to | 1:30 |
| P.M. Break | 2:30 | to | 3:15 |
| Dinner | 4:30 | to | 5:30 |

FIG. 58

| 100% COMPLETE NUTRITION FOR KITTENS AND ADULT CATS ||||
|---|---|---|
| NUTRIENT | Recommended Protein Percentage | Important For: |
| PROTEIN | 107 | Growth ard tissue repair |
| VITAMIN A | 120 | Eyes, healthy coat and bones |
| VITAMIN D | 150 | Bones & teeth |
| VITAMIN E | 156 | Fetal development & cell wall integrity |

FIG. 59

| MEDICINE DOSAGE |||||
|---|---|---|---|---|
| AGE (yr) | under 2 | 2-3 | 4-5 | 6-8 |
| WEIGHT(lb) | under 24 | 24-35 | 36-47 | 48-59 |
| TABLETS | consult physician | 2 | 3 | 4 |

FIG. 60

| MODE | SP | LP | EP |
|---|---|---|---|
| RECORDING TIME | 120 Min. | 240 Min. | 360 Min. |
| TAPE LENGTH | 246 m. | | |

FIG. 61

| HONDA | | ACURA | |
|---|---|---|---|
| CIVIC | $99 | INTEGRA | $149 |
| ACCORD | $159 | LEGEND | $259 |
| PRELUDE | $179 | NISSAN | |
| PONTIAC | | SENTRA | $99 |
| SUNBIRD | $149 | 240 Sx | $189 |
| GRAND AM | $159 | MAXIMA | CALL |
| 6000 | $179 | PULSAR | $189 |
| BONNEVILLE | $219 | STANZA | $189 |
| LINCOLN | | 300 Zx | $299 |

FIG. 62

SANDWICHES

| | |
|---|---|
| 1/4 lb. Hamburger | 1.74 |
| 1/4 lb. Cheeseburger | 1.83 |
| Bacon Cheeseburger | 2.24 |
| Fish Sandwich | 1.89 |

KIDS' MEALS

| | |
|---|---|
| Drumstick, Sm. Fries, Sm. Drink | 2.99 |
| Hamburger, Sm. Fries, Sm. Drink | 2.99 |
| Cheeseburger, Sm. Fries, Sm. Drink | 3.14 |
| Bacon Cheeseburger, Sm. Fries, Sm. Drink | 3.34 |

SIDE ORDERS

| | | | | |
|---|---|---|---|---|
| Fries | Sm. .77 | Med. .87 | | Lg. .97 |
| Cole Slaw | Reg. .69 | Lg. 1.59 | | |

BEVERAGES

| | | | | |
|---|---|---|---|---|
| Soda | Sm. .79 | Med. .82 | | Lg. .97 |
| Sanka | Reg. .55 | Lg. .65 | | |
| Hot Tea | | Reg. .65 | | |
| Hot Chocolate | | Reg. .65 | | |
| Milk | | .50 | | |

DESSERTS

| | |
|---|---|
| Sundae | .79 |
| Strawberry Shortcake | 1.09 |

FIG. 64

- rows
- columns
- grouped
- scattered

FIG. 69

| MEDICINE DOSAGE |||||
|---|---|---|---|---|
| AGE (yr) | under 2 | 2-3 | 4-5 | 6-8 |
| WEIGHT(lb) | under 24 | 24-35 | 36-47 | 48-59 |
| TABLETS | consult physician | 2 | 3 | 4 |

Vacation Guidebook Listings

DINING OUT/ FAIRS
REAL ESTATE/
AUCTIONS /GIFTS
RETAIL SHOPS/
FLEA MARKETS

FIG. 75

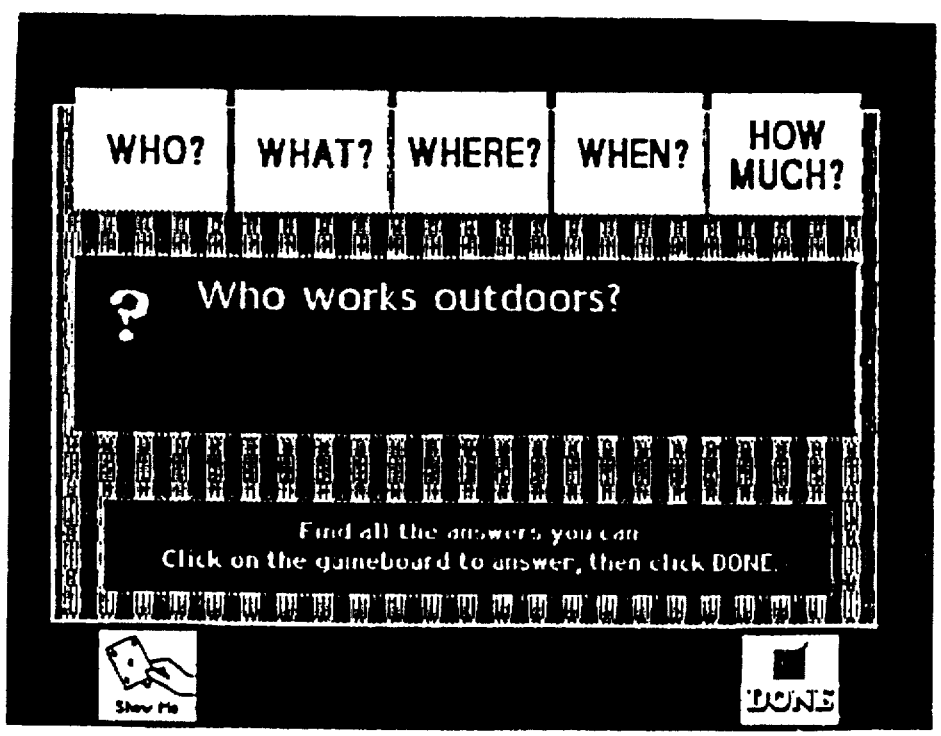
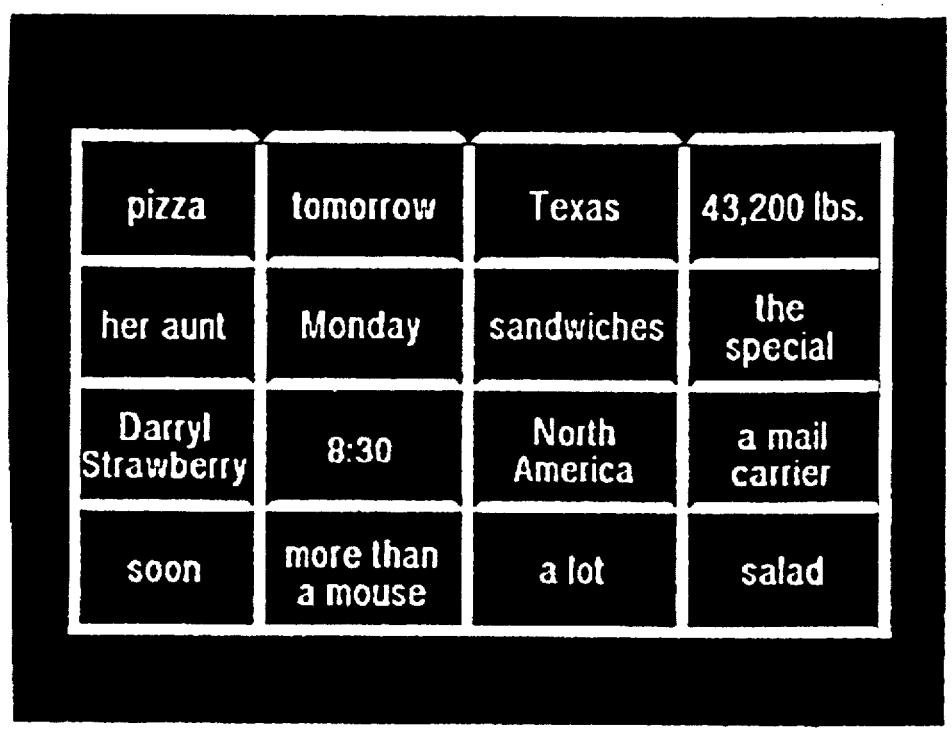
FIG. 77

STATE FISHING RECORDS

| KIND OF FISH | WEIGHT (lbs - oz) | DATE CAUGHT | PLACE CAUGHT | RECORD HOLDER |
|---|---|---|---|---|
| Brook Trout | 8 - 8 | 6-26-66 | Punchbowl Pond | W. Keener |
| Lake Trout | 32 - 0 | 5-16-86 | Lake Placid | E. Plendler |
| Rainbow Trout | 26 -15 | 5-22-85 | Lake Ontario | G. Sanania |
| Muskie | 69 -15 | 9-22-57 | St Lawrence River | A. Lawton |
| American Shad | 8 - 7 | 5-7-84 | Delaware River | C. Pittaluga |
| White Catfish | 4 - 7 | 6-14-87 | Papscannee Creek | S. Bobik |

FIG. 78

Inventions and Discoveries

| Invention | Date | Inventor | Nation |
|---|---|---|---|
| Air Conditioning | 1911 | Carrier | U.S. |
| Bicycle | 1885 | Starley | England |
| Frozen Food | 1924 | Birdseye | U.S. |
| Motorcycle | 1885 | Daimler | Germany |
| Piano | 1709 | Cristofori | Italy |
| Telescope | 1609 | Galileo | Italy |
| Thermometer | 1593 | Galileo | Italy |
| Toaster | 1918 | Strite | U.S. |
| Velcro | 1948 | de Mestral | Switzerland |

FIG. 79

| Session 1 | 9:00 A. M. to 10:30 A.M. |
|---|---|
| Course # | Title of Course |
| 101 | Food Services |
| 102 | Fashion Design |
| 103 | Cosmetology |
| 104 | Electronics |
| 105 | Dry Cleaning |
| 106 | Woodworking |
| 107 | Commercial Art |
| 108 | Agricultural Techniques |
| 109 | Creative Arts |

FIG. 80

STORE HOURS

| | | |
|---|---|---|
| mon. | 8 | -10 |
| tues. | 8 | -10 |
| wed. | 8 | -10 |
| thur. | 8 | -10 |
| fri. | 8 | - 8 |
| sat. | 10 | - 7 |
| sun. | 12 | - 7 |

FIG. 81

| Post Office | Zip Code |
|---|---|
| Ackermanville | 18010 |
| Alburtis | 18011 |
| Alpha (NJ) | 08865 |
| Allentown | 18105 |
| Aquashicola | 18012 |
| Asbury (NJ) | 08802 |
| Ashfield | 18212 |
| Bangor | 18013 |

FIG. 82

| CHECK # | AMOUNT | PAID DATE |
|---|---|---|
| 3356 | 22.50 | 12/28 |
| 3357 | 2.54 | 12/29 |
| 3559 | 197.79 | 12/19 |
| 3561 | 45.00 | 12/16 |
| 3565 | 255.96 | 12/20 |
| 3566 | 22.25 | 12/16 |
| 3567 | 50.00 | 12/15 |
| 3568 | 45.00 | 12/20 |
| 3569 | 28.00 | 12/28 |

FIG. 83

DEPARTURES

| TRAIN NUMBER | TIME | TRACK NUMBER | DESTINATION |
|---|---|---|---|
| 148 | 12:10 | 2 | SCHAUMBURG |
| 313 | 1:00 | 10 | HIGHLAND PARK |
| 111 | 1:20 | 4 | ELMHURST |
| 315 | 2:20 | 11 | OAK PARK |
| 507 | 3:10 | 6 | NORTHBROOK |
| 509 | 4:10 | 5 | ELMHURST |
| 621 | 4:30 | 14 | DOWNERS GROVE |
| 115 | 4:30 | 2 | CICERO |

FIG. 84

| HAMILTON'S BEST BUYS! | YEAR | MODEL | PRICE |
|---|---|---|---|
| | 1989 | Conquest | $15,999 |
| | 1990 | Horizon | $10,999 |
| RTV ROTH'S | 1990 | Acclaim | $13,179 |
| | 1990 | Sundance | $10,779 |
| HAMILTON | 1990 | LeBaron Cpe | $16,379 |
| CHRYSLER-PLYMOUTH | 1990 | 5th Avenue | $19,699 |
| | 1990 | Colt Wagon | $9,899 |

FIG. 85

| Date | Time | Call Type | Place | Cost |
|---|---|---|---|---|
| Nov 26 | 7:27am | Weekend | Cherry Hill | .47 |
| Nov 26 | 8:02pm | Evening | Milwaukee | 4.80 |
| Nov 28 | 10:02pm | Evening | Cherry Hill | .63 |
| Dec 2 | 8:50am | Weekend | Milwaukee | 1.59 |
| Dec 9 | 9:12pm | Weekend | Trenton | .10 |
| Dec 10 | 1:02am | Weekend | Brooklyn | .23 |
| Dec 10 | 7:24pm | Evening | Cherry Hill | .26 |
| Dec 11 | 7:50pm | Evening | Cherry Hill | 1.31 |

Bell of Pennsylvania

| NUMBER | DATE | DESCRIPTION | PAYMENT (-) | DEPOSIT (+) | BALANCE |
|--------|------|-------------|-------------|-------------|---------|
|        |      |             |             |             | 126.00  |
| 124    | 1/3  | Bell Telephone | 15.29    |             | 110.71  |
|        | 1/4  | Birthday check |          | 20.00       | 130.71  |
| 125    | 1/4  | Food Town   | 53.44       |             | 77.27   |
| 126    | 1/5  | Public Electric | 37.95   |             | 39.32   |
| 127    | 1/8  | Drug Store  | 9.15        |             | 30.17   |
|        | 1/10 | Paycheck    |             | 126.00      | 156.17  |
| 128    | 1/13 | Gas Company | 115.00      |             | 41.17   |

FIG. 89

Phillies Home Schedule for April

| | | |
|---|---|---|
| Fri. 7 | St. Louis Cardinals | 7 35 pm |
| Sat. 8 | St. Louis Cardinals | 7 05 pm |
| Sun. 9 | St. Louis Cardinals | 1 35 pm |
| Mon. 10 | Montreal Expos | 7 35 pm |
| Tue. 11 | Montreal Expos | 7 35 pm |
| Wed. 12 | Montreal Expos | 7 35 pm |
| Fri. 14 | Chicago Cubs | 7 35 pm |
| Sat. 15 | Chicago Cubs | 7 05 pm |
| Sun. 16 | Chicago Cubs | 1 35 pm |

FIG. 90

EVA'S SPECIALTY DRINKS
FRESH SQUEEZED JUICES
CAPPUCCINO
FROZEN YOGURT SHAKES
AMERICAN GLACE
HEALTH SHAKES
HOMEMADE LEMONADE
SOFT DRINKS   ESPRESSO
COFFEE  TEAS

FIG. 94

THE PRESIDENTS OF THE UNITED STATES

| President | Born | Elected at Age | Occupation |
|---|---|---|---|
| George Washington | 1732 | 57 | Planter |
| John Adams | 1735 | 61 | Lawyer |
| Thomas Jefferson | 1743 | 57 | Planter |
| James Madison | 1751 | 57 | Lawyer |
| James Monroe | 1758 | 58 | Lawyer |
| John Quincy Adams | 1767 | 57 | Lawyer |
| Andrew Jackson | 1767 | 61 | Lawyer |
| Martin Van Buren | 1782 | 54 | Lawyer |
| William H. Harrison | 1773 | 68 | Soldier |

FIG. 96

|  | Average Temperature | | Rainy |
|---|---|---|---|
| City | High | Low | Days |
| Athens | 60 | 46 | 11 |
| Brussels | 51 | 38 | 17 |
| Cairo | 75 | 51 | 1 |
| Hong Kong | 67 | 60 | 7 |
| Madrid | 59 | 41 | 10 |
| Moscow | 32 | 18 | 15 |
| Paris | 54 | 39 | 12 |
| San Francisco | 61 | 48 | 10 |

WORLD WEATHER IN MARCH

FIG. 97

| Meat/Poultry/Fish | Total fat (grams) | Saturated fat (grams) | Cholesterol (milligrams) |
|---|---|---|---|
| Beef arm, roasted lean only, 3 oz. | 6 | 3 | 77 |
| Ground beef, cooked lean, 3 oz. | 15 | 6 | 80 |
| Beef liver, fried, 3 oz. | 9 | 2 | 372 |
| Chicken, roasted without skin, 3 oz. | 6 | 2 | 76 |
| Halibut fillets, broiled with margarine, 3 oz. | 6 | 1 | 48 |

FIG. 99

| | |
|---|---|
| egg | $25 |
| egg-xacta | 135 |
| homefries | 50 |
| roll | 40 |
| bagel | 50 |
|   butter & cm. chs. | 55 |
| mini bagel | 25 |
| toast | 35 |
| English muffin | 35 |
| raisin round | 35 |

FIG. 100

Vehicle Rates

| | |
|---|---|
| Bicycles | $.25 |
| Motorcycles/Mopeds | 1.25 |
| Cars | 2.00 |
| (25¢ each extra passenger) | |
| Trucks (under 20 ft.) | 2.00 |
| Trucks (over 20 ft.) | 3.00 |
| House Camper/Trailer | 3.00 |
| Buses | 3.00 |
| Tractor Trailer | 6.00 |

FIG. 101

| train n. | time | track | destination |
|---|---|---|---|
| 507 | 12:07 | 13 | Morristown |
| 1151 | 12:30 | 6 | Suffern |
| 313 | 12:37 | 2 | Summit |
| 621 | 12:50 | 10 | Dover |
| 509 | 1:07 | 13 | Morristown |
| 1113 | 1:30 | 4 | Suffern |
| 315 | 1:37 | 2 | Summit |
| 323 | 1:50 | 11 | Dover |

FIG. 102

SANDWICHES

| | |
|---|---|
| Hamburger | $1.75 |
| Cheeseburger | $2.10 |
| Grilled Cheese | $1.95 |
| Turkey Breast | $3.00 |
| Roast Beef | $3.00 |
| Corned Beef | $3.75 |
| Pastrami | $3.00 |
| Reuben | $3.25 |

FIG. 104

| The Cost of Food | 1970 | 1980 |
|---|---|---|
| 1 lb. can of coffee | $.91 | $2.82 |
| 1 lb. margarine | .30 | .73 |
| 1 lb. sliced bacon | .95 | 1.71 |
| 1/2 gallon ice cream | .85 | 1.92 |
| 1 lb. butter | .87 | 1.97 |
| 1 lb. potatoes | .09 | .22 |
| 1 lb. sirloin steak | 1.35 | 2.93 |
| 1 dozen large eggs | .61 | 1.00 |
| 1 lb. frying chicken | .41 | .76 |

FIG. 105

CHINA TOWNE
Discount Office Furniture

| Item | Condition | Cost |
|---|---|---|
| 4 Drawer Legal Files | Excellent | $129 |
| 66 x 30 Pedestal Desk | Good | $279 |
| Wood Bookcase 39 x 30 | Excellent | $ 99 |
| Steel Shelves 48 x 18 | OK | $ 59 |
| Folding Table 36 x 96 | Good | $ 89 |
| Computer Desks | Fair | $ 89 |
| 4 Drawer Files - Used | Rough | $ 5 |
| 3 Drawer Files - Used | OK | $ 1 |
| Single Pedestal Desk | Excellent | $ 89 |
| Safe with combination | Excellent | $399 |

2320 Milton Ave., Solvay    (315) 488-0419

FIG. 106

Understanding Intersecting Lists

Using Intersecting Lists

Practice Questions

FIG. 108

Monday Evening

| | 6:00 | 6:30 | 7:00 |
|---|---|---|---|
| 3 | News | NBC News | Enter. Tonight |
| 6 | News | ABC News | Jeopardy! |
| 10 | News | CBS News | Family Feud |
| 12 | MacNeil, Lehrer Newshour | | Nightly Busines |
| 17 | Diff'rent Stroke | Facts of Life | Jeffersons |
| 23 | World Survival | Nightly Busine | N. J. News |
| 29 | Family Ties | Cheers | Movie |
| 40 | News | NBC News | Phil Donahue |
| 52 | World Surviva | Nightly Busine | N. J. News |
| 57 | New.. Beaver | Taxi | St. Elsewhere |

FIG. 110

 Which group of column labels will complete this intersecting list?
| Compact | Full Size | Luxury Size |
| 8 Feet | 10 Feet | 12 Feet |
| Infants | Women | Men |
Drag the correct group of column labels to the intersecting list.
Weekly Rates for Car Rentals
MIAMI         $89    $179    $209
DENVER        $99    $169    $229
NEW YORK      $99    $159    $259
LOS ANGELES   $119   $179    $259
FIG. 112

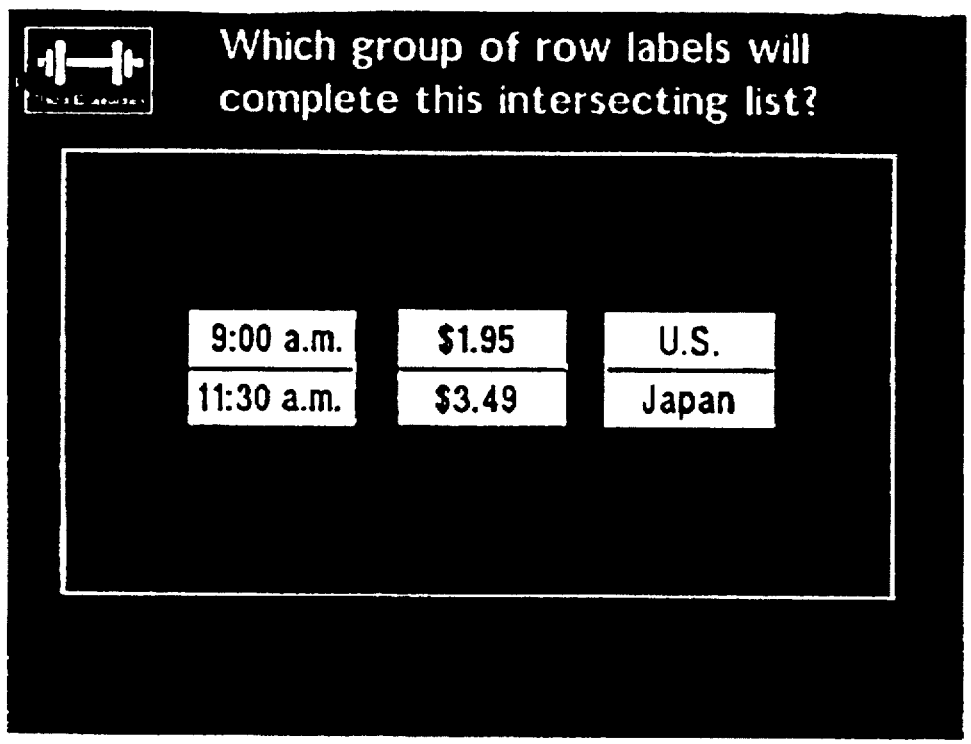
FIG. 113

Important Dates

| | 1995 | 1996 | 1997 |
|---|---|---|---|
| Martin Luther King Jr.'s Birthday | Jan. 16 | Jan. 15 | Jan. 20 |
| Lincoln's Birthday | Feb. 12 | Feb. 12 | Feb. 12 |
| Memorial Day | May 29 | May 27 | May 26 |
| Labor Day | Sept. 4 | Sept. 2 | Sept. 1 |
| Columbus Day | Oct. 9 | Oct. 14 | Oct. 13 |
| Election Day | Nov. 7 | Nov. 5 | Nov. 4 |

FIG. 114

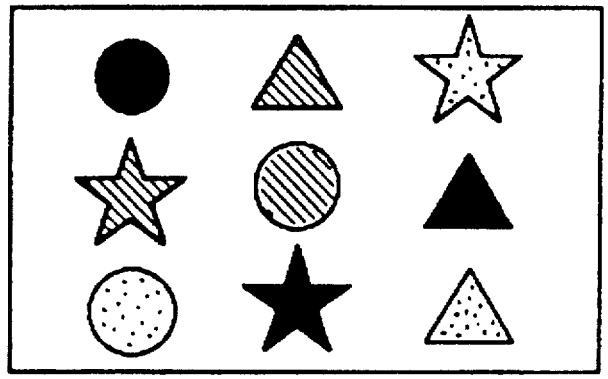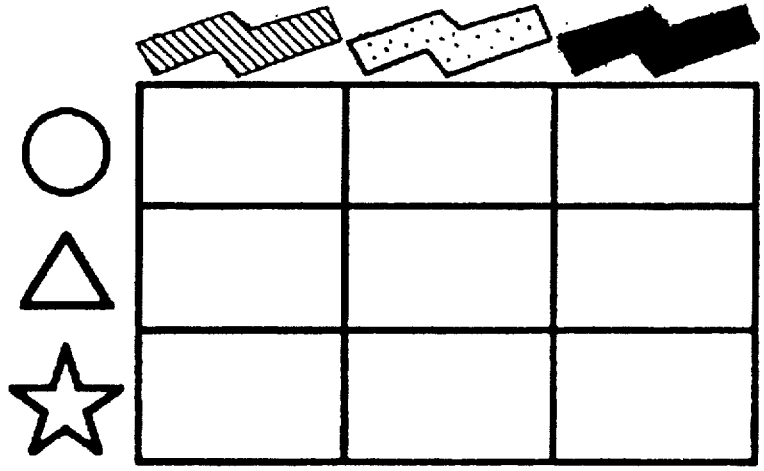
FIG. 115

Mini Blind Prices

| | WIDTH | | | |
|---|---|---|---|---|
| | 23" | 26" | 32" | 40" |
| 21" | $7 | $9 | $12 | $16 |
| 42" | 10 | 12 | 15 | 19 |
| 48" | 13 | 14 | 19 | 23 |
| 54" | 15 | 17 | 22 | 27 |
| 60" | 18 | 21 | 24 | 29 |

(LENGTH)

FIG. 116

Passenger Car Production, U.S. Plants

| Model | Year | Number of Cars |
|---|---|---|
| Celebrity | 1985 | 264,097 |
| Celebrity | 1986 | 257,983 |
| Celebrity | 1987 | 285,111 |
| Escort | 1985 | 344,548 |
| Escort | 1986 | 378,341 |
| Escort | 1987 | 394,699 |
| Taurus | 1985 | 12,250 |
| Taurus | 1986 | 355,689 |
| Taurus | 1987 | 405,690 |

FIG. 118

Passenger Car Production, U.S. Plants

|  | 1985 | 1986 | 1987 |
|---|---|---|---|
| Celebrity | 264,097 | 257,983 | 285,111 |
| Escort | 344,548 | 378,341 | 394,699 |
| Taurus | 12,250 | 355,689 | 405,690 |

FIG. 119

Complete this combined list.

| SHOWS | CHANNELS | TIMES |
|---|---|---|
| Days of Our Lives | | |
| Another World | | |
| Santa Barbara | | |
| Young and Restless | | |
| As the World Turns | | |
| Guiding Light | | |
| All My Children | | |
| One Life to Live | | |
| General Hospital | | |

| | 1:00 | 2:00 | 3:00 |
|---|---|---|---|
| 3 | Days of Our Lives | Another World | Santa Barbara |
| 5 | Young and Restless | As the World Turns | Guiding Light |
| 9 | All My Children | One Life to Live | General Hospital |

FIG. 120

IMMUNIZATION SCHEDULE FOR CHILDREN

|  | DTP[1] | Polio | TB Test[2] | MMR[3] | HIB/ Conjugate |
|---|---|---|---|---|---|
| 2 Months | ✓ | ✓ |  |  | ✓ |
| 4 Months | ✓ | ✓ |  |  | ✓ |
| 6 Months | ✓ |  |  |  |  |
| 12-15 Months |  |  | ✓ |  |  |
| 15 Months |  |  |  | ✓ | ✓ |
| 15-18 Months | ✓ | ✓ |  |  |  |
| 4-6 Years | ✓ | ✓ |  |  |  |
| 5-21 Years |  |  |  | ✓ |  |
| 14-16 Years |  |  |  |  |  |

1 Diptheria, tetanus, pertussis
2 Only in high-prevalence populations
3 Measles, mumps, rubella

FIG. 121

SUCCESSFUL SPACE LAUNCHES: 1960 TO 1988

| YEAR | USSR | UNITED STATES | EUROPEAN SPACE AGENCY | JAPAN | CHINA |
|---|---|---|---|---|---|
| TOTAL | 2016 | 875 | 16 | 34 | 19 |
| 1960-1964 | 76 | 192 | - | - | - |
| 1965-1969 | 302 | 279 | - | - | - |
| 1970-1974 | 405 | 139 | - | 5 | 2 |
| 1975-1979 | 461 | 126 | 1 | 10 | 6 |
| 1980-1984 | 483 | 93 | 8 | 12 | 6 |
| 1985 | 98 | 17 | 3 | 3 | 1 |
| 1986 | 91 | 6 | 2 | 2 | 2 |
| 1987 | 95 | 8 | 2 | 2 | 2 |
| 1988 | 90 | 12 | 7 | 7 | 4 |

FIG. 122

| | WALLEYE | PERCH | PIKE | BASS | TROUT | SALMON | PANFISH |
|---|---|---|---|---|---|---|---|
| FISHING KEY B-Best, F-Fair, G-Good, P-Poor | | | | | | | |
| Oneida Lake | F | F | F | G | G | | F |
| Seneca Lake | | G | P | B | B | | G |
| Cayuga Lake | | F | | G | G | G | B |
| Owasco Lake | | F | | G | G | G | |
| Oswego Harbor | G | | | B | B | B | G |
| Salmon River | | G | F | G | G | F | G |
| Henderson Harbor | B | F | B | B | F | F | P |
| Lake Ontario | | | | G | G | F | |

FIG. 123

| Ratings of Breakfast Cereals | Nutrients | | | | |
|---|---|---|---|---|---|
| | Fiber | Protein | Low Sugar | Low Fat | |
| Cheerios | ● | ● | ● | ● | |
| Wheaties | ● | ● | ◉ | ⊙ | |
| Life | ● | ● | ● | ● | |
| Corn Flakes | ◉ | ◉ | ● | ⊙ | |
| Kix | ◉ | ◉ | ◉ | ⊙ | |
| Rice Krispies | ○ | ◉ | ◉ | ⊙ | |
| Fruit Loops | ◉ | ● | ○ | ⊙ | |

Excellent ⊙   Very Good ●   Good ◉   Fair ●   Poor ○

| Percentage of Female Workers Employed in Selected Occupations in 1975, 1985, and 1989 |||||
|---|---|---|---|
| Occupation | 1975 | 1985 | 1989 |
| Auto Mechanic | 0.5% | 11.3% | 0.7% |
| Bus Driver | 37.7 | 49.2 | 54.8 |
| Computer Programmer | 25.6 | 34.3 | 35.2 |
| Dental Assistant | 100.0 | 99.0 | 98.9 |
| Dentist | 1.8 | 6.5 | 8.6 |
| Lawyer, Judge | 7.1 | 18.2 | 22.3 |
| Mail Carrier | 8.7 | 17.2 | 26.1 |
| Office Machine Repairer | 1.7 | 5.7 | 8.1 |

FIG. 127

WIND-CHILL FACTOR

This index is a measure of what cold weather "feels like" to the average person. For example, a temperature of 20° with a wind of 20 mph produces a wind-chill temperature of -10°.

| Wind Speed | Actual Temperature* | | | | | | |
|---|---|---|---|---|---|---|---|
| | 35 | 30 | 25 | 20 | 15 | 10 | 5 |
| 5 mph | 33 | 27 | 21 | 16 | 12 | 7 | 0 |
| 10 mph | 22 | 16 | 10 | 3 | -3 | -9 | -15 |
| 15 mph | 16 | 9 | 2 | -5 | -11 | -18 | -25 |
| 20 mph | 12 | 4 | -3 | -10 | -17 | -24 | -31 |
| 25 mph | 8 | 1 | -7 | -15 | -22 | -29 | -36 |
| 30 mph | 6 | -2 | -10 | -18 | -25 | -33 | -41 |
| 35 mph | 4 | -4 | -12 | -20 | -27 | -35 | -43 |
| 40 mph | 3 | -5 | -13 | -21 | -29 | -37 | -45 |
| 45 mph | 2 | -6 | -14 | -22 | -30 | -38 | -46 |

(*degrees fahrenheit)

FIG. 128

| PASSENGER CAR PRODUCTION, U.S. PLANTS | | | |
|---|---|---|---|
| | 1985 | 1986 | 1987 |
| ■ CELEBRITY | 264,097 | 257,983 | 285,111 |
| ■ CORVETTE | 46,304 | 28,410 | 28,514 |
| ■ DAYTONA | 47,746 | 33,063 | 64,054 |
| ■ ESCORT | 344,548 | 378,341 | 394,699 |
| ■ HONDA | 145,337 | 238,159 | 324,065 |
| ■ LINCOLN | 119,787 | 137,280 | 142,017 |
| ■ REGAL | 137,018 | 60,897 | 40,425 |
| ■ TAURUS | 12,250 | 335,689 | 405,640 |

FIG. 129

ALPHABET BABY BIBS

| COLORS | DMC | ANCHOR | PATERNAYAN |
|---|---|---|---|
| Dark Green | 890 | 218 | 661 |
| Kelly Green | 909 | 229 | 681 |
| Red | 666 | 46 | 971 |
| Burgundy | 816 | 20 | 940 |
| White | 819 | 1 | 260 |
| Black | 310 | 403 | 220 |
| Dark Brown | 938 | 381 | 470 |
| Medium Yellow | 632 | 936 | 411 |
| Butterscotch | 435 | 365 | 412 |
| Apple Green | 726 | 290 | 772 |
| Charcoal | 743 | 302 | 771 |
| Orange | 977 | 307 | 725 |
| Powder Blue | 754 | 336 | 492 |

FIG. 130

Every Mattress & Boxspring Set on Sale Now!

|              | TWIN  | FULL  | QUEEN | KING  |
|--------------|-------|-------|-------|-------|
| FIRM         | $134  | $189  | $219  | $259  |
| EXTRA FIRM   | $179  | $269  | $299  | $399  |
| LUXURY FIRM  | $199  | $289  | $329  | $499  |
| ULTRA FIRM   | $219  | $300  | $349  | $519  |

FIG. 131

|  | 9:00 | 9:30 | 10:00 | 10:30 | 11:00 | 11:30 |
|---|---|---|---|---|---|---|
| 3 | Cheers | Dear John | L.A. Law | | News | Tonight |
| 5 | Equalizer | | Knots Landing | | News | Cheers |
| 8 | Mystery! | | World at War | | East Enders | Movie |
| 10 | Oprah Winfrey Prime Time | | | | Arsenio Hall | |
| 13 | Larry King Live | | PrimeNews | | Money-Line | Sports |
| 26 | Auto Racing | | Racing | Women's Tennis | | SpoCtr. |
| 68 | Family Ties | Car 54 | Sat.Night Live | SCTV | Laugh-In | 3 Sons |

FIG. 133

AVERAGE WEIGHT OF AMERICAN MALES BY HEIGHT AND AGE

|       | 20-24 | 25-29 | 30-39 | 40-49 | 50-59 |
|-------|-------|-------|-------|-------|-------|
| 5'6"  | 148   | 152   | 156   | 158   | 159   |
| 5'7"  | 153   | 156   | 160   | 163   | 164   |
| 5'8"  | 157   | 161   | 165   | 167   | 168   |
| 5'9"  | 163   | 166   | 170   | 172   | 173   |
| 5'10" | 167   | 171   | 174   | 176   | 177   |
| 5'11" | 171   | 175   | 179   | 181   | 182   |
| 6'0"  | 176   | 181   | 184   | 186   | 187   |
| 6'1"  | 182   | 186   | 190   | 192   | 193   |
| 6'2"  | 187   | 191   | 195   | 197   | 198   |

FIG. 134

OILS AND FATS

| TYPE OF OIL | % OF SATURATED FAT | % OF POLY-UNSATURATED FAT | % OF MONO-UNSATURATED FAT |
|---|---|---|---|
| CANOLA | 6% | 62% | 32% |
| SAFFLOWER | 10% | 13% | 77% |
| SUNFLOWER | 11% | 20% | 69% |
| CORN | 13% | 25% | 62% |
| OLIVE | 14% | 77% | 9% |
| SOYBEAN | 15% | 24% | 61% |
| SESAME | 16% | 41% | 43% |
| PEANUT | 18% | 49% | 33% |
| PALM | 54% | 37% | 10% |
| COCONUT | 91% | 6% | 2% |

Choose oils high in polyunsaturated fats and monounsaturated fats - they tend to lower cholesterol levels.

FIG. 135

STATE STREET PIZZA

|  | THIN CRUST | | THICK CRUST | |
|---|---|---|---|---|
|  | 12" | 16" | 12" | 16" |
| Cheese | 5.20 | 7.25 | 5.80 | 8.25 |
| Mushroom | 5.95 | 7.75 | 6.55 | 8.75 |
| The Works | 6.50 | 8.50 | 7.10 | 9.50 | highlight        next example?

FIG. 137

Average Height and Weight for Children

| Age | Boys Height | Boys Weight* | Girls Height | Girls Weight |
|---|---|---|---|---|
| 1 | 2'5" | 21 | 2'5" | 20 |
| 3 | 3'0" | 31 | 3'0" | 30 |
| 5 | 3'6" | 39 | 3'5" | 38 |
| 7 | 3'11" | 51 | 3'11" | 49 |
| 9 | 4'4" | 63 | 4'4" | 62 |
| 11 | 4'8" | 77 | 4'8" | 77 |
| 13 | 5'0" | 92 | 5'0" | 98 |

*in pounds

FIG. 138

HOME RUN LEADERS

| | National League | | | American League | | |
|---|---|---|---|---|---|---|
| | PLAYER | TEAM | HR | PLAYER | TEAM | HR |
| 1920 | Cy Williams | Philadelphia | 56 | Babe Ruth | New York | 56 |
| 1930 | Hack Wilson | Chicago | 56 | Babe Ruth | New York | 56 |
| 1940 | John Mize | St. Louis | 43 | Hank Greenberg | Detroit | 43 |
| 1950 | Ralph Kiner | Pittsburgh | 47 | Al Rosen | Cleveland | 47 |
| 1960 | Ernie Banks | Chicago | 41 | Mickey Mantle | New York | 41 |
| 1970 | Johnny Bench | Cincinnati | 45 | Frank Howard | Washington | 45 |
| 1980 | Mike Schmidt | Philadelphia | 48 | Reggie Jackson / Ben Oglivie | New York / Milwaukee | 48 |
| 1990 | Ryne Sandberg | Chicago | 40 | Cecil Fielder | Detroit | 40 |

WINDOW SHADES

| WIDTH | Light-Filtering | | Light-Blocking | |
|---|---|---|---|---|
| | FRINGED | UNFRINGED | FRINGED | UNFRINGED |
| 15-37 IN. | $25 | $18 | $30 | $25 |
| 38-46 IN. | $32 | $39 | $38 | $33 |
| 47-73 IN. | $40 | $35 | $49 | $44 |
| 56-73 IN. | $62 | $53 | $71 | $63 |

NEWSPAPERS: Number and Circulation, 1955-88

| | Morning | | Evening | | Sunday | |
|---|---|---|---|---|---|---|
| | Number of Papers | Daily Circulation* | Number of Papers | Daily Circulation* | Number of Papers | Daily Circulation* |
| 1955 | 316 | 22,183 | 1,454 | 33,964 | 541 | 46,448 |
| 1960 | 312 | 24,029 | 1,459 | 34,853 | 563 | 47,699 |
| 1965 | 320 | 24,107 | 1,444 | 36,251 | 562 | 48,600 |
| 1970 | 334 | 25,934 | 1,429 | 36,174 | 586 | 49,217 |
| 1975 | 339 | 25,490 | 1,436 | 36,165 | 639 | 51,096 |
| 1980 | 387 | 29,414 | 1,388 | 32,787 | 735 | 54,672 |
| 1985 | 482 | 36,362 | 1,220 | 26,405 | 798 | 58,826 |
| 1988 | 529 | 40,453 | 1,141 | 22,242 | 840 | 61,474 |

(*in thousands)

FIG. 139

| Program | 18-29 | 30-49 | 50+ |
|---|---|---|---|
| 6:00 News | 80 | 90 | 100 |
| Comedy Tonight | 130 | 110 | 150 |
| Movie of the Week | 130 | 100 | 110 |

Viewers of Different Ages

Click on each box to find out about viewers of that age agroup.

| Program | Men | Women |
|---|---|---|
| 6:00 News | 190 | 150 |
| Comedy Tonight | 150 | 210 |
| Movie of the Week | 110 | 190 |
Viewers of Different Genders
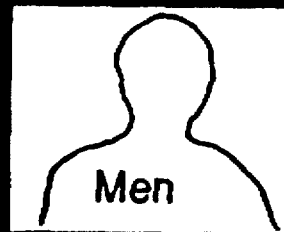
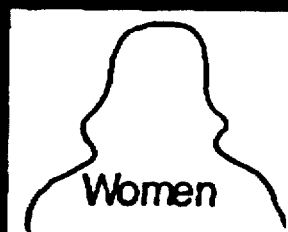
Click on each box to find out about viewers of that gender.
FIG. 142

| Program | East | West |
|---|---|---|
| 6:00 News | 160 | 170 |
| Comedy Tonight | 165 | 175 |
| Movie of the Week | 155 | 175 |
Viewers from Different Regions
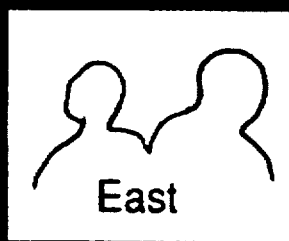
East
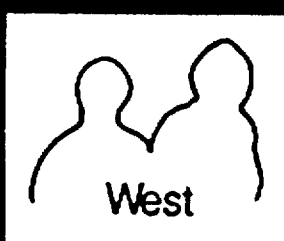
West
Click on each box to find out about viewers in that region.
FIG. 143

| Program | 18-29 | | 30-49 | | 50+ | |
|---|---|---|---|---|---|---|
| | East | West | East | West | East | West |
| 6:00 News | 45 | 35 | 50 | 40 | 50 | 50 |
| Comedy Tonight | 80 | 50 | 60 | 50 | 75 | 75 |
| Movie of the Week | 60 | 70 | 35 | 65 | 40 | 70 |

FIG. 144

| Program | Men | | | Women | | |
|---|---|---|---|---|---|---|
| | 18-29 | 30-49 | 50+ | 18-29 | 30-49 | 50+ |
| 6:00 News | 50 | 70 | 70 | 40 | 60 | 50 |
| Comedy Tonight | 65 | 40 | 45 | 75 | 60 | 75 |
| Movie of the Week | 35 | 35 | 40 | 50 | 80 | 60 |

FIG. 145

| Program | East | | West | |
|---|---|---|---|---|
| | Men | Women | Men | Women |
| 6:00 News | 80 | 80 | 95 | 75 |
| Comedy Tonight | 80 | 85 | 85 | 90 |
| Movie of the Week | 75 | 80 | 85 | 90 |

FIG. 146

| Program | 18-29 | 30-49 | 50+ |
|---|---|---|---|
| 6:00 News | 80 | 90 | 100 |
| Comedy Tonight | 130 | 110 | 150 |
| Movie of the Week | 130 | 100 | 110 |

FIG. 147

| Program | East | West |
|---|---|---|
| 6:00 News | 160 | 170 |
| Comedy Tonight | 165 | 175 |
| Movie of the Week | 155 | 175 |

FIG. 148

| Program | East | | West | |
|---|---|---|---|---|
| | Men | Women | Men | Women |
| 6:00 News | 80 | 80 | 95 | 75 |
| Comedy Tonight | 80 | 85 | 85 | 90 |
| Movie of the Week | 75 | 80 | 85 | 90 |

FIG. 149

AVERAGE WEIGHT OF AMERICANS BY HEIGHT AND AGE

| Height | Men 20-24 | 25-29 | 30-39 | 40-49 | Women 20-24 | 25-29 | 30-39 | 40-49 |
|---|---|---|---|---|---|---|---|---|
| 5'2" | 130 | 134 | 138 | 140 | 120 | 121 | 124 | 129 |
| 5'4" | 139 | 143 | 147 | 149 | 127 | 128 | 131 | 136 |
| 5'6" | 148 | 152 | 156 | 158 | 133 | 134 | 137 | 143 |
| 5'8" | 157 | 161 | 165 | 167 | 141 | 142 | 145 | 150 |
| 5'10" | 167 | 171 | 174 | 176 | 149 | 150 | 153 | 158 |
| 6'0" | 176 | 181 | 184 | 186 | 157 | 159 | 164 | 168 |

FIG. 150

WINDOW SHADES

|  | Light-Filtering | | Light-Blocking | |
|---|---|---|---|---|
| WIDTH | FRINGED | UNFRINGED | FRINGED | UNFRINGED |
| 15-37 IN. | $25 | $18 | $30 | $25 |
| 38-46 IN. | $32 | $39 | $38 | $33 |
| 47-73 IN. | $40 | $35 | $49 | $44 |
| 56-73 IN. | $62 | $53 | $71 | $63 |

>More>

FIG. 151

HOME RUN LEADERS

| | National League | | | American League | | |
|---|---|---|---|---|---|---|
| | PLAYER | TEAM | HR | PLAYER | TEAM | HR |
| 1920 | Cy Williams | Philadelphia | 56 | Babe Ruth | New York | 56 |
| 1930 | Hack Wilson | Chicago | 56 | Babe Ruth | New York | 56 |
| 1940 | John Mize | St. Louis | 43 | Hank Greenberg | Detroit | 43 |
| 1950 | Ralph Kiner | Pittsburgh | 47 | Al Rosen | Cleveland | 47 |
| 1960 | Ernie Banks | Chicago | 41 | Mickey Mantle | New York | 41 |
| 1970 | Johnny Bench | Cincinnati | 45 | Frank Howard | Washington | 45 |
| 1980 | Mike Schmidt | Philadelphia | 48 | Reggie Jackson / Ben Oglivie | New York / Milwaukee | 48 |
| 1990 | Ryne Sandberg | Chicago | 40 | Cecil Fielder | Detroit | 40 |

FIG. 152

U.S. POPULATION PROJECTIONS
(in millions of persons)

| | MALE | | | FEMALE | | |
|---|---|---|---|---|---|---|
| | Black | White | Hispanic | Black | White | Hispanic |
| 2000 | 17 | 109 | 13 | 18 | 113 | 13 |
| 2010 | 19 | 113 | 15 | 19 | 116 | 15 |
| 2020 | 23 | 115 | 18 | 23 | 119 | 18 |

FIG. 153

U.S. POPULATION PROJECTIONS
(in millions of persons)

| | BLACK | | WHITE | | HISPANIC | |
|---|---|---|---|---|---|---|
| | Male | Female | Male | Female | Male | Female |
| 2000 | 17 | 18 | 109 | 113 | 13 | 13 |
| 2010 | 19 | 19 | 113 | 116 | 15 | 15 |
| 2020 | 23 | 23 | 115 | 119 | 18 | 18 |

FIG. 154

PERCENT OF POPULATION NEVER MARRIED, 1960-1989

| | WOMEN | | | | MEN | | | |
|---|---|---|---|---|---|---|---|---|
| | 1960 | 1970 | 1980 | 1989 | 1960 | 1970 | 1980 | 1989 |
| 20-24 YRS | 28.4 | 35.8 | 50.2 | 62.5 | 53.1 | 54.7 | 68.8 | 77.4 |
| 25-29 YRS | 10.5 | 10.5 | 20.9 | 29.4 | 20.8 | 19.1 | 33.1 | 45.9 |
| 30-34 YRS | 6.9 | 6.2 | 9.5 | 16.9 | 11.9 | 9.4 | 15.9 | 25.8 |
| 35-39 YRS | 6.1 | 5.4 | 6.2 | 9.9 | 8.8 | 7.2 | 7.8 | 15.2 |
| 40-44 YRS | 6.1 | 4.9 | 4.8 | 6.3 | 7.3 | 6.3 | 7.1 | 8.3 |
| 45-54 YRS | 7.0 | 4.9 | 4.7 | 5.4 | 7.4 | 7.5 | 6.1 | 6.7 |
| 55-64 YRS | 8.0 | 6.8 | 4.5 | 4.4 | 8.0 | 7.8 | 5.3 | 5.8 |
| 65 & OVER | 8.5 | 7.7 | 5.9 | 5.0 | 7.7 | 7.5 | 4.9 | 4.7 |

FIG. 155

Decorative Curtain Rods

| Length | Walnut Finish | | | Oak Finish | | |
|---|---|---|---|---|---|---|
| | Catalog No. | Weight | Price | Catalog No. | Weight | Price |
| 38 to 66 in. | R73-835 | 4.5 lb. | $38.00 | R73-413 | 5 lb. | $46.00 |
| 66 to 120 in. | R73-843 | 7 lb. | $59.00 | R73-421 | 7.5 lb. | $70.00 |
| 120 to 180 in. | R73-850 | 10.5 lb. | $81.00 | R73-926 | 11 lb. | $84.00 |

FIG. 156

Dial-Direct

| Rates from other places in this directory may vary slightly  From UNION GROVE to: | WEEKDAY FULL RATE | | EVENING 35% DISCOUNT | | NIGHT & WEEKEND 60% DISCOUNT | |
|---|---|---|---|---|---|---|
| | FIRST MINUTE | EACH ADDITIONAL MINUTE | FIRST MINUTE | EACH ADDITIONAL MINUTE | FIRST MINUTE | EACH ADDITIONAL MINUTE |
| BEAVER DAM | .31 | .27 | .20 | .18 | .12 | .11 |
| EAGLE | .23 | .17 | .15 | .11 | .09 | .07 |
| POND DU LAC | .35 | .29 | .22 | .19 | .13 | .12 |
| TREVOR | .19 | .13 | .12 | .09 | .06 | .05 |
| WHITEWATER | .29 | .24 | .19 | .16 | .12 | .10 |
| WIND LAKE | .16 | .11 | .10 | .08 | .06 | .04 |

FIG. 157

TOP 5 GOLD PRODUCERS
(Percent of World Production)

| Year | Africa — South Africa | North America — Canada | North America — U.S. | Other — China | Other — USSR |
|------|------|--------|------|-------|------|
| 1982 | 50% | 3% | 5% | 4% | 20% |
| 1983 | 48% | 4% | 5% | 4% | 19% |
| 1984 | 47% | 4% | 6% | 4% | 18% |
| 1985 | 44% | 5% | 6% | 4% | 18% |
| 1986 | 40% | 7% | 6% | 4% | 17% |
| 1987 | 36% | 9% | 7% | 4% | 17% |
| 1988 | 34% | 11% | 7% | 4% | 17% |
| 1989 | 31% | 13% | 8% | 4% | 15% |

FIG. 159

MOST POPULAR TV SHOWS, 1980-1989

| Rank | Show | Rank | Show |
|------|------|------|------|
| 1. | 60 Minutes | 5. | Knots Landing |
| 2. | Dallas | 6. | Cheers |
| 3. | The Cosby Show | 7. | Magnum P.I. |
| 4. | Dynasty | 8. | Murder, She Wrote |

HOW MUCH YOU PAY EACH MONTH FOR YOUR GROUP HOSPITAL INSURANCE

|  | REGULAR PLAN | | | ECONOMY PLAN | | |
|---|---|---|---|---|---|---|
| PLAN | Under Age 45 | 45 - 54 | 55 and over | Under Age 45 | 45 - 54 | 55 and over |
| Individual (covers you only) | $20.50 | $26.05 | $35.50 | $13.40 | $16.95 | $27.30 |
| Husband/Wife | $34.50 | $44.10 | $64.45 | $22.10 | $28.20 | $41.05 |
| One Parent Family | $29.70 | $35.25 | $44.70 | $19.10 | $22.65 | $33.00 |
| All Family | $43.70 | $53.30 | $73.65 | $27.80 | $33.90 | $46.75 |

FIG. 163

Characteristics of the Voting-Age Population:

| Characteristic | 1984 | | 1988 | |
|---|---|---|---|---|
| | Percent registered | Percent voted | Percent registered | Percent voted |
| Total, 18 years and over | 68.3 | 59.9 | 66.6 | 57.1 |
| White | 69.6 | 61.4 | 67.9 | 59.1 |
| Black | 66.3 | 55.8 | 64.5 | 51.5 |
| Hispanic | 40.1 | 32.6 | 35.5 | 28.8 |
| 18 to 24 years | 51.3 | 40.8 | 48.2 | 36.1 |
| 25 to 44 years | 66.6 | 58.4 | 63.0 | 53.9 |
| 45 to 64 years | 76.6 | 69.8 | 75.5 | 67.8 |
| 65 years and over | 76.9 | 67.7 | 78.4 | 68.8 |
| Northeast | 66.6 | 59.7 | 64.8 | 57.4 |
| Midwest | 74.6 | 65.7 | 72.5 | 62.9 |
| South | 66.9 | 56.8 | 65.6 | 54.5 |
| West | 64.7 | 58.5 | 63.0 | 55.6 |

FIG. 165

TEMPERATURES AROUND THE NATION

|           | Wednesday HIGH / LOW | Thursday HIGH / LOW | Friday HIGH / LOW |
|-----------|----------|----------|----------|
| CLEVELAND | 66 / 32  | 64 / 40  | 49 / 38  |
| DENVER    | 82 / 49  | 88 / 56  | 84 / 52  |
| FLAGSTAFF | 78 / 37  | 83 / 45  | 76 / 37  |
| HOUSTON   | 83 / 62  | 85 / 64  | 89 / 67  |
| MEMPHIS   | 75 / 47  | 83 / 59  | 86 / 62  |
| ORLANDO   | 66 / 50  | 72 / 45  | 75 / 45  |
| RALEIGH   | 86 / 62  | 84 / 62  | 85 / 60  |
| SEATTLE   | 63 / 52  | 56 / 42  | 54 / 44  |
| TUPELO    | 74 / 45  | 81 / 52  | 84 / 56  |

FIG. 166

What Are Charts and Graphs?

Understanding Pie Charts

Understanding Bar Graphs

Understanding Line Graphs

Titles and Subtitles

Information Outside the Graph

Comparing Charts & Graphs

FIG. 167

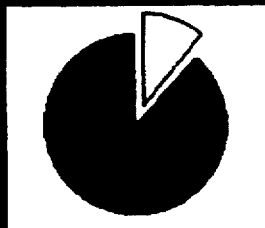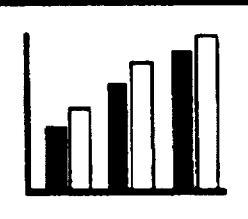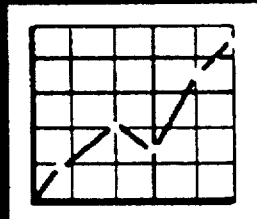
FIG. 169

```
┌─────────────────┐
│   What Are      │
│   Bar Graphs?   │
└────────┬────────┘
         │
┌────────┴────────┐
│ What Are Axes?  │
└────────┬────────┘
         │
    ┌────┴─────────┐
    │  Bar Graphs  │
    │  and Lists   │
    └──────────────┘
```

FIG. 184

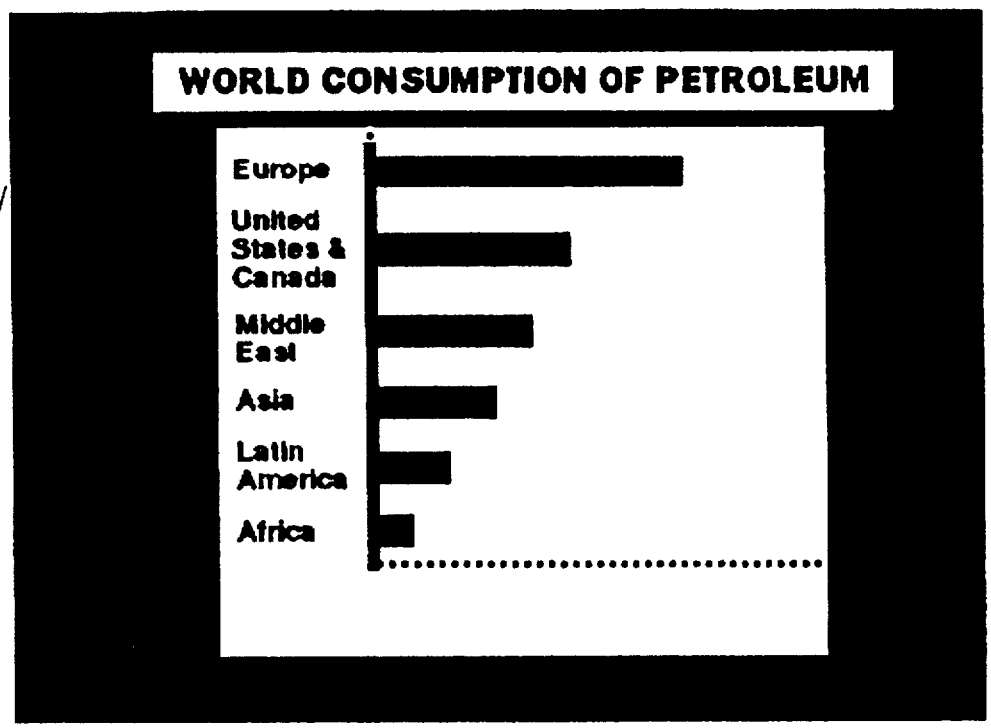
188a
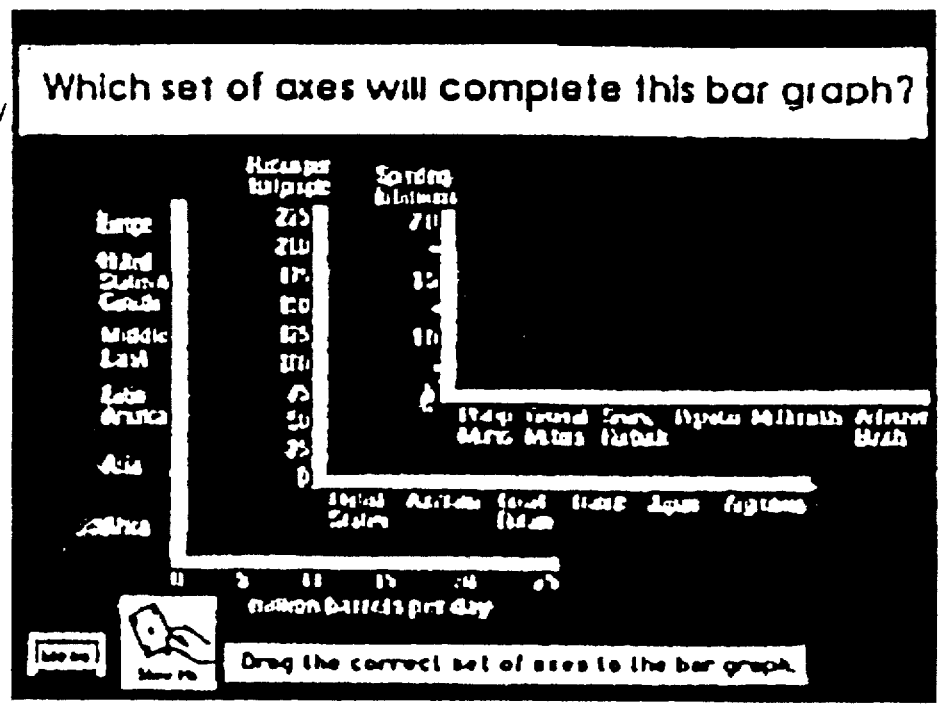
188b
FIG. 188

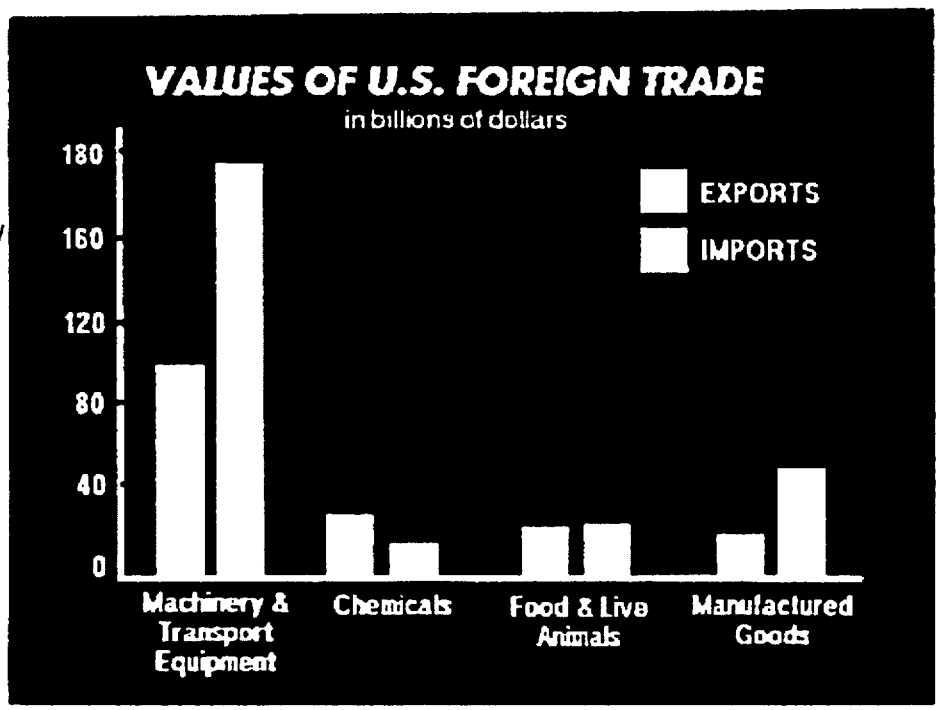
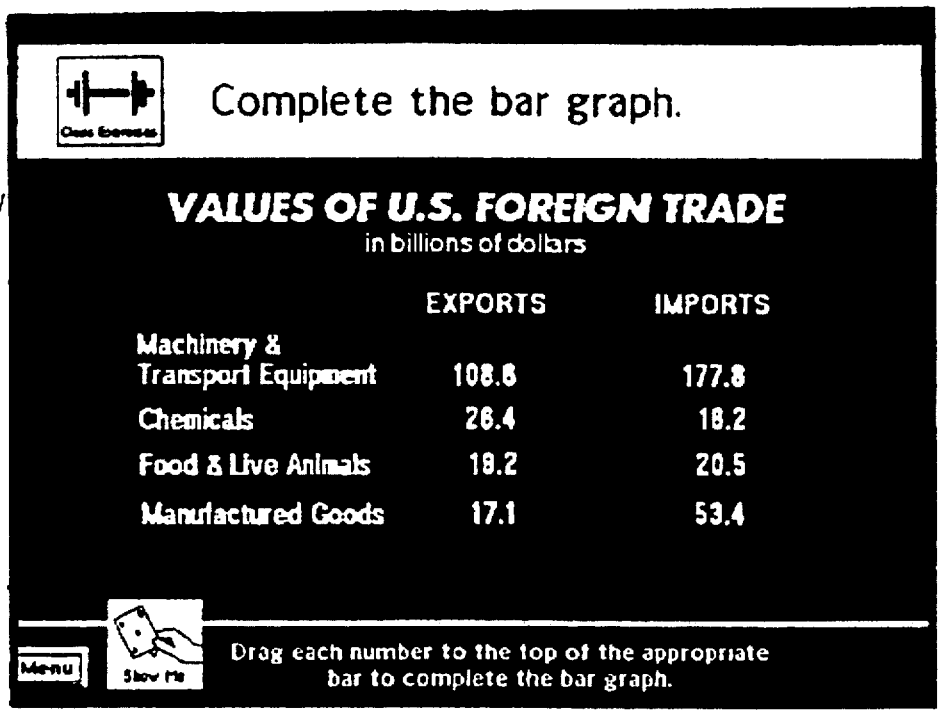
FIG. 193

```
┌─────────────────┐
│   What Are      │
│  Line Graphs?   │
└────────┬────────┘
         │
┌────────┴────────┐
│  What Are Axes? │
└────────┬────────┘
         │
┌────────┴────────┐
│   Line Graphs   │
│    and Lists    │
└─────────────────┘
```

FIG. 194

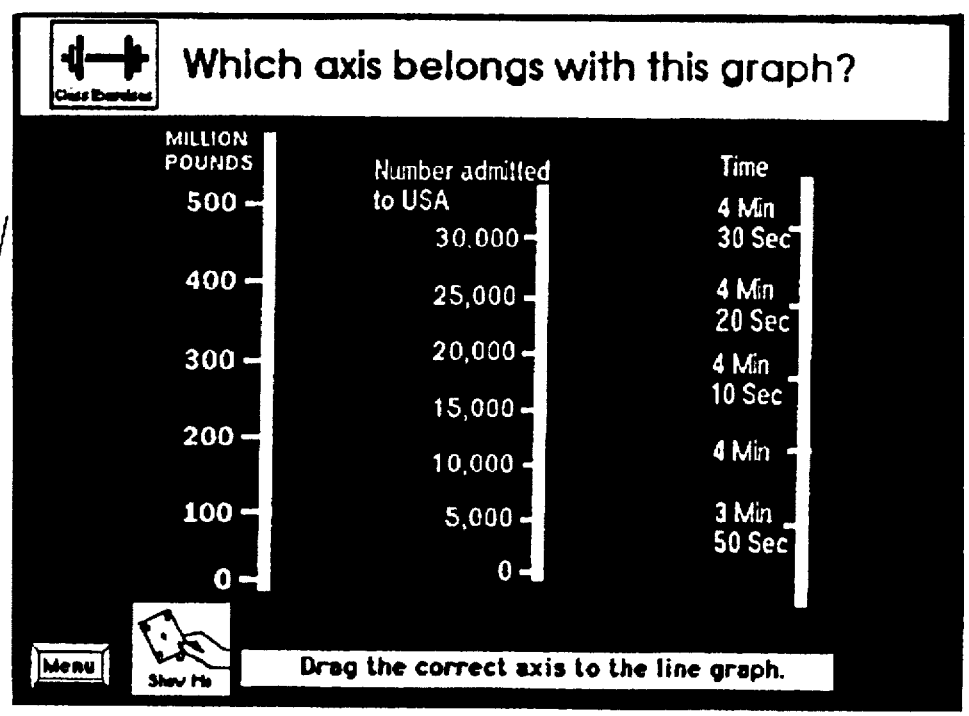
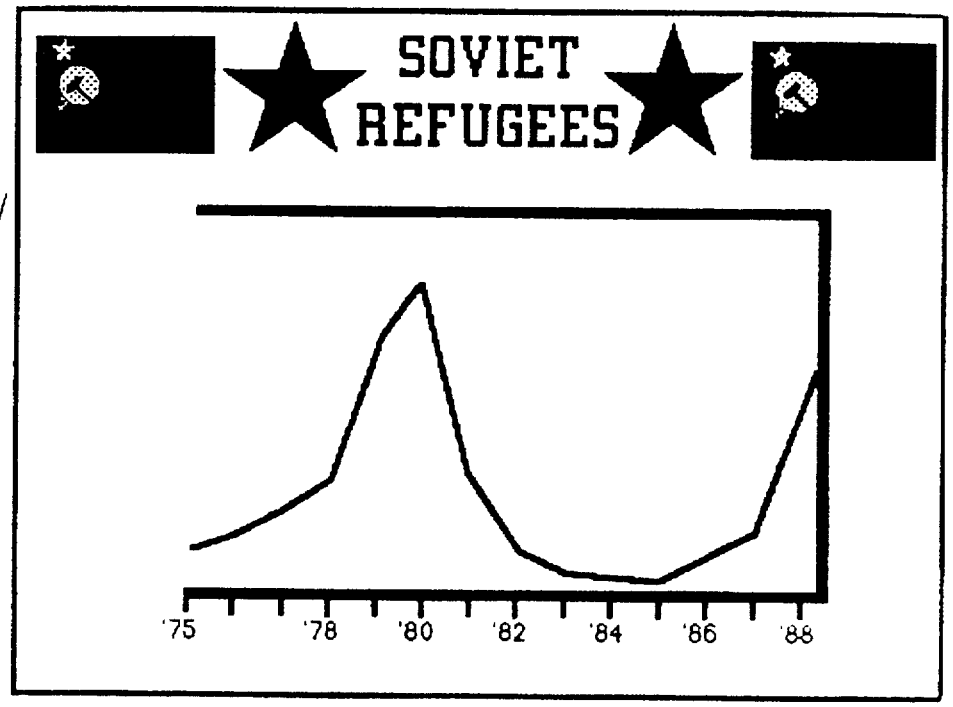
FIG. 199

| AGE | APPROXIMATE WEIGHT RANGE | DOSAGE | | |
|---|---|---|---|---|
| | | DROPS | SYRUP | CHEWAB |
| 3 MO. | UNDER 13 LB. | ½ DROPPER | ¼ TSP. | |
| 9 MO. | 13-20 LBS. | 1 DROPPER | ½ TSP. | |
| MO. | 21-26 LBS | 1½ DROPPER | ¾ TSP. | |
| MO | 27-35 LBS | 3 DROPPER | 1 TSP. | 2 TABLETS |
| | 36-43 LBS | | 1½ TSP | 3 |
| | 44-62 LBS | | 2 TSP. | 4 |
| | 63-77 | | 2½ TSP. | 5 |

New York State - Department of Motor Vehicles

VEHICLE REGISTRATION/TITLE APPLICATION
*PLEASE PRINT WITH BLACK OR BLUE INK IN THE BOXES*

What do you want to do?

Name of registrant

Date of birth    Sex

Mailing address

City or town    State    Zip code    County

Vehicle description

Vehicle Identification number    Current odometer reading

EMPLOYMENT APPLICATION

SECTION A

| Name | | |
|---|---|---|
| Address | | |
| Phone Number | Social Security Number | Are you a U.S. citizen? ☐ Yes ☐ No |

SECTION B

| Type of School | Name and Location of School | Degree | Graduated? |
|---|---|---|---|
| HIGH SCHOOL | Name<br>City  State | | Yes No<br>☐ ☐ |
| OTHER | Name<br>City  State | | Yes No<br>☐ ☐ |

SECTION C

| Dates | Name and Address of Employer | Position Held | Wages |
|---|---|---|---|
| From:<br>_/_<br>mo. yr.<br>To:<br>_/_<br>mo. yr. | Name<br>Address<br>Phone | Job Title<br><br>Supervisor | Starting<br><br>Final |

FIG. 269

State of New Jersey
DEPARTMENT OF HUMAN RESOURCES
Division of Youth and Family Services

CHILD DAY CARE SCREENING

MOTHER'S NAME OR LEGAL GUARDIAN
_____

ADDRESS _____
_____

PHONE:   HOME _____

WORK _____

FIG. 270

SAVINGS ACCOUNT FORM

WITHDRAWAL

DATE _____ 19 __

PRINT NAME _____

$ _____

ACCOUNT NUMBER ☐☐☐ ☐☐☐ ☐☐☐

SIGNATURE OF ACCOUNT OWNER _____

FIG. 271

APPLICATION FOR A SOCIAL SECURITY CARD
Form SS-5 (Original, Replacement or Correction)

| CSP 3 | CITIZENSHIP | SEX 4 | SEX |
|---|---|---|---|
| | ☐ a. U.S. CITIZEN | | ☐ MALE |
| | ☐ b. LEGAL ALIEN ALLOWED TO WORK | | |
| | ☐ c. LEGAL ALIEN NOT ALLOWED TO WORK | | ☐ FEMALE |
| | ☐ d. OTHER (See Instructions on Page 2) | | |

FIG. 272

MARSHALL FIELDS
CREDIT APPLICATION

YOUR PERSONAL AND BUSINESS INFORMATION

First Name                    Last Name

Street Address

City                                    State   Zip Code

Former Address

FIG. 273

New York
MAGAZINE

| CIRCLE THE TERM YOU PREFER AND SAVE | 2 YEARS (100 Issues) | 1 YEAR (50 Issues) | 6 MONTHS (25 Issues) |
|---|---|---|---|
| COVER PRICE | $195.00 | $97.50 | $48.75 |
| SAVINGS OFF COVER PRICE | 70% | 70% | 70% |
| YOUR COST | $58.00 | $29.00 | $14.50 |

NAME

ADDRESS                    APT.

CITY          STATE     ZIP

FIG. 274

METHOD OF PAYMENT

☐ Check  ☐ Money Order (Please do not send cash). Make checks and money orders payable to AMERICA IN SPACE.

☐ VISA  ☐ MasterCard  ☐ American Express  ☐ Discover

Credit Card No: ☐☐☐☐☐☐☐☐☐☐☐☐☐☐☐☐

My card expires: ☐☐ ☐☐
           Month Year

Signature: _____

Telephone Number: (____) _____

FIG. 275

Illinois - Department of Motor Vehicles

DRIVER'S LICENSE APPLICATION

*PLEASE PRINT WITH BLUE OR BLACK INK*

FOR OFFICE USE ONLY
BATCH FILE NO.
1 - CODE
LRC   LAM   LRN
LDP   LNO   LIS

LAST NAME | FIRST NAME | MIDDLE NAME

MAILING ADDRESS (include Street Number and Name, Rural Delivery, Box and/or Apartment Number)

CITY OR TOWN | STATE | ZIP CODE | COUNTY

DATE OF BIRTH | SOCIAL SECURITY NUMBER

Name of month | Day | Year

SEX | HEIGHT | WEIGHT | HAIR COLOR | EYE COLOR
☐ Male
☐ Female | Feet  Inches | Pounds

FIG. 276

Credit Application

INFORMATION ABOUT APPLICANT

ADDRESS

DO YOU: ☐ OWN  ☐ RENT  ☐ OTHER  SPECIFY: _____

MORTGAGE HOLDER OR LANDLORD & ADDRESS

MONTHLY MORTGAGE/RENT

EMPLOYER | HOW LONG?

EMPLOYER'S ADDRESS

GROSSMAN'S
EVERYTHING TO BUILD WITH

CUSTOMER COPY

CREDIT APPLICATION - TERMS OF AGREEMENT

In consideration of the extension of credit by Grossman's, Buyer promises to pay the purchase price, and the FINANCE CHARGE thereon, of the merchandise shown in the sales slip or other memorandum of purchase signed by Buyer evidencing a purchase under the terms of this Agreement. Whenever Buyer pays the entire New Balance, as shown on the monthly billing statement, within 30 days from the Statement Date shown thereon, or if there is no balance as of such Statement Date, there will be no FINANCE CHARGE assessed. Otherwise, a FINANCE CHARGE of 1 1/2% per month (ANNUAL PERCENTAGE RATE: 18%) shall be imposed on that portion of the Average Daily Balance of Buyer's account during the billing period which is $500 or less and a FINANCE CHARGE of 1% per month (ANNUAL PERCENTAGE RATE: 12%) shall be imposed on that portion of the Average Daily Balance which exceeds $500, subject, however, to a minimum monthly FINANCE CHARGE of 50¢ for each month in which the Average Daily Balance is less than $35.00. The Average Daily Balance is determined by dividing the sum of the balances outstanding for each day of the billing period, which balances shall include deductions for payments and credits during the period, but exclude any purchases added to the account during such period, by the number of days in the billing period. The price of the goods together with the FINANCE CHARGE imposed theron shall be paid in accordance with the following schedule of payments.

| NEW BALANCE | MINIMUM MONTHLY PAYMENT |
|---|---|
| 00.00 to $ 15.00 | NEW BALANCE |
| 15.00 to $150.00 | $ 15.00 |
| 150.01 to $200.00 | $ 20.00 |

FIG. 281

APPLICATION FOR
GEORGIA JOB TRAINING PARTNERSHIP PROGRAM

PART II - ELIGIBILITY DATA

14a. CITIZENSHIP

| U.S. Cit. | U.S. Nat. | Perm. Alien | Other Alien |
|---|---|---|---|
| 1 | 2 | 3 | 4 |

14b. I-94 STAMPED

14c. REGISTRATION NO.

15. FARM FAMILY

| No | Yes | Mig. | Sea. |
|---|---|---|---|
| 1 | 2 | 3 | 4 |

16. VETERANS STATUS

| No | Disab. | Viet. Era | Rec. Sep. | Other |
|---|---|---|---|---|
| 1 | 2 | 3 | 4 | 5 |

17. FAMILY STATUS

| Single w/d less than 6 | Single w/d 6-17 | Single w/d more than 17 | Parent in 2-par. fam. | Family member | Non-dep. Individual |
|---|---|---|---|---|---|
| 1 | 2 | 3 | 4 | 5 | 6 |

18. NO. IN FAMILY 6 MOS.

19. NO. OF DEPENDENTS

20. DRAFT COMPLIANCE

YES, I want to subscribe.

Please start my one-year subscription (six bimonthly issues) to National Geographic TRAVELER.

*Check one:*

☐ Bill me $17.95.
☐ Enclosed is $17.95.

_____
Name

_____
Street

_____
City           State           Zip Code

Forms in Different Contents

Steps for Filling Out a Form

What Makes Forms Harder?

FIG. 286

MEDICAL FORM

FAMILY HISTORY

Please place a check after any condition that is a past or present health problem.

| CONDITION | YOU | FATHER | MOTHER |
|---|---|---|---|
| Arthritis | ___ | ___ | ___ |
| Asthma | ___ | ___ | ___ |
| Back trouble | ___ | ___ | ___ |
| Bursitis | ___ | ___ | ___ |
| Cancer | ___ | ___ | ___ |
| Constipation | ___ | ___ | ___ |
| Diabetes | ___ | ___ | ___ |
| Disc problems | ___ | ___ | ___ |
| Emphysema | ___ | ___ | ___ |
| Epilepsy | ___ | ___ | ___ |
| Headaches | ___ | ___ | ___ |
| Heart trouble | ___ | ___ | ___ |
| High blood pressure | ___ | ___ | ___ |
| Insomnia | ___ | ___ | ___ |

FIG. 287

STATEMENT OF CLAIM
Group Health Benefits

INSTRUCTIONS FOR FILING A CLAIM

YOUR CLAIM WILL BE SUBJECT TO DELAY OR RETURN IF THESE INSTRUCTIONS ARE NOT FOLLOWED

- Be sure every entry on this form has been completed.
- Use a separate form for each member of the family for each separate illness or accident.
- For physicians' charges see instructions on reverse side of this form.
- For drug charges ask for bills which show: - name of patient - name of physician prescribing medication - prescription number and date filled
- Cancelled checks are not acceptable
- Send this form and your bills to National Benefits Corporation at the above address.

FIG. 288

9 To whom shall the insurance benefits be paid at your death? Indicate full name ( e.g. Mary A. Smith not Mrs. John Smith) A married person with children usually names his/her spouse as primary beneficiary and simply "my children" under contigent beneficiary. When the term "my children" is used, the date of birth and relationship columns are left blank. Unless you specify otherwise, this term provides equally for all your children, present and future, born of any and all marriages or legally adopted at any time. If primary beneficiary is other than spouse, child or parent, please explain purpose of insurance in details below.

| primary beneficiary(ies) | date of birth | relationship to you |
|---|---|---|
|  |  |  |
| contingent beneficiary(ies) |  |  |
|  |  |  |

Note: If no primary beneficiary is living at the time of insured's death, benefits are payable to the contingent beneficiary.

Details here:

FIG. 289

⑨ To whom shall the insurance benefits be paid at your death? Indicate full name (e.g. Mary A. Smith not Mrs. John Smith) A married person with children usually names his/her spouse as primary beneficiary and simply 'my children' under contigent beneficiary. When the term 'my children' is used, the date of birth and relationship columns are left blank. Unless you specify otherwise, this term provides equally for all your children, present and future, born of any and all marriages or legally adopted at any time. If primary beneficiary is other than spouse, child or parent, please explain purpose of insurance in details below.

| primary beneficiary(ies) | date of birth | relationship to you |
|---|---|---|
|  |  |  |
| contingent beneficiary(ies) |  |  |
|  |  |  |

Note: If no primary beneficiary is living at the time of insured's death, benefits are payable to the contingent beneficiary.

Details here:

FIG. 290

17. Family Status (please circle)

| Single w/d less than 6 | Single w/d 6 - 17 | Single w/d more than 17 |
|:---:|:---:|:---:|
| 1 | 2 | 3 |

| Parent in 2-par. fam. | Family member | Non-dep. individual |
|:---:|:---:|:---:|
| 4 | 5 | 6 |

FIG. 291

NEW YORK STATE- DEPARTMENT OF MOTOR VEHICLES
REGISTERING A VEHICLE IN NEW YORK STATE -
WHAT YOU WILL NEED -

| To REGISTER a vehicle | To CHANGE your registration or title. |
|---|---|
| 1. Completed Registration/ Title Application (MV-82).<br>2. Proof of ownership.<br>3. Proof of insurance<br>Proof of inspection.<br>5. Sales Tax Clearance.<br>6. Proof of your identity and D.O.B.<br>7. If registering for a corporation, proof of incorporation.<br>8. If you (the registrant) are not the owner, registration authorization.<br>9. The authorization fee. | 1. Completed Registration/ Title Application (MV-82).<br>2. Your present registration.<br>3. For 1973 or newer vehicles, your Certificate of Title.<br>4. The appropriate fee.<br>5. For a change in name, partnership, vehicle year, vehicle identification number, or registration class, you will also need:<br>  a. Proof of insurance.<br>  b. Proof of change to be made. |
| To RENEW your registration: | To TRANSFER PLATES: |
| 1. Completed Registration Renewal Reminder or, if you don't have it or if information on the reminder is wrong | 1. Completed Registration/ Title Application (MV-82).<br>2. Proof of ownership. |

FIG. 292

15a Do you speak a language other than English at home?

☐ YES  ☐ NO — Skip to 16

15b What is this language?

For example: Chinese, Italian, Spanish, Vietnamese

16 Were you

☐ born before April 1, 1975? — Go to 17a

☐ born April 1, 1975 or later? — Go to questions for the next person

FIG. 293

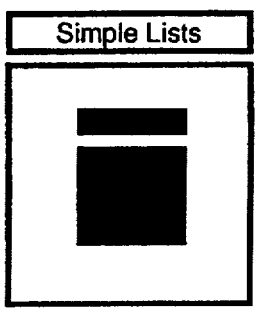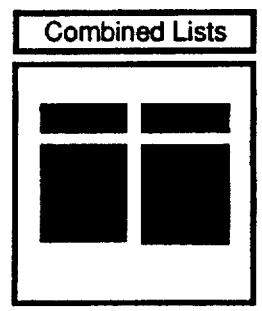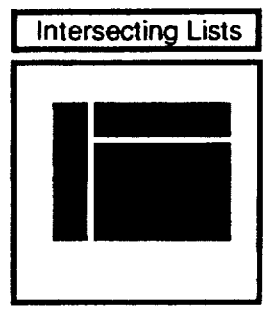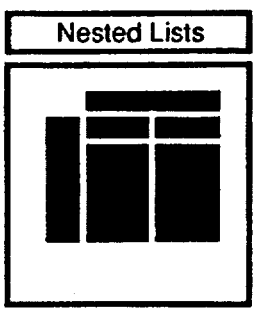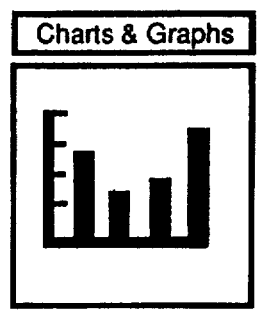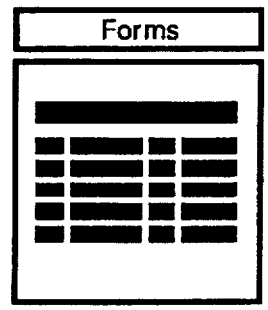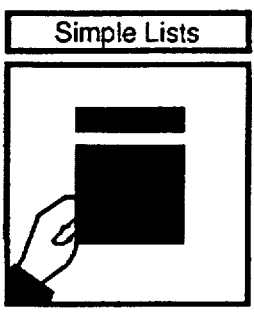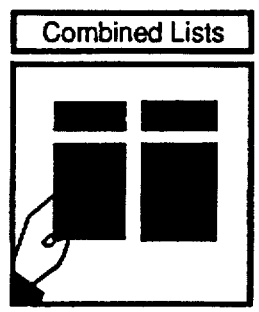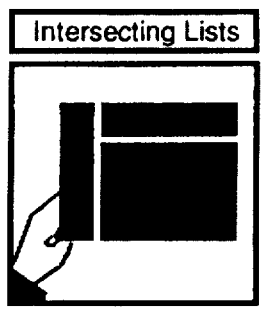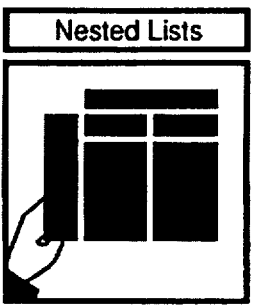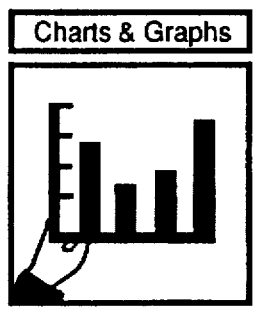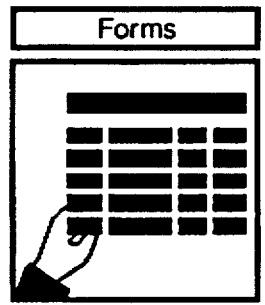
FIG. 296

UNDERSTANDING CHARTS AND GRAPHS

WORKSHEET

Fertility Rates of Women in the United States, aged 15-44

| Year | Births per 1,000 women |
|------|------------------------|
| 1940 | 80 |
| 1945 | 86 |
| 1950 | 106 |
| 1955 | 118 |
| 1960 | 118 |
| 1965 | 97 |
| 1970 | 88 |
| 1975 | 66 |
| 1980 | 68 |
| 1985 | 66 |
| 1990 | 69 |

UNDERSTANDING CHARTS AND GRAPHS

WORKSHEET

Estimated Future Population of the United States

|  | BLACK | | WHITE | |
|---|---|---|---|---|
|  | Male | Female | Male | Female |
| 2000 | 16,787 | 18,342 | 108,774 | 112,739 |
| 2010 | 18,602 | 20,231 | 112,610 | 116,368 |
| 2020 | 23,445 | 25,361 | 115,285 | 119,456 |

UNDERSTANDING CHARTS AND GRAPHS

WORKSHEET

Estimated Future Population of the United States

|  | BLACK | | WHITE | |
|---|---|---|---|---|
|  | Male | Female | Male | Female |
| 2000 | 16,787 | 18,342 | 108,774 | 112,739 |
| 2010 | 18,602 | 20,231 | 112,610 | 116,368 |
| 2020 | 23,445 | 25,361 | 115,285 | 119,456 |

CHARTS AND GRAPHS USE LESSONS

PRACTICE EXERCISES

PIE CHART

1. What year does this pie chart cover?

2. How many women finished less than 4 years of gigh school? How many women out of 100 finished less than 4 years of high school?

3. What is the educational attainment of the largest group?

4. What is greater, the group with 4 years of college, or the group with 1-3 years of college?

5. Show the pie chart as a combined list.

FIG. 301

CHARTS AND GRAPHS USE LESSONS
PRACTICE EXERCISES
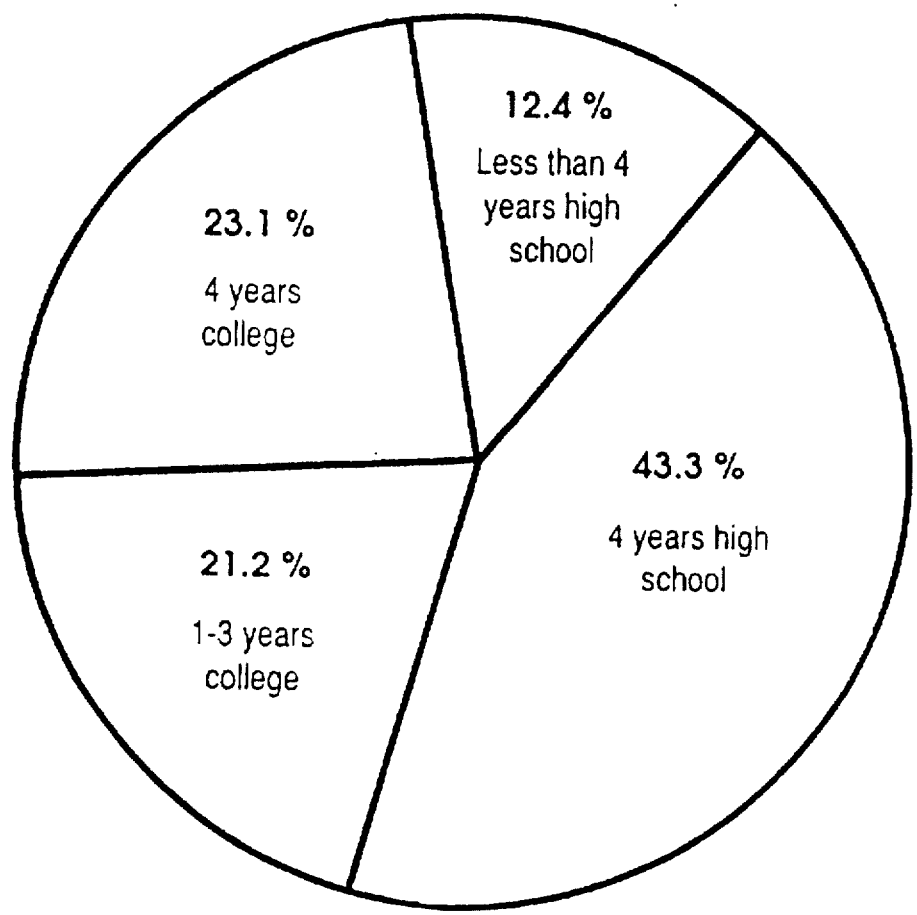
FIG. 302

CHARTS AND GRAPHS USE LESSONS

PRACTICE EXERCISES

WOMEN'S DEGREES

1. Does the scale start at 0?

2. What are the years covered the graph?

3. Do the figures for 1972 cover October, 1972?

4. What percent of Doctoral degrees were earned by women in 1962?

5. In what year were half of the Bachelor's and Master's degrees earned by women?

6. Did women earn more or fewer Bachelor's degrees in 1962 than in 1972?

7. What would you say is the general idea of this graph?

FIG. 303

CHARTS AND GRAPHS USE LESSONS
PRACTICE EXERCISES
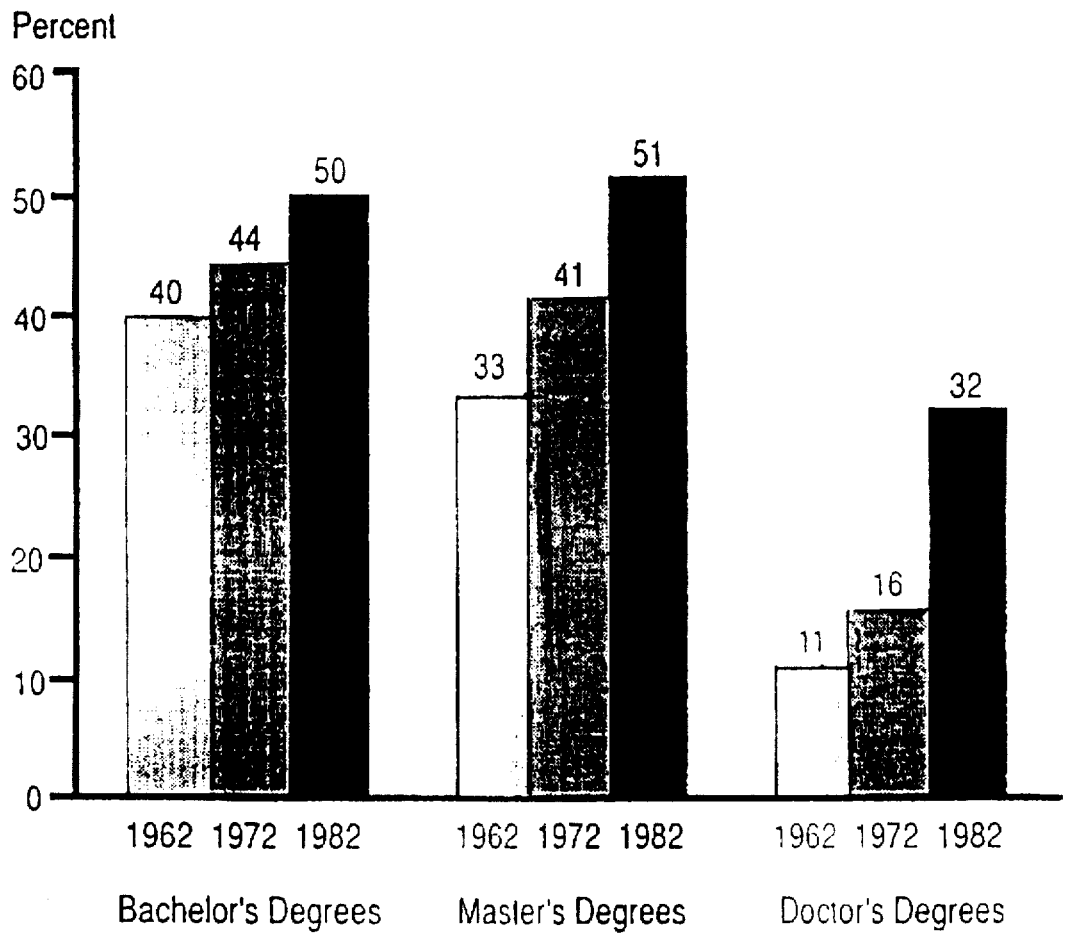
FIG. 304

CHARTS AND GRAPHS USE LESSONS

PRACTICE EXERCISES

LINE GRAPH

1. About how much riboflavin does 1 percent milk loses in 5 days?

2. How long does it take whole milk to lose 25 percent of it's riboflavin?

3. Which kind of mlik loses nearly halk of it's riboflavin in 7 days.

4. What kind of container was the milk on the graph stored in?

5. What is riboflavin?

6. What is the general idea of this graph?

FIG. 305

CHARTS AND GRAPHS USE LESSONS
PRACTICE EXERCISES
RIBOFLAVIN (VITAMIN B$_2$) LOSS
This shows milk's loss of riboflavin in plastic containers under fluorescent lights.* Other tests show that milk loses even more of its vitamin A.
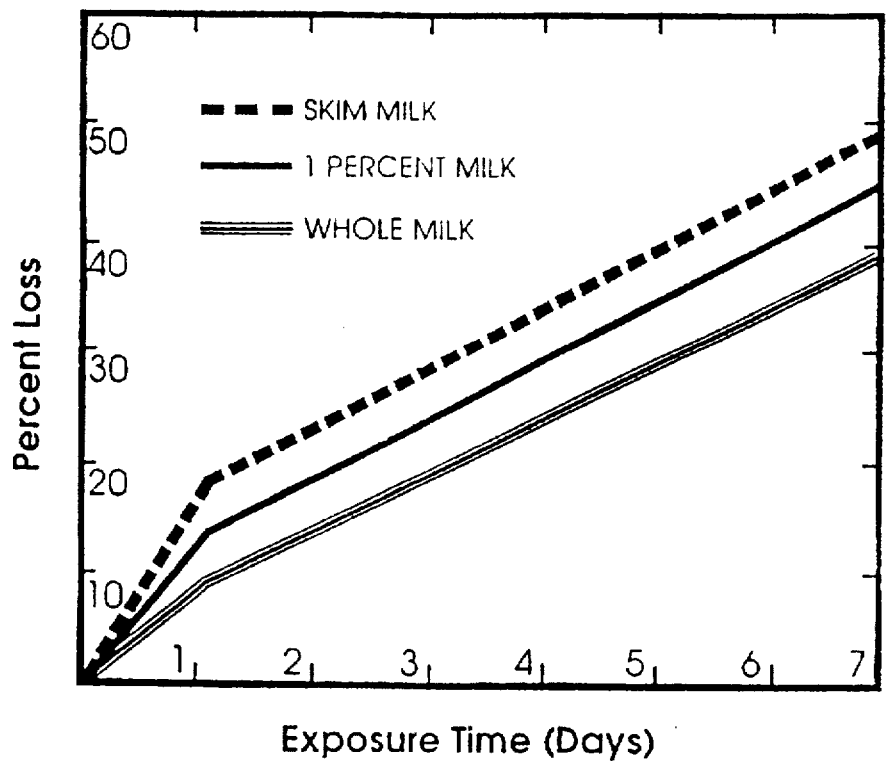
FIG. 306

CHARTS AND GRAPHS USE LESSONS

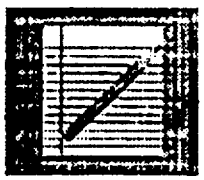 PRACTICE EXERCISES

EDUCATIONAL GOALS

1. What is the highest goal named by the U.S. public?

2. What are the two highest goals named by the teachers?

3. What do the teachers think is the least important?

4. How important do teachers think it is for students to develop an understanding of careers?

5. In how many goals do teachers and the public differ by fewer than 10 points?

6. About which two goals do teachers and the public differ most?

7. Why would teachers and the public disagree about the goals of education?

FIG. 307

CHARTS AND GRAPHS USE LESSONS
PRACTICE EXERCISES
Educational Goals
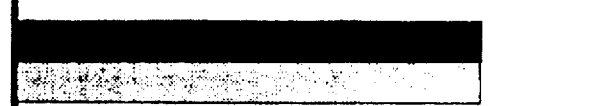
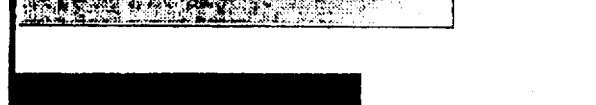
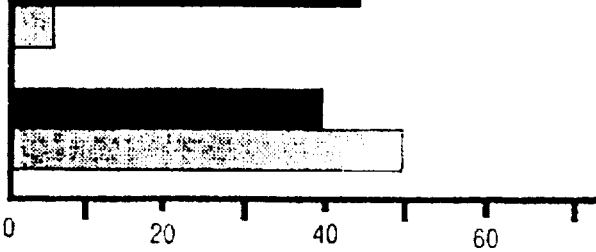
Percent giving goal the highest rating
FIG. 308

CHARTS AND GRAPHS USE LESSONS

PRACTICE EXERCISES

1. According to graph A, how many students achieved at least 4 years of high school in 1985?

2. According to graph B, how many students graduated from high school in 1985?

3. Name two differences between graph A and graph B in the figures about students in 1985.

4. What is the general picture of graph A?

5. What is the general picture of graph B?

6. How could the graphs describe the same thing so differently?

FIG. 309

CHARTS AND GRAPHS USE LESSONS
PRACTICE EXERCISES
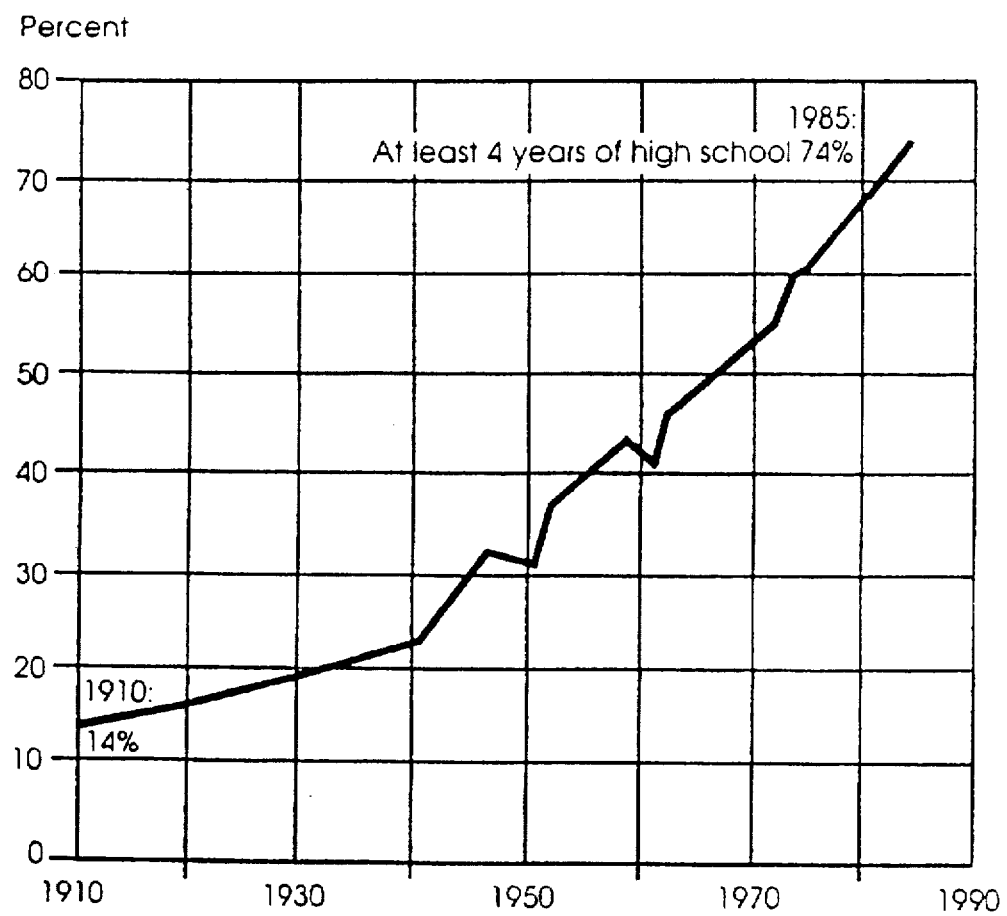
FIG. 310

CHARTS AND GRAPHS USE LESSONS
PRACTICE EXERCISES
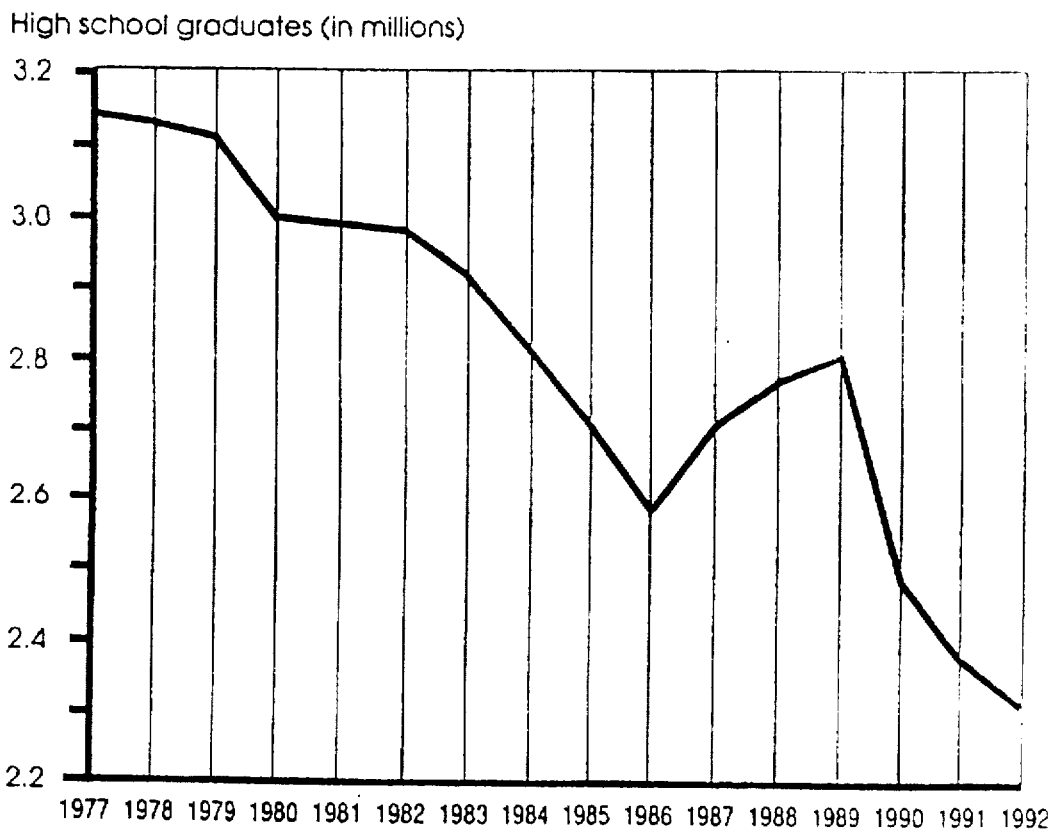
Graph B: High School Graduates:
United States, 1976-77 to 1991-92
FIG. 311

Percent of Viewing Audience Who Watch Sports on Television

|  | Men | Women | Teens | Kids |
|---|---|---|---|---|
| Football | 55 | 32 | 6 | 7 |
| Baseball | 51 | 38 | 5 | 6 |
| Basketball | 51 | 30 | 10 | 9 |
| Bowling | 44 | 46 | 3 | 7 |
| Golf | 52 | 39 | 4 | 5 |
| Horse Racing | 42 | 44 | 7 | 7 |
| Tennis | 43 | 47 | 4 | 6 |

FIG. 312

U.S. Population
1860 to 1980

| State | 1860 | 1900 | 1940 | 1980 |
|---|---|---|---|---|
| ARIZ. | — | 122,931 | 489,261 | 2,716,546 |
| CAL. | 379,994 | 1,485,053 | 6,907,387 | 23,667,764 |
| GA. | 1,057,286 | 2,216,331 | 3,123,723 | 5,462,982 |
| MASS. | 1,231,068 | 2,805,346 | 4,316,721 | 5,737,093 |
| MO. | 1,182,012 | 1,551,270 | 2,183,796 | 2,520,770 |
| N.Y. | 3,880,216 | 7,268,894 | 13,479,142 | 17,558,165 |
| TEX. | 604,215 | 3,048,710 | 6,414,824 | 14,225,513 |
| W. VA. | 378,688 | 958,800 | 1,901,974 | 1,950,186 |

FIG. 313

Dial-Direct

| Rates from other places in this directory may vary slightly<br><br>From<br>UNION GROVE<br>to: | WEEKDAY FULL RATE | | EVENING 35% DISCOUNT | | NIGHT & WEEKEND 60% DISCOUNT | |
|---|---|---|---|---|---|---|
| | FIRST MINUTE | EACH ADDITIONAL MINUTE | FIRST MINUTE | EACH ADDITIONAL MINUTE | FIRST MINUTE | EACH ADDITIONAL MINUTE |
| BEAVER DAM | .31 | .27 | .20 | .18 | .12 | .11 |
| EAGLE | .23 | .17 | .15 | .11 | .09 | .07 |
| FOND DU LAC | .35 | .29 | .22 | .19 | .13 | .12 |
| TREVOR | .19 | .13 | .12 | .09 | .06 | .05 |
| WHITEWATER | .29 | .24 | .19 | .16 | .12 | .10 |
| WIND LAKE | .16 | .11 | .10 | .08 | .06 | .04 |

FIG. 314

NEWSPAPERS: Number and Circulation, 1955-88

| | Morning | | Evening | | Sunday | |
|---|---|---|---|---|---|---|
| | Number of Papers | Daily Circulation* | Number of Papers | Daily Circulation* | Number of Papers | Daily Circulation* |
| 1955 | 316 | 22,183 | 1,454 | 33,964 | 541 | 46,448 |
| 1960 | 312 | 24,029 | 1,459 | 34,853 | 563 | 47,699 |
| 1965 | 320 | 24,107 | 1,444 | 36,251 | 562 | 48,600 |
| 1970 | 334 | 25,934 | 1,429 | 36,174 | 586 | 49,217 |
| 1975 | 339 | 25,490 | 1,436 | 36,165 | 639 | 51,096 |
| 1980 | 387 | 29,414 | 1,388 | 32,787 | 735 | 54,672 |
| 1985 | 482 | 36,362 | 1,220 | 26,405 | 798 | 58,826 |
| 1988 | 529 | 40,453 | 1,141 | 22,242 | 840 | 61,474 |

(*In thousands)

FIG. 315

| Recreation areas of West Virginia | Identification # |
|---|---|
| Beech Fork Lake | 29 |
| Bluestone Lake | 5 |
| East Lynn Lake | 34 |
| Summersville Lake | 44 |
| Sutton Lake | 45 |
| Tygart Lake | 26 |

FIG. 318

| Recreation areas of WV | Map location | Identification # |
|---|---|---|
| Beech Fork Lake | D-1 | 29 |
| Bluestone Lake | E-3 | 5 |
| East Lynn Lake | D-1 | 34 |
| Summersville Lake | D-3 | 44 |
| Sutton Lake | C-3 | 45 |
| Tygart Lake | C-4 | 26 |

FIG. 319

| Parts | Physical Characteristics | Functions | Structural Relations |
|---|---|---|---|
| Part 1 | Description of Part 1 | Function 1 | Struct. Relation 1 |
| Part 2 | Description of Part 2 | Function 2 | Struct. Relation 2 |
| Part 3 | Description of Part 3 | Function 3 | Struct. Relation 3 |
| Part *n* | Description of Part *n* | Function *n* | Struct. Relation *n* |

FIG. 322

The Quick Press Iron, Model T2-4

| Parts | Physical Characteristics of Parts | Functions of Parts | Structural Relations between Parts |
|---|---|---|---|
| Water tank | extra large | presses clothes with fewer refills | located above the steam chamber |
| Soleplate | teflon; made up of steam vents | ensures easy pressing | located below the steam chamber |
| Steam vents | narrowed | allow steam but not water to pass from steam chamber onto clothes | connected to the steam chamber |

FIG. 324

| Picture | Agent | Object | Action | Condition | Effect |
|---|---|---|---|---|---|
| Picture 1 | Air or wind | sand | blows against | Air is *moving* | |
| | Sand | rock | wears away | | Soil is made. |
| Picture 2 | Water | rocks | wears down | Water is *running* | |
| | particles of sand and gravel | rock | wear down | | Soil is made. |
| Picture 3 | Water | rock | splits and chips | Water is *freezing and expanding in cracks* | Soil is made. |
| Picture 4 | Rain | rocks | wears away | | |
| | Rain | plant and animal matter | soaks into the soil | Matter is *decayed* | Soil is made. |
| Picture 5 | Glaciers | rocks | grind and break | Rocks are *loose* | Soil is made. |

FIG. 325

| Picture | Action | Object | Reference Point | Direction Path |
|---|---|---|---|---|
| Picture 1 | *pitch* | plane | lateral axis | |
| | moves | nose | | up or down |
| Picture 2 | *roll* | plane | longitudinal axis | |
| | dips | one wing tip | other wing tip | lower |
| Picture 3 | *yaw* | plane | vertical axis | |
| | turns | nose | | left or right |

FIG. 326

| Diagram / Major Steps | Minor Steps | Agent | Action | Object | Direction Path | Reference Point | Effect | Condition |
|---|---|---|---|---|---|---|---|---|
| Diagram 1/ Major Step 1 | MS 1 | steam | operates | engine | | | | |
| | MS2 | steam | pushes | piston | | on one side | | |
| | MS 3 | steam | pushes | piston | | the other side | | |
| | MS 4 | side valve | directs | the steam | from side to side | | | |
| | MS 5 | steam | enters | | | from the left side of the cylind-er | | |
| | MS 6 | steam | forces | the piston | to the right | | forces the piston to the right | |
| | MS 7 | | moves | piston | | | | |
| | MS 8 | piston rod | turns | the fly-wheel | half a turn | | half a turn | as the piston moves |

FIG. 327

| Diagram / Major Steps | Minor Steps | Agent | Action | Object | Function | Direction Path | Reference Point | Condition |
|---|---|---|---|---|---|---|---|---|
| Diagram 1 / Major Step 1 | MS1 | | splits | The seed | | | | |
| | MS2 | | emerges | the hypocotyl | to form the primary root | | | |
| | MS3 | hypocotyl | form | primary root | | | | |
| Diagram 2 / Major Step 2 | MS4 | | grows | the root | | downward | | As the root grows downward |
| | MS5 | | breaks | the stem | | | through the soil | |
| Diagram 3 / Major Step 3 | MS6 | | open | the cotyledons | | | | |
| | MS7 | the cotyledons | free | the plumule | to free the plumule | | | |
| | MS8 | | drops | the seed coat | | off | | |
| Diagram 4 / Major Step 4 | MS9 | | grows | the stem | | upward | | as the stem grows upward |
| | MS10 | the plumule | forms | the leaves | | | | first leaves |

FIG. 328

| Proced-ures | Agent | Object | Action | Effect | Physical Char-acter-istics | Funct-ion | Goal/ Purpose | Locat-ion | Time | Cond-ition |
|---|---|---|---|---|---|---|---|---|---|---|
| Proced-ure 1 | *you | power to the disposal circuit | turn off | | | | | at the service panel | | After turning off power |
| Proced-ure 2 | *you | the wires | discon-nect | | | | | at the dispos-al's bottom | | |
| | *you | wires must be recon-nected accord-ing to color | keep in mind | | | | | | | black to black, and white to white, with the ground wire secure-ly attach-ed |
| Proced-ure 3 | *you | the screw | loosen | | | | | on the clamp around the dish-washer hose | . | |
| Proced-ure 4 | *you | the slip-joint nut | unscrew | | | | | on the drain-pipe connect-ion | | |
| | *you | a firm hand | keep | to keep the disposal from falling | | | | under the disposal | | As you loosen the screws from the sink mount-ing |
| Proced-ure 5 | *you | screw-driver | use | | | | to pry open the insulat-ed cover | at the seam | | Once the unit is free of the sink |
| | | cover | should snap off | | | | | | | easily |
| Proced-ure 6 | *you | the mach-ine | disman-tle | | | | | | | by the method descrnb-ed on the fol-lowing pages |

FIG. 329

| Proced- ures | Agent | Object | Action | Effect | Physical Char- acter- istics | Funct- ion | Goal/ Purpose | Locat- ion | Time | Cond- ition |
|---|---|---|---|---|---|---|---|---|---|---|
| Proced- ure 1 | *you | the hopper bolts | unscrew | | | | | | | Once the insul- ated cover- ing is off |
| Proced- ure 2 | *you | the hopper | remove | | | | | from the motor housing | | |
| | *you | the gaskets and grind ring | lay aside | | | | for reas- sembly | | | with care in the proper se- quence |
| Proced- ure 3 | *you | the motor bolts | remove | | | | | from the bottom of the stator | | |
| Proced- ure 4 | *you | the motor housing and rotor | lift out | | | | | | | |
| *indicates an inference | | | | | | | | | | |

FIG. 330

| Procedures | Agent | Object | Action | Effect | Physical Characteristics | Function | Goal/Purpose | Location | Time | Condition |
|---|---|---|---|---|---|---|---|---|---|---|
| Procedure 1 | | | | | | | | | | Because the rotor and the turntable revolve together |
| | *you | | | will have to immobilize the rotor | | | | | | with one hand |
| Procedure 2 | *you | | unscrew the lock-nut | | | | | | | Do procedure 1 before 2 |
| Procedure 3 | *you | the turntable | take off | | | | exposing the the spacer and the seal unit | directly beneath the turntable | | |
| Procedure 4 | *you | the spacer | take off | | | | | | | |
| Procedure 5 | *you | the seal unit | lift out | | | | | | | |
| Procedure 6 | *you | the surfaces of the rings | examine | | | | to determine whether dirt has come between them and unseated the seal. | | | |
| Procedure 7 | *you | the rings | look over | | | | for nicks or scars | | | |
| Procedure 8 | *you | the boot | inspect | | | | for tears | | | |
| Procedure 9 | *you | the entire seal unit | should replace | | | | | | | If there is any evidence of damage |
| | *you | | remember | | | | | | | |
| | | seal | | | delicate | | | | | |
| | | seal's ring surfaces | must be | | perfectly smooth | | | | | |
| Procedure 10 | *you | the rings | handle | | | | in reseating the seal | | | with care |
| | | rough treatment | new parts | can damage | | | | | | even |
| *indicates an inference |

COMPUTERIZED METHOD AND SYSTEM FOR TEACHING PROSE, DOCUMENT AND QUANTITATIVE LITERACY

MICROFICHE APPENDIX

This patent document includes a computer program listing in the form of automatic or self documenting program indexes or code disclosed in the form of a MICROFICHE APPENDIX consisting of 14 microfiche with a total of 1,278 frames.

A portion of the disclosure of this patent document, including, but not limited to, all the figures, contains material which is subject to copyright protection. The copyright owner has no objection to the facsimile reproduction by anyone of the patent disclosure, as it appears in the Patent and Trademark Office public patent files or records, but otherwise reserves all copyright rights whatsoever.

I. BACKGROUND OF THE INVENTION

A. Field of the Invention

The present invention relates to a computerized multimedia prose, document and quantitative literacy system ("Computerized Literacy System"). The Computerized Literacy System may be used by a teacher in a small group setting (e.g., from three to twenty students), or operated by students without the presence of a teacher, either alone or in small groups. The system teaches students skills for using printed information, and how to think critically about the organization of that information. In one preferred embodiment, the system teaches students to understand and use "documents," i.e., structured information such as schedules, tables, charts, graphs and forms. That embodiment of the present invention provides students with a computerized, systematic approach for understanding the basic structure of documents found most often in our society.

B. Description of the Prior Art

People are required many times every day to identify and use information available in printed material. Printed material includes words and numbers which are visible, regardless of whether they appear on a piece of paper or on a computer screen. In accordance with the present invention, printed material can be broken down into three general types: prose, documents, and quantitative material. Prose is printed material that is typically organized in paragraph format, such as that found in newspaper articles, magazines, brochures, poems and books. Documents are printed material that is typically organized in matrix format, such as tables, schedules, indexes, forms, charts, graphs, maps, recipes, labels and television listings. Quantitative material is printed material containing numerical information that can be presented in either prose or document format, such as menus, checkbooks, or advertisements.

In 1985, the National Assessment of Educational Progress, under a grant to Educational Testing Service of Princeton, New Jersey ("ETS"), applicants' assignee, developed and conducted a household survey of the literacy skills of young adults, ages 21 to 25. In order to consider the many points of view that exist regarding literacy, ETS convened panels of experts who helped set the framework for this assessment. Their deliberations led to the adoption of the following definition of "Literacy Skills," used herein: Using printed and written information to function in society, to achieve one's goals, and to develop one's knowledge and potential.

The survey reported on the Literacy Skills of young adults in terms of three scales representing distinct and important kinds of Literacy Skills, one for each type of printed material. Prose Literacy Skills involve the skills and strategies needed to understand and use information contained in prose. Document Literacy Skills involve the knowledge and skills required to locate and use information contained in documents. Quantitative Literacy Skills involve the knowledge and skills needed to apply arithmetic operations, either singly or sequentially, that are imbedded in either prose or document format, such as balancing a check book, figuring out a tip, completing an order form, or determining the amount of interest from a loan advertisement.

The results of the survey were, in brief, that although more than half of young adults were estimated to have attained low and moderate levels of proficiency, relatively few young adults were estimated to have reached levels of proficiencies associated with the most complex and demanding tasks encountered in modern society. In addition, the survey found that minority group members as well as those persons who have terminated their education at an early point are disproportionately underrepresented at the moderate to high proficiency levels. The survey concluded that coordinated efforts seem to be needed both to develop and to apply appropriate intervention strategies that will allow individuals to take advantage of their existing skill levels in upgrading their proficiencies. The present invention was designed, in part, to provide this much needed new approach to teaching. Before it can be understood, some additional background information about each of the three types of printed material must be provided.

1. Prose

There are three qualitatively different types of skills involved in Prose Literacy Skills. The first is locating information in text, which requires a reader to match information sought with the identical or corresponding information stated in the text. An example of this type of skill is finding the answer to a question in textual material. The second type of skill is producing and interpreting text information. This requires a reader to use background knowledge or a combination of background and text information to produce a response that supports a given statement or idea, for example, writing a job description. The third type of skill is generating a theme or organizing principle from text information. This requires a reader to synthesize information to generate a theme or organizing principle that is consistent with the arguments provided in a text, for example, determining the theme of a poem or the main argument of a newspaper column.

2. Documents

The amount of time people spend reading and using documents may vary according to background characteristics such as occupation, gender, and level of education. Independent of these characteristics, though, people spend more time reading and using documents than any other type of printed material. People must therefore possess the skills needed to obtain information from documents.

Although people spend much of their reading time reading documents, little attention has been given to how they may be taught to systematically understand and use them. In elementary schools, students are taught to read using narratives. In secondary and postsecondary schools, they are taught to read using exposition. After school, however, people read documents to accomplish specific goals. To help people accomplish their goals and improve their Document Literacy Skills, they need to be taught how to understand the structures of the materials they read. They also need to be taught strategies for finding and dealing with the necessary information in those structures. The inventors believe that if people can learn to infer structures in documents, they can use what they have learned about those structures to find the information they need.

Prior art approaches to teaching typically have failed to consider the underlying structural organization of documents. They also have failed to consider how different purposes for using documents require people to process the information contained in them differently. One such prior art example is found in Singer and Donlan (1989), which focused on graphs, charts and scales such as those found in reading in the content areas.

Beginning in October 1989, two of the inventors of the present invention, Kirsch and Mosenthal, coauthored a series of articles in the Journal of Reading about understanding documents. The purpose of the articles was to explore the nature of documents, the different purposes for using them, and the various strategies used to process them. The articles analyzed various document types and considered how different purposes for using documents require readers to process these structures differently. The articles did not disclose a computerized multimedia document literacy system. See the Bibliographic References section attached hereto for a list of the articles.

According to Kirsch and Mosenthal, as set forth in the articles, substantially all documents can be classified into a reasonably limited number of types, and each document type has a substantially limited number of uses. The document types are: (a) the four kinds of matrix documents: simple lists, combined lists, intersecting lists, and nested lists; (b) the three kinds of graphic documents: pie charts, bar graphs, and line graphs; (c) entry documents or forms; (d) the two kinds of maps: general reference maps and thematic maps; and (e) the four kinds of mimetic documents: pictures, diagrams, process schematics, and procedural schematics. Each of these document types will be discussed briefly in turn.

a. Matrix Documents

In each of the four matrix document types, information is arranged in rows and columns. Simple lists, the most basic of the document types, consist of a single list of items in which each item shares a minimum of one feature with all other items in the list. An example of a simple list is a shopping list. Combined lists are a concatenation or combination of two or more simple lists in which the items in the lists are related as a predicate to a subject. An example of a combined list is a restaurant menu, in which the price list is the predicate to the list of food items. Intersecting lists consist of three simple lists, of which two contain information which is redundant with respect to the third. An example of an intersecting list is a television listing, in which the list of programs predicates both the list of times and the list of channels. Nested lists, the most complicated of the matrix document types, contain at least two pairs of lists of predicate information, with each pair sharing the same label or title. An example of a nested list is a table depicting imports and exports for the years 1987 and 1988. In this case, the pair of lists "1987" and "1988" are nested under the pair "imports" and "exports". The labels "1987" and "1988" are repeated.

All the other types of documents are built on the foundation principles of the matrix documents. Prior art approaches to teaching students how to understand and use matrix documents typically have failed to consider their structures, how the structures of the different kinds of matrix documents are related to one another, and how the strategies used for extracting information from matrix documents depends upon the particular document structure.

b. Graphic Documents

Graphic documents organize quantitative information by representing it visually, as pictures. One kind of graphic document, pie charts, represents a quantitative feature or characteristic of some object differentiated into two or more pieces. The structure of pie charts is generally similar to the structure of a single row of intersecting lists. The other kinds of graphic documents, bar and line graphs, generally have structures which are similar to combined, intersecting or nested lists, in which at least one predicate list contains quantitative information. Because, unlike matrix documents, graphic documents are designed to make a visual impression, they provide a quick general look at numbers in relation to each other. They do not, however, provide for the close examination of many numbers in detail, as matrix documents do.

Although graphic documents have been in use for over 200 years, few people have understood how their structure relates to that of the matrix documents. Therefore, prior art teaching methods typically have failed to take into account that graphic documents are actually special cases of the matrix document structures, and that people can therefore apply many of the strategies for accessing information in matrix documents to graphic documents.

c. Forms

Forms are entry documents that must be filled in by someone. They are one of the most common and important document types which people must know how to use because people are usually affected by information they enter into forms. In modern society, after a person fills out an incomplete entry form, the form, now a completed document, is usually entered into a database with hundreds of other similar documents. This database, which has the structure of a combined list, is then filed, used or sold. Through the use of these databases, individuals are drafted, called for jury duty, sent junk mail, given paychecks, and called by the IRS. Some of the difficulty people have in using forms comes from the fact that the designers of the forms often have the database-makers in mind rather than the form-filers. Prior art approaches to teaching students how to fill out and use forms typically have failed to take this into account, and have failed to show how forms are related to the matrix and graphic documents.

d. Maps

Maps pictorially represent geographical areas of varying sizes. Using a combination of lines, words, symbols, and colors, maps represent a selected set of features and their distribution within a geographical area. General reference maps show features of the earth's surface that are easily recognized by most people. These include buildings, parks, roads, rivers, oceans, mountains, and political boundaries. In contrast, thematic maps focus on a particular topic as it relates to a given geographical area, such as daily weather patterns, annual rainfall or population density.

To date, most discussions on how to teach maps have focused on concerns associated with representing some geographic area. For instance, most "content area" texts list the essential map skills as: determining directions, interpreting a map's legend, applying a map's scale, understanding latitude and longitude, understanding common map terms, and understanding projections. While these skills are certainly important, little attention has focused on how to teach concepts for understanding structures of map content. Prior art approaches have also failed to relate the structures of maps to the structures of the other document types.

e. Mimetic Documents

Mimetic documents are visual representations which depict a phenomenon as it is observed or believed to exist.

These representations include photographs or drawings that are typically found in illustrated dictionaries, encyclopedias, content area texts, and "how to" manuals. Two kinds of mimetic documents, pictures and diagrams, provide visual instances of an object phenomenon, which is a person, place, or thing viewed from a single perspective at a single point in time. As such, pictures and diagrams serve to portray a particular state of an object viewed from a fixed perspective. The other two kinds, process and procedural schematics, provide a visual instance of an event phenomenon, which involves changing states associated with persons, places, or things over time. These changes may involve processes such as weather cycles, steps in manufacturing a product, and blood circulating through the body, as well as procedures such as carrying out a recipe, following a set of assembly or operating instructions, and following the directions on a medicine label.

Mimetic documents are similar to graphic documents and maps in that they portray information visually. Mimetic documents differ from graphic documents, however, in that they focus on portraying a phenomenon's critical and variable features whereas graphic documents deal only with the quantitative characteristics of many objects. Mimetic documents differ also from maps in that they deal with phenomena independent of geographical area whereas maps portray phenomena, or characteristics of phenomena, only in the context of a particular geographical area. Prior art approaches to teaching students how to use mimetic documents typically failed to take these differences into account, and failed to relate the structures of mimetic documents to those of the other document types.

Although much attention in prior art literacy instruction has focused on teaching information organized as prose, little attention has focused on teaching information organized in document format. This is problematic given the importance and pervasiveness of documents. Therefore, the focus of one embodiment of the present invention is on teaching people to improve their Document Literacy Skills.

In addition, although the importance of prose material has been widely recognized in the prior art, the increasing importance of documents has not been so recognized. Documents are important, in part, because they serve a variety of functions. They enable people to: perform important actions (e.g., apply for a loan, secure medical reimbursement, cast a vote, and repair a disposal); make informed decisions (e.g., how much medicine to dispense to a child, determine the fat content of a particular food, and identify which brand of food is the cheapest per unit price); record actions and thoughts (e.g., maintain a check balance, make a list of food to buy, indicate responses on a standardized test, and remember birthdays); and organize and extract large amounts of information in relatively small amounts of space (e.g., bus schedules and income tax tables).

Documents are important also because they are extremely pervasive in modern society. To illustrate, over a decade ago, it was estimated that the total number of different British government forms was well over 100,000. The Associated Press estimated that in the mid-1970's, the United States government issued some 98,000 different forms per year and received over 500 million responses. During this period, the Internal Revenue Service alone sent out over 3,500 different forms. The pervasiveness of documents in elementary and secondary reading materials and achievement tests has also been noted.

The importance and pervasiveness of documents is also evidenced by the fact that the average North American adult spends more time reading documents than any other type of material. This has been confirmed by a variety of studies. For instance, in one study of over 100 households within a community of 6,000 residents, it was found that individuals—independent of occupational group, gender, and level of education—reported they spent more time reading short documents than any other type of material (including the categories of news and business, society and science, recreation and sports, fiction and viewpoint, and reference).

This pervasiveness of documents has only recently been recognized such that, in addition to a prose scale, a document scale has been included on many of the major national assessments, including the NAEP young adult literacy survey, mentioned above, the DOL workplace literacy assessment, the National Adult Literacy Survey, the NAEP reading assessment, and the International Education Assessment. In addition, many standardized tests (such as the Iowa Test of Basic Skills) now include documents as part of their measures of reading and math abilities.

However, despite this recent recognition of the importance and pervasiveness of documents, few instructional methods have been developed which teach documents using a systematic framework. Most instructional recommendations for teaching documents to date have been comprised of little more than providing practice in answering one or more tasks created for understanding a single aspect of a single document (e.g., signing one's name on a job application or ordering merchandise from a specific catalogue). Under this approach, each task and its concomitant document is treated as a unique activity, and no attempt is made to teach the underlying structure, content, and strategies of documents in such a way to facilitate the transfer of skills across the universe of Document Literacy Skills.

This instructional limitation is further compounded by the lack of consistency, in current document pedagogy, for labeling and classifying different document structures, contents, and strategies. In many cases, the nomenclature of documents in various instructional practices varies from one approach to another. For instance, in some instructional approaches, a "chart" is defined as a "map" and a "graph" is defined as a "diagram." In turn, a "diagram" is defined as a "schematic" and a "schematic" is defined as a "picture." As instructional designers have demonstrated, without a consistent framework by which teachers, as well as students, can consciously understand and discuss the dimensions of a problem, students have no basis for solving document-related problems effectively. In terms of completing document tasks, this means that, without a common rhetoric for identifying and describing the underlying structures, contents, and strategies of documents, teachers have few universal tools for equipping themselves and their students to understand and master Document Literacy Skills.

3. Quantitative Material

Quantitative material can be presented in varying degrees in several possible formats, including prose, document, or a combination of prose and document. This material requires a reader to perform mathematical operations such as addition, subtraction, multiplication, and division, either singly or in combination. The level of proficiency at reading, understanding and using quantitative material is a function of several factors, including the level of proficiency at understanding and using the underlying prose or document, the particular operation required, the number of operations needed to get a result, and the extent to which the numerical task is embedded in the printed material. Therefore, there is some overlap in the skills and strategies required to use quantitative material with those needed to use prose and documents. One embodiment of the present invention uses this correlation between the teaching of Quantitative Literacy Skills and the teaching of Prose and Document Literacy Skills to teach students in a more efficient and effective manner.

PROBLEMS WITH THE PRIOR ART

Aside from the particular problems concerning Document Literacy Skills set forth above, several additional problems currently hinder the effective teaching of Literacy Skills in general. One problem is that teachers do not generally know how to teach Literacy Skills most effectively. A large amount of time and resources would be required to familiarize teachers with the most effective method before they could utilize it to teach others. A second problem is the shortage of available teaching resources. A third problem is the difficulty in keeping students interested in and attentive to instruction, especially those that are accustomed to watching television or interacting with computers.

OBJECTS OF THE PRESENT INVENTION

An object of the present invention is to provide a computerized multimedia literacy system for use in teaching Prose, Document and Quantitative Literacy Skills based on teaching the structures and uses of printed material.

Another object of the present invention is to solve some of the more common problems, set forth above, associated with teaching Literacy Skills. The present invention solves the problem of the lack of knowledge about the most effective teaching method because teachers will themselves learn how to teach Literacy Skills through the use of the present invention. In addition, teachers will not have to know how to teach Literacy Skills in order to operate the Computerized Literacy System. The present invention solves the problem of the shortage of teaching resources because the Computerized Literacy System can be operated without the presence of a teacher. The present invention solves the problem of the lack of student interest because it provides for various modes of computerized and video instruction. In addition, the present invention permits and encourages student interaction and involvement in the lessons.

A further object of the present invention is to provide the means to show students how and why the lessons are useful in real life. This is accomplished through a combination of graphics, video and sound capabilities that demonstrate concepts by using everything from copies of documents to live action motion videos involving actors. For example, the present invention supplements the instruction of understanding forms with a video segment demonstrating the right and wrong ways to fill out a job application. This serves to impress on the students the importance of learning how to fill out such a form.

A further object of the present invention is to provide flexibility for teachers and students to adapt the materials to their own needs. For example, in a lesson on understanding forms, students could be shown how to fill out their own medical forms as a supplement to the materials provided in the lesson.

Another object of the present invention is to provide an understanding of how information is arranged in documents so that students can learn to access it successfully and efficiently.

II. SUMMARY OF THE INVENTION

The Computerized Literacy System of the present invention provides for and enhances the teaching of Literacy Skills. It is directed to people who can read words but who have not yet developed strategies for seeing the structure, organization or relationships in printed materials. The system helps people develop long term approaches for locating and processing information in prose, documents, and quantitative material.

As stated above, the focus of one embodiment of the present invention is on teaching people to improve their Document Literacy Skills. The design of this embodiment of the system is based on the knowledge model procedure ("Knowledge Model Procedure") of the present invention by which students are taught to look for and then to identify the types of documents and, based on the document type, how to obtain information from them. In accordance with this procedure, the Computerized Literacy System teaches students, through a series of "structure lessons," to understand the structural features and key characteristics of each document type. The system also teaches students, through a series of "use lessons," about the uses for and the strategies applicable to each document type. The system teaches students that a limited number of strategies can be used for each document type to locate and process the information contained in the document. The system uses specially designed exercises and practice questions to enhance the students' abilities to identify the structure and use of documents and to apply the proper strategies. See FIG. 1 for an overview of the structure of one embodiment of the Computerized Literacy System.

A. Structure Lessons

Each structure lesson in this embodiment of the Computerized Literacy System is preferably divided into about five segments. Each lesson segment explains one principle of the document structure. One segment of a structure lesson introduces and defines the structure of the document type. Each of the other segments explains another important feature of the document structure. Dividing a lesson into short, manageable segments allows for flexibility in scheduling and increases student interest level and attentiveness.

Each structure lesson segment typically contains several screens of instruction, at least one opportunity for student interaction (a chance to manipulate the structure in some way), a summary screen that makes the point of the lesson clear, and at least one exercise that instantiates the point of the lesson. The modes of instruction are varied within each segment by the presentation of a certain amount of explanation (usually about an example pictured on a video monitor), an opportunity for student involvement in the lesson, and an exercise, which also typically involves manipulation of something on a screen display.

B. Use Lessons

The use lessons of this embodiment of the Computerized Literacy System teach students to process information in documents. Each document type has a set of use lessons, broken into several lesson segments. Some use lesson segments provide students with strategies for finding information, such as locating, connecting or comparing. Other use lesson segments, such as the ones on understanding question words and questions with one condition, teach students how to look at a question for clues to the information they are asked to process.

Most use lesson segments contain interactions that allow students to practice the strategies being taught in those segments. The emphasis in the use lesson interactions is on practicing processing information in documents.

C. System Components

The Computerized Literacy System comprises two general components: software and hardware. One embodiment of the software, developed by the inventors, uses AUTHORWARE PROFESSIONAL™ multimedia authoring tool, available through Macromedia, Inc. of San Francisco, Calif. AUTHORWARE® PROFESSIONAL™'s reference manual is hereby incorporated by reference herein, and the reader is instructed to inspect the manual for more information. AUTHORWARE® PROFESSIONAL™ software, as discussed in its manual, incorporated herein, provides an automatic documentation mechanism. This mechanism provides the means to print out the computer program in a format providing for the appropriate sequence the instructions, routines, and other contents of the software in the form of indexes. A printout of such indexes for preferred embodiments of the Computerized Literacy System produced by utilizing this mechanism is included in the MICROFICHE APPENDIX. These indexes contain the functional flow of the computer programs.

The hardware of one embodiment of the present invention, FIGS. 2 and 3, comprises, two thirty-three inch video display screens, a PIONEER® laser disc player, available through Pioneer Communications of America, Inc. of Upper Saddle River, N.J., for displaying the video images, a mouse and a keyboard all controlled by a MACINTOSH® Quadra Series Centris microcomputer available through Apple Computer, Inc. of Cupertino, Calif. The elements and connections for the system hardware are more fully detailed in the Hardware Reference at the end of the Detailed Description.

To achieve the objective of providing an effective, self-contained, easy to operate, and interesting system for teaching Literacy Skills, as well as to achieve other objectives set forth in this disclosure, the inventors have developed and combined a set of text, graphics, videos, sounds, menus and icons. All of these will be described in detail below.

The Computerized Literacy System is driven by menus. In one preferred embodiment of the present invention, there are three levels of menus in the system. FIG. 4 shows the menu structure of one embodiment of the system. In the first level, the menu of document structures (the "Main Menu"), the system requires users to select from among a limited number of document types about which to receive instruction. See FIG. 29A. This teaches students that there are a limited number of document types and what those types are. In the second level, the menu of lessons within each document structure ("Lesson Menu"), the system requires users to select from among structure lessons, use lessons, or practice questions. In the third level, the menu of segments within each lesson ("Lesson Segment Menu"), the system requires users to select from among a set of structural points, strategies or practice question sets. See FIG. 29B for an example of a Lesson Segment Menu, for simple list structure lessons.

The menu choices usually appear in boxes on the screen displays. A selection is made by moving the mouse over the appropriate box and clicking the mouse button. When a class completes a lesson segment, that segment in the Lesson Segment Menu is marked with a check mark so that the teacher or students are aware of which lesson segments have been completed. When the class has completed all of the structure lesson segments for a document type, the Lesson Menu is returned and the system offers users the choice of running the use lesson, working on the practice questions, or learning about another document type.

This menu-driven nature of the Computerized Literacy System accomplishes several objectives. One objective, in accordance with the Knowledge Model Procedure, is to teach students of the limited number of document types into which all documents can be classified. A second objective is to keep track of what a given set of students has learned. A third objective is to permit the users to receive instruction about the document type which is most important or relevant to them. A fourth objective is simply to make the system easy to operate, even for users with little or no familiarity with computers.

The present invention has several embodiments that provide for different possible modes of operation. In one mode, the system is set up to be operated and controlled by a teacher. In this mode, the teacher has the flexibility to decide which lessons to run and in what order, thus allowing the teacher to tailor his or her instruction according to the needs and progress of the students. In another mode, the system is set up to run without the presence of a teacher, according to a procedure established in advance to ensure the most complete and effective instruction by the system. This pre-established procedure may be customized to accommodate the needs of a particular set of students. In another embodiment of the present invention, the system is set up such that anyone ordinarily skilled in the art could modify it to establish substantially any given order of instruction, and to provide for a desired mix of teacher-controlled and automated lessons. These different embodiments provide flexibility, efficiency, and the opportunity to accomplish the objective of teaching Literacy Skills without taking valuable teaching resources.

Another manner in which the Computerized Literacy System achieves some of the objectives set forth in this disclosure is through the use of special icons developed by the inventors. Icons are essentially pictures that represent, in one embodiment of the present invention, a specific function or document type and that appear on screen displays. See FIG. 5. Some icons are used only for display purposes, such as the icons which represent the different document types. See FIGS. 5a and 5b. These icons appear on the menus to help students understand the basic form of each document type. They also appear on the screen displays while students are working on each document type to remind students about what document type they are learning and to reinforce in their minds the document type's structure. See FIG. 29b for the structure and use lesson icons for the matrix documents, graphic documents, and forms.

Other icons are "clickable" icons, i.e., the system performs some function when these icons are "clicked" with the mouse. Clickable icons permit users to interact with the system and to have some control over which and how much instruction they receive on any given topic. For example, lesson segment screen displays contain NEXT and PREVIOUS ARROW icons. FIGS. 5g and 5i. Clicking on the NEXT ARROW icon displays the next screen of information, and clicking on the PREVIOUS ARROW icon displays the previous screen of information. These two icons permit users to review material they have previously seen and to advance more quickly to more complex material.

A more detailed explanation of the various icons and the functions which they represent is contained in the Icon Reference at the end of the Detailed Description of the Preferred Embodiments.

D. Documents

One embodiment of the Computerized Literacy System was designed such that it begins by teaching the structures and strategies of documents. The theory underlying the design of this embodiment is that the principles which define the structures, strategies, and contents of documents are the same as those which underlie quantitative literacy and prose literacy.

In one embodiment of the present invention, the Computerized Literacy System begins by teaching students about the matrix documents. This embodiment of the system starts students with a lesson segment on the key concept of a list: items in a list are related because they share a common characteristic. It then takes students through a series of structure and use lessons on matrix documents, and shows them that even the most complicated documents are made up of lists of information arranged in a limited number of ways.

The Computerized Literacy System also provides separate structure and use lessons for each of the three graphic document types. Although graphic documents contain almost all the same information as comparable matrix documents, they are taught distinctly because they have the addition of a visual dimension which facilitates the comparison of data. One embodiment of the system provides separate lessons for the different graphic document types because the structure of pie charts may vary from the structures of bar graphs and line graphs, and because the three kinds of graphic documents may function differently from one another. Nevertheless, they all share a structure similar to the matrix documents.

The graphic documents lessons in one embodiment of the present invention also teach students both the differences and the similarities between graphic and matrix documents. Students are instructed about the individual characteristics and functions of graphic documents. They are instructed how graphic and matrix documents are closely related, and how information expressed in one form of document can be restructured into the other.

One embodiment of the present invention also teaches students to recognize the organizational structures of forms by representing them in the form of matrix documents, the functions and uses of forms, the types of information requested in forms, and the three sources of information used to fill out forms, i.e., the individual's memory, the form itself, and secondary sources. The present invention also teaches students to recognize that forms have a finite number of different kinds of response formats (about five), that forms have instructions, and how to understand those instructions.

Another embodiment of the present invention teaches students about the basic structure of maps, and how the knowledge about matrix documents they acquired through the use of the present invention can be used to understand and access information in maps. Students are also taught how to understand and use indexes, coordinate systems, legends and contours.

A further embodiment of the present invention provides the means for teaching students to recognize the basic structures of mimetic documents and how to extract the information needed. Because of the differences between mimetic documents and the other document types, discussed above, students are taught special strategies for understanding the special structures of mimetic documents. The present invention also provides the means for teaching students the "push, pop and stacks" recursive procedure for obtaining information from mimetic documents.

E. Prose

In one embodiment of the present invention, the Computerized Literacy System's instruction on Prose Literacy Skills builds upon the principles underlying the teaching of Document Literacy Skills, e.g., that lists consist of labels and items and that items in the list must share a minimum of one feature with each other such that this commonality is reflected in the list label. The system's instruction on prose illustrates and teaches exposition arrayed in a variety of forms—from those that are loosely organized like simple lists, such as information in brochures and pamphlets, to those that are organized with distinct chapter headings and glossaries, such as information found in text books.

This embodiment of the system further focuses on the functional aspects of prose as it relates to: (1) the purpose for writing the prose, that is, from the author's perspective; (2) the purpose for reading the prose, that is, from the reader's perspective; (3) the structural characteristics of prose representing various genres, e.g., sports, editorials, obituaries, informational pamphlets, and advertisements; and (4) strategies for summarizing prose in terms of their label-like titles and their item-like details.

F. Quantitative Material

In one embodiment of the present invention, the Computerized Literacy System's instruction on Quantitative Literacy Skills builds upon the principles of Document and Prose Literacy Skills. The system teaches students to utilize their knowledge of prose and documents, acquired through the use of the present invention, to identify the numbers in printed material on which they need to perform operations. This aspect of quantitative literacy instruction involves the same knowledge of structures, contents, and strategies that is used to process those of prose or documents.

Once students have learned to identify the numbers, they are then taught to formulate the appropriate mathematical equation and to carry out the correct calculation to arrive at a mathematical solution. This part of quantitative literacy, involving setting up and calculating, is emphasized by the Computerized Literacy System as it relates to: (1) different types of calculations (e.g., addition, subtraction, multiplication, and division); (2) different types of number representations (e.g., whole numbers, fractions, decimals and percentages); (3) different units of measure (e.g., time, weight, and height); and (4) different mathematical concepts (e.g., tip, interest, and unit price).

G. Nomenclature

The detailed description of the system contained in this disclosure follows some conventions to help in describing the invention. As indicated above, the system hardware of one embodiment includes, inter alia, a computer, two display screens, a laser disc player for displaying the video images, a mouse and a keyboard. Any time text is written out in this description as it appears on either screen, that text is italicized. For example, if "Is this a simple list?" is displayed on a screen, Is this a simple list? appears in this description. The order of statements or questions in a series is indicated by (n), where n=1, 2, 3, etc. These conventions permit the reader to differentiate between what the system actually displays and explanations that have been added in this disclosure to summarize or clarify what is done by the system or to suggest questions that would be appropriate for an instructor to ask.

Whenever information is provided in this disclosure about what function the system performs after a clickable icon has been clicked, the label for the icon is shown in capital letters (e.g., HINT, SHOW ME, MORE). This label is followed either by a description of what occurs or by the text that the system displays on a screen when the icon is clicked with the mouse. Whenever information is provided in this disclosure regarding definitions that can be viewed during a lesson segment by clicking on the DEFINITION icon, the definitions are set forth herein just prior to the description of the lesson segment in a section titled "Vocabulary."

III. BRIEF DESCRIPTIONS OF THE DRAWINGS

FIG. 296 shows some of the location icons that appear on screen displays during the operation of one preferred embodiment of the Computerized Literacy System.

FIGS. 297 through 311 show pencil and paper-type exercises given to students to practice what they were taught during the graphic documents structure and use lessons of one embodiment of the present invention.

FIGS. 311 through 331 show screen displays shown during the operation of one embodiment of the Computerized Literacy System.

IV. DETAILED DESCRIPTION OF THE PREFERRED EMBODIMENTS

Figure 1:
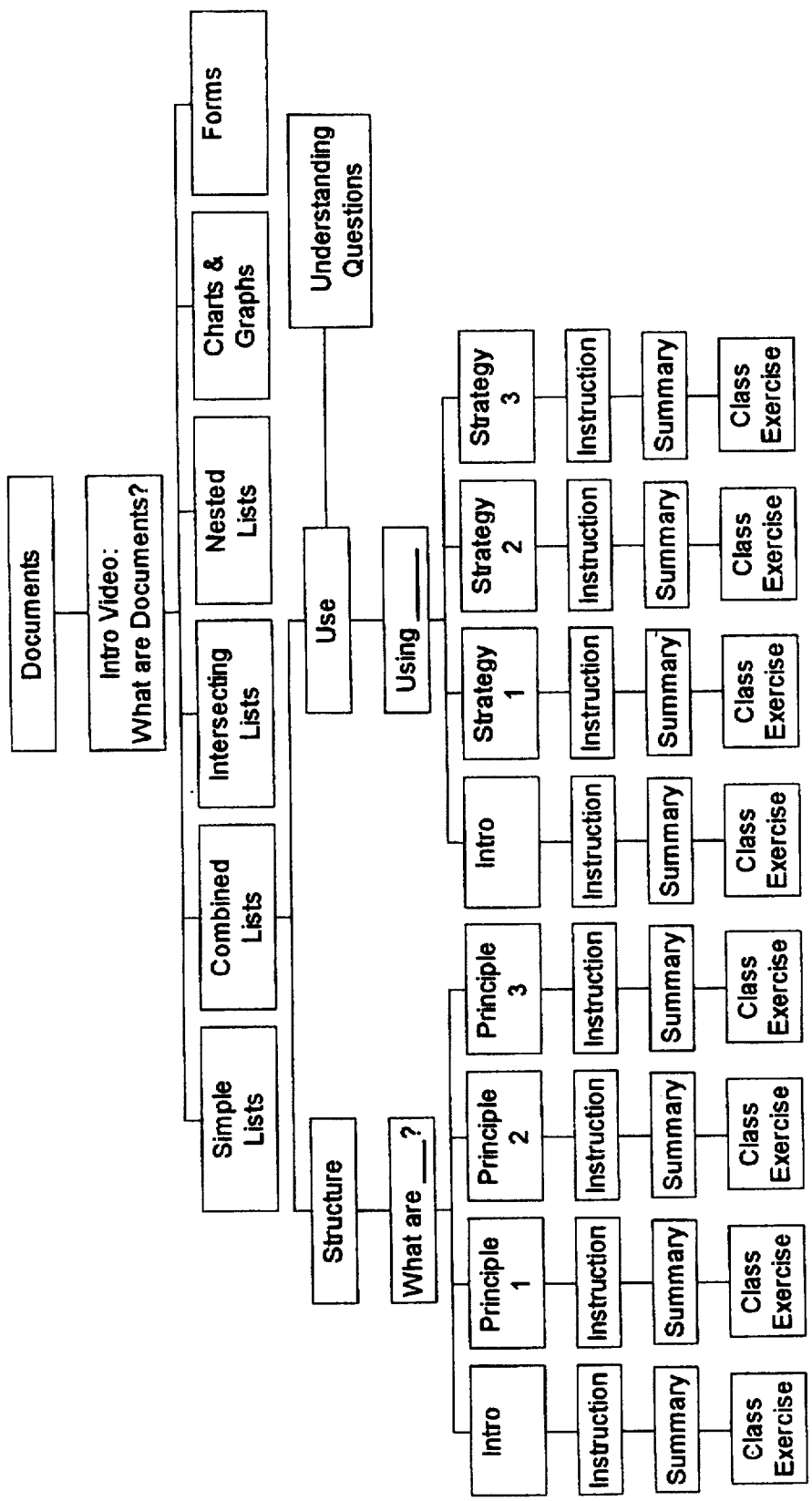
FIG. 1 is a flow chart showing the structure of one preferred embodiment of the Computerized Literacy System.

The software component of one preferred embodiment of the present invention was developed using AUTHORWARE® PROFESSIONAL™. However, other commercially available authoring software could also be used, for example, HYPERCARD™ available through Apple Computer, Inc. of Cupertino, Calif. In addition, hardware components other than those indicated in this disclosure could be used. See the Hardware Reference for details. In developing the software of the present invention, the inventors used AUTHORWARE® PROFESSIONAL™'s preprogrammed system variables and functions. In addition, the inventors created new variables and functions specially designed for the Computerized Literacy System.

In developing the software of the present invention, the inventors entered content such as text, graphics, and commands into discrete units called "design icons." Each design icon represents particular function(s) which are performed when that icon is encountered during operation of the Computerized Literacy System. The design icons were programmed by selecting and "opening" them, placing content into them, and setting or modifying the presentation functions which control their operation by entering data into boxes called "slots." Titles were given to some of the design icons to help identify their particular functions. The design icons were placed onto "flow lines," i.e., vertical lines representing the logical flow of the program. Flow lines appear on screen displays called "design windows." Terminators at the top and bottom of each design window indicate the beginning and end of each file.

The inventors used AUTHORWARE® PROFESSIONAL™'s eight basic design icons. Each type of design icon has a different function and requires different data. "Display icons" were used to cause text and graphics objects which are typed, drawn, or imported from outside sources to be displayed on the screen. "Animation icons" were used to cause the objects of a preceding display icon to move from one point on the screen display to another in a given amount of time or at a specified speed. "Erase icons" were used to cause text and graphics to be erased from screen displays. "Wait icons" were used to cause file flow to be interrupted for a specified amount of time or until a key is pressed or the mouse is clicked. "Decision icons" were used to provide for the selection of the next icon to be accessed from a set of attached icons. "Interaction icons" were used to provide users with options or questions and select, based on the user's response, which branch of attached icons to access. "Calculation icons" were used to provide for mathematical or special control functions, the execution of written code, and the jump to other files or applications. Mathematical calculations were also programmed into the "calculation window" contained in each icon. "Map icons" were used to organize and modularize the file by providing space to put more icons. Each Map icon provides its own flow line on which other icons, including other Map icons, are placed.

The inventors also used AUTHORWARE® PROFESSIONAL™'s Decision and Interaction icons to provide for branching of the flow line into multiple paths. This branching capability was used for major branching decisions, such as choosing an appropriate topic or challenge level for a user, as well as for detailed branching decisions, such as setting the number of responses a user is allowed to offer before being given a hint. The branching structures, called "microbranching," branch out from the flow line and then return to the flow line. Branching helped provide a logical structure to the Computerized Literacy System program.

When the Decision or Interaction icons were used, certain options were set which affect the method of branching. For example, some Decision icons were set to select branches sequentially, i.e., to branch to the first path the first time the icon is encountered, to the second path the second time, and so on. Other Decision icons were set to branch according to random selection or to select a path depending on the value of a given variable. Interaction icons were set to accept various types of user responses, including text, mouse clicks, menu selections, the movement of graphics objects, and the expiration of time limits.

During the development of the Computerized Literacy System program, subroutines or "models" were created that contain one or more design icons together with their branching structures. Models were inserted in various places and were used repeatedly throughout the program. They were used to provide the ability to quickly build interactions by the insertion of predefined structures. Models were also utilized as additional, readily available development tools that were listed on pulldown menus during the development of the program.

In this disclosure, in substantially all cases, whenever passive language is used indicating that students are, for example, "told," "asked," "taught," or "shown" something, the Computerized Literacy System of the present invention is the instrument that performs the actions described, such as telling, asking, teaching or showing. The passive tense is used herein only to make this disclosure easier to read and understand; it should not be taken in any way to indicate that something or someone other than the Computerized Literacy System is performing the actions described herein.

In addition, the description in this disclosure of the lesson segments of one embodiment of the present invention is sequenced according to the theoretical framework set forth herein. However, the actual sequence in which the system displays its instruction will vary depending on its mode of operation. As explained above, the system can be set up to be operated by a teacher, to operate without a teacher, or to be modified by one skilled in the art to operate in substantially any desired order. Thus, the order given herein for the presentation of the lesson segments is illustrative of one embodiment only, and the language used herein to describe that order (e.g., "first", "then", "next") should be understood in that manner.

Figure 6:
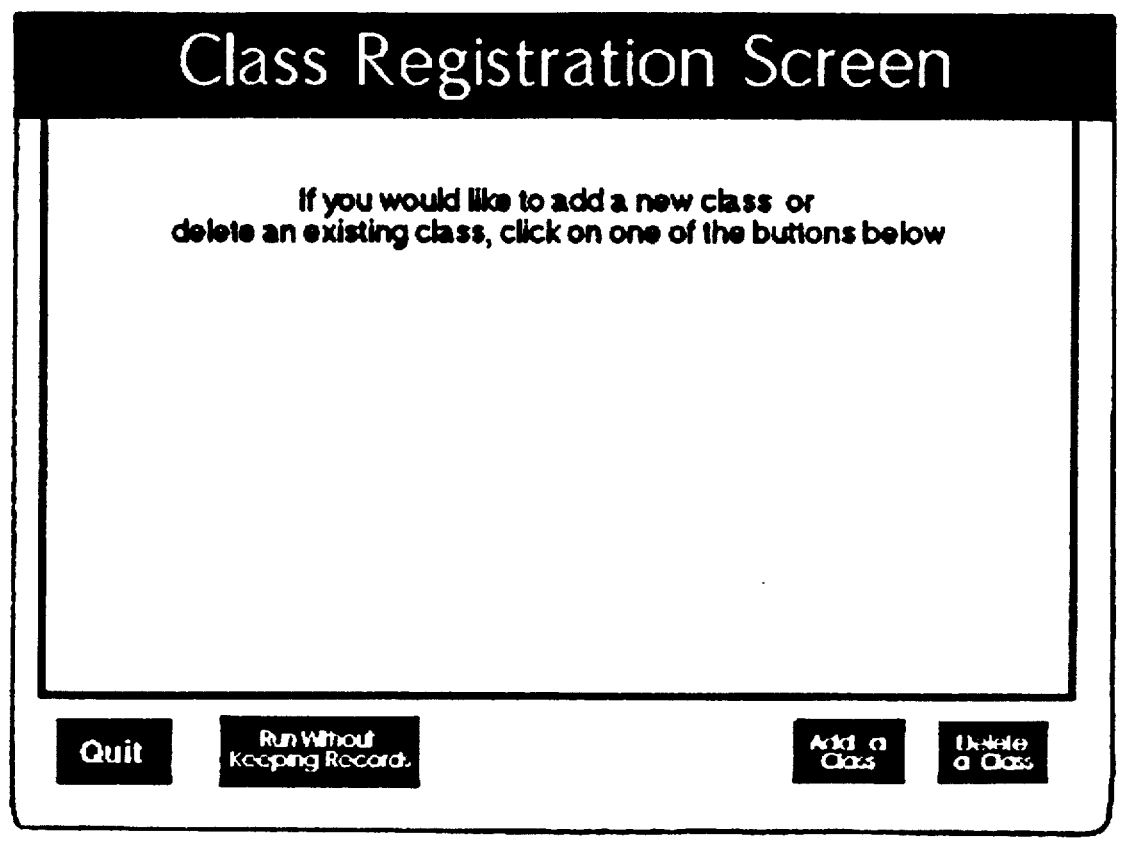
FIGS. 6 through 295 show screen displays shown during the operation of one preferred embodiment of the Computerized Literacy System.

After the hardware is connected and turned on and the program is loaded, the first screen displayed by the system is a title screen. By clicking the mouse on the area of this screen marked Click here to begin, a class registration screen is displayed. See FIG. 6. The Computerized Literacy System provides users with the opportunity to operate the system in one of several modes. Through the class registration screen, users choose whether to begin a new session and save it to a file, to recall program files recorded during an earlier session with the same set of students, or to run the program without saving it at all. Users can also delete any given set of records. These choices allow a class to keep track of the lessons they have completed while preserving storage space on the computer. The class registration screen also offers the option to exit the program.

After the class registration screen is displayed, the system of one preferred embodiment shows a video entitled "What are Documents?" which introduces the basic concept of a document. After the video, the Main Menu is displayed and the user is required to choose a document type about which to receive instruction. FIG. 29A. For each document type, the system offers structure and use lessons. Each structure lesson offers a choice of several segments, including an introductory segment that defines the document structure and one or more other segments that describe certain distinct principles about the document structure. Each use lesson offers a choice of several segments that describe strategies for using the document type, including but not limited to connecting, locating, comparing and recycling. Each structure and use lesson segment contains some instruction, a summary, and one or more examples that serve as class exercise.

Other embodiments of the present invention provide additional functions that give teachers greater flexibility in their use of the Computerized Literacy System and may enhance the effectiveness of lessons displayed by the system. In one such embodiment, pre- and post-tests are provided along with the Computerized Literacy System for each lesson. These are free-response tests averaging twenty-five (25) items in length. They are used by teachers to diagnose what students need to work on most, to assess what students have learned from each lesson, or to provide more paper and pencil practice for individuals or groups of students.

In another embodiment, two other system features are available to the user and accessible from the Main Menu. Through a clickable icon, teachers may access an image library. The image library is a collection of document and video images that can be used to complement the lessons resident on the system. Through the image library, teachers may search through and view images from the videodisc; teachers may also select images to create lessons or exercises on an individual basis. The system also provides the capability, through a workspace subsystem, to allow teachers to create lessons and class exercises, customizing instruction to meet the needs and interests of specific students. Teachers can create text screens and combine them with video images or graphics selected from the image library in a sequence of their own design.

There are also other embodiments of the system. In one such other embodiment, student workbooks accompany the Prose, Quantitative and Document lessons. One function of the student workbook is to allow students to individually respond to instructions presented on the system. For example, during a lesson segment students may be directed to draw a picture in their workbook showing how they visualize a math problem. The workbooks also review materials presented on the system, contain practice exercises, and provide extension activities which allow students to apply what they have learned to new and more complicated materials. Journal pages are included in the workbooks on which students can take notes and reflect on what they have learned. The workbooks may also contain a reference section and dictionary of key vocabulary terms used in the system. Customized workbooks may be developed using materials submitted by a particular group, such as a company, interested in more specific literacy instruction for its employees. Such workbooks would be organized around the lessons as they exist on the system but would contain documents and prose materials specific to a particular work place.

In another embodiment, the system provides a function that gives users information on how the menu structure of the system is organized. This function also provides examples of key features of the system, and shows how the interactions and clickable icons work. The system also provides a tutorial to familiarize users with how to use a mouse. The tutorial has lessons on such things as how to move a mouse, point to, click on, and drag an object. Each lesson has an interactive session allowing users to practice each skill. Additional audio tracks are also available on one embodiment of the system. Audio tracks on the videodisc would include non-English versions. For example, students could hear the lessons presented in Spanish while practicing using materials in English. The system of this embodiment also has an indexing function. This function allows users to select a key word and access applicable lesson segments. For example, in the prose lessons a user might choose to search on "Headings." The user would then be able to move across lesson segments to see how headings are used in brochures, magazine articles, and text books.

In the following description, the theory underlying the teaching method for each document type is generally described prior to the description of the lessons.

A. Documents

As stated above, one embodiment of the present invention begins by teaching students about the structures and uses of documents. In the embodiment, as discussed above, wherein the system is designed to be operated by an instructor, the instructor may determine the order of lessons shown by the system.

1. Matrix Documents

In one embodiment of the present invention directed to operation of the system without an instructor, the Computerized Literacy System teaches about matrix documents first because they are the foundation upon which all the document types are built. Students who understand the structures and uses of the matrix documents and the strategies for accessing the information in them can apply that knowledge to the other types of documents.

a. Simple Lists

The instruction for simple lists provided by the Computerized Literacy System is based on the qualities and characteristics of simple lists. Simple, well-formed lists are the basic building blocks of most documents. A simple, well-formed list consists of a single set of items which all contain a minimum of one shared feature. A list often has a label, the purpose of which is to notify the reader of the feature or set of features that are shared among the items which make up the list. Each item in a simple, well-formed list must also be "equivalent," i.e., each item must represent the same kind or type of example. The items in a simple, well-formed list may be words, numbers, pictures, or icons.

Well-formed lists can be arrayed either vertically or horizontally. Although the items in simple, well-formed lists are most often organized one on top of the other, they are sometimes arranged in a row or even in paragraph format. In longer, well-formed lists, items may be ordered using a particular convention. For example, when a list consists of words, the items are often ordered alphabetically, as in a list of topics in a book's subject index. Other common conventions include chronological order, rank order, descending size order, and number order.

The Computerized Literacy System of one embodiment starts its instruction with simple lists because they form the basic building blocks for all the matrix documents. Even the most complicated matrix documents are nothing more than lists of information put together in different ways. Once students become familiar with the structure of simple lists and how they function, they will be shown how more complex documents share many of those same features.

(1) Structure Lessons

The structure lessons for simple lists focus on the key concept of related information. Students are taught that to make up a simple list, items must have something in common. They also are taught that the function of labels is to define the common characteristic shared by a group of items. This concept of relatedness forms the basis for classifying and categorizing information. If students understand how information is put together in this simplest structure, they will be in a much better position to understand increasingly complicated document structures as they progress through the system. The lesson segment menu in one embodiment is in FIG. 7.

In the first structure lesson segment for simple lists, "What Are Simple Lists?", students view and discuss examples of simple lists. They are also provided with a definition of this document structure: (1) Simple lists consist of a single group of items; and (2) Items share a common characteristic that can be defined by a label.

Vocabulary. Throughout this lesson segment the user has the option of viewing the definitions of certain words or phrases by clicking on the DEFINITION icon. These definitions include: "Item"—each entry in a list; and "Label"—the word or words that define what the items have in common.

The Lesson Segment. The segment begins by presenting a video sequence showing a number of simple lists from daily life. In accordance with the conventions described above, the following italicized text is displayed on a screen: These are all examples of simple lists. Examples include a shopping list, a list of movie show times, and the choices on a soda vending machine. The sequence gives students a chance to infer what a simple list is before they are told. Using the video controller to replay the sequence and stop at appropriate examples provides the opportunity for an instructor to raise questions such as: Have you ever seen a list like this? Where? The examples are also intended to expand students' notions of what constitutes a simple list. Simple lists have two parts. The parts are labeled on the shopping list example by clicking MORE.

Summary. A simple list has a single group of items. The items all have something in common that can be defined by a label.

The Class Exercise. The class exercise allows students to practice identifying groups of items that share a common characteristic. A group of 20 items is displayed on the left screen. The label "Groceries" is presented on the right screen and students are asked to drag across five items that fit that label. If they try to add an incorrect item to the list, that item "flies" back over to the left screen. See FIG. 8. Clicking NEXT EXAMPLE presents another label for students. There are three additional labels: Parts of a Car, Animals in a Zoo, and Flowers.

In the second structure lesson segment, "More About Items", students are taught that items in a list can be either words, numbers or pictures. They are shown examples of lists containing each kind of item. The inventors believe it is likely that students have never thought of a series of numbers or pictures as a list, so these examples are useful for a discussion about what these items have in common, and to stimulate students to think of other items that could be added to this list.

The Lesson Segment. In accordance with the conventions set forth above, the text that appears in screen displays is italicized in the following description of the examples:

- Items in a list can be: words. Three examples of the kinds of words that could form a list are presented: names, things and places. Clicking on each example displays a list of words. See FIG. 9.
- Items in a list can be: numbers. Three examples of the kinds of numbers that could form a list are presented: dates, times, and sizes. Clicking on each example displays a list of numbers. See FIG. 10.
- Items in a list can be: pictures. Two examples of pictures that could form a list are presented: signs and products. Clicking on each example displays a list of pictures. See FIG. 11.
- Items in a list can be combinations of words, numbers or pictures. An example of a list that has both words and pictures (from the Table of Contents of a car repair manual) is shown. Two additional examples, an airport directory and a list of peg hooks, are available by clicking NEXT EXAMPLE.

Summary. Items in a list can be words, numbers, or pictures.

The Class Exercise. The class exercise helps students see the relationship between the kinds of items used in a list and the ways that list can be used. Three lists are shown in which the same items can be represented in different ways: as pictures or numbers, pictures or words, and words or numbers. Students can discuss the advantages and disadvantages of representing information in different ways given particular purposes. In accordance with the conventions set forth above, text is italicized if it accompanies the following examples on the screen displays.

Figure 12:
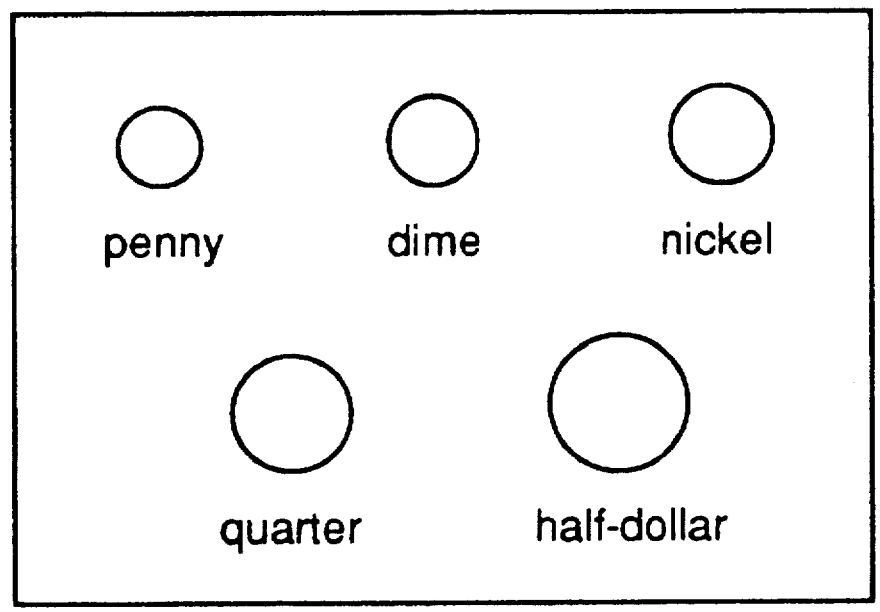

The first example is in FIG. 12. What would this list look like if the items were numbers? Students can describe or write out the list. Clicking on MORE puts the list of numbers next to the picture list. If someone needed to know the value of U.S. coins, which list would be more helpful? The picture list shows what the coins look like, but not how much they are worth. The number list would be most useful for the purpose described in the question.

Figure 13:
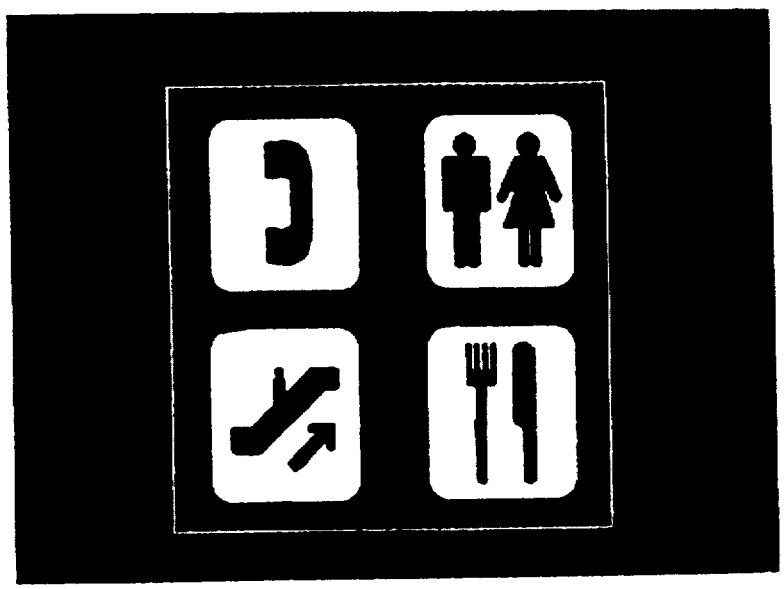

The second example is in FIG. 13. What would this list of signs look like if the items were words? Clicking on MORE brings up the list of words next to the picture list. Which list would be easier for a non-English speaking foreign visitor to understand? The value of picture lists like this list of international symbols can be discussed—people can understand them without any written words.

Figure 14:
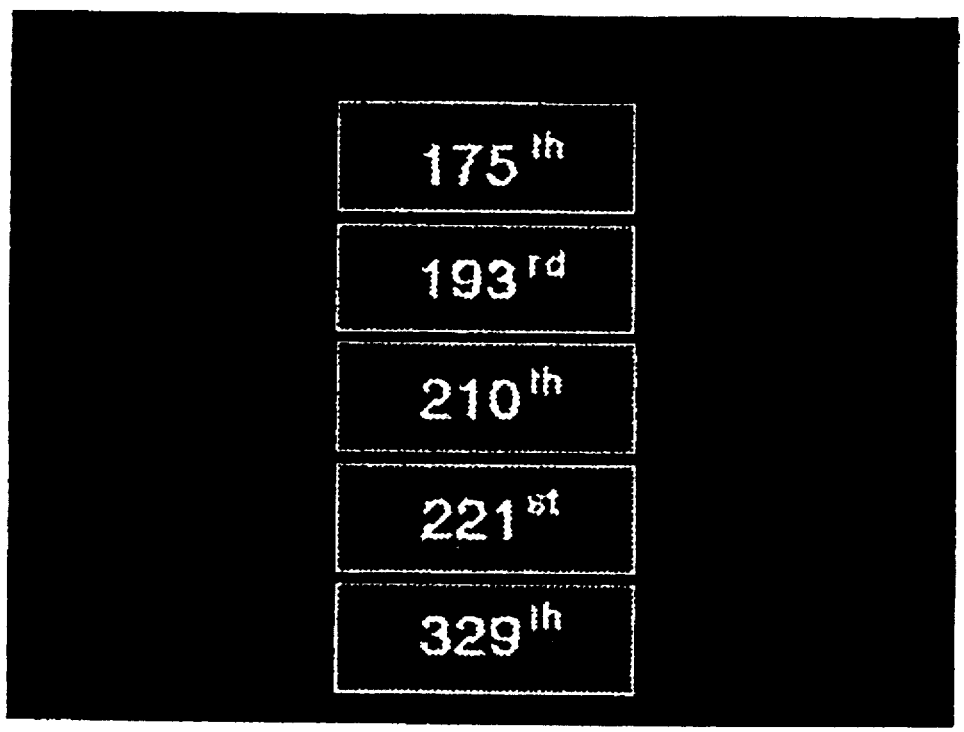

The third example is in FIG. 14. What would this list of street numbers look like if the items were words? Clicking on MORE displays the list of words next to the number list. Which list would be more likely to appear as a list of stops on the bus-stop sign? This list illustrates the point that sometimes size restrictions dictate which kind of items are most useful.

In the third lesson segment, "More About Labels", the function of labels is explored. Students are taught that labels show what a group of items has in common. They are also taught that when lists do not have labels, classifying or categorizing the items is the way to supply the missing label.

The Lesson Segment. This lesson segment contains a series of screen displays that contain the following information: (As stated above, text that appears on a screen display is indicated in this disclosure in italics.) (1) A label defines what items in a list have in common. Three examples of lists with labels are available for discussion: Eva's Specialty Drinks, Commemorative Stamps, and Caulk Colors. (2) A list may not have a label: if it is a list you have written for yourself (shopping list is shown); and if it is clear what the list is about (vending machine example is shown). (3) Some lists need a label to make sense. A list of three numbers is displayed (2, 10 and 27). Without a label this list could be almost anything. What could you label this list? Students generate as many labels as they can think of for this list. Clicking MORE brings up two sample labels: a lock combination and television channels. Other examples might be family birth dates in June or winning lottery ticket numbers.

Summary. A label tells you what a list is all about.

The Class Exercise. In the class exercise, students can practice labeling some lists without labels. What would you label this list? Two lists are available: a picture list showing laundry instructions on a t-shirt tag and icons outside a building (restrooms, no beverages allowed, etc.).

In the fourth lesson segment, "Recognizing Simple Lists", students are shown that groups of items that fit the definition of a simple list can be presented in a number of different ways.

Vocabulary. The following two definitions are available during this lesson segment (by clicking on the DEFINITION icon): "Column"—information arranged vertically; a column of items goes up and down (just like a column on a building); and "series"—a number of items coming one after another, often with commas between each item.

The Lesson Segment. The opening screen shows labeled icons representing the three ways that lists of information can be presented: in a single column, in a series, or in several columns. Clicking on any presentation icon brings up examples of that kind of simple list. See FIG. 15. The examples are: for one column—a window sign listing discounted items at a drug store, a shopping list, and a sign for different types of insurance; for a series—snacks sold at a food stand and an excerpt from a brochure listing tools needed for a home repair job; and for several columns—a list of contents on a soup can label and an aisle sign in a grocery store.

Summary. Simple lists can be presented in many different ways.

The Class Exercise. In the class exercise, students are shown a document and asked whether it is a simple list. They need to keep in mind what they have learned about the defining characteristics of simple lists and the different ways simple lists can be configured. There are two examples in the exercise. For each, students are asked: Is this a simple list? They can discuss the example and decide individually or come to some consensus, about whether it is a simple list. HINT reminds them that in order to be a simple list all the items must have something in common. SHOW ME provides an answer and reconfigures the document into a single column to help students see that the items are or are not a single type of information. The first example is in FIG. 16. SHOW ME—This is a simple list arranged in columns. All the items on the list are kinds of Mexican foods. The second example is in FIG. 17 and has items listed in several columns which is one of the ways a simple list can be presented. However, the items do not share a single common characteristic. There are three different types of information in this document—flight numbers, times and destinations—so this is not a simple list. SHOW ME—This schedule has several columns. But it is not a simple list because the items are not all the same kind of information.

In the fifth lesson segment, "How Lists Are Organized" students learn that items in a list can be organized, often in a number of different ways. Students are introduced to some of the ways lists can be organized.

The lesson segment. A list of the nine known planets is displayed. Four organizational schemes are presented on screen. This list could be organized . . . By distance from the sun; Alphabetically; By size—small to large; By size—large to small. Clicking on an organizational scheme above reorganizes the list of planets.

Items in a list can be organized in many different ways. Three examples are available for the class to discuss. For each example students are asked, How is this list organized? Example #1 is organized alphabetically. See FIG. 18. Example #2 is organized in numerical order. See FIG. 19. Example #3 is organized by time, earliest to latest. See FIG. 20.

Summary. Sometimes items are organized to make a list easier to use.

The Class Exercise. The class exercise presents a simple list that can be organized several different ways. Students are asked to identify the three organizational schemes. (Text is italicized in this disclosure, as explained above, to indicate it appears on a screen display.) The screen displays for the exercise are in FIG. 21. Students are told, Here is a list of 5 states that is not organized in any way. They are the shown the screen display FIG. 21a. The list is then reorganized, FIG. 21b, and students are asked, How is this list organized now? Clicking on MORE displays the answer: The list of states is now organized alphabetically. The list is reorganized again, FIG. 21c. How is this list organized now? Clicking on HINT displays a map of the United States with the five states identified. Clicking on MORE displays an answer: The list of states is organized from east to west. The list is reorganized for the third time, FIG. 21d. Students are asked, How is this list organized now? The map remains on the monitor for this last question. Clicking on MORE displays one answer: Now the list of states is organized from west to east. There is another way to define this organizational scheme. Clicking on MORE displays a second answer: The list is also organized by size from the largest to the smallest state. At the end of this exercise, students have a chance to make their own lists and see how many different ways they can organize them. They may wish to make several different lists and see which ones they can reorganize in the most ways.

(2) Use Lessons

The use lessons for simple lists have a dual purpose. First, students are introduced to factors that can make a list more or less difficult to use. These include: the length of the list, its organization (or lack thereof), and the number of items that are similar to information being searched for and are therefore attractive as possible answers. The lessons also focus on questions and how to understand exactly what they are asking. Because using documents involves searching for information to respond to others' questions or one's own, this focus on taking apart questions and verifying that answers fulfill all the conditions in a question is an important focus in the use lessons for all the matrix documents.

The use lessons have two segments: "Question Words and Conditions" and "What Makes a List Harder to Use". The lesson segment menu is in FIG. 22.

In "Question Words and Conditions", students are taught the importance of understanding questions as they relate to finding information in documents. Students learn about question words that act as clues for the type of answer needed. They also are taught that questions have conditions that must be fully satisfied by any answer they find.

Vocabulary. The following definitions are available during this lesson segment (by clicking on the DEFINITION icon): "Question words"—words most often found at the beginning of a question that let you know what kind of information you must find for an answer; "Conditions"—information you need to look for in a document in order to find the answer; "Synonyms"—words that mean about the same thing as the item you are looking for; and "Outside knowledge"—what you know from your own experience; Information you bring to a document that is beyond the information provided.

The Lesson Segment. The segment begins by explaining why it is important to learn about questions in order to use documents successfully (text is italicized in this disclosure, as explained above, to indicate it appears on a screen display). (1) Anytime you use a document to find information you are dealing with questions. (2) Sometimes the questions are your own and you have a pretty good idea what you are looking for. An image of a woman looking at a train schedule appears on the video monitor. (3) Sometimes the questions come from somebody else: Your teacher in class; Your boss at work; A family member at home; A friend in the neighborhood. Images representing each of these situations appear on the video monitor. (4) In these lessons on using simple lists, you will learn about the two parts of questions: Question words and Conditions.

The next section of the segment explains the function of question words and provides four examples. Question words tell you what kind of answer you need to find. For example, question words such as "Is," "Does," and "Did" usually require a Yes or No answer. Three questions using these question words are available. Is today Tuesday? Does the sun rise in the west? Did you come to class by bus? The question words "How many" tell you that your answer must be a number. How many days are there in a week?

Figure 23:
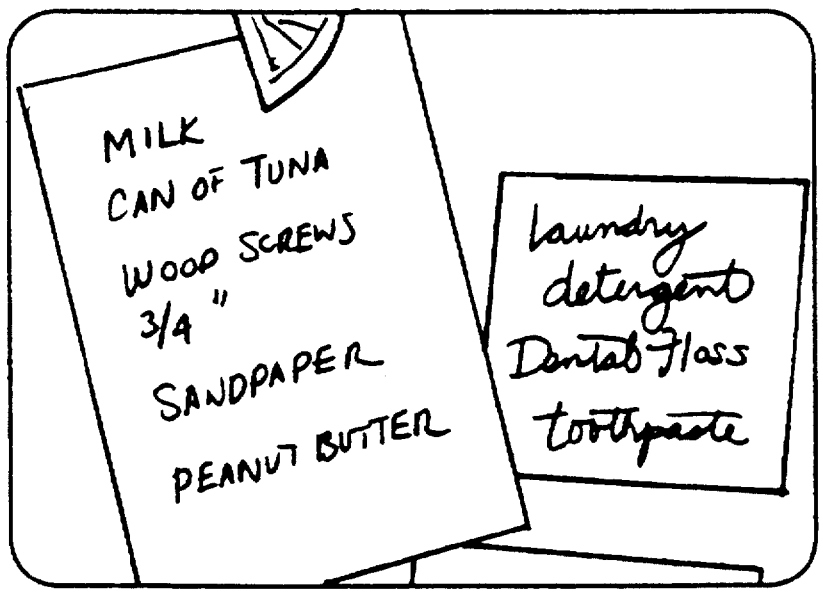

A condition is the information you need to look for in a document in order to find the answer. An example is provided in the screen display in FIG. 23. Are wood screws on the list? Clicking on MORE labels wood screws as the condition in the question and provides feedback: To answer this question you must look for "wood screws." If you find it, the answer is "yes;" if you do not, the answer is "no."

Figure 24:
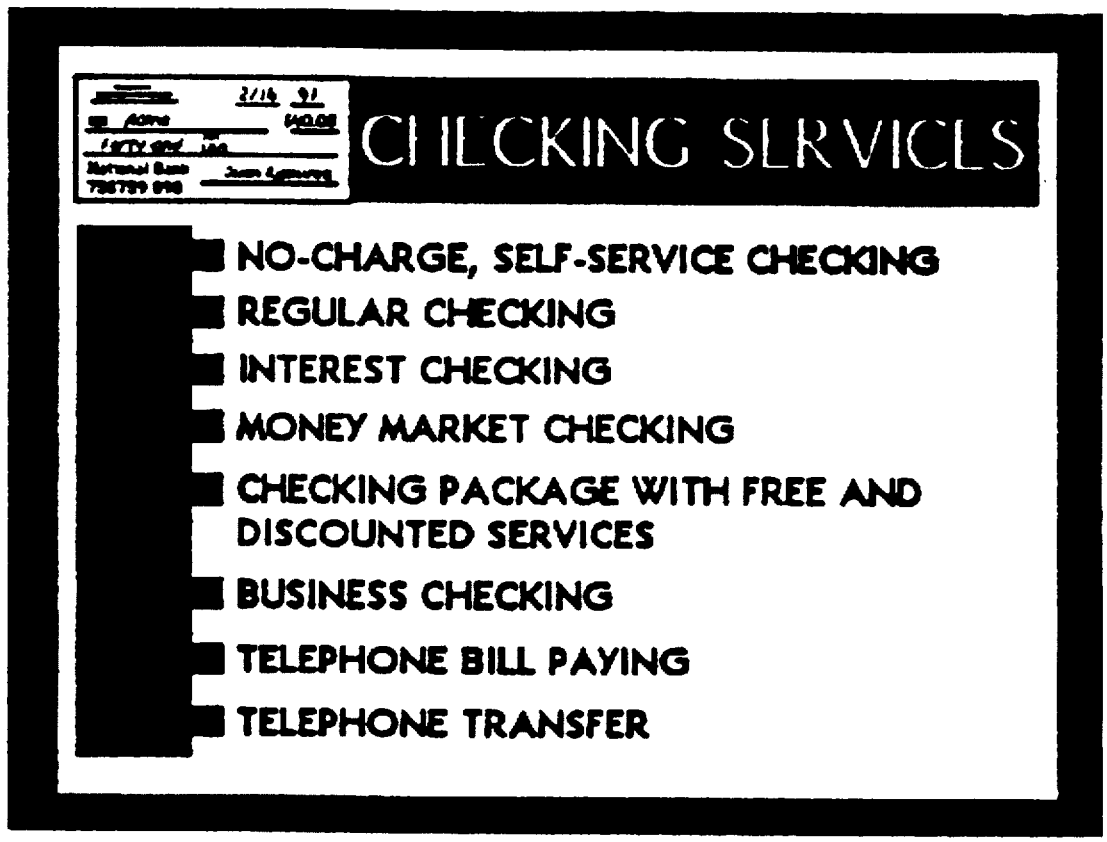

When you use a simple list to answer a question, you have to check back and forth between the question and the list. Sometimes a condition in the question matches what's in the list exactly. Students are taught that this is the easiest situation because they must only search and match. They are shown the screen display in FIG. 24 as an example. Is money market checking available? Students answer by clicking on YES or NO. The condition "money market checking" is underlined and feedback is provided by clicking MORE: Here what you are looking for exactly matches an item in the list.

Figure 25:
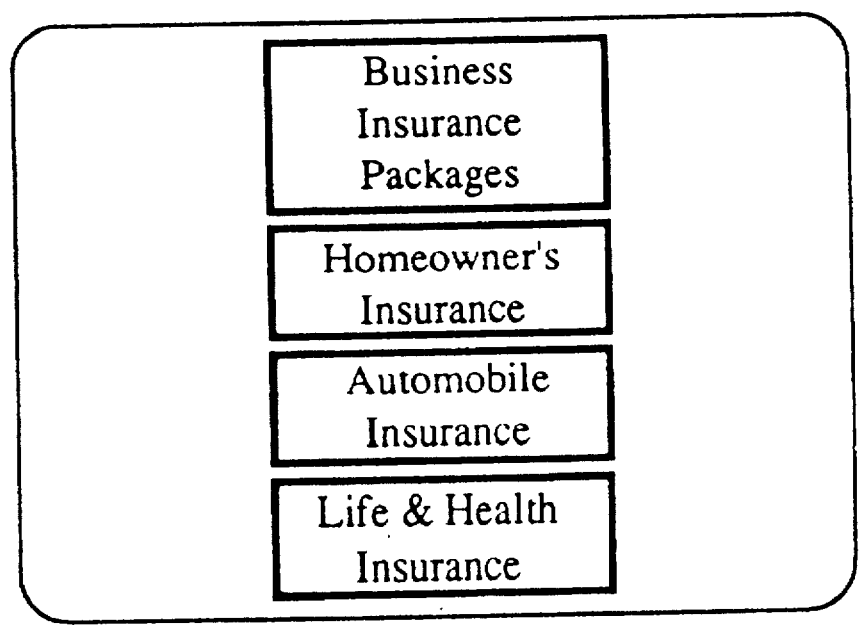
Figure 26:

Sometimes the condition in a question does not exactly match any item in the list. An example is provided in FIG. 25. Is car insurance available? Students must click on YES or NO. The condition "car insurance" is identified and feedback is provided by clicking MORE: To answer this question, you have to look for an item that means the same thing as car insurance. When a condition does not exactly match anything in the list you have to look for synonyms. To answer other questions, you have to use outside knowledge. Clicking the DEFINITION button brings up the following definition of outside knowledge: For some questions, all the information you need is not in the document. You have to use what you know from your own experience to answer questions like these. An example is provided in FIG. 26. How many kinds of Mexican sauces are listed? The answer must be typed in. The condition "Mexican sauces" is underlined and feedback is provided by clicking MORE: It is clear that Taco Sauce and Enchilada Sauce are both kinds of Mexican sauces. Those two are exact matches. You have to know that "salsa" is a kind of sauce in order to find all three sauces in this list.

In the second use lesson segment, "What Makes a List Harder to Use?", students are taught that a list that is long, not organized (or not organized in a way that fits the purpose for which it is being used), or full of distractors can be difficult to use. If students learn to recognize these factors, they may be more likely to proceed carefully in locating information in such lists and as a result use them more successfully. These same factors affect difficulty for all the matrix documents.

Vocabulary. The following definition is available during this lesson segment: "Distractors"—items that almost match the information you are looking for but do not completely satisfy all the conditions in a question.

The lesson segment. Some lists are harder to use than others. The menu screen is in FIG. 27, and it is accompanied on the screen display with the following title: Some things about a list that can make it harder to use include:. Students are then shown examples depending on which item from the menu is selected.

Figure 28:

The example shown when "length" is selected from the menu is in FIG. 28, and is accompanied by the following text: Can this cleaning pad be used with rubber kitchenware? Students must click on YES or NO. Clicking MORE highlights the answer and puts up feedback: A list can be hard to use if you have to look through lots of items to find an answer. "Rubber kitchenware" is highlighted in the question and in the list.

Figure 27:
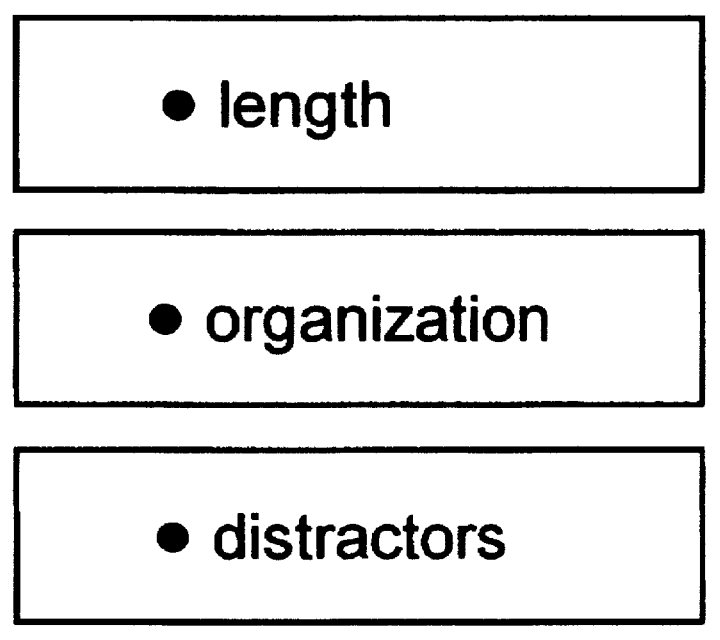
Figure 29:

The first example shown when "organization" is selected from the menu in FIG. 27 is in FIG. 29. Are filled pastries available at the breakfast buffet? Students must click on YES or NO. Clicking MORE puts up feedback: Because this list is not organized in any way, you have to look through all the items to find an answer. "Filled pastries" is highlighted in the question and in the list.

Figure 30:

The second example shown when "organization" is selected is in FIG. 30. Does this spaghetti sauce have meat in it? Students must click on YES or NO. Clicking on MORE puts up feedback: This list is organized, but not in a way that helps you find what you are looking for. The ingredients are listed in order by weight. If you just want to know whether a specific ingredient is present, all you can do is look through the list.

The example shown when "distractors" is selected from the menu in FIG. 27 is in FIG. 31, and is accompanied by the following text: If a list has items that almost match what you are looking for, it can be hard to find the correct answer. Is a pocket knife one of the tools listed? Students must click on YES or NO. Clicking on MORE provides the following feedback: Because the word "knife" appears twice in the list, it could be easy to make a mistake when answering this question. Items that come close to being right, but aren't exactly correct answers are called distractors. Students are taught that if they look through the list trying to match on "knife" and do not pay attention to the different kinds of knives listed, they could easily answer incorrectly.

The next section of this lesson segment focuses on the interaction between a question and a document. Students are taught that, The same kind of question can be more or less difficult to answer depending on the list you have to use. FIG. 32 contains the screen display shown during this section. Students are asked, Is 96629 a correct Navy post office zip code? They must click on YES or NO. Clicking on MORE provides the following feedback: This list is not too long and it is organized in a way that helps you find the item you are looking for. Students are taught that since this is a list of numbers, it has lots of distractors, and that it is easy to misread a number and answer the question incorrectly. The list then changes. There are now more items, but they are still organized in numerical sequence. Students are asked, Is 96644 a correct Navy post office zip code? They must click on YES or NO. MORE—Now it is harder to find the zip code on the list because there are so many numbers to look through. The list then changes for a third time. The number of items remains the same, but now they are presented in a random sequence. Students are asked, Is 96604 a correct Navy post office zip code? They must click on YES or NO. MORE—The only way to find 96604 on this long, disorganized list is to look through all the zip codes.

Summary. A list can be easier or harder to use depending on: its length; how it is organized; and the number of distractors it has.

The practice questions lesson segment is intended to provide further practice in answering questions using simple lists. The lesson segment menu is in FIG. 33. The lesson has three sets of questions, each using a different simple list. Each set has three questions. The questions follow the same format: the question is presented, students answer the question, and feedback about the conditions, and the list itself (e.g., this is a long, disorganized list) is provided. The condition in each question is also underlined as part of the feedback. The questions in this lesson are "yes/no" or "how many" questions. Students are reminded about question words and are taught to identify them in the questions.

Figure 34:
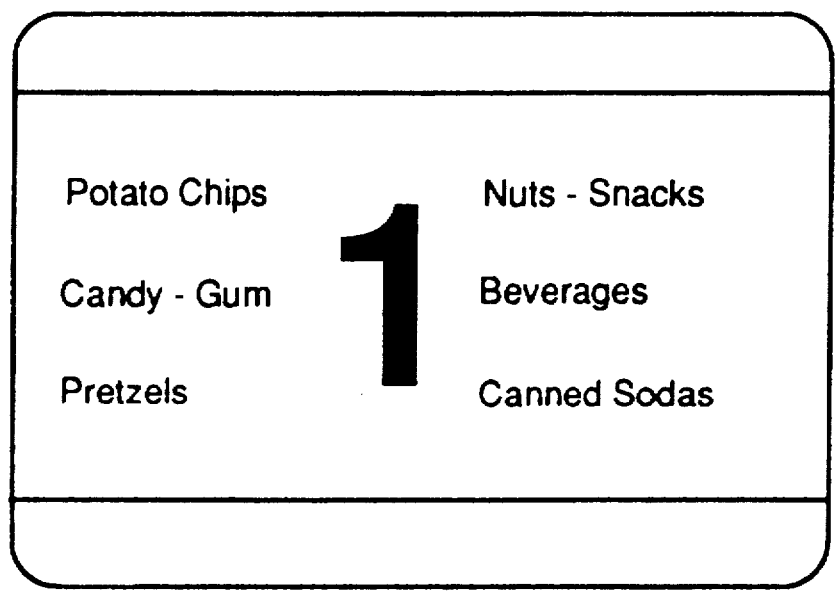

Question Set 1. The questions in Question Set 1 are based on the example in FIG. 34. A series of questions is presented to the students (text is italicized in this disclosure to indicate it appears on the screen displays). Are pretzels in aisle 1? This is an exact match question, and students must click on YES or NO. Clicking on MORE provides the following feedback: In this question, the condition "pretzels" exactly matches an item in the list. The list is not organized, but it is short so it is not too hard to look through it. The next question students are asked is, Would you expect to find drinks in aisle 1? This is a synonym question, and students must click on YES or NO. MORE—To answer this question, you have to know that "drinks" is a synonym for "beverages" or "canned soda." The next question is, You are looking for macaroni. Is it likely to be in aisle 1? Students must click on YES or NO. MORE—There is no item that exactly matches or is a synonym for "macaroni" on this list.

Figure 35:
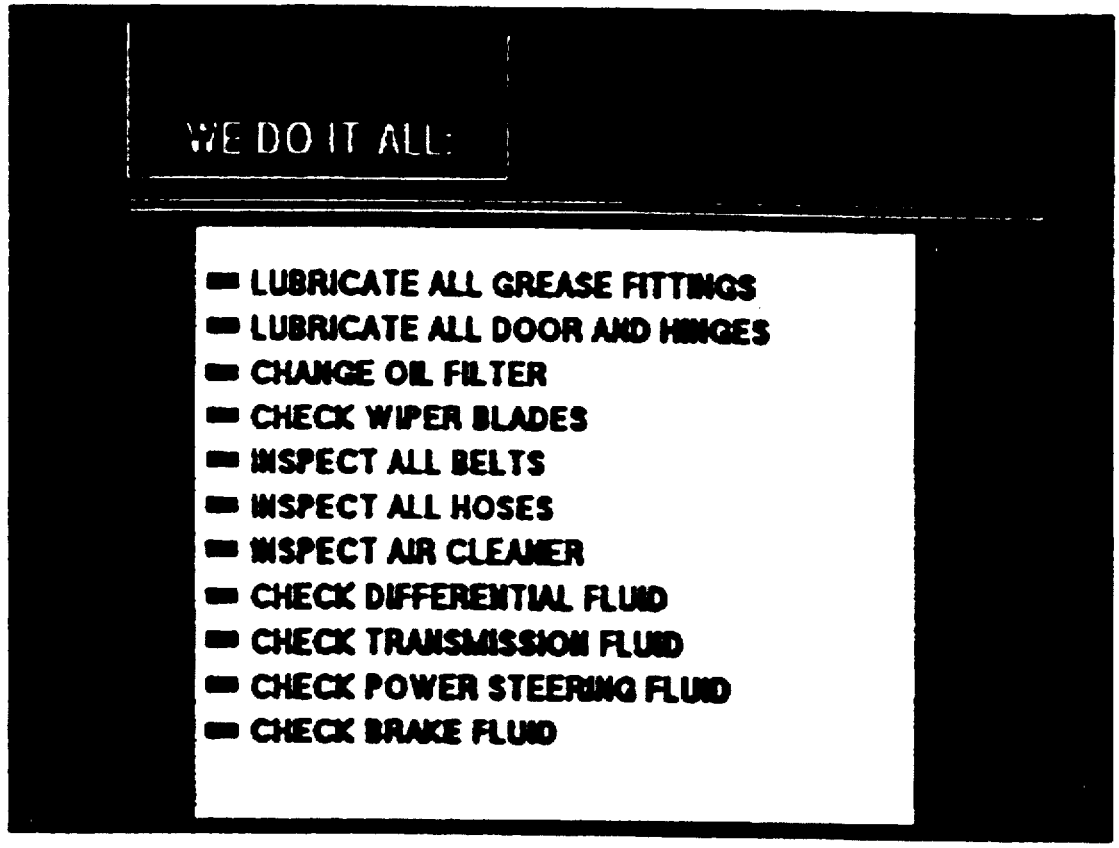

Question Set 2. The second series of questions is based on the example in FIG. 35. The first question is, Is checking the brake pads part of this car service? Students must click on YES or NO. MORE—There is no item on this list that exactly matches or is a synonym for "brake pads." One distractor on the list is "brake fluid." The second question is, How many fluids are checked as part of this service? Students must type in their answer. MORE—To answer this question, you must look through the list and count all the fluids that are checked. The third question is, Is changing the oil filter one of the services listed? This is slightly different from an exact match question since different forms of the same word must be identified when answering this question. Students must click on YES or NO. MORE—To answer this question, you have to look for "changing the oil filter." Since "changing" and "change" are forms of the same word, one item on the list matches what you are looking for.

Question Set 3. The third Question set is based on the example in FIG. 30. The first question students are asked is, Are there any red peppers in the sauce? Students must click on YES or NO. MORE—Here you have to look for "red peppers." There are 2 distractors: green pepper and black pepper. The second question is, Does the spaghetti sauce have any sweeteners in it? This is an outside knowledge question. Students must click on YES or NO. MORE—To answer this question you have to use outside knowledge. You must know that corn syrup is a kind of sweetener. The third question is, Are there more olives or mushrooms in this sauce? This is an outside knowledge question. Students must click on Olives or Mushrooms. MORE—To answer this question you have to know that items on an ingredients label are listed in order by weight.

b. Combined Lists

In teaching about combined lists, the Computerized Literacy System relies on several basic principles. First, combined lists are the matrix structure found most often in everyday contexts. They can be found in such familiar materials as menus, newspapers, advertisements, and bills. Second, all combined lists are made up of two or more related simple lists. To illustrate this point to the students, they are shown the example in the screen display in FIG. 36. The display shows a telephone bill which is made up of a list of dates that calls were made, lists of places and telephone numbers called, and a list of charges.

Third, combined lists, like simple lists, are made up of groups of items and labels. In combined lists, however, information is related not only within single lists, but also across lists. From the example in FIG. 36, students are taught the following points: Rochester, N.Y. is related to all the other cities in the list of places. It is also related to May 10, (716) 555-8876 and $1.23. All the items in that row are linked because they provide information about a single phone call. That row relationship can be expressed as a sentence: On May 10th, a call was made to Rochester, N.Y. to number (716) 555-8876 that cost $1.23.

Another principle about combined lists upon which the Computerized Literacy System relies is that the sequence of items in one list cannot be changed without changing all the other lists as well because information in combined lists is related across rows. If the list of places on the phone bill was arranged in alphabetical order, the other three lists would also have to be resequenced or the information would no longer be correctly related. Students are taught, then, that when one simple list in a combined list has a particular organization scheme, this scheme determines the order in which items are presented in adjoining lists. Students are shown, however, that while ordering a combined list by a particular ranking may be most useful for some purposes, that ranking may not be optimum for others. Students are also taught that combined list labels are, for the most part, extremely abbreviated, and sometimes fail to characterize the exact nature of the items which they represent. Students are therefore taught to locate or infer the additional information from titles, footnotes, or accompanying text.

The system also teaches students that information in a combined list is additive. Theoretically, related lists could be added to a combined list indefinitely. For example, in the phone bill in FIG. 36, lists could be added to show the times that calls were placed and their duration.

(1) Structure Lessons

Figure 37:
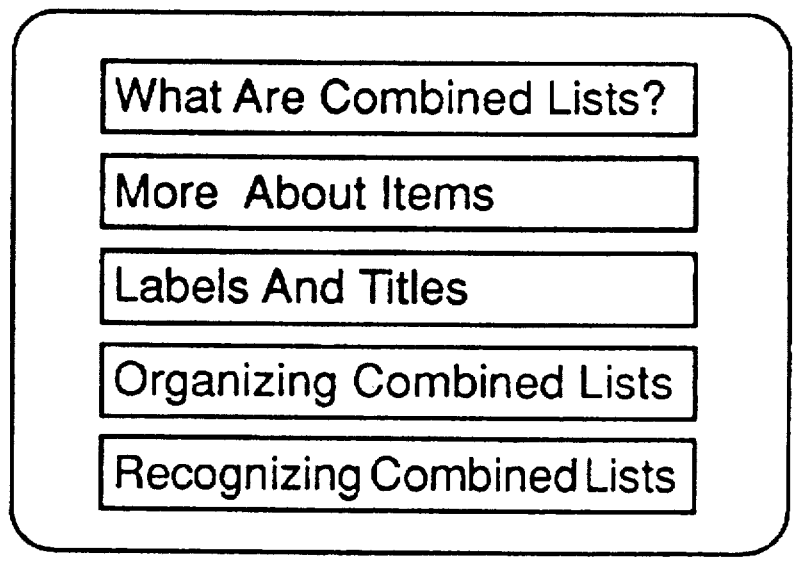

The Computerized Literacy System requires users to choose from a limited number of structure lesson segments. The lesson segment menu for one embodiment is in FIG. 37.

In the first structure lesson segment for combined lists, "What Are Combined Lists?", students are introduced to the principle that combined lists are made up of two or more simple lists. They are taught that each of the component simple lists adds related information to the combined list.

Vocabulary. In accordance with the description above, throughout this lesson segment the user has the option of viewing the definition of a word by clicking on the DEFINITION icon. "Related"—having something in common with. Items in lists are all related. The lists that make up a combined list are related as well.

The Lesson Segment. The segment contains an optional introductory section which shows that all of the principles for simple lists apply to the component lists in a combined list as well. The instructor or user may choose to show the review section or make the connection between simple and combined lists during the discussion of this first lesson segment.

Students are taught the following series of principles (as explained above, text that is italicized in this disclosure appears on screen displays). A combined list is made up of two or more simple lists. The example in FIG. 38 appears on a screen display. If the option to review simple lists is selected, each principle from the simple list structure lesson displays one at a time. Highlighting appears on the "Best Picture" combined list in FIG. 38 to illustrate each principle. The items can be words, numbers, or pictures. Labels tell you what each list is about. Items may be organized to make the lists easier to use. Year list is identified as organized by time. The lists can be presented in different ways. The combined list is reconfigured in rows. What's new about combined lists? Each simple list adds new information to the combined list. The simple lists all go together, or are related, in some way. The title for the document appears, Academy Award Winning Movies, 1976–79. This title defines how the two lists are related.

The next interaction in this lesson segment provides the opportunity for students to put together related lists to build a combined list. The example in FIG. 39 appears on the screen displays. An order form is a combined list. Which of these lists go together to complete the order form? (As explained above, text is italicized to indicate it appears on screen displays.) Students are asked to drag the appropriate list from the left side of FIG. 39 across to the video monitor in order to complete the form. Any list can be dragged over and put in any column. The computer will not judge students' selections as right or wrong. This will allow class discussion about a choice before making another selection. Students are thus taught how information is related across lists as the order form is built. Students are encouraged to see this relationship by being asked questions that require them to read across the lists, such as, how much do the pants cost?, and what size dress was ordered?

Summary. A combined list is made up of related simple lists.

Figure 40:
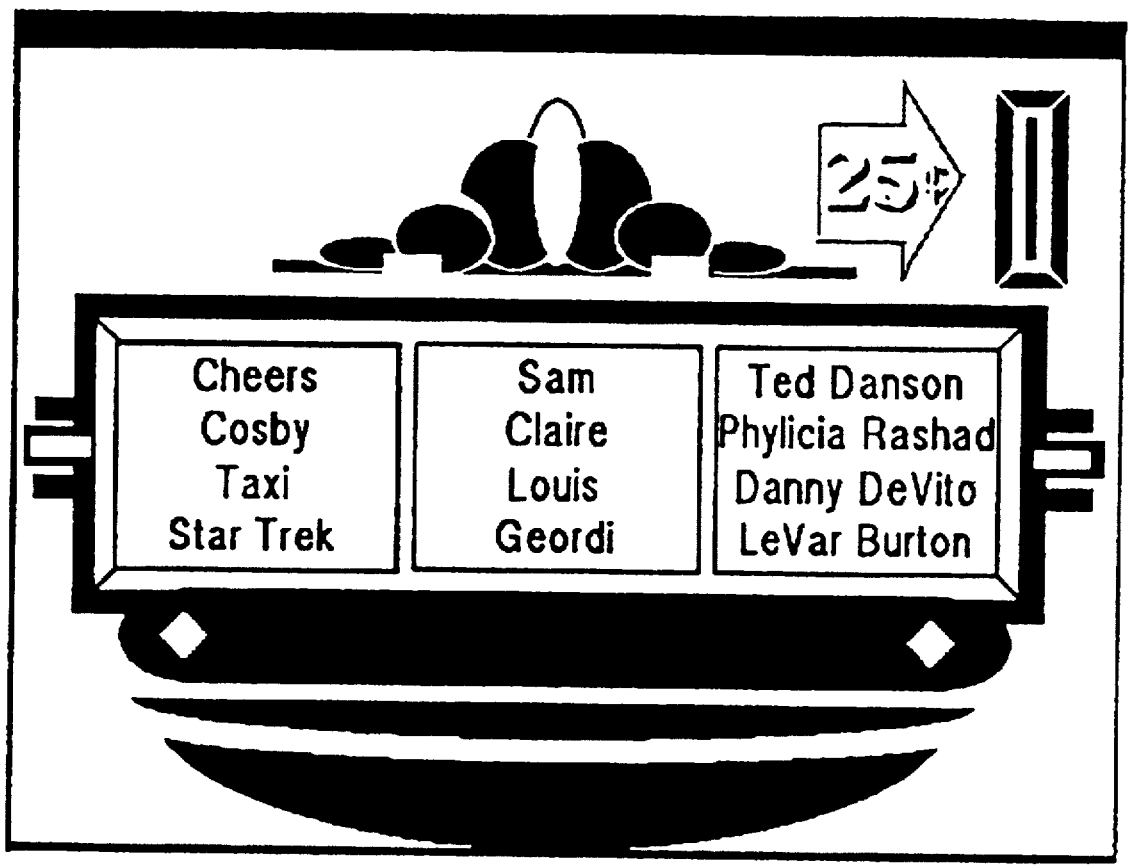

The Class Exercise. The exercise provides the opportunity for students to play with the idea of related information. A combined list "slot machine" displays three lists. See FIG. 40. Students are to decide whether the lists are related and can form a combined list. Can these lists go together to make a combined list? Once a decision has been reached about the first set of lists, another set can be displayed. The first two sets of lists will always be related. The lists in FIG. 40 are: television shows, main characters, and the stars that play those roles. The second set of lists shows the states in which several singers were born and their dates of birth. Subsequent sets will be randomly mixed and may or may not be related in a way that forms a sensible combined list.

In the second structure lesson segment for combined lists, "More About Items", students are taught that items in a combined list are related in two directions: both within and across lists. An item is related to other items within the same list. This is the same relationship that students have already learned about in simple lists. The items in a list have something in common; they represent the same kind of information. Students are taught that in a combined list, an item is also related across lists to other items in the same row. These items are often different kinds of information, but they are related to the same topic. This relationship can be expressed in sentence form.

The Lesson Segment. Students are first taught that, in a combined list, Each item has something in common with other items in the same list. (As stated above, text that appears in screen displays is indicated in this disclosure in italics.) The example in FIG. 41 appears on a screen display. The item 11:10 p.m. is highlighted and its list of items is highlighted. The common information is identified: These are all times when airline flights leave. Each item is also related to other items across the other simple lists. The row in which 11:10 p.m. appears is highlighted. The relationship of these items is identified: Information about Flight 4578. These related items build a kind of sentence. Flight 4578 leaves at 11:10 p.m. for Allentown, except Saturday and Sunday.

Summary. Items are related both within and across lists.

The Class Exercise. Students are shown a combined list. A row of items is highlighted and students are asked to supply a sentence expressing the relationship among the related items. SHOW ME supplies one possible sentence for students to discuss. Students are told that it is fine if they come up with alternative wording for the sentences. The critical point students are taught is that the sentence must contain each item in the row.

The first example is in FIG. 42. Students are asked, What sentence could you make using the items in this row? The second row is highlighted. SHOW ME: The Red Sea is 1,764 feet deep and has an area of 174,900 square miles. The second example is in FIG. 43. Students are asked, What sentence could you make using the items in this row? The second row is highlighted. SHOW ME: A 66×30 pedestal desk in good condition costs $279.

In the third structure lesson segment, "Labels and Titles", students are shown the various ways that labels and titles can be used in combined lists. Each list in a combined list may have a label or one can be supplied if it is missing. This idea was introduced in the simple list segment "More About Labels" so it will be a review for students who have already played that lesson in the system. Students are taught, though, that combined lists may also have titles. A title may either add information to, or take the place of, the labels.

The Lesson Segment. Students are taught a series of principles (as explained above, text that is italicized in this disclosure appears on a screen display). Each of the lists in a combined list may have its own label. The example of a combined list with labels in FIG. 44 is presented on a screen display. If there are no labels on the lists, you can usually figure them out. The example in FIG. 45 appears on a screen display. A combined list may also have a title. The example in FIG. 46 is presented on a screen display. A title in a combined list may add new information that is not in the labels. The example in FIG. 47 is presented on a screen display. Students are told that this title indicates that the sports listed are broadcast events and that they are broadcast on one particular day of the week. A title in a combined list may take the place of the labels. The example in FIG. 48 is presented on a screen display. Students are shown how this title labels the list of birth dates and the list of presidents' names.

Summary. Labels and titles can help explain what's in a combined list.

Figure 50:

The Class Exercise. Students are shown a combined list which has neither labels nor a title. They are asked to type in a label for each list and to type in a title for the document. Two examples are available: a combined list showing chicken products and their prices, see FIG. 49, and one showing the players and teams represented in an NBA All-Star game, see FIG. 50.

In the fourth lesson segment, "Organizing Combined Lists", students are shown that, as with simple lists, combined lists can be organized to make them easier to use. However in combined lists, because information is related across lists, the organization of any one list is dependent upon the organization of the others.

Figure 51:

The Lesson Segment. Students are taught a series of principles accompanied by examples. Items in one list may be organized to make a combined list easier to use. The example in FIG. 51 appears on a screen display. The list of dates highlights and the organizational scheme is identified: organized by calendar date. The next example is in FIG. 52. The list of ocean depths highlights and the organizational scheme is identified: Organized by depth—shallow to deep. Students are asked, What happens if the organization of that list is changed? The items in the list of ocean depths are reorganized from deepest to shallowest. See FIG. 53. Students are shown that when just the list of ocean depths is changed, the document no longer has accurate information. For example, in FIG. 53, the depth of the Atlantic Ocean, which should be 11,730 feet, is now 1,764 feet. Students are thus taught that because items are related across rows, one can not change the sequence of just one list in a combined list. To keep the related items together, the other items must be changed too. The lists of ocean names and areas are reorganized to match the new organization of the list of ocean depths.

Summary. One list can define the organization of the other lists.

Figure 54:
Figure 55:
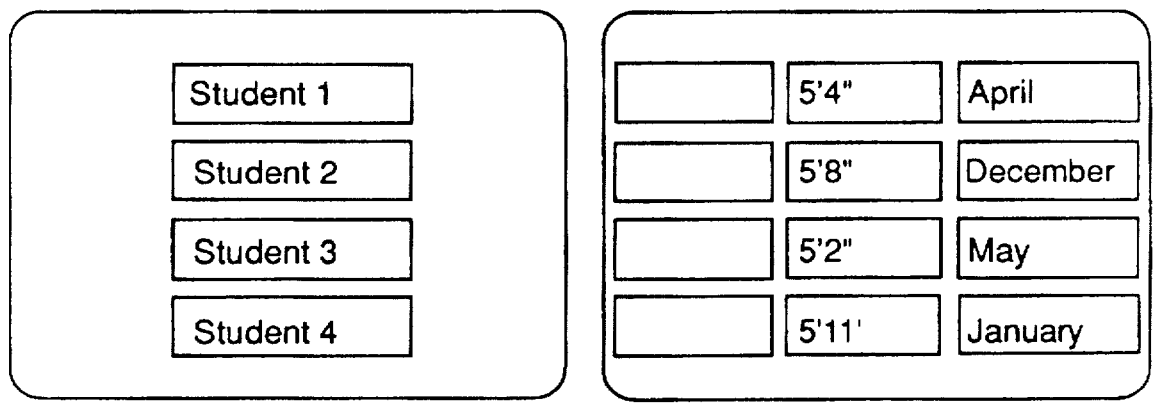

The Class Exercise. Students use familiar information to see the consequences of reorganizing one list of items without changing the other lists. Students make up a combined list showing student names, heights, and months of birth by typing the information in the columns provided on the computer screen. See FIG. 54. Clicking on DONE transfers their list onto the video screen. See FIG. 55. Students are then asked to select a list to reorganize. The items in that list are transferred to the computer monitor. Students drag the items to the video monitor list in the new order that they have chosen (they might, for example, organize the list of names alphabetically.) At this point, students are shown that the information is no longer accurate. For example, instead of being 5'4", Student 1 may now be shown as being 5'11" tall. Clicking on REORGANIZE LISTS changes the organization of the other two lists to keep the related items together. This exercise can be repeated choosing a different list to reorganize, or another way to reorganize the first list selected.

In the fifth structure lesson segment, "Recognizing Combined Lists", students are shown four ways in which combined LO lists can be presented. Students are taught how related information is grouped in each kind of combined list.

The Lesson Segment. Students are taught that combined lists can be presented in different ways. The four different ways of presenting combined lists appear as a menu on the screen. See FIG. 56. Clicking on a choice presents an example of that kind of combined list. NEXT EXAMPLE presents additional examples for discussion.

Figure 63:
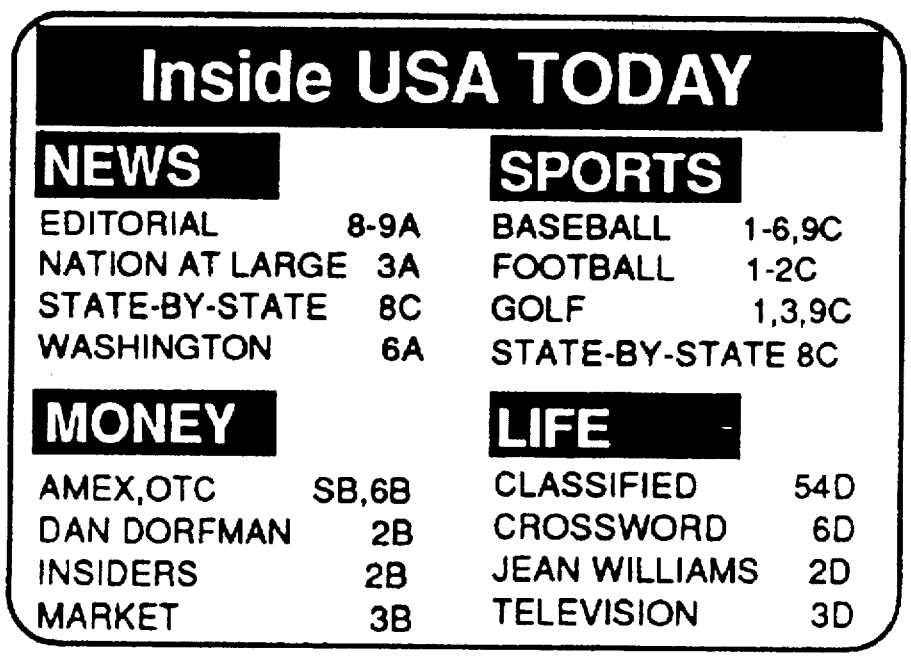
Figure 65:
Figure 66:
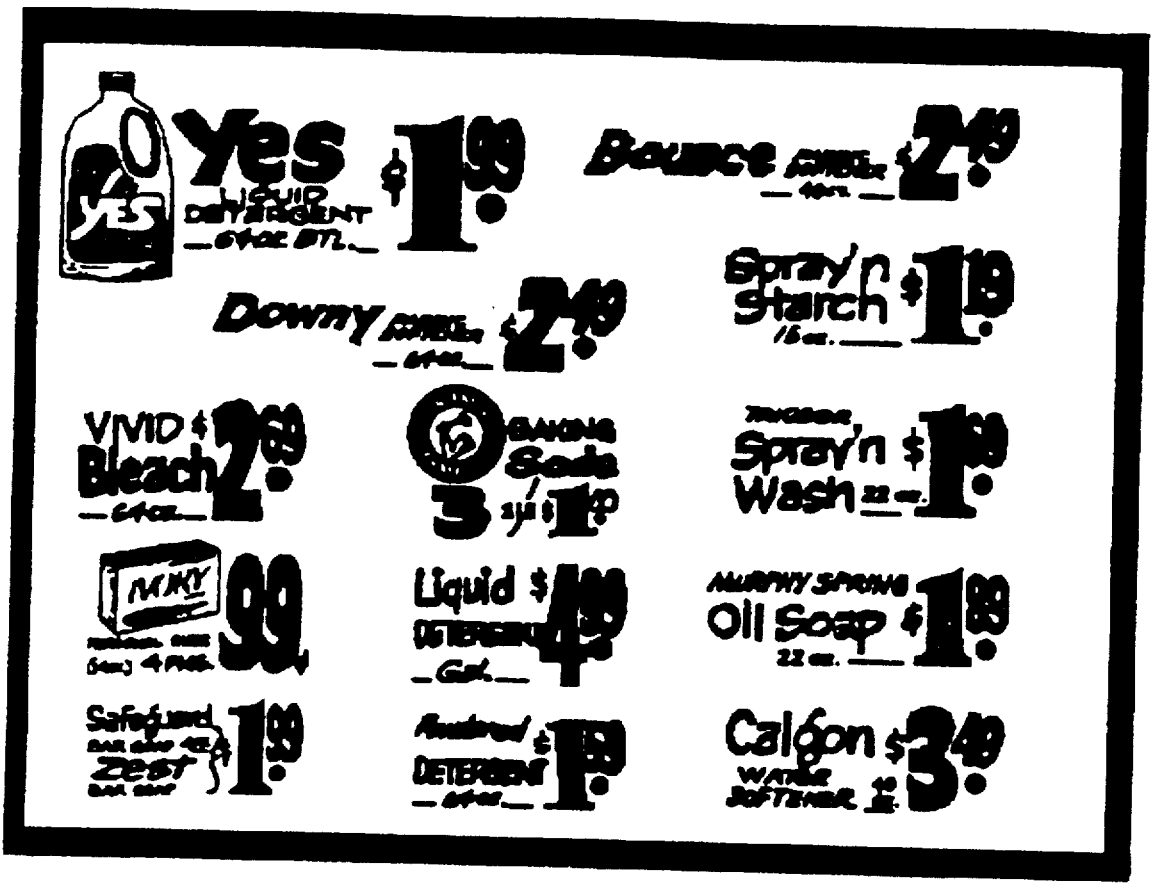
Figure 67:
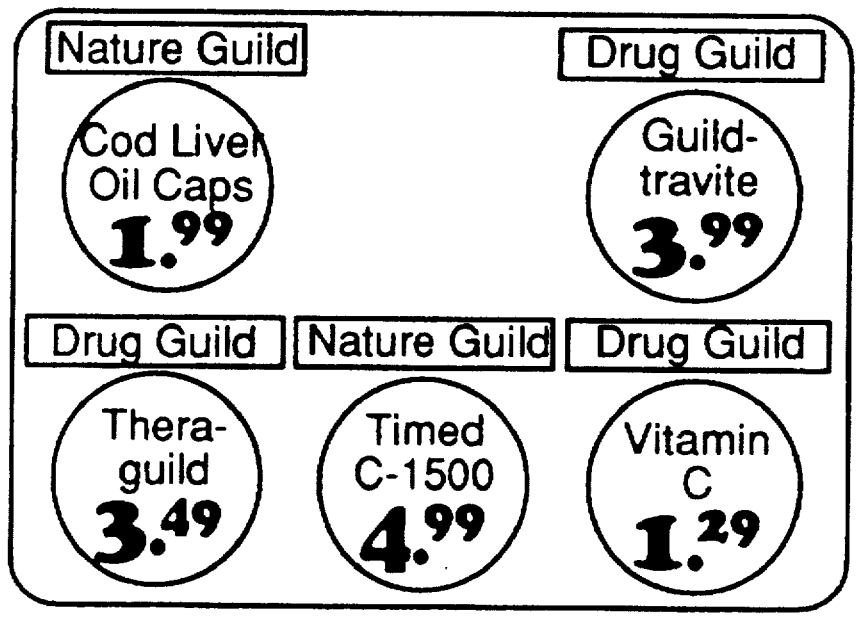
Figure 68:
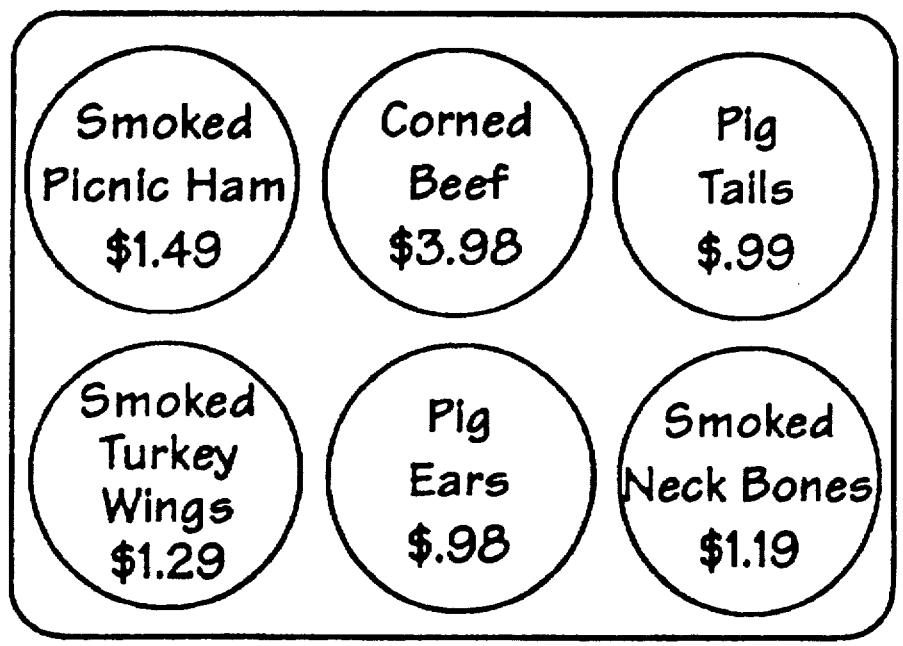

When "In Columns" is selected, three examples are available. See FIGS. 57, 58 and 59. When "In Rows" is selected, two examples are available. See FIGS. 60 and 61. When "Grouped" is selected, three examples are available. See FIGS. 62, 63 and 64. When "Scattered" is selected, four examples are available. See FIGS. 65, 66, 67 and 68.

Figure 70:

The next section goes into more detail about the !5 different ways information is presented in each type of combined list. The menu screen is in FIG. 69. When "Columns" is selected from the menu, students are taught that: When combined lists are in columns, each column is a list of items, and the items are related across rows to form a sentence. The example in FIG. 70 appears on a screen display. A related row of items is highlighted and the sentence provided: "Coffee and tea stains can be removed with vinegar or hydrogen peroxide." Students have practiced forming sentences in the lesson segment "More About Items", so this should be familiar. If they need more practice, the instructor could ask them to form another sentence with related items.

Figure 69:
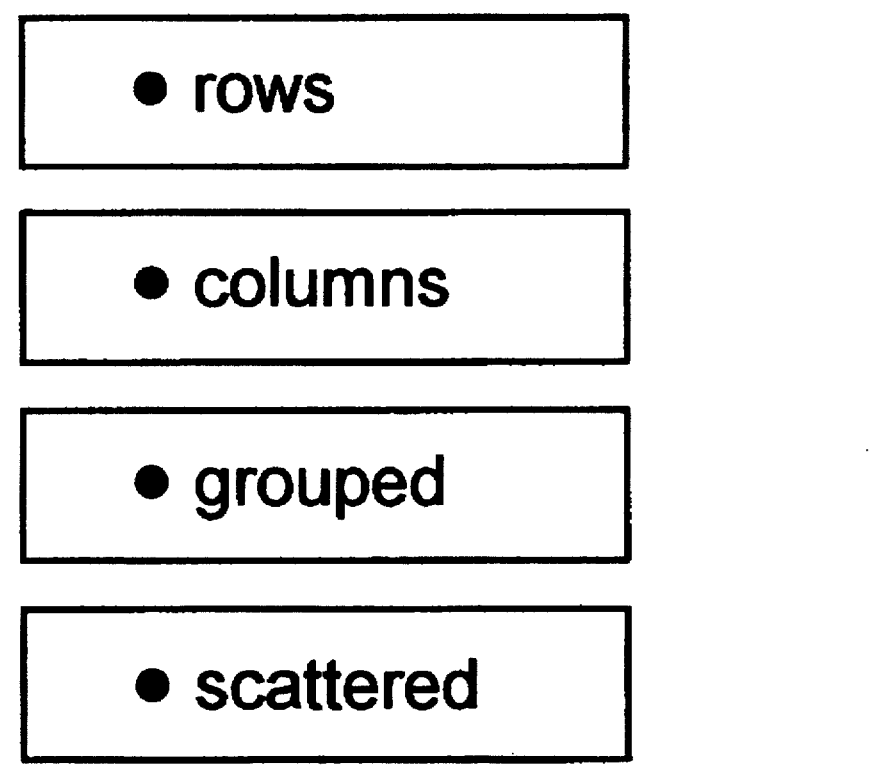

When "Rows" is selected from the menu in FIG. 69, students are taught that: When combined lists are arranged in rows, each row is a list of items, and the items are related up and down in columns to form a sentence. The example in FIG. 71 appears on a screen display. A related column of items is highlighted and the sentence provided: "For children ages 2–3 who weigh 24–35 pounds, the dosage is 2 tablets."

When "Grouped" is selected from the menu in FIG. 69, students are taught that: Group combined lists are divided into sections. Each section in a combined list may have a heading. The example in FIG. 64 appears on a screen display.

Figure 72:

When "Scattered" is selected from the menu in FIG. 69, students are taught that: Scattered combined lists have no headings, and items are not arranged in columns or rows. Advertisements are often scattered combined lists. The example in FIG. 72 is presented on a screen display. Even though information is scattered across the page, this ad is made up of three lists of related information. The example contains three labeled columns displayed on the computer monitor: "Shoe Picture", "Name of Shoe Style", and "Price". Students are asked to drag each item from the ad to the correct column, reorganizing the scattered combined list into columns. They can arrange the items in any order, but they must keep the related information together (e.g., the picture, name, and price in any row must be for the same kind of shoe.) When they have finished, students will have been shown that the advertisement, instead of keeping lists of like items together, groups the related row information together. In this case, all the information about a shoe is placed together on the advertisement.

Summary. Combined lists do not all look alike.

Figure 73:
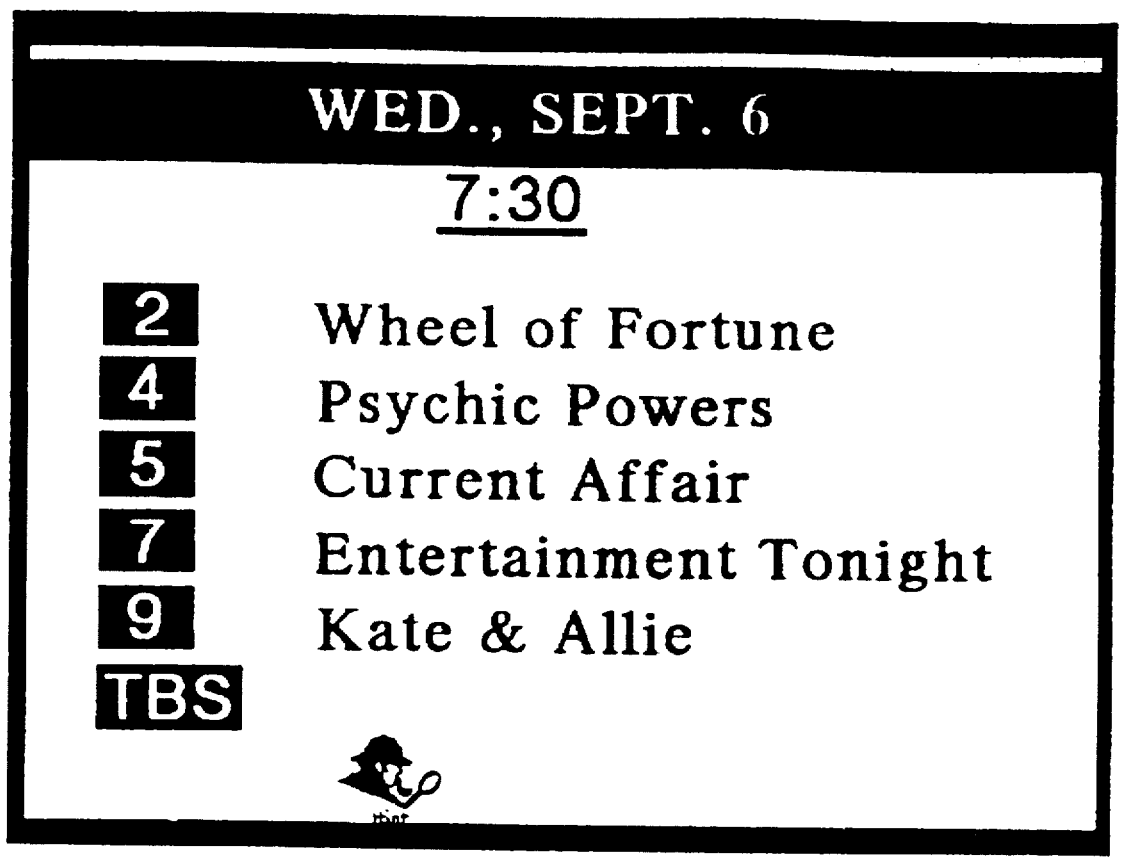

The Class Exercise. Documents are presented and students must decide whether each is a combined list. Three examples are available. For each example, the question is posed: Is this a combined list? A HINT button brings up a definition: A combined list has more than one list of information and the lists are related. The first example is in FIG. 73. Clicking on SHOW ME causes the lists to separate into two lists under the labels Channels and TV programs. This is a combined list because it contains more than one list of information and the lists are related in some way. Television programs and their channels make up this combined list.

The second example uses a grouped combination list. It is in FIG. 74. Clicking SHOW ME causes the lists to separate into columns under the labels: Year, Model, Price, Rebate. Students are shown that this is a combined list because it contains more than one list of information and the lists are all related in some way. This combined list shows information about the car models for sale.

The last example shows a list of vacation guidebook listings. It is in FIG. 75. SHOW ME reconfigures the list into a single column. Students are told that, This is not a combined list because it has only one list of information.

(2) Use Lessons

Figure 76:
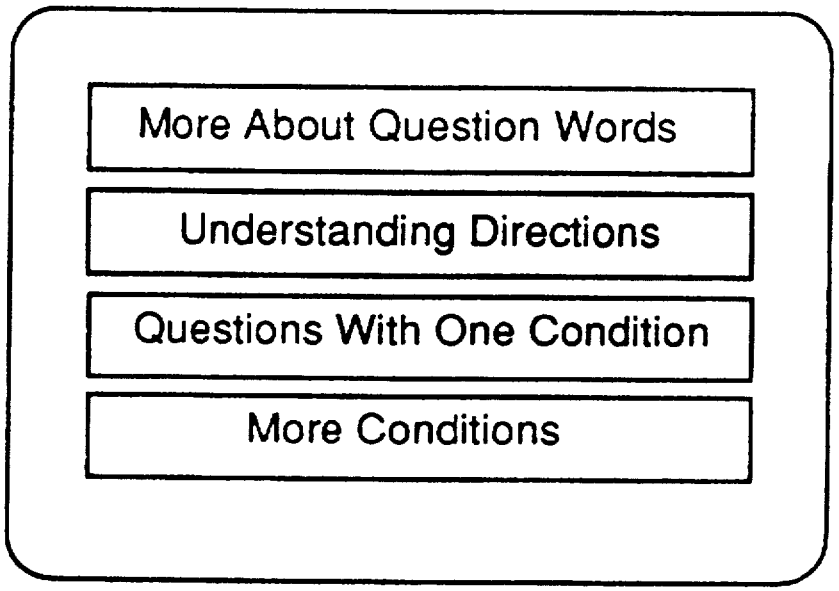

In the first part of the combined list use lessons of one embodiment of the present invention, "Understanding Questions", students are taught to extend what they have learned about question words and conditions in the simple list use lessons. Each lesson segment in this part has a practice question section. This section is analogous to the class exercise that follows each segment in the structure lesson. Practice questions allow students to apply what they have learned in a lesson segment to a new document. The Computerized Literacy System requires students to select from among a limited number of use lesson segments. The lesson segment menu is in FIG. 76.

In the first lesson segment for Understanding Questions, "More About Question Words", students are shown the kind of answer required by five common question words: "who," "what," "when," "where," and "how much." Students are also shown that "which," and sometimes "what," require one to look beyond the question word to determine what kind of answer one is looking for. Finally, students are taught the link between knowing the kind of answer being sought and knowing where to look in a combined list. Students are shown that using a simple list involves, by definition, dealing with a single kind of information. They are taught that because combined lists contain multiple kinds of information, knowing what kind of information is required to answer a question indicates in which list(s) to search.

The Lesson Segment. Students are first told that, Many questions begin with question words like these. (Text is italicized in this disclosure to indicate it appears on a screen display, as explained above). Who, What, When, Where, and How Much are displayed on the video monitor. These words tell you something about the kind of answer you are looking for.

Next, an interaction provides students practice in matching question words and answers. See FIG. 77. One question is available for each question word. Each question has multiple answers. Clicking on a question word displays the question. Students select their answers on the game board and click DONE once they have found all the answers. Feedback appears after each question, reinforcing the question word/answer type match. The questions and feedback are as follows: (1) Who works outdoors? The three answers presented by the system represent both proper and common nouns. They are her aunt, Darryl Strawberry and a mail carrier. Students are taught, then, that, The answer to a "Who" question must be a person. (2) What did you order for lunch? Both singular and plural nouns are included here. The four answers presented by the system are pizza, sandwiches, the special, and salad. Students are then taught, The answer to this "What" question must be a thing. (3) Where is Dallas? The two answers presented by the system are Texas and North America. Students are then taught, The answer to a "Where" question must be a place. (4) When does your new job start? The answers provided by the system are tomorrow, Monday, 8:30, and soon. Students are then taught, The answer to a "When" question must be a time. (5) How much hay does an elephant eat a year? The answers presented by the system are 43,200 lbs., a lot, and more than a mouse. Students are then taught, The answer to a "How Much" question must be an amount.

Students are next taught that Sometimes it takes more than a single question word to know what in an answer to look for. This is often true for "what" and "which" questions. An interaction teaches students to focus on the kind of information needed to answer a question, rather than on the actual answer. Students are also shown that they must often look at words beyond the question words "what" and "which" to know what kind of answer to look for. A question is presented and students must click on one of the following to indicate the kind of answer needed: a time, a person, a place, an amount, or a thing. The first question presented is, What time does the train for Minneapolis leave? Students are taught to look at the words "what time" to know the answer must be a time. An additional series of questions and answers are presented by clicking on NEXT QUESTION: (1) Which shirt do you like best? "Which shirt" tells you the answer must be a thing. (2) Which singer won the most Grammy awards last year? "Which singer" tells you the answer must be a person. (3) Which city is north of Miami? "Which city" tells you the answer must be a place. (4) What is the cost of a round-trip bus ticket? "What is the cost" tells you the answer must be an amount.

Students are next taught that Knowing what kind of answer you need can help you figure out where to look for an answer in a combined list. This is true because different lists in a combined list often contain different kinds of information. If you match up the kind of information needed for an answer with the list that has that kind of information, you know where to look for the answer.

A combined list is presented that has five different kinds of information: species of fish, weights, dates, places, and people. See FIG. 78. A series of questions and answers are presented and students are asked not to find the answer but to find the list that should have the answer, because it contains the kind of information the question word asks for: (1) Where was the Lake Trout caught? SHOW ME: The answer to a "where" question must be a place. The list labeled "Place Caught" is identified as the list that has place information. (2) When was the White Catfish caught? SHOW ME: The answer to a "when" question must be a time or date. The list labeled "Date Caught" is identified as the list that has date information. Before the rest of the questions, the items are masked and only the labels on the combined list show. Students are asked to find the list that would have the answer just by using the labels. (3) Who caught the record weight American Shad? SHOW ME: The answer to a "who" question must be a person. The list labeled "Record Holder" is identified as the list that has person information. (4) What did W. Keener catch? SHOW ME: The answer to this "what" question must be a thing. The list labeled "Kind of Fish" is identified as the list that has thing information. (5) How much did the Muskie weigh? SHOW ME: The answer to a "how much" question must be an amount. The list labeled "Weight" is identified as the list that has amount information.

Summary. Question words give you clues about: (1) The kind of answer you are looking for, and (2) Where to look in a combined list to find your answer.

Practice Questions. Students are asked a series of questions based on the example in FIG. 79: (1) Who invented the toaster? Students click on the document. SHOW STEPS: The question word "who" tells you that the answer must be a person. Since inventors are the only people listed, the answer must be in the inventor list. (2) When was the piano invented? Students type in the answer. SHOW STEPS: The question word "when" tells you that the answer must be a time. In this combined list, the times are dates. (3) Which person invented Velcro? Students click on the document. SHOW STEPS: Here you have to look at more than one question word. "Which person" tells you the answer must be a person.

In the second lesson segment for Understanding Questions, "Understanding Directions", students are introduced to tasks that involve directives rather than questions. Students are shown how to figure out what kind of answer a directive requires.

The Lesson Segment. Students are first told that, Sometimes when you use a document you are given directions to follow. Instead of beginning with question words like "who," "when," or "where," directions have other clue words. Other clue words are displayed: Circle, List, and Underline. The directions tell you what to do in order to show your answer. How do you know what kind of answer you are looking for when there is no question word? A word or phrase after the directions tells you exactly what kind of answer you need to find.

A series of examples is then presented to illustrate these points. The first example is in FIG. 80. Students are directed to, Circle the title of course number 104. Students click on the course name they want to circle. SHOW ME: The direction "Circle" tells you that you need to circle the answer. The phrase "the title" tells you that your answer must be a course title. The second example is in FIG. 81. Students are directed to, List the days this store is open until 10. Students type in their answer. SHOW ME displays the correct answer. The third example is in FIG. 82. Students are directed to, Underline the zip code for Ashfield. Students click on the zip code to underline it. SHOW ME: The direction "Underline" tells you to mark your answer by underlining it. "The zip code" tells you that the answer must be a zip code.

Summary. Directions tell you: (1) How to show your answer, and (2) What kind of answer is required.

Practice Questions. Students are given a series of directions through a paper and pencil exercise based on the example in FIG. 83. Clicking on SHOW ME for each direction displays the answer on screen and activates a SHOW STEPS option. The directions are: (1) Circle the check numbers of any checks paid on 12/20. SHOW STEPS: The direction word "Circle" tells you to mark your answers by circling them. "The check numbers" tells you to circle check numbers. (2) Underline the date on which check number 3559 was paid. SHOW STEPS: "Underline" tells you to show your answer by underlining it. "The date" tells you that your answer should be a date. (3) List the amounts of any checks paid after 12/20. SHOW STEPS: "List" tells you that you must write out your answer as a list. "The amounts" tells you that your list should be made up of check amounts.

In the third lesson segment for Understanding Questions, "Questions With One Condition", students are taught to apply what they have learned about conditions to combined lists. This segment emphasizes identifying the condition in a question. To make this task easier, only questions with a single condition are presented in this segment. Students are also taught to verify an answer by checking to be sure it matches both the question word and the condition in the question.

The Lesson Segment. Students are first told that, A condition is information in a question that you need to look for in a document in order to find an answer. Some questions have just one condition. An example is provided. See FIG. 84. Students are told, Use the train schedule to answer this question, and are asked, When does train number 315 leave? Students click on the document to answer. SHOW ME: The condition "train number 315" is the information you must look for first in the schedule. Once you have found train number 315, you can find the time that the train leaves. Students are told that, Using conditions and question words together you can figure out:

(1) What to look for first in order to find an answer, and (2) What kind of answer you need to find.

The train schedule example is then taken away and students are focused on a series of questions. They are first asked to identify the question word and condition in the following question: Where does the 1:20 train go? The question word "where" tells you that the answer must be a _____. Students must type their answer in the blank. SHOW ME: place. Students are then asked, What condition in the question tells you what to look for first in the document? Students must click on the condition. SHOW ME: the 1:20 train. The next question is, Where does the 3:10 train go? Now what is the condition in the question? Students click on the condition. SHOW ME: 3:10 train. The question word and condition are labeled. The train schedule in FIG. 84 is displayed again and students are asked to answer the question by clicking on the correct destination. SHOW ME: Northbrook.

Students are then taught how to check their answers. Check your answer by asking: Does the answer fit the question word? Yes, Northbrook is a place. Does the answer match the condition in the question? Yes, Northbrook is the place where the 3:10 train goes.

Summary. A condition in a question is the information to look for in a document in order to find an answer.

Practice Questions. Students are given a series of questions based on the example in FIG. 85: (1) Which car costs $13,179? Students click on the document. SHOW STEPS: The price $13,179 is the condition you must match in order to find the answer. "Which car" tells you that the answer must be a car model. (2) How many cars cost less than $13,000? Students type in their answer. SHOW STEPS: The question word "How many" tells you that the answer must be a number. "Less than $13,000"" is the condition. Here you must look through the list of prices and count each price that is less than $13,000.

The fourth lesson segment in Understanding Questions, "More Conditions", focuses on two key features of using more complicated document structures that students must be taught: (1) understanding the multiple conditions in complex questions, and (2) becoming aware of the processes that can be followed to find answers in a document.

The Lesson Segment. An introductory video relates conditions to a real-life situation. In the video, a waitress in a diner has difficulty correctly filling an order because she has trouble remembering all the conditions specified by the customer (e.g., the size of the drink, the way the eggs should be prepared, etc.) Only when she checks the order condition by condition against her written list does she bring the customer everything he has ordered. Students are taught in the lesson that they too must check their work condition by condition to be sure an answer is correct.

Underlying the instruction on conditions is an emphasis on process. Because answering a multiple-condition question involves several steps, students are asked for the first time to consider the process involved in finding an answer. For each question they answer, students are shown one way the answer could be found. The ANOTHER PATH icon is used to introduce the idea that there are often several different paths to the same answer. As they answer other questions in the lessons, students are taught to recognize how they went about finding answers and to compare the efficiency of alternate strategies.

This segment has a second video which is intended to promote discussion about alternate means to the same end. In the video, a mother and daughter are cooking together and have different ideas about the best procedures to follow. The mother finds that her daughter can cook a terrific meal even though she does not do things the way she would. The video prompts discussion about different ways to accomplish the same task, and students are taught the advantages and disadvantages of alternate approaches. This is then related to different approaches to finding information in documents.

Figure 86:

Students are taught that, Some questions have more than one condition. Before you can answer questions like these, you must satisfy all the conditions. An example is then provided. See FIG. 86. Students are asked, Suppose this is your phone bill and you want to answer this question. How many calls were made to Cherry Hill? Students type in their answer. SHOW ME: "How many" tells you the answer must be a number. Cherry Hill is the one condition you must match. A second question with two conditions is then presented. How many evening calls were made to Cherry Hill? Students type in the number of calls. For each step, highlighting on the document illustrates the process. One way to answer this question is to: (1) Find the evening calls. Each "evening" highlights in the "Call Type" list; (2) Find the Cherry Hill Calls. Each "Cherry Hill" highlights in the "Place" list; and (3) Count the number of evening calls to Cherry Hill. A box appears on the screen display to link each call made in the evening to Cherry Hill.

Students are then taught, When a question has several conditions, there is usually more than one way to find the answer. Clicking on ANOTHER PATH shows another series of steps that could be followed to find the answer. The first alternate path is just a resequencing of the steps initially displayed: Another way to answer this question is to: (1) Start by looking for all the Cherry Hill calls. (2) Then find the evening calls made to Cherry Hill and count them. ANOTHER PATH can be clicked a second time. In this alternative path, both conditions are searched simultaneously. You might also find the answer by looking down both the "Call Type" and "Place" columns for evening calls that were made to Cherry Hill.

A final question is presented that has four conditions: How many evening calls were made to Cherry Hill in December which cost more than $1.00? Students type in their answer. SHOW ME: One way to find the answer is to: (1) Start by looking for the December calls since the list of dates is organized by month; (2) Find all the evening calls that were made in December; (3) Find the Cherry Hill calls made in the evening in December; and (4) Find the one call over $1.00 that was made in December in the evening to Cherry Hill.

Finally, students are taught that, When answering questions with several conditions, it is important to check your answer carefully. The previous question is on screen and the row on the phone bill that contains the only call over $1.00 is highlighted. Students are asked a series of questions: (1) Is this an evening call? SHOW ME: Yes, "Evening" is highlighted in the "Call Type" list. (2) Was it made to Cherry Hill? SHOW ME: Yes, "Cherry Hill" is highlighted in the "Place" list. (3) Did it cost more than $1.00? SHOW ME: Yes, "$1.31" is highlighted in the "Cost" list. (4) Do any other calls fit all these conditions? SHOW ME: No, and a little arrow moves down the bill to represent checking for other calls.

Summary. Each condition in a question is another piece of information you must look for in order to find an answer. When a question has several conditions there is usually more than one way to find the answer.

Figure 87:

Practice Questions. Students are asked a series of question based on the example in FIG. 87 and then the number of conditions is identified. The SHOW STEPS icon is available and clicking on it displays one process that could be followed to find the answer. The steps display one at a time with highlighting on the documents to illustrate the process. The questions are: (1) What is the latest time an October game starts? Students click on the document. SHOW STEPS: This question has two conditions—Latest time and October game. To answer this question, you could: Find the October games. Look at the times for the October games. Find the latest time listed. (2) What is the latest time a Sunday game in November starts? Students click on the document. SHOW STEPS: This question has 3 conditions—latest time, Sunday game, and November. To answer this question: Find the November games. Find the Sunday games in November. Look at the times of the Sunday November games. Find the latest time. (3) On what day do the Eagles play the Cowboys in December? Students click on the document. SHOW STEPS: The question has 2 conditions—Cowboys and December. To answer this question you could: Look through the list of opponents to find the Cowboys. Look at the months to find December. Find the date.

Figure 88:
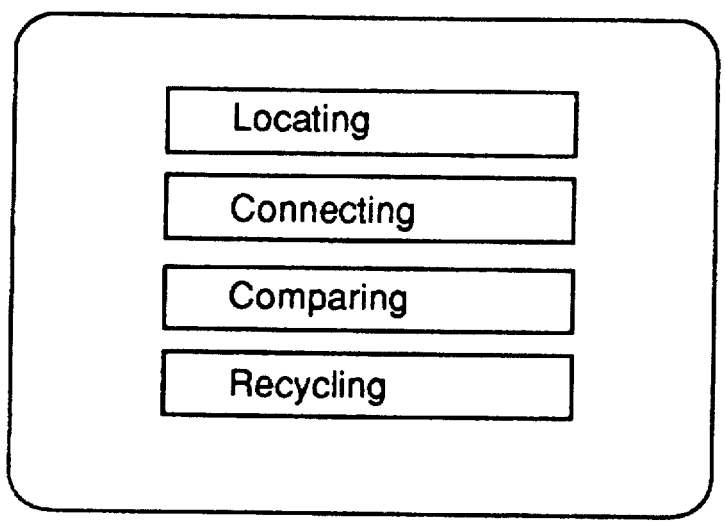

The second part of the combined list use lessons, "Using Combined Lists", introduces students to four strategies for finding information in combined lists: locating, connecting, comparing and recycling. Locating is the process of looking in a single list to find information. Connecting is probably the most common way of using combined lists and requires information to be linked across lists. In the comparing segment, students learn that questions have clue words that signal the need to compare information. Recycling involves using one of the other strategies in a repetitive process for questions that require multiple answers. The Lesson Segment Menu for the second part of the combined list use lessons is in FIG. 88.

In the first lesson segment in "Using Combined Lists", "Locating", students are taught about three situations. The first situation is when a condition in a question exactly matches a label on the list. This situation makes the task of finding the one list needed easiest because one knows immediately which list to look in. The second situation is when conditions and labels are synonymous. The third situation is when lists do not have labels. The segment also teaches students how the locating strategy applies to grouped and scattered combined lists.

The Lesson Segment. Students are first taught that, To answer some questions using a combined list, you only have to locate an item in one list. Sometimes you can just look at a document and locate the item you need right away. More often you have to use what you know about labels and lists to locate an item. Students are asked a series of questions based on the example in FIG. 89: Suppose this is one part of the register for your checking account. You are trying to balance your account and have the following question: Did I make a $20 deposit? Students click on YES or NO. SHOW ME: To answer this question, you have to match the condition $20 deposit. Students are told, Here are the two steps you might follow to answer this question: (1) Find the list labeled "Deposit". (2) Look through the list for a deposit of $20. Because one list has a label that matches what you are looking for, it is pretty easy to find the list you need to answer this question. Students are next asked, But what if no label exactly matches what you are looking for? Did I write a check for $115? Students click on YES or NO. SHOW ME: Here you have to look for a synonym, a label that means that same thing as "write a check for." Students click on MORE and the label "Payment" is identified as the synonym.

A second example is provided in FIG. 90. Based on this example, students are asked, Do the Phillies play the Montreal Expos? Students click on YES or NO. SHOW ME: If there are no labels, figuring out what each list is about helps you know where to look. Labels appear on the screen display for each list: Dates, Teams, Times.

The next section of this lesson segment provides icons for grouped and scattered combined lists that act as menu choices. Students are asked, What about grouped and scattered combined lists? How do you locate items in documents like these? When "grouped" is selected, students are asked a question based on the example in FIG. 64: What kind of milk do they have to drink? Students click on the document. SHOW ME: To answer this question you have to: (1) Find the right section of the menu—Milk is a kind of beverage so you have to look in the "Beverages" section. (2) Find the right list—You need to look at the kinds of beverages, not the prices. (3) Locate the item you need.

When "scattered" is selected, students are taught that, With scattered lists there are no labels or organized lists to help you. You just have to search through the items until you can locate the answer. Students are asked a question based on the example in FIG. 66: How many products cost $2.49? Students type in their answer. SHOW ME: To answer this question you must look through the ad and find all the $2.49 prices: count each $2.49 you find.

Summary. Locating is using a single list of information to answer a question.

Practice questions. The menu on the screen shows three boxes: combined lists in columns, grouped combined lists, and scattered combined lists. Students click on a box to choose practice questions in one of these areas.

Figure 91:
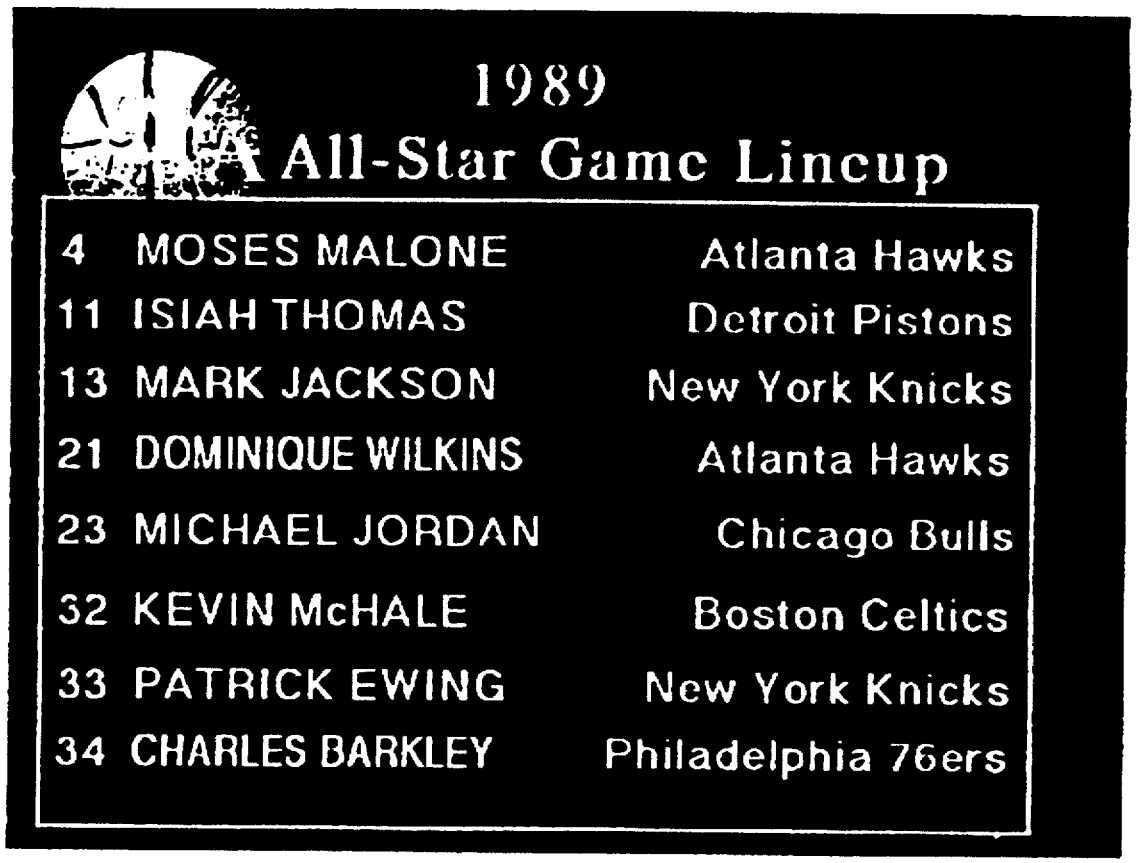

When "Columns" is selected, students are asked questions based on the example in FIG. 91: (1) Was Michael Jordan one of the players in this All Star game? Students click on YES or NO. SHOW STEPS: This combined list has no labels. Figuring out which list is made up of players can help you answer the question. (2) Did any player represent the Washington Bullets in the 1989 All Star Game? Students click on YES or NO. SHOW STEPS: To answer this question: Find the list of teams, since the Washington Bullets are a team. Look for the Washington Bullets.

Figure 92:
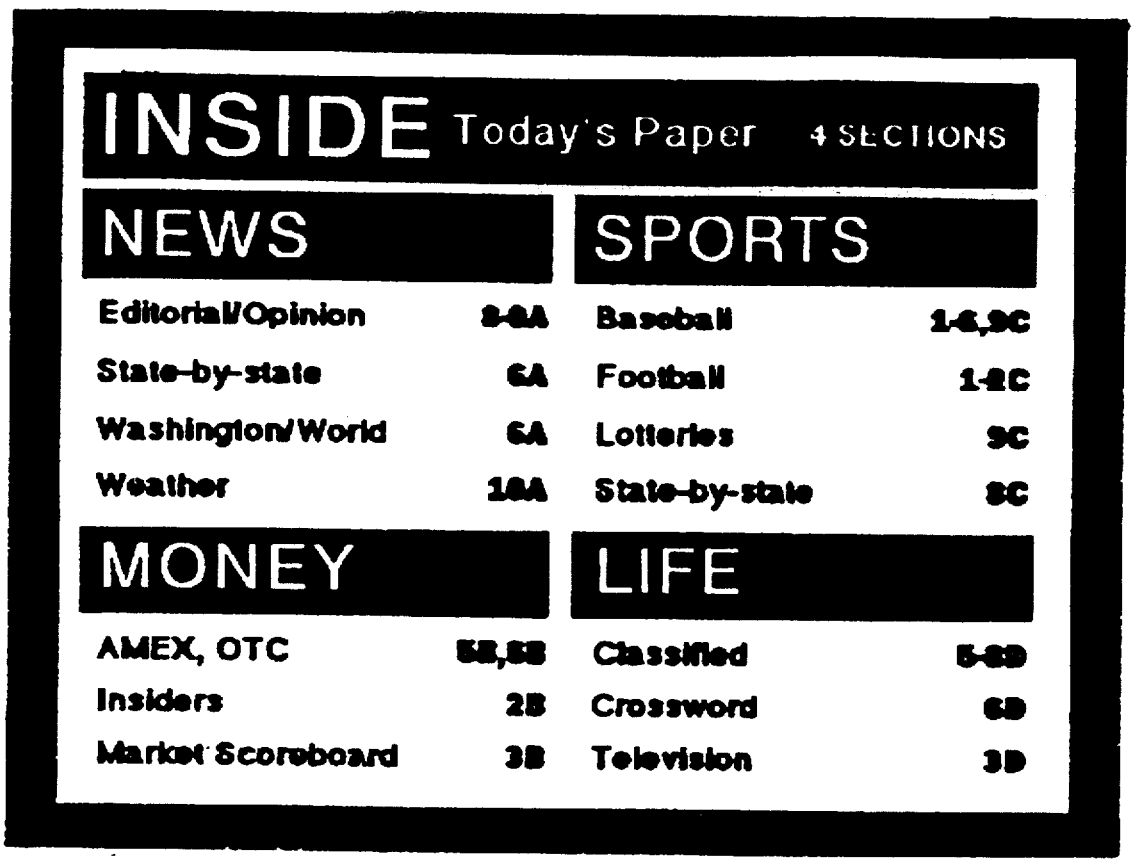

When "Grouped" is selected, students are asked questions based on the example in FIG. 92: (1) Are movies listed in the Life Section? Students click on YES or NO. SHOW STEPS: To answer this question you need to: Find the right section of the combined list. Find the correct list. Look for the item you need. (2) How many News Features are on page 6A? Students type in their answer. SHOW STEPS: For this question you have to: Find the correct section. Find the right list. Locate each page 6A and count it.

Figure 93:
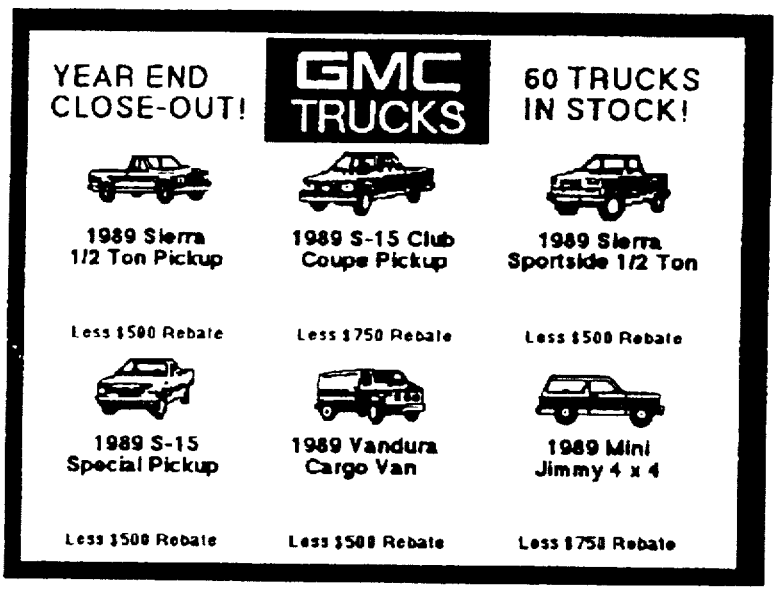

When "Scattered" is selected, students are asked questions based on the example in FIG. 93: (1) Is an S-15 Special Pickup advertised? Students click on YES or NO. SHOW STEPS: To answer this question you have to scan through the ad for the S-15 Special Pickup. Noticing that the model name for each truck is located under its picture can help you find the answer more quickly. (2) How many trucks have a $750 rebate? Students type in their answer. SHOW STEPS: Here you have to search through the items until you locate each $750 rebate. The rebates are listed at the bottom of the box of information about each truck.

In the second lesson segment for the second part of the combined list use lessons, "Connecting", students are taught that "connecting" is defined as linking information across lists. Students are taught that when a combined list has just two columns, connecting is easy. They are also taught that when there are more columns, especially when several lists have the same kind of information, it becomes harder to find the correct lists to connect.

Figure 95:
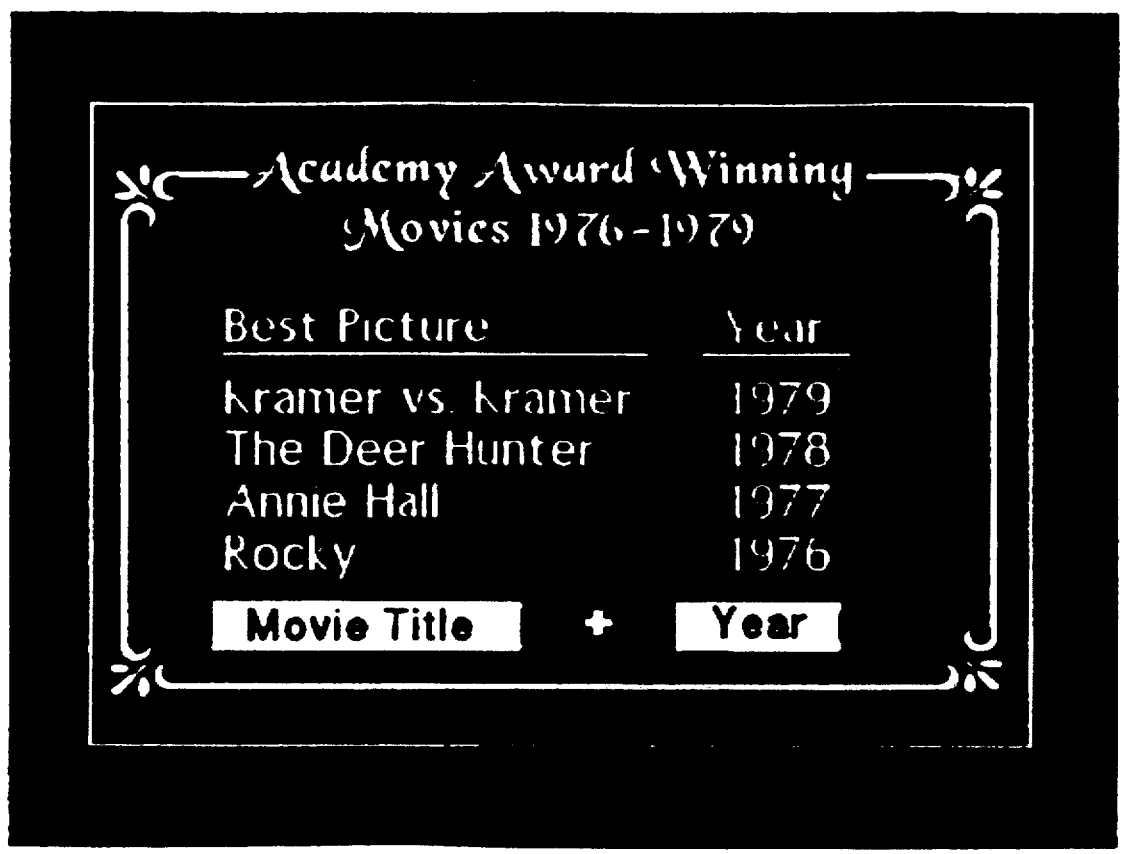

The Lesson Segment. Students are told that, When you use a simple list, you work with just one list of information. Students are asked, based on the example in FIG. 94, Is homemade lemonade one of the drinks listed? Students click on YES or NO. Students are next told that, Combined lists are made up of related lists of information. So when you use a combined list, you can connect information across lists. Students are then asked questions based on the example in FIG. 95: (1) In what year did "Rocky" win best picture? Students click on the document. SHOW ME: To answer this question, you need to: Locate Rocky in this list of best pictures. Connect across to find the year. (2) When the question changes you may connect in the opposite direction. Which movie won the Academy Award in 1978? Students click on the document. SHOW ME: To answer this question, you might follow these steps: Locate 1978 in the list years. Connect across to find the movie.

In the next section of this lesson segment, students are taught that, Connecting is easiest with combined lists that have just two columns. When a combined list has three or more columns, you have to figure out which lists to connect. Students are asked a series of questions based on the example in FIG. 96: (1) How old was Thomas Jefferson when he was elected? Students type in their answer. SHOW ME: To answer this question you need to: Find the list of presidents and locate Thomas Jefferson. Find the list of ages. Connect across lists. (2) It is harder to know which lists to connect when there are several lists that have the same kind of information. The document in FIG. 96 changes, and a second list of ages, "Died at age" is added. How old was John Adams when he died? Students type in their answer. SHOW ME: To answer this question you need to: Find the list of presidents and locate John Adams. Choose the correct list of ages by matching the condition "died". Connect across the lists.

Summary. Connecting is linking information across lists.

Practice Questions. Students are asked a series of questions based on the example in FIG. 97: (1) How many rainy days does Moscow average in March? Students type in their answer. SHOW STEPS is available to define the process for finding the answer. (2) Which city has an average low temperature of 51 degrees in March? Students click on the document. SHOW STEPS: Here you have to be careful to look through the list of low temperatures, not high temperatures.

In the third lesson segment, "Comparing", students are taught that comparing questions can be identified by clue words such as "more" or "less." There are examples of comparing questions for students to discuss. They are shown that, for some questions, they need only compare items in a single list. More frequently, they must connect across lists to answer a comparing question.

The Lesson Segment. Students are first told that, One common way to use combined lists is to compare items in the lists. There are clue words in questions that tell you to compare. The clue words "more," "less," "most," "least" and the endings -er and -est appear on the video monitor. Students can then select from three boxes on the screen: amounts, prices, and times. Clicking on a box displays a combined list and a comparing question to be discussed. NEXT QUESTION shows an additional comparing question for the document. NEXT EXAMPLE displays another combined list in the category selected. There are two documents for each category and two questions for each document.

Figure 98:
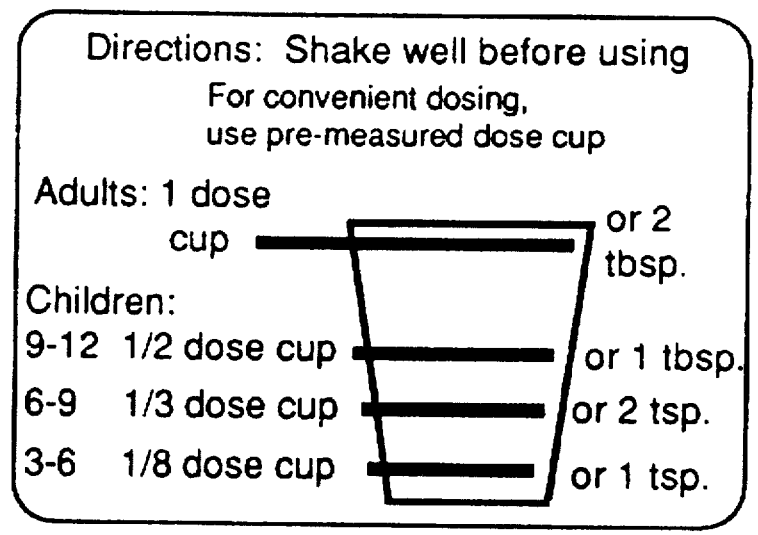

When "Amounts" is selected, students are asked a series of questions based on two examples. The first example is in FIG. 98: (1) What is the largest amount prescribed for children? (2) Is the amount for 10-year-olds larger than the amount for 6-year-olds? The second example is in FIG. 99: (1) Which food has the highest amount to total fat? (2) Which food has more cholesterol, ground beef or beef liver?

When "Prices" is selected, the first example is about which students are asked questions is in FIG. 100: (1) What is the least expensive item on the menu? (2) Which costs less, home fries or an English muffin? The second example is in FIG. 101: (1) What is the least expensive toll you could pay? (2) Which is higher, the toll for a bicycle or a moped?

Figure 103:

When "Times" is selected, the first example is in FIG. 102: (1) What time does the latest train to Suffern leave? (2) Which train leaves earlier, number 313 or 1113? The second example is in FIG. 103: (1) What is the earliest time the store opens? (2) Is the store open later on Thursdays or Fridays?

In the next section of this lesson segment, students are taught that, For some questions, you only have to compare the items in one list. Students are asked a series of questions based on the example in FIG. 104: (1) How much does the cheapest sandwich cost? Students click on the document. SHOW ME: Because sandwiches are the only type of food listed on this menu, you only have to look in the price list to answer this question. (2) More often you have to connect across lists to make a comparison. Which is cheaper, a roast beef sandwich or a cheeseburger? Students click on the document. SHOW ME: To answer this question you have to find each type of sandwich and its price.

Summary. When you compare items in a combined list, you can: (1) compare items within one list. (2) Connect across lists and compare.

Practice Questions. Students are asked a series of questions based on the example in FIG. 105: (1) What is the price of the most expensive food listed for the year 1970? Students click on the document. SHOW STEPS: To answer this question you only have to compare the items in one list. The process of finding the answer is then explained. (2) Which food was least expensive in 1980? Students click on the document. SHOW STEPS explains that students should compare in one list, then connect across lists. (3) Which was cheaper: a pound of butter in 1970 or a pound of margarine in 1980? Students click on the correct food. SHOW STEPS explains that students should locate each item, connect to its price and then compare the prices. (4) Compare the cost of a 1—pound can of coffee and 1 pound of sliced bacon in 1970 and 1980. SHOW STEPS: Some comparing questions are very open-ended. There are a few ways you might compare these two items. You could compare the 1970 prices for coffee and butter and then the 1980 prices. Which food was more or less expensive in 1970? What about 1980? You might also compare the cost of each food across the years. How much did the price of coffee increase from 1970 to 1980? Compare that with the increase for bacon.

In the fourth lesson segment, "Recycling", students are taught that recycling is simply using one strategy repeatedly to answer a question that requires multiple answers. Students are shown that if the question specifies the number of answers needed, this strategy is fairly simple. They are also shown that when questions are not specific, it is easy to make a mistake by not finding all the correct answers.

The Lesson Segment. Students are first told that, Sometimes when you use a combined list, you have a question that needs more than one answer. The question may tell you exactly how many answers you need. Students are then asked a series of questions based on the example in FIG. 106: (1) What are the three kinds of desks for sale? This question requires students to apply the strategy of "locating" they were taught in a prior lesson segment. They click on the document. SHOW ME: The question asks you to find this question you must: Look through the list of items for sale. Locate three kinds of desks. (2) More often you must decide when all the answers have been found. What pieces of office furniture are in excellent condition? This question requires students to apply the strategy of "connecting" they were taught in a prior lesson segment. They click on the document. SHOW ME: The plural word "pieces" is the clue that you need to find more than one answer. The steps for finding the answer are then explained. (3) What costs less than $60? This question requires students to apply the strategy "comparing" they were taught in a prior lesson segment. They click on the document. SHOW ME: Here the question does not tell you whether you are looking for just one answer or more than one answer. The process for finding the answer is then shown. How do you know when you have found all the possible answers? You have to check through the combined list carefully. Marking each answer that you find can help you check you work. An example showing the answers checked is shown.

Summary. When you need to find more than one answer to a question, you must recycle through a document.

Figure 107:
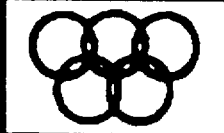

Practice questions. Students are asked two questions based on the example in FIG. 107, which require them to apply the strategy "locating" they were taught in a prior lesson segment: (1) In which three Olympics were 37 nations represented? Students click on the document. SHOW STEPS: This question tells you exactly how many answers you need to find. The steps are then shown. (2) When were the Olympics held in the United States? Students click on the document. SHOW STEPS: It would be easy to find one answer to this question and stop. There are no clues that you need to find more than one answer. The steps are then shown.

C. Intersecting Lists

The instruction on intersecting lists by the Computerized Literacy System relies on several principles. First, intersecting lists are usually made up of three simple lists. The three simple lists could be arranged as a combined list. However, because two of the simple lists contain information which is redundant with respect to the third list, a combined list is not the most efficient format by which to represent the information. For example, the two simple lists containing the channels and times in a TV schedule are redundant with respect to the list of programs because more than one program airs on each channel and at each time. To increase efficiency, and also to facilitate locating information, the three simple lists are arranged as an intersecting list.

A second point relied upon by the Computerized Literacy System is that in an intersecting list, the items in the two redundant simple lists usually serve as "micro" labels for the items in the third simple list. One of the "micro" label lists is placed horizontally across the top of the intersecting list and the other vertically down the side. The "micro" label lists are usually ordered by some principle, and this ordering determines the placement of the items in the intersecting list. The ordering scheme serves, of course, to increase efficiency in terms of locating information. The intersecting lists lesson menu is in FIG. 108.

(1) Structure Lessons

Figure 109:
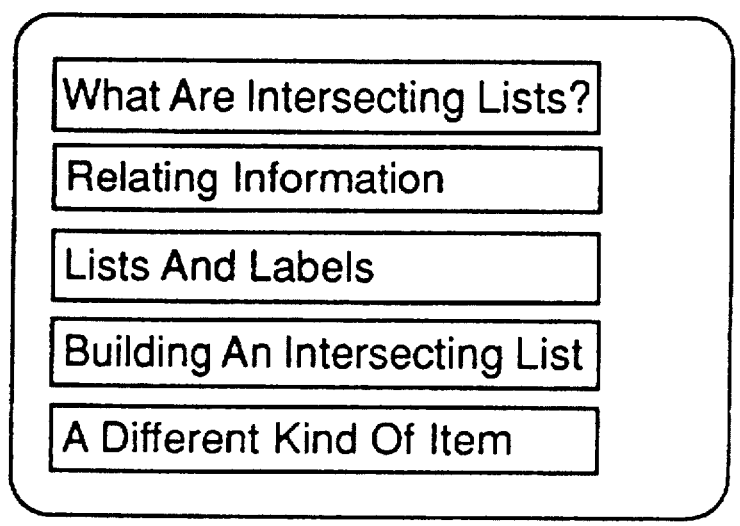

The Computerized Literacy System requires users to choose from among a limited number of intersecting lists structure lesson segments. The lesson segment menu is in FIG. 109.

In the introduction lesson segment, "What are Intersecting Lists," students are introduced to the two key features of intersecting lists: (1) intersecting lists are made up of three, and only three, different types of related information; and (2) the information in intersecting lists is always arranged in the same way. Column labels are on the top, row labels are on the left and items are located in the cells where the row and column labels intersect. An optional short motion video introduces the idea of intersecting information in documents.

Vocabulary. The following definitions are available during this lesson segment by clicking on the DEFINITION icon: (1) "Intersect"—row and column intersect at the cell where they meet; (2) "Column labels"—labels for the items in each column of an intersecting list; (3) "Row labels"—labels for the items in each row of an intersecting list.

The Lesson Segment. The segment uses a TV schedule as a familiar example of an intersecting list. See FIG. 110. Students are first told, This TV schedule has three parts. Each part has a different type of information. Students are asked to identify the type of information in each part of the TV schedule in FIG. 110. They type in their answers as each of the three parts of the schedule is highlighted in turn.

Students are next taught that, Intersecting lists are made up of exactly three groups of information. The groups of information can be related to form a sentence that describes what the document is about. Students are shown that the document sentence for the TV schedule in FIG. 110 is, *This intersecting list shows the times and channels that TV programs are on.* Using the same example, students are then taught that, In every intersecting list, information is arranged in the same way. Column labels are listed at the top. The column labels in the example highlight. Row labels are listed on the left. The row labels in the example highlight. Where the rows and columns intersect, there are items.

Summary. Intersecting lists have three groups of related information. Information in all intersecting lists is arranged in the same way.

Figure 111:

The Class Exercises. Students are presented with an intersecting list that has one group of missing information. They select from three choices the group of information that completes the intersecting list and drag their choice with the mouse from the left screen to the right screen. Incorrect choices buzz but stay on the right screen to allow discussion. They can then be dragged back and another choice selected. Three examples are shown in FIGS. 111, 112, and 113.

The second lesson segment for intersecting lists, "Relating Information" explores the relationship among column labels, row labels and items in intersecting lists.

The Lesson Segment. The segment begins by reminding students about how information is related in a combined list. The airline departure board in FIG. 41, used in the combined list structure lesson "More About Items", is displayed on the right screen. Students are first told that, In a combined list, information is related across rows. *This combined list shows the flight numbers, times, destinations, and schedule information for airline departures.* (Text is italicized in this disclosure, as explained above, to indicate it appears on a screen display.)

The intersecting list in FIG. 114 is used as the example for the remainder of this segment. Using this example, students are taught a series of points: (1) In an intersecting list, row labels, column labels, and items are all related. Students are shown that the document sentence that expresses the relationship among these three groups of information is: *This intersecting list shows the dates for several holidays in three different years.* (2) Each row label is linked with a column label at the item where they intersect. Any related row label, column label, and item can form a kind of sentence. A related row label, column label and item are highlighted on the document and the following sentence displays: *In 1996, Memorial Day will be on May 27.* (3) The parts of the sentence can be arranged in different ways. Two different arrangements are presented: *Memorial Day will be on May 27 in 1996. May 27, 1996 will be Memorial Day.* Students are thus taught the key here is that the sentence contains the three parts (the information in the row label, column label and item) and that the sequence in which those three parts are linked usually does not matter. (4) A sentence with a missing part is displayed on a screen. Students click on the appropriate related item, row label or column label to complete the sentence. The first sentence must be completed to continue. Two additional sentences are available by clicking NEXT QUESTION. The three sentences are: (1) *In 1977, Labor Day will be on_____.* (2) *Election Day in 1995 will be on _____.* (3) *In 1997, October 13th will be _____.*

Summary. Each item, row label, and column label can be related to form a kind of sentence.

The Class Exercise. Students practice relating information by completing an intersecting list made up of shapes and colors. Students are presented with an incomplete intersecting list. They must use the row and column labels to figure out what item belongs in each cell. See FIG. 115. The task is to drag the appropriate symbol into the correct cell. Incorrect selections remain in place until DONE is clicked. Then they "fly" back over and students can try again.

The third structure lesson segment, "Lists and Labels", focuses on all the lists that make up intersecting lists. Students are shown that the tow labels make up one list, the column labels make up a second list, and all the items form a third list.

The Lesson Segment. The segment begins with a review screen, in which students are told, All intersecting lists have items, row labels and column labels. The mini blind example in FIG. 116 is used for the remainder of the lesson segment.

The different lists in the example are identified and highlighted. The label for each list is also identified. Students are first told, Because the items are single groups of information, they make up a list. A label for the list of items can often be found in the title of an intersecting list. They are then told that, The row labels and column labels also form their own lists of information. If these lists have labels they can usually be found next to or above the lists. Finally, students are taught that, Each row and column of items also makes up its own list. Every list has a row or column label that tells what the items have in common.

Students are then presented with a series of two questions: (1) All the prices in this list are for mini blinds of what length? (2) All the prices in this list are for mini blinds of what width? Students click on the row or column labels that identify what each of these lists of prices has in common.

Summary. In any intersecting list: The items, row labels and column labels each form a list. Each row and column of items also forms a list.

Figure 117:
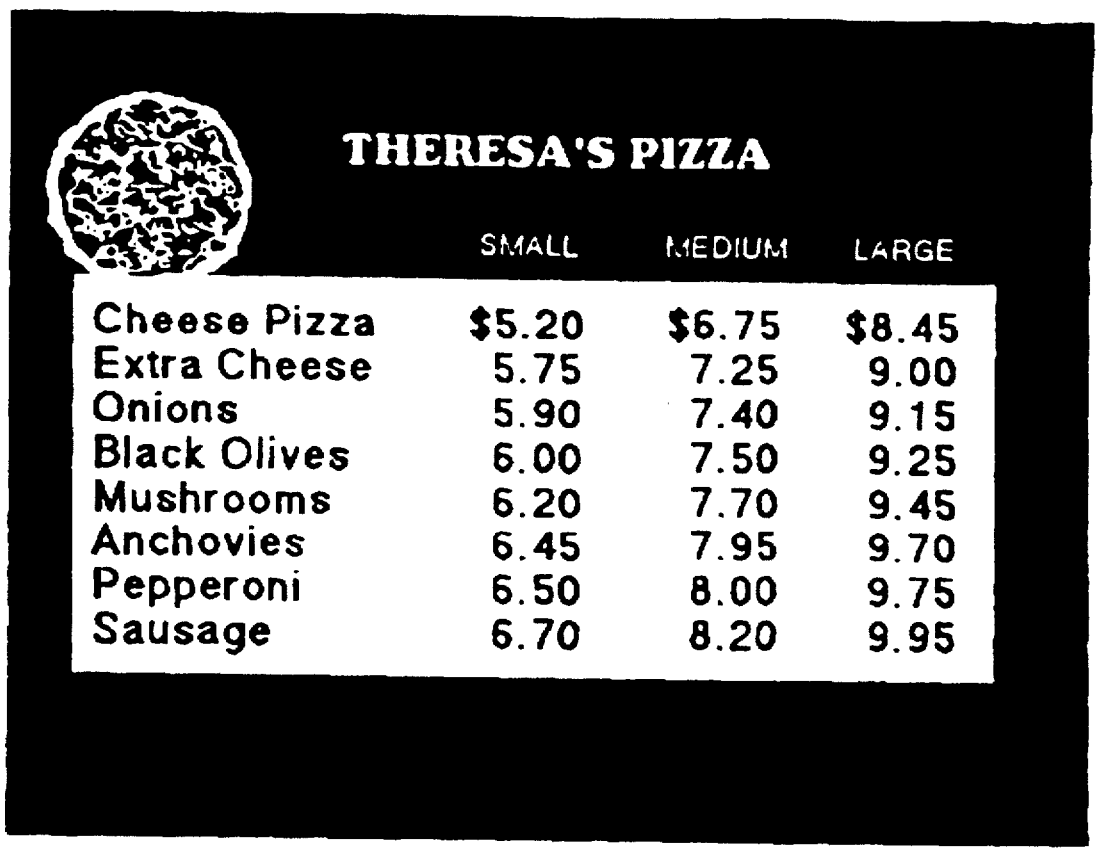

The Class Exercise. Students are asked to label several of the lists that make up the pizza menu in FIG. 117. The items, row labels and column labels are not labeled on this example as they were on the mini blind example in the lesson segment. As each of thee lists is highlighted, students are asked, What would you label this list? They type in their own labels. SHOW ME supplies the label and HINT tells students, This list does not have a label. To label it, figure out what the items have in common. When NEXT QUESTION is clicked, a column of items is highlighted on the document and the question is posed: All the prices in this list are for what size pizza? Students click on a column label to answer. Then a row of items is highlighted and students are asked to identify the label for that list.

The fourth structure lesson segment, "Building an Intersecting List", focuses on the efficiency of intersecting lists. Students are shown the same information presented as a combined list and as an intersecting list. Comparing the combined and intersecting lists illustrates the ways in which information is presented more efficiently in the latter.

The Lesson Segment. Students are first taught, based on the screen display in FIG. 118, that, This combined list about U.S. passenger car production has three lists of information. Each list highlights. Students answer one question using the combined list: Which car model had the highest production in 1977? After answering the question, they receive the following feedback: To answer the question using this combined list, you have to find the year 1987 in 3 places. They are shown that, This combined list is not easy to use because so much information is repeated: Each model is repeated 3 times. Each year is repeated 3 times.

The combined list in FIG. 118 is then reconfigured. Students are told that, This information could be arranged as an intersecting list. The number of cars produced becomes the items. (Text is italicized in this disclosure, as explained above, to indicate it appears on a screen display.) The numbers then "fly" over to the intersecting list in FIG. 119. The models and years become the row and column labels. The labels then "fly" over. Because information is not repeated, this intersecting list is easier to use. Next, students answer one question using the intersecting list. Which car model had the lowest production in 1977? After answering the question, they receive the following feedback: To answer the question using the intersecting list, you only have to locate the year once. Finally, students are taught that, As an intersecting list, both the row and column labels can be organized to make it easier to locate information. The years are organized from least to most recent. The car models are organized alphabetically.

Summary. An intersecting list presents information in a way that makes it easier to use.

The Class Exercise. In the exercise the process presented in the lesson is reversed. Now students start with an intersecting list and build a combined list that presents the same information. They are asked to drag items from one intersecting list to the proper spots on the combined list. In doing so they can see how often information must be repeated in the combined list format. The screen displays are in FIG. 120. Once the combined list is completed, students can see where information is repeated. Students can also compare the organization of the two documents.

The fifth structure lesson segment for intersecting lists, "A Different Kind of Item", focuses on intersecting lists that use symbols. These symbols represent binary kinds of information such as yes/no, available/not available, present/absent. Students are taught that a symbol in a cell is a positive indicator and an empty cell is a negative indicator. Students are also introduced to intersecting lists that have legends explaining what symbols mean.

Vocabulary. During this segment, the following definitions are available by clicking on the DEFINITION icon, as explained above: "Symbol"—something that stands for or represents something else. In intersecting lists, symbols are marks such as ✓'s and X's.; "Legend"—information outside the list that explains what a symbol means.; and "Cell"— where a row and column label intersect.

The Lesson Segment. Students are first taught that, Some intersecting lists have items that are symbols. Symbols you might see include: X○✓. Clicking on a symbol brings up an example of an intersecting list that uses that symbol. An example of an intersecting list that uses symbols is presented to illustrate what kind of information symbols represent. The screen display is in FIG. 121. Using this example, students are taught that, Intersecting lists with symbols present "yes or no" kinds of information. A cell that has a symbol means "Yes." (Yes, a DPT vaccine is needed for children at 4 months.) An empty cell means "No." (No, a polio vaccine is not needed for 6-month-old children.)

Students are then asked to answer a yes/no question using an intersecting list from a catalogue: Can you buy a shirt with a neck size of 15 and a 34-inch sleeve length? NEXT QUESTION—Can you buy a shirt with a sleeve length of 31 inches and a neck size of 16 inches?

An interesting list that uses the symbol "-" in some cells is presented. The screen display is in FIG. 122. Students are asked, What might the "-" in this cell mean? Two possible explanations are presented when SHOW ME is selected: the symbol could mean there were no successful space launches in that country in that year, or that data is unavailable. Students are then told, Intersecting lists with symbols sometimes have legends. The screen display is in FIG. 123. Students are taught, A legend adds information: An empty cell still means "no." (No, you can not catch pike in Cayogal Lake.). But a symbol tells you more than just "yes." (Yes, you can catch trout in Oneida Lake and the fishing is good.)

Another example of an intersecting list with a legend is displayed. See FIG. 124. Students are told, In this intersecting list, the color of a circle adds information about how a cereal is rated for each nutrient listed.

Summary. Some intersecting lists have symbols for items.

Figure 125:
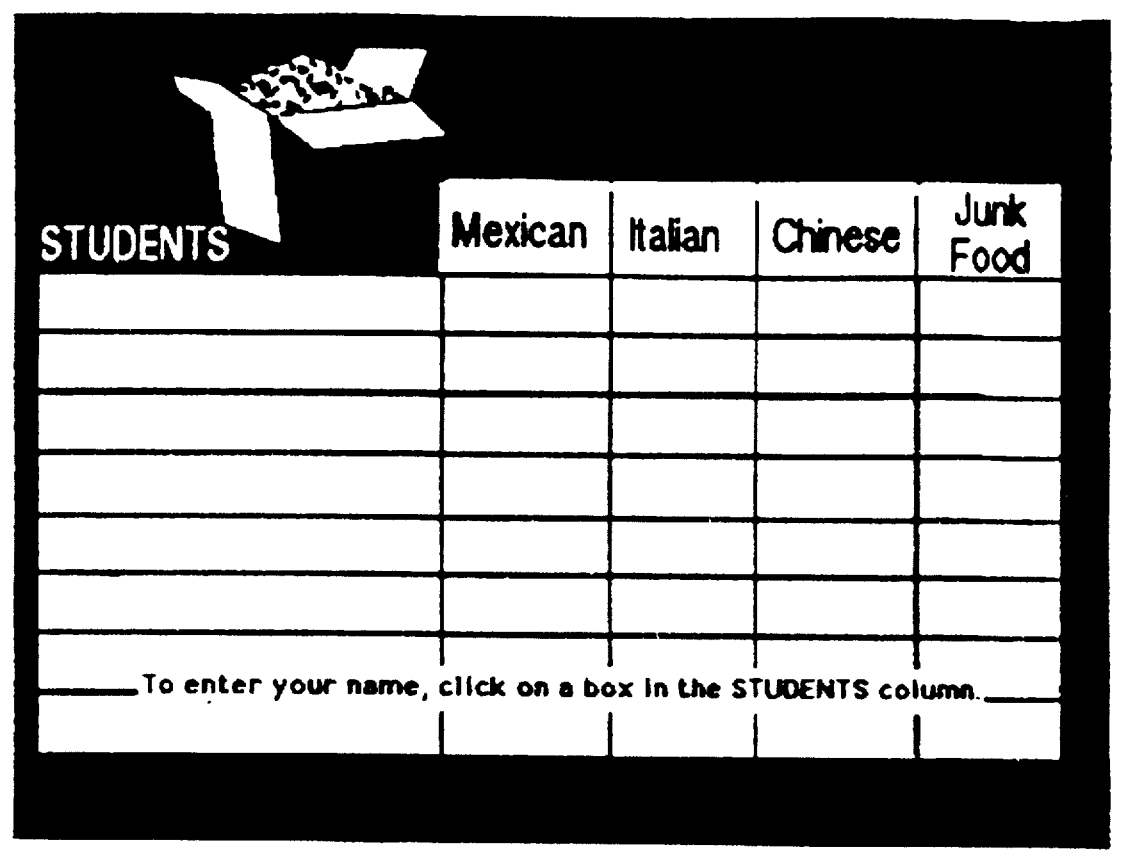

The Class Exercise. The class can create an intersecting list using symbols to indicate students' food preferences. Students type in their name and click in cells in the screen display in FIG. 125 to place ✓'s showing types of foods they like to eat.

(2) Use Lessons

The use lessons for intersecting lists consist of (1) "Using Intersecting Lists" (from the lesson menu, FIG. 108), a group of lessons on the strategies appropriate for accessing information in intersected lists, and (2) "Practice Questions", a lesson made up of practice questions that allow students to apply what they have learned about intersecting lists. In "Using Intersecting Lists", students learn how to get a general sense of a document before they begin looking for specific information. They also learn about connecting, locating, and comparing using intersecting lists. The recycling strategy is used with intersecting lists but there is no new instruction about that strategy since what students learned in the combined lists use lessons applies to this structure as well. Questions requiring recycling are included in the "Practice Questions" Lesson.

In one preferred embodiment of the present invention, practice questions are not included in the intersecting list use lesson segments. So, for example, in that embodiment, there are connecting questions for students to answer within the "Connecting" lesson segment, but no practice questions following that segment. The practice questions would instead appear in their own lesson. By not linking the practice questions with any particular strategy instruction, the inventors intend for students to begin to figure out which of the strategies they have learned applies to a particular question.

Figure 126:
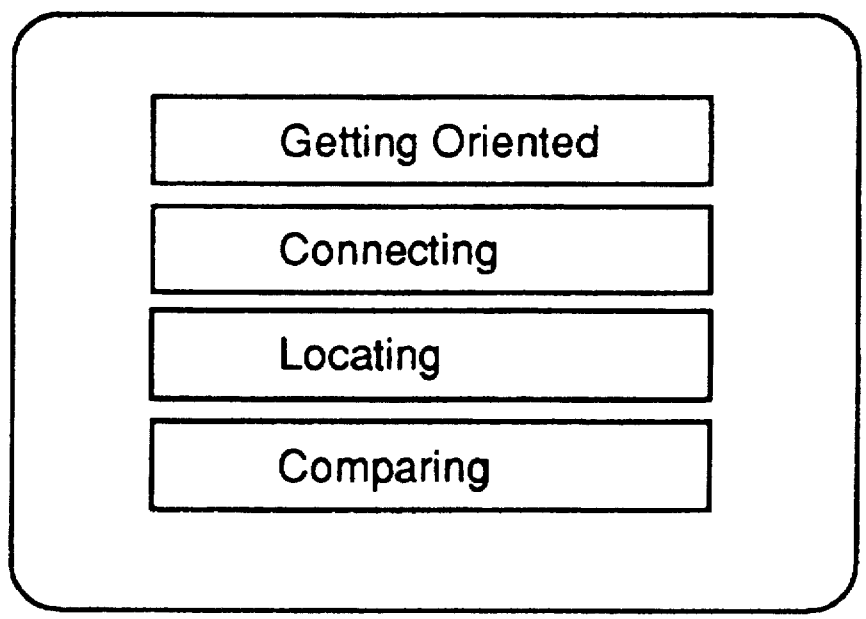

In accordance with the Knowledge Model Procedure of the present invention, described above, the Computerized Literacy System requires students to select from among a limited number of use lesson segments. The lesson segment menu is in FIG. 126.

In the first lesson segment for use lessons, "Getting Oriented", it is suggested that students orient themselves to a document before they try to find specific information in it. This is particularly helpful when using complex documents such as intersecting and nested lists. Three strategies for getting oriented are introduced.

Vocabulary. The following definition is available during this lesson segment by clicking the DEFINITION icon: "Outside knowledge"—what you know from your own experience; information you bring to a document that is beyond the information provided.

The Lesson Segment. In the first part of the segment, it is suggested that students use all the available information in an intersecting list to figure out what it is about. This includes reading the title, the labels, an explanatory text and footnotes. Students are told, It is helpful to get a general idea of what an intersecting list is about before you look for specific information. The title may help you see how information in an intersecting list is related. A screen display, FIG. 127, shows how this title explains and labels the items, row labels and column labels: This title explains the 3 kinds of information in this intersecting list. It labels the list of items. "Percentage of Female Workers" and the items highlight in the screen display of FIG. 127. It tells you there is a list of some occupations in which women work. "Selected Occupations" and the list of occupations highlight. It explains what years these percentages cover. "1975, 1985, and 1989" highlight in the title and on the list.

In the next part of this lesson segment, students are shown that although the above example had a clear, complete title, there are in reality many intersecting lists with more abbreviated, and therefore, less helpful titles. Students are shown the screen display in FIG. 128 and told, In this intersecting list, the title "Wind-Chill Factor" is not very helpful. Here you can use other information such as the labels, an explanation of what the chart means, and footnotes. Each part highlights in turn. Next it is suggested that students try generating a document sentence if the document does not have explicit explanations of what it is all about. They are taught, Because titles are often incomplete, you may have to figure out for yourself what an intersecting list means. They are shown the screen display in FIG. 129, and asked, How would you explain what this intersecting list is about? Relating the 3 kinds of information to form a document sentence can help you explain what an intersecting list is about. The three kinds of information are identified for students—car models, years, and number of cars produced. One possible document sentence is available by clicking on SHOW ME.

In the final part of this use lesson segment, an example is shown that lacks any helpful explanatory information and requires specialized outside knowledge to interpret. For students without this specialized knowledge, this document is most difficult to understand. Students are shown the screen display in FIG. 130, and asked, How would you explain what this intersecting list is about? To explain this intersecting list, you need outside knowledge. If you do not know about embroidery, this list is very difficult to figure out. When SHOW ME is clicked, an explanation of the document displays: This chart lists: (1) The colors needed to embroider a set of baby bibs. (2) 3 different brands of embroidery thread. (3) The code numbers used by each brand for the colors listed. So if you were buying DMC embroidery floss, you would use the first column of numbers to identify the colors you needed to complete the baby bibs.

The second lesson segment for the intersecting lists use lessons, "Connecting", introduces students to three kinds of connecting. Students are taught that the most common way of connecting information in an intersecting list is finding intersections. They are also taught that a second way involves finding a label, connecting to a related item and then connecting again to the other label that defines that item. In this lesson that process is called connecting twice. Finally, they are taught the third way is connecting an item with a single label.

The Lesson Segment. The segment goes through the three kinds of connecting one at a time. For each section there are questions with feedback that explains the connecting process. Conditions in the question and the question words that need to be satisfied by the answer are identified.

The first kind of connecting is finding intersections. Students are taught, A common way of connecting information in intersecting lists is to find an intersection. When the DEFINITION icon is clicked, "Find a intersection" is defined as: finding the item where a particular row and column intersect. Students are shown the screen display in FIG. 131, and are asked, What is the price of an extra firm queen-size set? Students type in their answer. SHOW ME: To find the intersection you can: (1) Locate "extra firm" in the list of mattress types. (2) Locate "queen" in the list of mattress sizes. (3) Find the price where the row and column intersect.

The second kind of connecting is connecting twice. Students are told, Sometimes you have to connect twice to find an answer. This happens when you must find a row or column label for an answer. They are then shown the screen display in FIG. 131, and asked, What size ultra firm mattress costs $300? They click on the document to indicate their response. SHOW ME: To find the answer to this question: (1) Locate "ultra firm." (2) Connect across to find "$300." (3) Connect again up to the list of sizes to find the answer. They are then asked, What type of queen-size mattress is most expensive?

Figure 132:
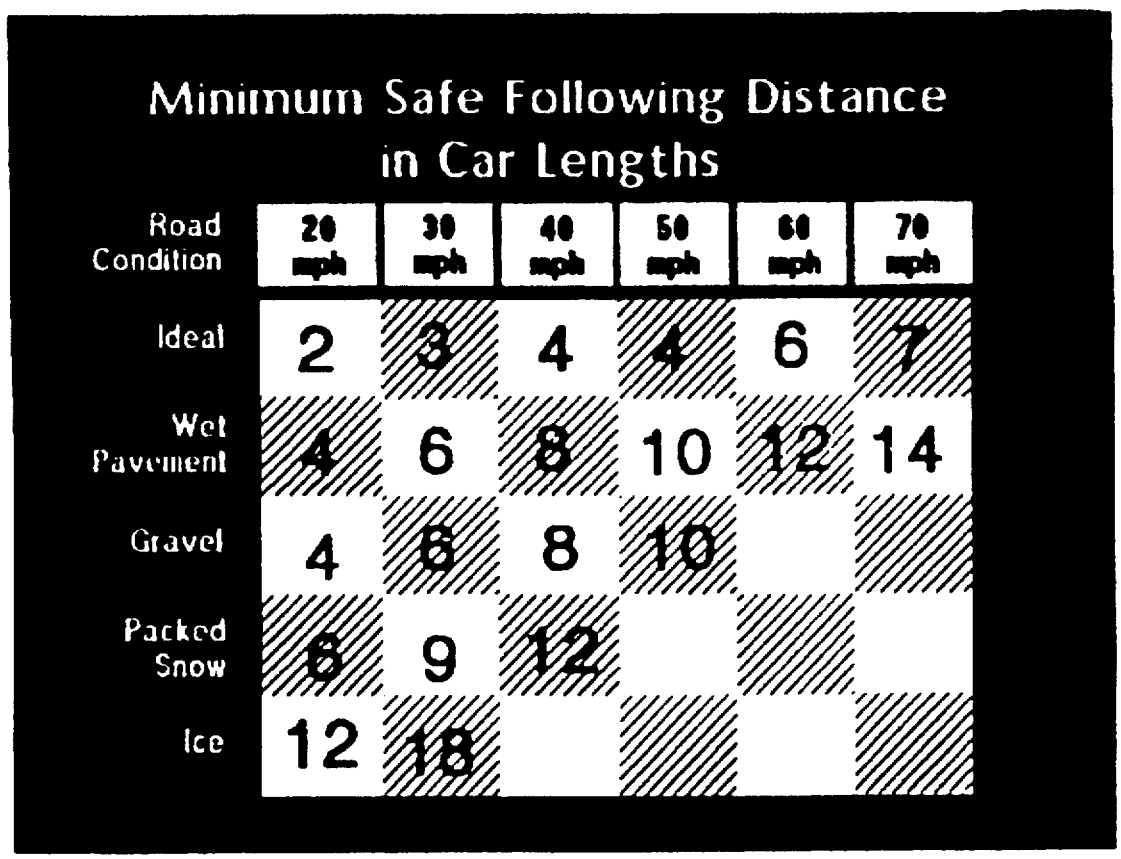

The third kind of connecting is connecting items and labels. Students are taught. Sometimes you only need to connect an item with a single row or column label. They are then shown the screen display in FIG. 132, and asked, Under what road conditions is it safe to follow another car at a distance of 3 car lengths? Students are taught to find the item and connect to the label. They are shown that this can be difficult because they must search through the unorganized list of items. They are then asked, What is the closest distance you should follow another car on wet pavement? They are shown that they must locate a label and connect to an item.

Summary. There are 3 ways to connect using an intersecting list: (1) Find an intersection. (2) Connect twice. (3) Connect an item and one label.

In the third use lesson segment for intersecting lists, "Locating", students are taught that the locating strategy is defined as finding information within a single list in a document. In an intersecting list, locating typically occurs in the list of column labels, row labels or items. In this lesson, a locating question is presented for each list. Students are taught that locating is most difficult in the list of items because that list is usually not organized in any systematic way.

The Lesson Segment. Students are first told, Sometimes when you use an intersecting list, you only have to locate information in a single list. They are then presented with a screen display that shows three kinds of lists and acts as a menu: column labels, row labels, and items. A question is available for each list. The process for locating the answer follows each question. All the questions are based on the screen display in FIG. 133.

When "column labels" is selected by clicking on it with the mouse, students are asked, Does this TV schedule list shows on at 10:00? They click on YES or No. SHOW ME: To answer this question: Look trough the list of times. Check to see if "10:00" is a time listed.

When "row labels" is selected, students are asked, Is channel 6 listed on this schedule? They click on YES or NO. Students are taught that many locating questions are yes/no kinds of questions like this that require confirming the presence or absence of a particular piece of information.

When "items" is selected, students are asked, Is SCTV on tonight's schedule? They click on YES or NO. When they click on SHOW ME, students are taught that this is the most difficult list to use because it is not organized in any way that makes it easy to search for a particular item.

In the fourth use lesson segment, "Comparing", two kinds of comparing are introduced. The first kind, making specific comparisons, is most like the type of comparing students practiced in the combined list use lessons. Here the task is to compare two or more specific pieces of information. The second kind, making a general comparison, involves comparing information to look for similarities and differences. Students are taught that often making a general comparison involves drawing a conclusion based on those similarities and differences.

The Lesson Segment. Students are taught, Sometimes when you use an intersecting list, you need to compare information. You might want to compare information in the row and column labels. Students are then asked a question based on the screen display in FIG. 134: What is the tallest height listed? They click on the document to answer. Clicking on SHOW ME brings up a screen display that identifies the clue word that signals comparing (tallest) and explains the process of finding the answer: Look through the list of heights. Find the tallest one listed.

In the next section of this lesson segment, students are told. Most often you compare amounts in the list of items. They are then asked a series of questions based on the screen display in FIG. 135: (1) Which oil has the lowest percent of polyunsaturated fat? They click on the document to answer. SHOW ME: To find the answer: Locate "polyunsaturated" in the list of fats. Compare the percents listed and find the lowest one. Connect across to find the oil. (2) Which type of oil has a higher percentage of saturated fat: palm oil or olive oil? They click on palm oil or olive oil. Clicking on SHOW STEPS explains the process of finding the answer. (3) Sometimes you might want to make a more general comparison of information in an intersecting list. Compare the amounts of fat in peanut and coconut oil. Clicking on SHOW ME brings up screen displays that guide students through the process of making a general comparison like this: To make this comparison, you can compare the amount of each type of fat peanut and olive oil have. (4) How do the amounts of saturated fat compare? What about the other 2 types of fat? What conclusion can you draw from this general comparison? Which oil is healthier?

Summary. When you use an intersecting list to compare information, you make: (1) Specific comparisons among items, row labels and column labels. (2) General comparisons to see similarities and differences.

The practice questions for intersecting lists provide the opportunity for students to review and apply the strategies taught in the intersecting list use lessons. The lesson consists of three sets of questions each using a different screen display showing an example of an intersecting list. Each set has three questions. The questions follow the same format: the question is presented, students answer the question, go on to the next question, or click on SHOW STEPS.

As explained elsewhere in this disclosure, clicking on SHOW STEPS brings up screen displays that explain the process involved in answering the question. Each step is explained with illustrative highlighting displayed on the screen display. The conditions and clue words in the question are also identified following the underlining (conditions) and boxing (clue words) convention used in the simple and combined lists lessons. Sometimes additional information is presented (e.g., identifying synonyms, or plurals in question that signal the recycling strategy.)

Figure 136:
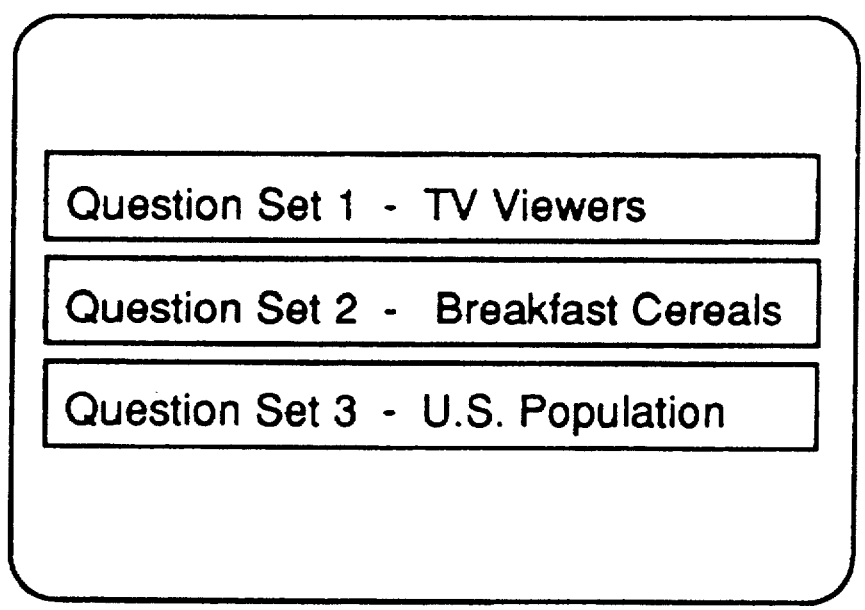

Before clicking SHOW STEPS the instructor has the opportunity to discuss with students the process they followed to find the answer. If "Practice Questions" is selected from the intersecting list lesson menu in FIG. 108, the lesson menu screen in FIG. 136 is displayed.

Question Set 1. In the first set of practice questions, students are shown the screen display in FIG. 312, and are asked the following series of questions: (1) What percent of teenage viewers watch baseball? SHOW STEPS: Locate "teens" in the list of viewers and "baseball" in the list of sports. Then find the percent where the row and column intersect. (2) Which sport do 55% of the male viewers watch? SHOW STEPS: Synonymous information must be used, "male"="men". Locate 55% in the list of men. Connect across to the list of sports to find the answer. (3) Which sports do more women watch than men? SHOW STEPS: The plural in the question, sports, signals recycling. To answer this question you have to compare the number of women and men viewers for each sport and find those that have more women viewers.

Question Set 2. Students are shown the screen display in FIG. 124, and are asked a series of questions: (1) Is oatmeal one of the cereals listed? SHOW STEPS: To answer this question you have to see if "oatmeal" is located in the list of cereals. (2) Which cereals are rated as "very good" because they are low in sugar? SHOW STEPS: The plural in the question, cereals, signals recycling. To find the answers you must first look in the legend to see which symbol means "very good." Then you can look through the "low sugar" list to locate the "very good" symbols. For each "very good" in the list,connect across to the name of the cereal. (3) Compare the nutrients in Rice Krispies and Wheaties. Try to draw a general conclusion based on this comparison. Which cereal seems more nutritious? Why? HINT: To make this comparison, you could look at the nutrients for each cereal. Which cereal is rated higher in fiber? In protein? How do the sugar and fat ratings compare? You might also try and make some general conclusion. Which cereal seems more nutritious? Why? SHOW ME: In general, Wheaties is more nutritious than Rice Krispies.

Question Set 3. Students are shown the screen display in FIG. 313, and are asked a series of questions: (1) How would you explain what this intersecting list is about? HINT: The 3 parts that the document sentence should contain are population figures, state names, and years. SHOW ME: One possible document sentence is: This intersecting list shows the population figures for eight states from 1860–1980. (2) How many of the states listed had populations over 10 million in 1940? SHOW STEPS: Find the list of population figures for 1940. Then count each figure that meets the condition "over 10 million". (3) which of the states listed had populations over 10 million in 1980? SHOW STEPS: Locate each figure over 10 million in the 1980 list. Then connect across to find the state names.

d. Nested Lists

In teaching about nested lists, the Computerized Literacy System relies on several basic principles. To help explain these principles, nested lists can be compared to intersecting lists. Although an intersecting list is an efficient way to store information, it is limited to only three simple lists. There are many instances where one would like to extend what is represented beyond three simple lists. For instance, in an intersecting list showing the percentage of people who watch a list of TV programs broken down by age of viewer, we might want to further analyze the percentage of viewers by gender. In such a case, we could create two intersecting lists, one for male viewers and one for female. To reduce redundancy, though, we could "nest" the items comprising the age of viewer list under the gender list. In this regard, "nesting" refers to creating a hierarchy of "predicate" information.

Several features of nested lists are apparent from this example. First, a nested list is a type of matrix document in which row and/or column information has been hierarchically ordered. This ordering occurs by adding different lists of predicate information to existing predicate information. This process assumes that the predicate information must not only modify the noun information but also have some expected relationship with the other predicate information. For example, gender and age both modify the noun "viewer," but they are also related in that they both can serve as predicates to a list of people, as opposed to a list of TV programs. Second, nested lists more commonly are built upon intersecting lists than combined lists or prose. Finally, an easy way to determine whether a list has been nested is to determine whether the list of items is repeated. In the prior example, age has been nested by gender, so the "micro" label list created from the list of viewer age is repeated under each item in the list of gender. In sum, then, a nested list is an important but complex way for reducing the redundant information in four or more combined simple lists and maximizing the amount of information presented in a given space.

(1) Structure Lessons

The first structure lesson segment for nested lists, "What Are Nested Lists?", provides students the opportunity to look, on an introductory level, at what makes up this document structure. Students learn that all nested lists have information that is repeated across several sections.

The Lesson Segment. Students are first told, Nested lists are documents that have repeated information. They are shown the example in the screen display in FIG. 137. The repeated information in the screen display is highlighted by clicking on the HIGHLIGHT icon. Students view additional examples of nested lists by clicking on NEXT EXAMPLE. Students are then shown the screen display in FIG. 138, and taught, This nested list shows: (1) The average height and weight for boys at different ages. (2) The average height and weight for girls at different ages. Because heights and weights are repeated, you can compare that information for boys and girls. Students are then asked a series of questions that require them to compare information: (1) Who weighs more at age 1? Students must select among the following choices: Boys, Girls, or They are the same. (2) Who is taller at age 7? (3) Who is shorter at age 5?

Summary. Nested lists have repeated information that allows you to make comparisons.

Class Exercise. In this exercise, students are asked to identify the repeated information in three nested lists. SHOW ME highlights the repeated information in each document. In each case, students are asked: What is the repeated information in this nested list? The three screen displays are in FIG. 139.

The second structure lesson segment "Making a Nested List" is a unique segment in one preferred embodiment of the present invention because it presents an interactive simulation. In the interaction, an advertising manager asks students to determine which of three TV shows is watched by the target audience for his product. Using motion video clips on the video disk, students are able to "poll" groups of fictional television viewers. Starting with a group of 1,000 television viewers, students find out about the viewing habits of viewers with different characteristics (different ages, males and females, viewers in different regions of the country.) They gather the data and see first an intersecting list and then a nested list get constructed. They use the nested list to identify the target audience.

The Lesson Segment. Students are first told, One way to understand a nested list is to see how one gets built. A video is then played on the video monitor in which the advertising manager is introduced and the initial problem is presented. The advertising manager tells the students, "We're introducing a new line of athletic shoes and are considering three television programs on which to run our commercials. We need your help. Can you get information about the viewing audience for each type of program? You may choose to find out about the age of the viewers, their gender, or the region of the country in which they live. Select your choice." The screen display in FIG. 140 is then shown on the computer screen, and students make their selection by clicking on an area with the mouse.

After the students select a characteristic, the faces of representative viewers appear in boxes on the video monitor. Clicking on a box causes the viewer to speak, telling how many people watch each of the three shows. As the viewer speaks, the numbers appear on the computer screen and form an intersecting list. When students select "Age" from the screen display in FIG. 140, the screens in FIG. 141 are displayed. When students select "Gender", the screens in FIG. 142 are displayed. When students select "Region", the screens in FIG. 143 are displayed.

Figure 140:
Figure 141:
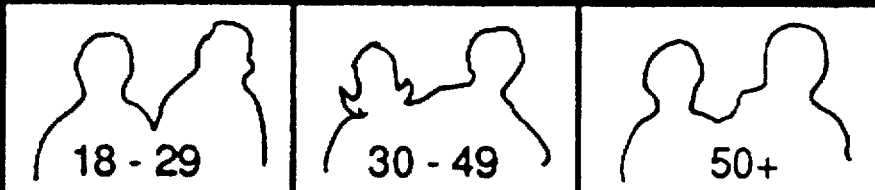

Once students have made their initial selection from the choices in FIG. 140, and gathered the information, the video returns to the advertising manager with added information. Students are then asked to select a second characteristic. Once they do so, a second set of viewers can be polled. Because students are now looking at two characteristics of viewers (e.g., women in their thirties) the data they collect is presented as a nested list.

The program takes three possible paths, depending on which characteristic is selected first. If the first choice was "Age", the advertising manager in the video says: "Well, that's good information. Our latest figures show that this new product is expected to sell best among people under thirty who live in the east. Can you get me information on that group?" If students incorrectly select "Gender" next, a screen is displayed that nests gender under age and the advertising manager explains, "This information won't tell us about people under 30 who live in the east." When students correctly select "Region", they are shown six boxes to click on and the nested list in FIG. 144 gets built as they "interview" each viewer.

If the first choice was "Gender", the advertising manager says: "Well, that's good information. Our latest figures show that this new product is expected to sell best among women in their thirties. Can you get me information on that group?" If students incorrectly select "Region" next, a screen is displayed that nests region under gender and the advertising manager explains, "This information won't tell us about women who are in their thirties." When students correctly select "Age", they are shown six boxes to click on and the nested list in FIG. 145 gets built as they "interview" each viewer.

If the first choice was "Region", the advertising manager says: "Well, that's good information. Our latest figures show that this new product is expected to sell best among men who live in the west. Can you get me information on that group?" If students incorrectly select "Age" next, a screen displays that nests age under region and the advertising manager explains, "This information won't tell us about men who live in the west." When students correctly select "Gender", they are shown four boxes to click on and the nested list in FIG. 146 gets built as they "interview" each viewer.

Once students have gathered their data in any given program path, the advertising manager in the video returns and asks them which of the three programs listed in the screen display would best reach the target audience. Students click on the program name to answer.

When the interaction is over, students are told, Nesting allows you to add more information to a document. The intersecting list built as a result of the students' initial choice of "Age", "Gender" or "Region" returns to the computer screen. Students are taught that to find the target audience, two things had to happen: A second characteristic had to be added and the numbers had to be divided up again. The intersecting list stays on the computer screen and students are shown the nested list get built in steps. When the second characteristic is added, that information is nested under the first characteristic. The nested list shown depends on the path taken by the students (e.g., the region labels display and are nested under each age group, the age groups are nested under gender, or gender is nested under regions.) As a result of adding this second characteristic, the number of viewers has to be divided up differently. First the 1,000 viewers were divided by a single characteristic (age, gender or region) and now students are shown those numbers divided up again (by region, age groups or gender) as the items in the nested list.

In the final part of this lesson segment, students are taught that, The nested list you built gave you more information about the TV viewers. You were able to compare not just (one of the following displays based on the path taken through the interaction): (1) viewers in different age groups, but viewers of different ages who live in different regions of the country. (2) male and female viewers, but male and female viewers of different ages. (3) eastern and western viewers, but eastern and western viewers of different genders.

Summary. Nested lists allow you to show added information and make more specific comparisons.

The Class Exercise. The exercise shows students that sometimes in the process of adding more specific information and breaking down numbers more precisely, the conclusions drawn from data can change. Students are presented with a series of screen displays and are asked questions based on them. The first display is in FIG. 147. Students are asked to complete the following sentence: Comedy Tonight is more popular among viewers who are:, and are given the following choices: 18–29, 30–49, and 50+. Using the information in the intersecting list, students click on an age group. They are then told, When information about region of the country is added, the conclusion you draw about who watches Comedy Tonight changes. Students are presented with a second example by clicking on NEXT QUESTION. They are shown the screen display in FIG. 148, and are asked to complete the following sentence: The 6:00 News is most popular among viewers from the, and are given the following choices: East and West. Using the information in the intersecting list, students click on a region. The final example is in FIG. 149. Based on that screen display, students are asked to complete the following sentence: The 6:00 News is most popular among women viewers from the, and are given the following choices: East and West. Using the information in the nested list, students click on a region. They are then taught, When information about gender is added, the conclusion you draw about who watches the 6:00 News changes.

The third structure lesson segment, "Parts of Nested Lists", focuses on the sections that make up nested lists. Students learn that sections consist of section labels, column labels, row labels and items.

Vocabulary. The following definition is displayed by clicking on the DEFINITION icon: "Section labels"— headings on nested lists which define the content of each section.

The Lesson Segment. Students are first taught that, Nested lists can look very complicated, but just like other documents they are made up of item and labels. What's new about nested lists is that information is grouped into sections. (Text is italicized in this disclosure, as explained above, to indicate it appears on a screen display.) A series of points are then made based on the screen display in FIG. 137. The two sections in the screen display highlight. Next, the parts of each section are identified and explained. The following points are made: (1) Students are told, Each section has its own section labels. The section labels tell you what each section is about. The section labels highlight in the screen display and the sections are identified: One is about thin crust pizza, the other is about thick crust pizza. (2) Each section has column labels, row labels and items. The same column labels are repeated in each section. The column labels in the screen display then highlight, and students are told, Both thin and thick crust pizza come in 12" and 16" sizes. (3) Each section shares the same row labels. The row labels highlight and students are told, The prices in each row are for pizzas with the same kind of sauce. (4) Each section has items. The items highlight, and students are told, These are all prices for different kinds and sizes of pizza. (5) Like other documents, the parts of a nested list are all related. All the parts can be put together into a document sentence. Students are then asked, What would be a document sentence for this nested list? Clicking on SHOW ME displays one possible document sentence: This nested list shows the prices for two sizes of pizza with different types of crust and toppings.

Summary. Nested lists have 2 or more sections. Each section is made up of related items, column labels and row labels.

The Class Exercise. In this exercise, students practice relating the parts of a nested list by completing sentences. Part of a nested list is highlighted and students are asked to find the row label, column label, or section label that identifies what the items in that list have in common. Students drag the label they have selected to the blank in a sentence that describes how the items are related. The three examples are based on the screen display in FIG. 150: Complete this sentence: (1) These are all weights for _____ year old men. The column of weights for men ages 20–24 is highlighted in the screen display. (2) These are all weights for people who are _____ tall. The row of weights for people 5'4" tall is highlighted. These are all weights for _____. The section in the screen display for women is highlighted.

The fourth structure lesson segment for nested lists, "More About Sections", focuses on how information is arranged within the sections of a nested list. Students are taught that because an individual section can function like a combined or intersecting list, what they have learned about the structure and use of those document types applies to nested lists as well. The segment also shows students that the way information is grouped into section affects the ease with which a nested list can be used.

The Lesson Segment. Students are first taught that, In all nested lists, items are the same type of information. In some nested lists, the items in each section are the same type of information. They are then shown the screen display in FIG. 151, and asked, What type of information are these items? Students type in a label, or category, for the items in the first section. The question is then posed again for the items in the second section. They are then told, In these nested lists, each section is like an intersecting list. The light-blocking section in the screen display is pulled out from the nested list so that students can be shown how it is like an intersecting list.

By clicking the REVIEW INTERSECTING LISTS icon, students can review the principles of intersecting lists that apply to an individual section of this kind of nested list: (1) Each section has 3 groups of information. (2) The items, row labels, and column labels can be related to form document sentences. A sample document sentence displays: This section shows the prices for Fringed and Unfringed Light blocking window shades at various widths. (3) In each section: The items, row labels and column labels each form a list. Each row and column of items also forms a list.

In the next section of this lesson segment, students are taught that, In other nested lists, the items in a section may be several different types of information. They are shown the screen display in FIG. 152. The types of information in this example are identified, and students are told, Here the items are names of players, teams' names and number of home runs. In this kind of nested list, each section is like a combined list. The American League section is pulled out from the nested list in the screen display to be discussed.

By clicking the REVIEW COMBINED LISTS icon, students can review the principles of combined lists as they apply to an individual section of this kind of nested list: (1) Each section is made up of related simple lists. (2) Items are related both within and across lists. "New York" is highlighted in the screen display, and students are asked, How is it related to Detroit, Cleveland, and Washington? What is a sentence expressing the row relationship of 1960, Mickey Mantle, New York and 41? (3) Labels help explain what's in each section. (4) One list can define the organization of the other lists. The year list is highlighted in the screen display, and students are asked, How is it organized?

In the next section of this lesson segment, students are taught, The way the sections of a nested list are organized can make it easier or harder to compare information. The screen display in FIG. 153 is shown, and students are told, In this nested list, the sections are organized by race. Each section has information about males and females of the same race. Students are asked, based on the example, Which group is expected to have a larger population in the year 2000—Black Males or Black Females? After students answer the question, they are taught that this question matches the organization of this nested list, making it easy to find the needed information. The question asks you to compare males and females of the same race. Because of the way the nested list is organized, you only have to look in one section to find the answer. Students are then asked a second question: Which group is expected to have a smaller population in the year 2010—Black Males or Hispanic Males?, and they are then told, The question asks you to compare males of different races. Finding this information is harder because you need to compare across sections. This question would be easier to answer if the nested list were organized differently. Students can then discuss alternate organizational schemes for this list before going on in the lesson segment.

By clicking on MORE, the list is reorganized, and the screen display changes to that in FIG. 154. Students are taught, Now the sections are organized by gender. All the information about males is grouped together and you can look in one section to compare males of different races.

Summary. The sections in a nested list can be combined or intersecting lists. The organization of the sections can make it easier or harder to compare information.

The Class Exercise. Students practice identifying the kinds of information represented by items in a nested list and thinking about alternate organizations for a nested list. They are shown the screen display in FIG. 155. The "men" section highlights in the display, and students are asked, This section has what type(s) of information? Students can identify whether the items in the section are a single type of information or different types. They are then shown the screen display in FIG. 156, and asked, How else could the sections of this nested list be organized? The "Walnut Finish" section highlights in the display, and students are asked, This section has what type(s) of information? How else could sections of this nested list be organized?

The fifth structure lesson segment, "Recognizing Nested Lists", show students two ways in which nested lists can be configured. As a way of reinforcing just what a nested list is, the segment also provides examples of documents that might be mistaken for nested lists and explains what necessary characteristics they are missing.

The Lesson Segment. Students are first taught, In nested lists, information can be presented in 2 different ways. Usually the section labels are found at the top. The sections are presented in columns. The same types of information are repeated in each section. The screen display in FIG. 157 is shown as an example. By clicking on NEXT EXAMPLE, students bring up another example of a nested list with section label at the top, concerning the characteristics of the voting-age population.

Figure 158:
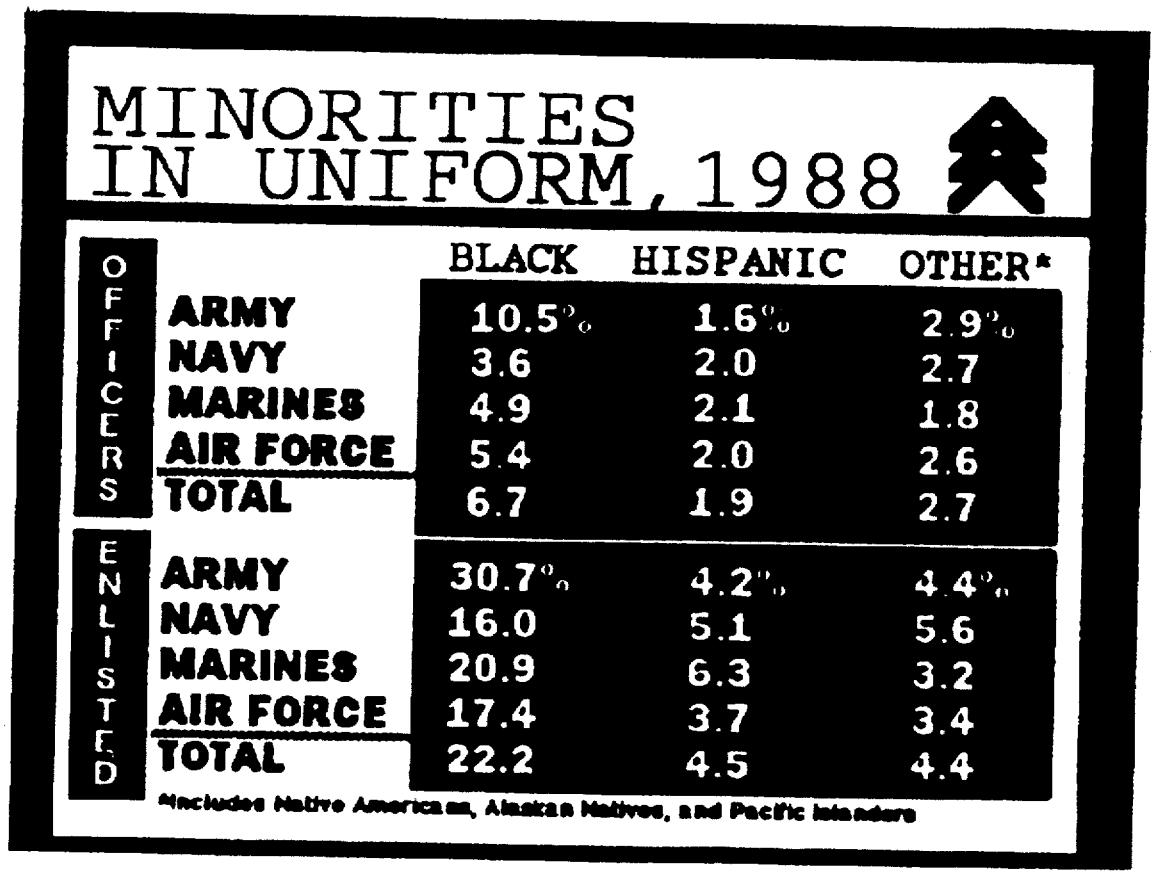

Students are next taught, Sometimes the section labels are found on the side of a nested list. The sections are presented in rows. The same types of information are repeated in each section. The screen display in FIG. 158 serves as an example. By clicking on NEXT EXAMPLE, students bring up another example of a nested list with section label on the side, concerning newspaper subscription rates.

Using the screen display in FIG. 159 as an example, students are then taught, Some documents look like nested lists but they're not. This document has sections, but there is no repeated information. The countries are merely grouped by continent and "other." Another example of this type of document is shown in the screen display in FIG. 160. Students are told, This document looks like it has repeated information, but it's really just a long combined list that has been arranged differently. By clicking on MORE, students are shown how the document is reconfigured into a single-column combined list.

Summary. The sections of nested lists can be presented in columns or rows. Some documents look like nested lists but aren't.

Figure 161:
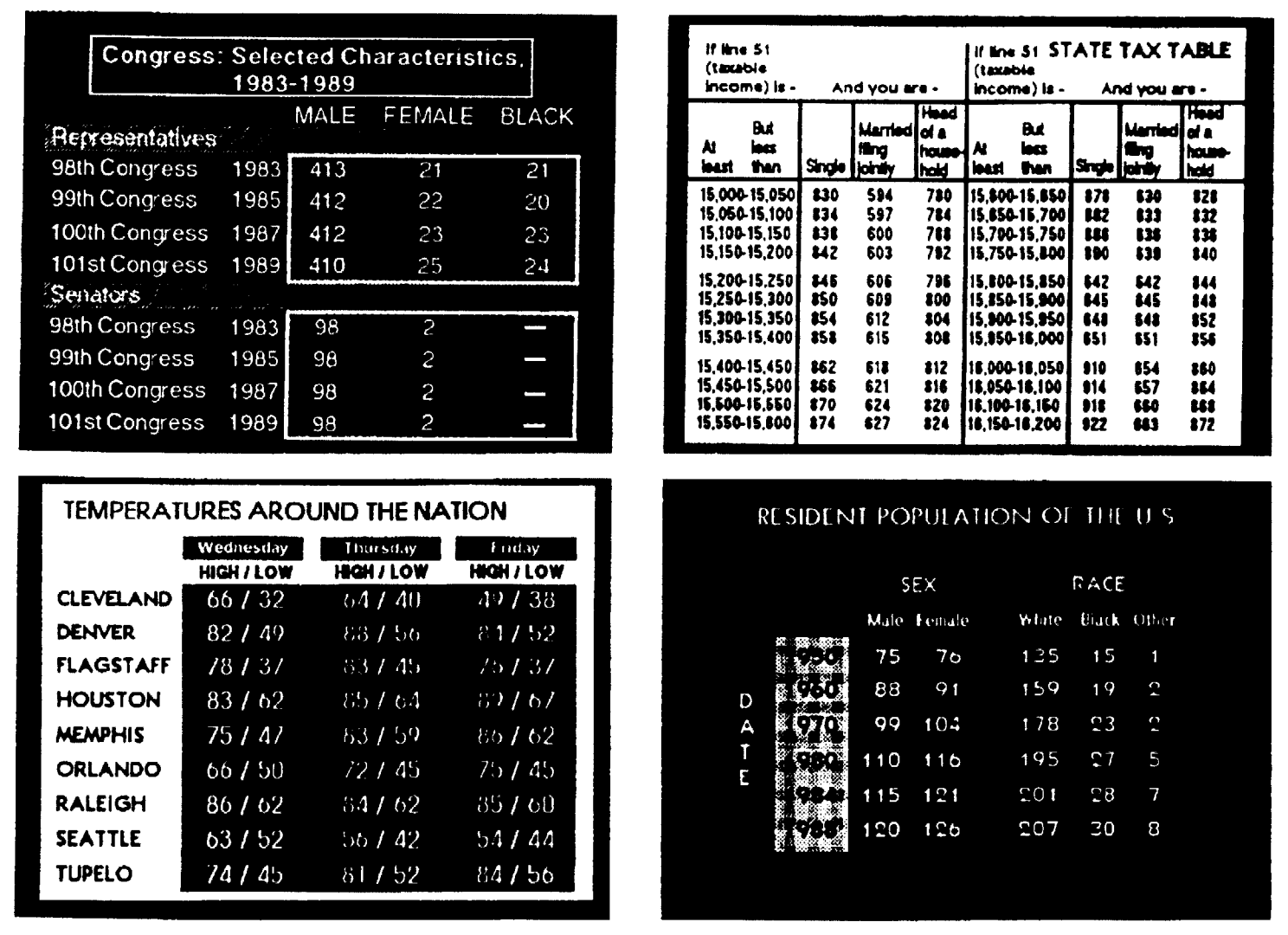

The Class Exercise. Four screen displays are presented sequentially and students are asked to decide whether each is a nested list. They indicate their decision by clicking on YES or NO. The four displays are in FIG. 161. For each, students are asked, Is this a nested list? By clicking on SHOW ME, students are given the following responses for each example: (1) Yes, this is a nested list with the sections arranged in rows. (2) No, this is a combined list that has been divided up. Notice that the "section labels" are exactly the same and thus there are no differentiated sections. (3) Yes, this is a nested list with the sections arranged in columns. (4) No, this is not a nested list. Hint-look at the "column labels." There are sections, but no repeated information.

(2) Use Lessons

Figure 162:
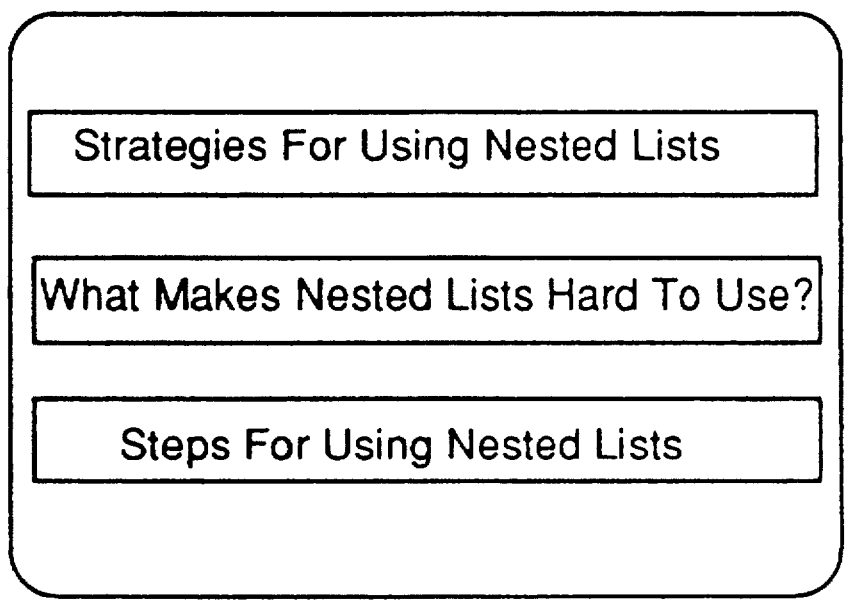

Two lessons make up the use instruction for nested lists: "Using Nested Lists" and "Practice Questions". In accordance with the Knowledge Model Procedure, described above, the Computerized Literacy System requires students to choose from a among a limited number of use lesson segments. The lesson segment menu is in FIG. 162.

In the first use lesson segment, "Strategies for Using Nested Lists", students are taught that the strategies they were taught for using other document structures also apply to nested lists. Four strategies for using nested lists are presented. Comparing is the first strategy listed on the menu because it is the most common way of using nested lists.

The Lesson Segment. After being told that, Nested lists can be used in the same ways other documents are used, students are shown a screen display that acts as the menu for this lesson: Strategies for using nested lists include: Comparing, Locating, Connecting, Recycling.

When "Comparing" is selected, students are first taught that: Most nested lists are designed to emphasize comparisons. When you compare information in a nested list you often need to look at two or more sections of the document. You may compare specific information. The screen display in FIG. 138 is displayed, and students are asked, On average, who is taller at age 5: Boys or Girls? They click on "Boys" or "Girls". MORE—To find this answer you have to: (1) Look in the sections for boys and girls and find the heights at age 5. (2) Compare the heights to see which is taller. (3) Connect up to the section label. Next, students are told, Sometimes you might make more general comparisons, and they are asked to Compare the average growth pattern for boys and girls from ages 1–9. By clicking on HINT, students are shown the similarities and differences to look for in the nested list. SHOW ME displays one conclusion that could be drawn from this comparison: From ages 1–9 boys and girls tend to be the same height but boys tend to weigh more.

When "Locating" is selected, students are first taught, Even when you use a document as complicated as a nested list, you may only need to locate information in a single list. They are then asked a series of questions based on the screen display in FIG. 163. Each of these questions has a SHOW STEPS option which shows the process for finding the answer. The questions are: (1) Are rates for people over the age of 55 listed? Students click on YES or NO. SHOW STEPS: Find the list of ages covered by the insurance plans. Look through the list of a plan for people over the age of 55. (2) Is a plan for single-parent families listed? This question asks students to locate using synonymous information. They click on YES or NO. SHOW STEPS: Find the list of plans. Look through the list for single, or one-parent, families.

Figure 164:

When "Connecting" is selected, students are first told that, Connecting in a nested list is like connecting in an intersecting list. You can: Find an intersection; Connect a label and an item; and Connect twice. They are then asked a series of questions based on the screen display in FIG. 164: (1) Did the video "How Will I Know?" win an MTV video music award in 1989? This question asks students to connect a label and an item. They click on YES or NO. SHOW STEPS: Locate "1989" in the list of years. Connect across, looking for "How Will I know?" (2) Which artist won the Best Female video award in 1987? This question asks students to find an intersection. They click on the document to indicate their response. SHOW STEPS: One way to find the answer here is to: Find the correct section of the nested list. Find the correct list of artists. Locate "1987" in the list of years. Find the name where the row and column intersect. (3) What award did Suzanne Vega win in 1988? This question asks students to connect twice. They click on the document to indicate their response. SHOW STEPS: Find "1988" in the list of years. Connect across to find Suzanne Vega. Connect again up to the section label to find the answer.

When "Recycling" is selected, students are first told that, Recycling with a nested list works like recycling with any other type of document. They are then shown the screen display in FIG. 164 again, and asked, What 3 artists won video music awards in 1990? This question asks students to apply the strategies of connecting (finding an intersection) and recycling. They click on the document to indicate their response. SHOW ME: This question tells you exactly how many answers you need to find. They are then shown the screen display in FIG. 138 again, and the "3" is underlined. They are asked, At what ages do girls typically weigh less than boys? This question asks students to apply the strategies of comparing and recycling. They click on the document to indicate their answer. SHOW ME: This question does not tell you how many answers you have to find. The plural word "ages" is the clue that there is more than one answer.

Summary. Making specific or general comparisons is a common way of using nested lists. You can also locate, connect and recycle to find information in a nested list.

In the second use lesson segment, "What Makes Nested Lists Hard to Use", students are taught about two factors that can make it difficult for anyone to use nested lists. First, because the questions that accompany nested lists often have several conditions, it is easy to miss a condition when looking for an answer. Second, because nested lists have repeated information, it is easy to look in the wrong section and inadvertently select a distractor for an answer. Students are made aware that these two aspects of using nested lists can easily lead to mistakes if they're not careful.

Vocabulary. The following two definitions are shown during this lesson segment when students click on the DEFINITION icon: "Conditions"—A condition is the information you must look for in a document in order to find an answer. "Distractors"—Answers that come close to being right, but aren't completely correct.

The Lesson Segment. Students are first taught, When you use a nested list, you often must answer questions with lots of conditions. They are then shown the screen display in FIG. 165 and asked, What percent of the voting-age population ages 18–24 voted in the 1988 election? They click on the document to indicate their answer. SHOW ME: This question has 3 conditions to meet which makes it hard to find the correct answer. The conditions are underlined in the question.

Next, students are taught that, Nested lists are also hard to use because they are full of distractors that meet some, but not all, of the conditions in a question. A question is presented, based on the same screen display, FIG. 165, that has been answered incorrectly: What percent of Southerners of voting age registered to vote in the 1988 election? The answer suggested is: 66.9. By clicking on SHOW ME, students are taught that the answer meets two of the conditions in the question but it fails to meet the third. It is not true for the 1988 election. They are told, Because there are lists labeled "Percent registered" for both 1984 and 1988, it is easy to look under the wrong year. Looking for an answer in the wrong section of a nested list is an easy mistake to make. This is because of the repeated information in each section.

In the final section of this lesson segment, the importance of checking answers when using complicated documents like nested lists is stressed. Students are told, When you use a nested list, you should always check an answer to be sure it meets each condition in a question. Check each condition one at a time. Based on the same screen display, they are told to Check the answer to this question: What percent of Hispanic voting-age population voted in the 1984 election? The answer suggested is: 28.2. A series of yes/no questions is then presented to guide students through checking the answer, and they click on YES or NO: Is the answer true for: (1) Hispanics of voting age? (2) the percent who voted? (3) the 1984 election? SHOW ME: The answer is incorrect because it is not true for Hispanic voters in 1984.

Summary. Nested lists can be hard to use because they often use questions with lots of conditions, and have lots of distractors.

The third lesson segment, "Steps for Using Nested Lists", presents three steps that can help students use nested lists successfully. Students are taught to first look over the document to get oriented and figure out what it is about. They are taught to next pare down what they're looking at and focus in on the list(s) containing the information they need. Finally, they are taught to check their answer to be sure it meets all the specified conditions and to be sure they haven't selected a distractor by mistake. Students are again told that because nested lists are complicated, anyone can make a mistake when trying to locate specific information in them.

The Lesson Segment. The opening display screen functions as a menu for the lesson: When you use a nested list, you need to: (1) Get oriented. (2) Focus in on the information you need. (3) Check your answer. Students select one of these three choices by clicking on the screen display with the mouse.

When "Get Oriented" is selected, students are first told: It is helpful to begin by looking at all the parts of a nested list. The title is often a good place to start. They are then shown the screen display in FIG. 166, and are taught the following series of points (text is italicized in this disclosure, as explained above, to indicate it appears on a screen display): (1) This title tells you that: The items are all temperatures. The temperatures are for places located around the nation. (2) The labels give you more information. These section labels tell you that the temperatures listed are for 3 days. The repeated column labels tell you that both high and low temperatures are listed for each day. (3) You should also look at how the information is organized. How are the cities organized? SHOW ME: alphabetically. How are the days organized? SHOW ME: in order from the middle to end of the week. Once you have looked at all the parts of the nested list, figure out how all these parts are related. (4) Try to put all the information together into a document sentence. What is one document sentence for this nested list? SHOW ME: There are several document sentences you might make. Here's one: This nested list shows the high and low temperatures over 3 days for several U.S. Cities.

When "Focus in" is selected, students are first taught that, Using a nested list often involves focusing in on a few lists that have the specific information you need. They are then asked a question based on the screen display in FIG. 166: Let's say you want to know this: What was the low temperature in Houston on Friday? A series of steps is presented for paring down the nested list to just the information needed to answer this question. Highlighting on the document helps show the parts that can be ignored for the purposes of this question. The steps are: (1) Start by looking at the sections. Which section do you need to look in? Students click on the section to indicate their response. (2) Which list in that section do you need to use? Students click on the list. (3) Finally, look through the row labels. Which row has the information you need to use? Students click on the row label. To find the answer, find where this row and column intersect. By clicking on the ANOTHER PATH icon, students are presented with an alternate way of finding the answer. It shows the same steps in a different order, starting with finding the row label.

When "Check Your Answer" is selected, students are first told, It is easy to make a mistake when using a nested list, so be sure to check your answer. Based on the screen display in FIG. 166, students are asked, Which city had a high temperature of 85 on Friday? They click on the document to indicate their answer. By clicking on MORE, they are presented with steps: To check your answer, ask yourself: (1) Is the answer a city? (2) Did it have a temperature of 85 degrees? (3) Was that a high temperature? (4) Was that temperature on Friday?

Summary. Any time you use a nested list be sure to follow these 3 steps: (1) Get Oriented. (2) Focus in. (3) Check your answer.

The "Practice Questions" part of the use lessons provides students the opportunity to review and apply the strategies taught in "Using Nested Lists". The lesson consists of two sets of questions, each using a different nested list. The first set has two questions, and the second set has three. The questions follow the same format: the question is presented, students answer the question, and students go on to the next question or select SHOW STEPS. Just as in the practice questions for intersecting lists, the SHOW STEPS option is available to explain the process involved in answering a question.

Question Set 1. In the first set of practice questions, students are shown the screen display in FIG. 314, and are asked the following series of questions: (1) What town could you call on a weekday at a cost of $0.23 for the first minute? Students click on the document to indicate their response. SHOW STEPS: Find the correct section. Find the correct list in that section. Locate 0.23 is that list. Connect across to the correct town, Eagle. Each item highlights on the display when mentioned. (2) To which town could you place a one-minute evening call for $0.19? They are given a possible answer, Trevor, and are asked whether this answer is correct. They are then told, If it is not correct, identify the correct answer and the condition in the question that was not met by the answer given.

Question Set 2. In the second set of practice questions, students are shown the screen display in FIG. 315, and are asked the following series of questions: (1) How many evening papers were there in 1980? Students click on the document to indicate their response. SHOW STEPS: Find the list of 1980 figures. Find the evening section. Look in the number of papers list in that section. Find the number where the row and column intersect. (2) In what year did morning newspapers first outnumber evening papers in daily circulation? Students type in their answer. SHOW STEPS: To answer this comparing question, you have to find the first year that there were more morning papers in circulation than evening papers. Looking at the circulation figures for morning and evening papers, you could: Compare the number of papers in circulation in 1955. Continue down the lists until you find the first year there were more morning papers in circulation. (3) Compare the circulation figures for morning, evening and Sunday papers since 1975. HINT: Your answer might include information about: which type of paper had the largest or smallest circulation figures for each year. Which papers increased or decreased in circulation since 1975.

2. Graphic Documents

Graphic documents are a common way to represent information. In accordance with the Knowledge Model Procedure of the present invention, students are taught how graphic documents are special cases of other document structures including combined, intersecting and nested lists. The three types of graphic document—pie chart, bar graph and line graph—not only look different but also function differently. Therefore, in accordance with the present invention, the Computerized Literacy System treats the essentials about each type separately. On the other hand, the system of the present invention treats all three types together with respect to certain common topics, including what graphic documents are, titles and subtitles, other information outside the graph, and comparing the three graphic document types.

a. Structure Lessons

The structure lessons introduce students to the differences in function at the same time that they teach students about the different structural components of each kind of graph. The graphic documents structure lessons contain three segments on pie charts, three on bar graphs, and four on line graphs. In the pie chart lesson segments, students are taught about wedges, portions, part-to-the-whole relationships and percents. In the bar graph segments, they are taught about bars, axes, scales, and multiple bars. In the line graph lessons, they are taught about lines, points, trends, axes, and multiple lines. In segments pertaining to all three graph types, they are taught about titles and subtitles, legends, other information outside the graph, and which graph is best for displaying which kind of information.

The structure lessons articulate both the differences between graphs and the matrix documents and the similarities between them. On the one hand, graphs are treated as individual structures with their own characteristics and functions; on the other hand, graphs are closely related to lists. There are lesson segments about lists and the three graph types ("A Pie Chart Has Two Lists", "Bar Graphs and Lists", and "Line Graphs and Lists"). These segments are important for showing students how graphs fit into the scheme of document structures, and they are also important for showing that the information in graphs is organized, that it can be restructured into a matrix document, or from a matrix document into a graph.

In accordance with the Knowledge Model Procedure, described above, the Computerized Literacy System requires users to select from among a limited number of structure lesson segments. The first lesson segment introduces students to the basic concept of graphic documents. Additional lesson segments teach students about each kind of graphic document. Three other lesson segments are shown after the lesson segments for each kind of graphic document which teach students more advanced concepts about graphic documents. The lesson segment menu for the graphic documents structure lessons is in FIG. 167.

In the first structure lesson segment for all the graphic documents, "What are Charts and Graphs", students are introduced to the concept that charts and graphs are pictures of amounts. They are shown that amounts can be easier to compare in graphs than in lists.

Figure 168:
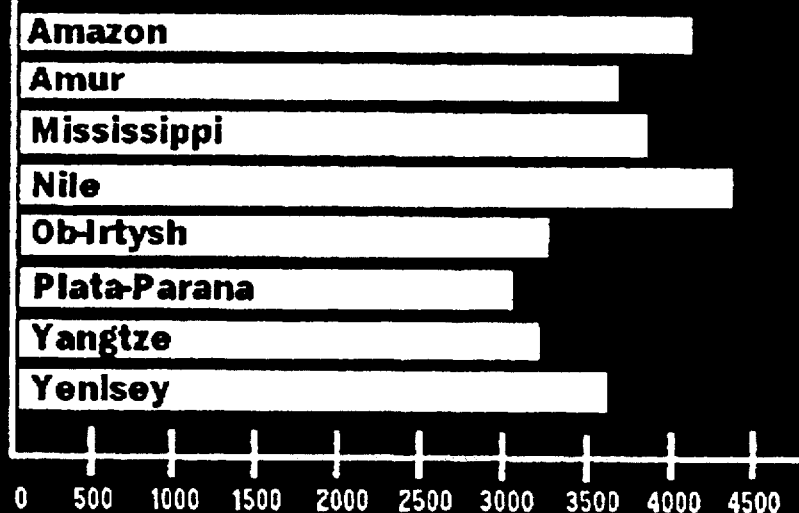

The Lesson Segment. Students are first told that, Charts and graphs are pictures that help you compare amounts. Amounts can be easier to compare in graphs than in lists. Students are then shown a screen display depicting a list of eight rivers in alphabetical order. See FIG. 168a. They are asked to click on the shortest one. Students will have already been taught through one embodiment of the present invention that lists are not always organized in the way that is most convenient for them to use. This is an example of such a list. Then, they are shown a bar graph, also listing the rivers in alphabetical order. See FIG. 168b. From this example, students are taught that they can more easily compare relative information when it is presented as a graph than as a list. For example, they can see right away that the Plata-Parana is the shortest river in the list.

Next, students are shown examples of the three types of charts and graphs. FIG. 169. By clicking on an icon of a graph, they can bring up an example of that type of graph.

Summary. Charts and graphs are pictures that help you compare amounts.

Figure 170:
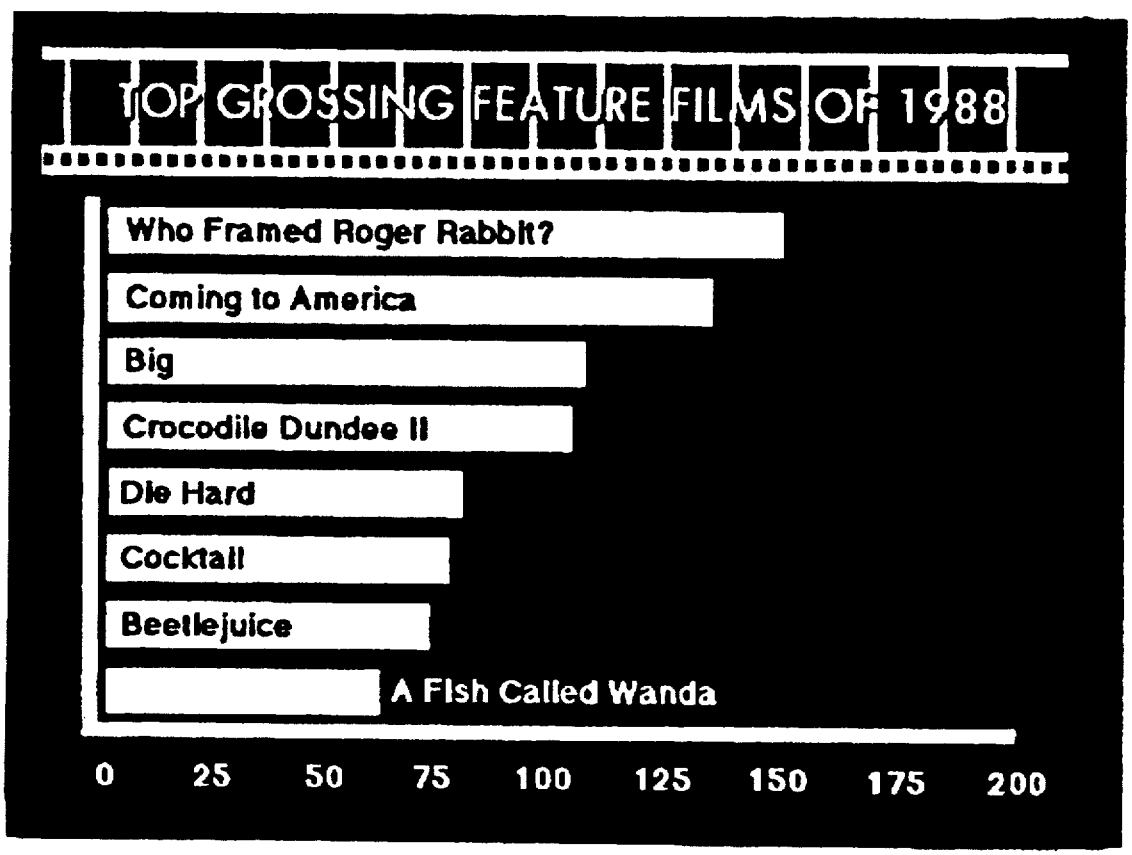

The Class Exercise. Students are shown the example in FIG. 170, and are asked to click first on the film that made the most money, and then on the one that made the least money.

In the second structure lesson segment for all the graphic documents, "Titles and Subtitles", students are taught the kinds of information they can get from titles and subtitles, and how to use that information to better understand graphs.

Figure 171:
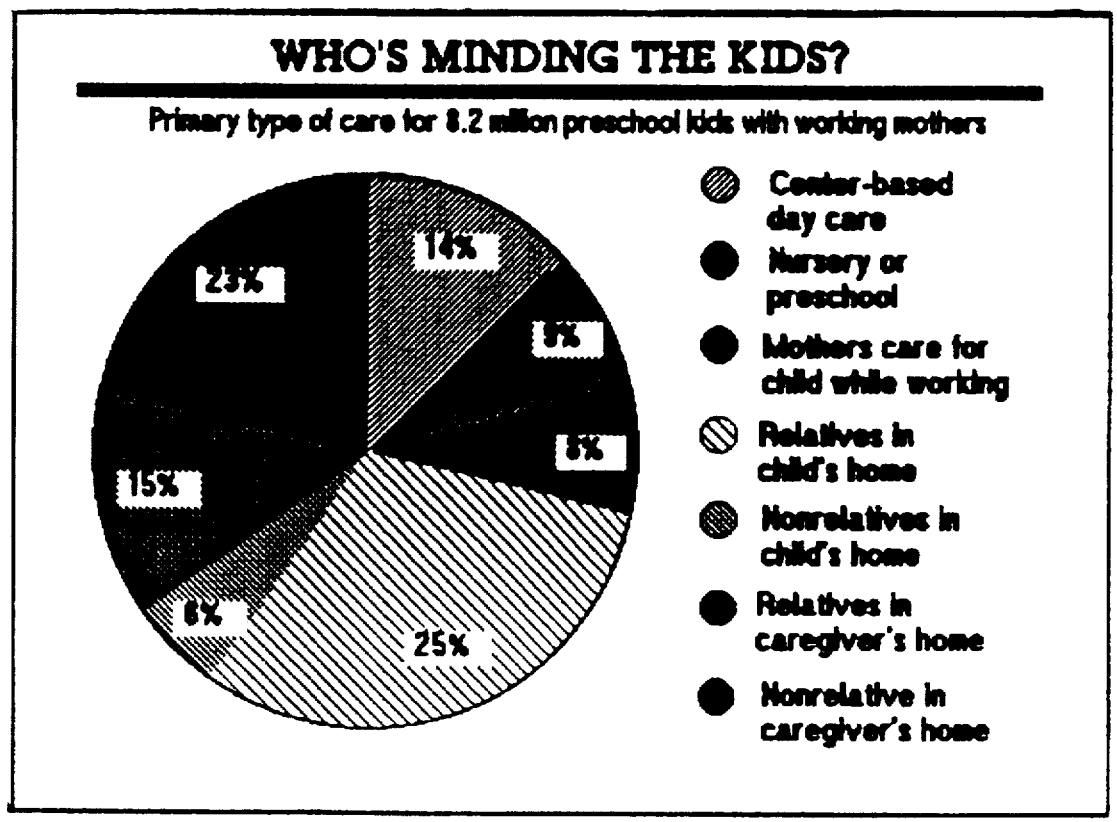

The Lesson Segment. Students are taught a series of points and a graph is displayed to illustrate each point: (1) The title of a graph should tell you what the graph is about. (2) The title can ask a question that the information in the graph answers, and can tell you what conclusion to draw from the graph. (3) When the title does not tell you enough, there is usually a subtitle. (4) You have to read the title and subtitle carefully to understand the information in the graph. Students are then shown the screen display in FIG. 171, and are asked to click on information in the subtitle of this graph that answers the following questions: (1) What is the total number the percents are based on? (2) Are elementary school children included in this pie chart?

Summary. Titles and subtitles give you information you need for understanding graphs.

Figure 172:
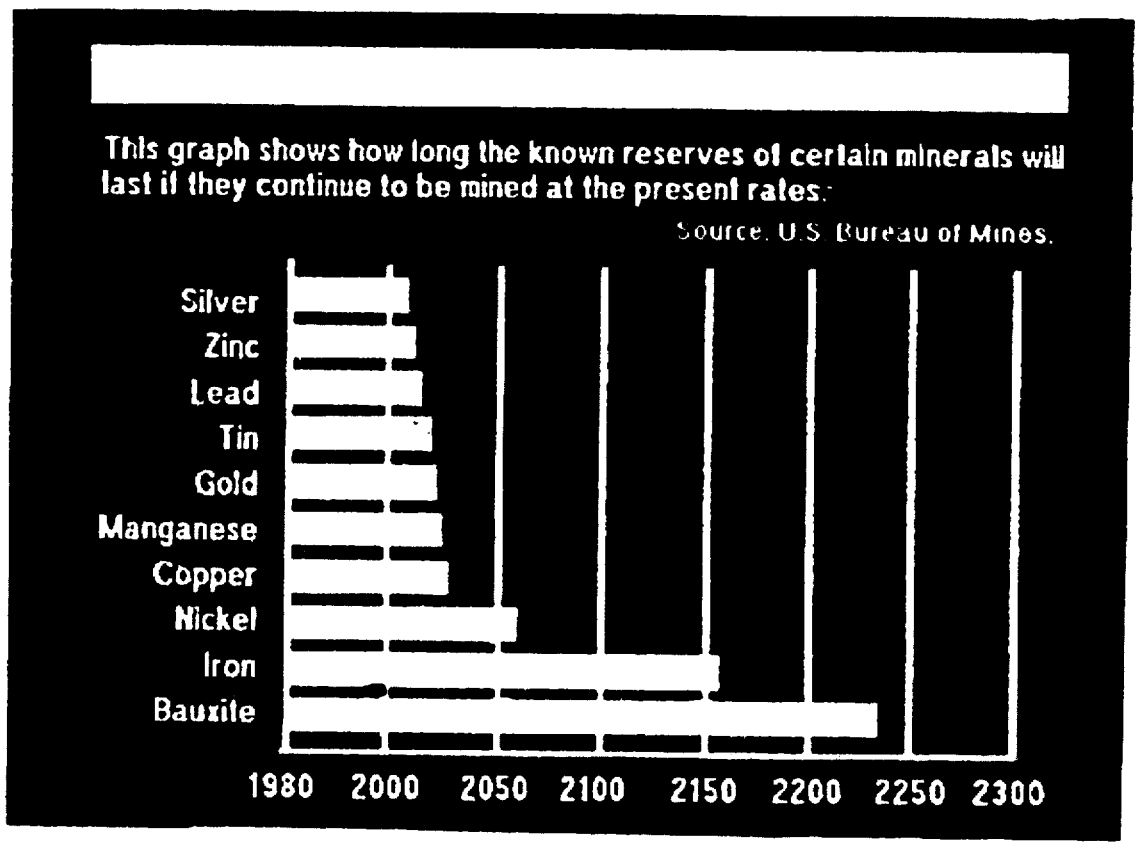

The Class Exercise. Students are shown a graph on the video screen, FIG. 172, and are asked what might be a good title. They discuss the elements given on the graph that give clues for a title.

The third structure lesson segment for all the graphic documents, "Information Outside the Graph", covers each graph type so that students can be aware of times they ought to look for legends and other outside information. This lesson teaches students to look outside the immediate area of the graph for information. The words "key" and "legend" are used interchangeably during the lesson.

Vocabulary. The following definitions are shown during this lesson segment when the DEFINITION icon is clicked: "Key"—something that explains the information in a graph, usually by color-coding. "Legend"—an explanatory list of the symbols or parts of a graph.

Figure 173:
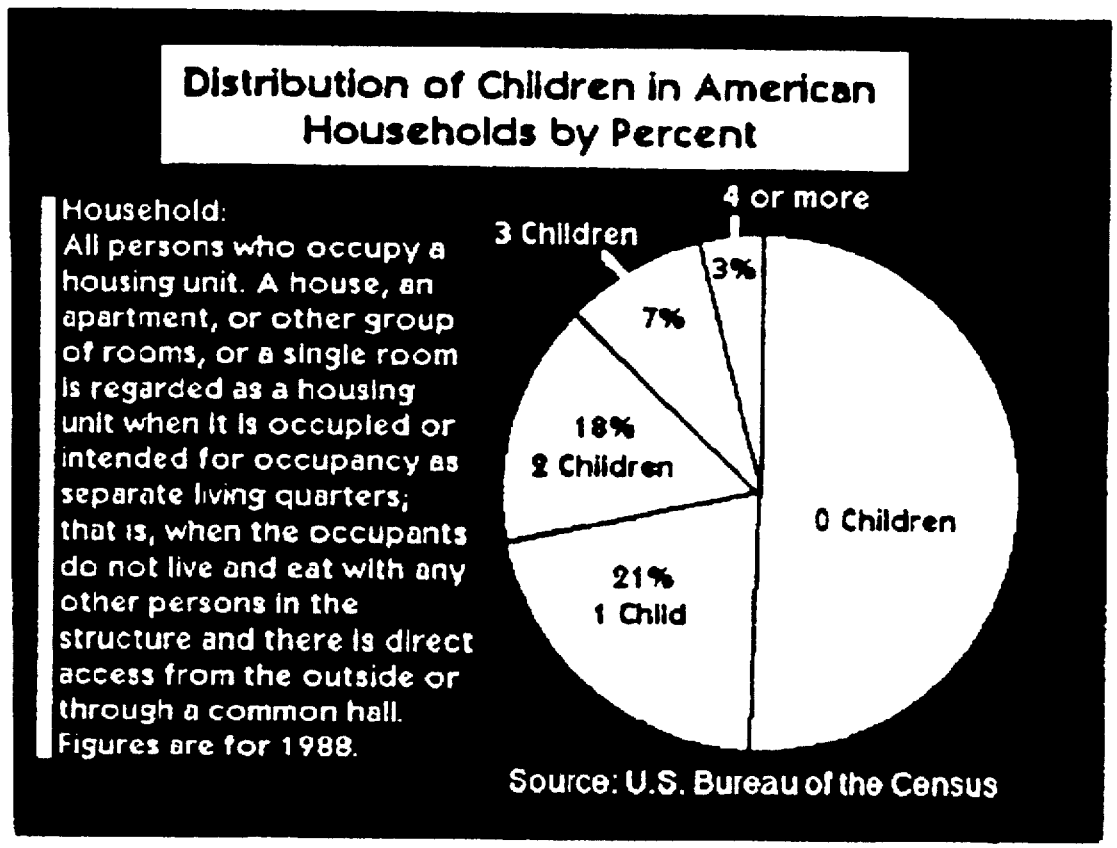

The Lesson Segment. Students are taught a series of points while being shown screen displays of graphs that illustrate those points: (1) Sometimes the information you need to help you understand a graph appears outside the graph. (2) In a pie chart, space is limited and sometimes the words for the pieces do not fit. The pieces can be color-coded, and the key to the color-coding is outside the pie chart. (3) In a bar graph with more than two groups of information, a legend is used to distinguish the groups from each other. (4) In a line graph, a legend is often used when there is more than one line, particularly if the lines are close together. (5) Other types of information outside the graph include: An explanation of the information displayed in the graph (e.g., a definition); the source for the information in the graph; and a date for the information in the graph. Students are then shown the screen display in FIG. 173, which contains a pie chart that illustrates other types of information that might occur outside the graph.

Summary. Information you need for understanding a graph is often outside the graph.

Figure 174:
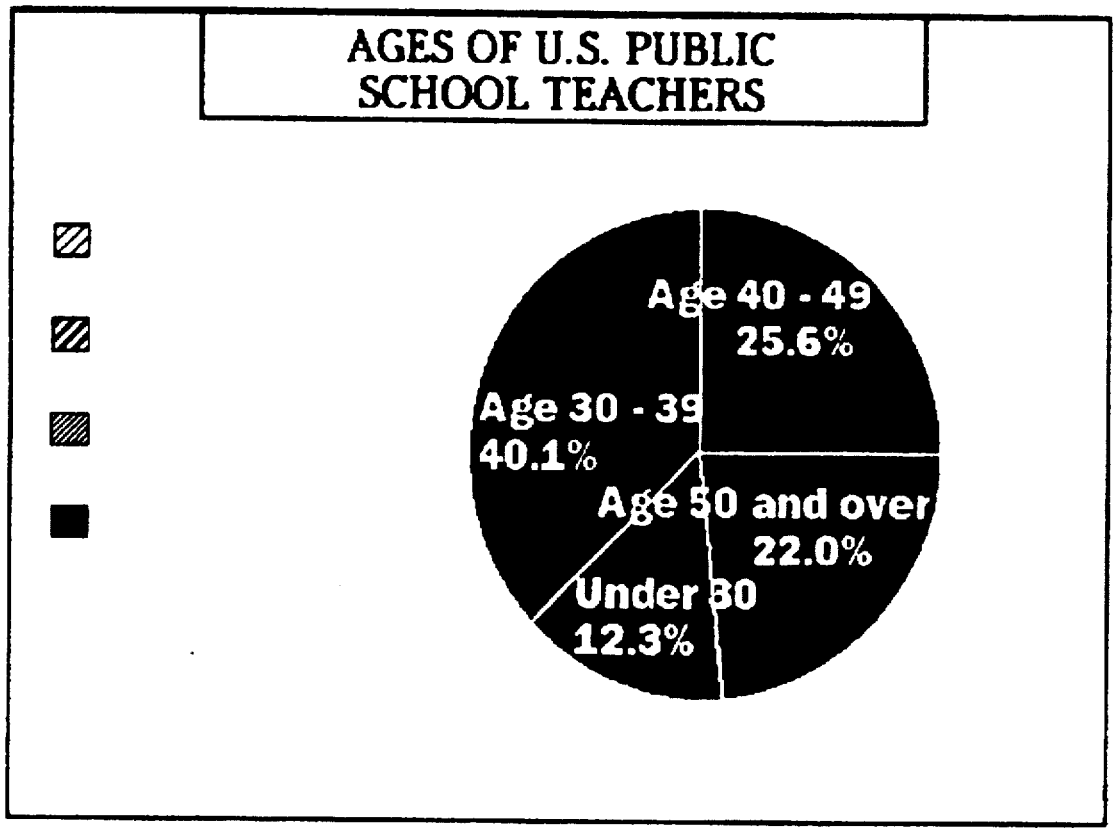

The Class Exercise. Students are shown the screen display in FIG. 174, and are told to make a legend by clicking on a color-coded legend box, and then clicking on any one of the pie pieces they want the legend box to represent.

In the fourth structure lesson segment for all the graphic documents, "Comparing Charts and Graphs", students are taught that each type of graph is best suited for displaying certain kinds of information.

Figure 175:
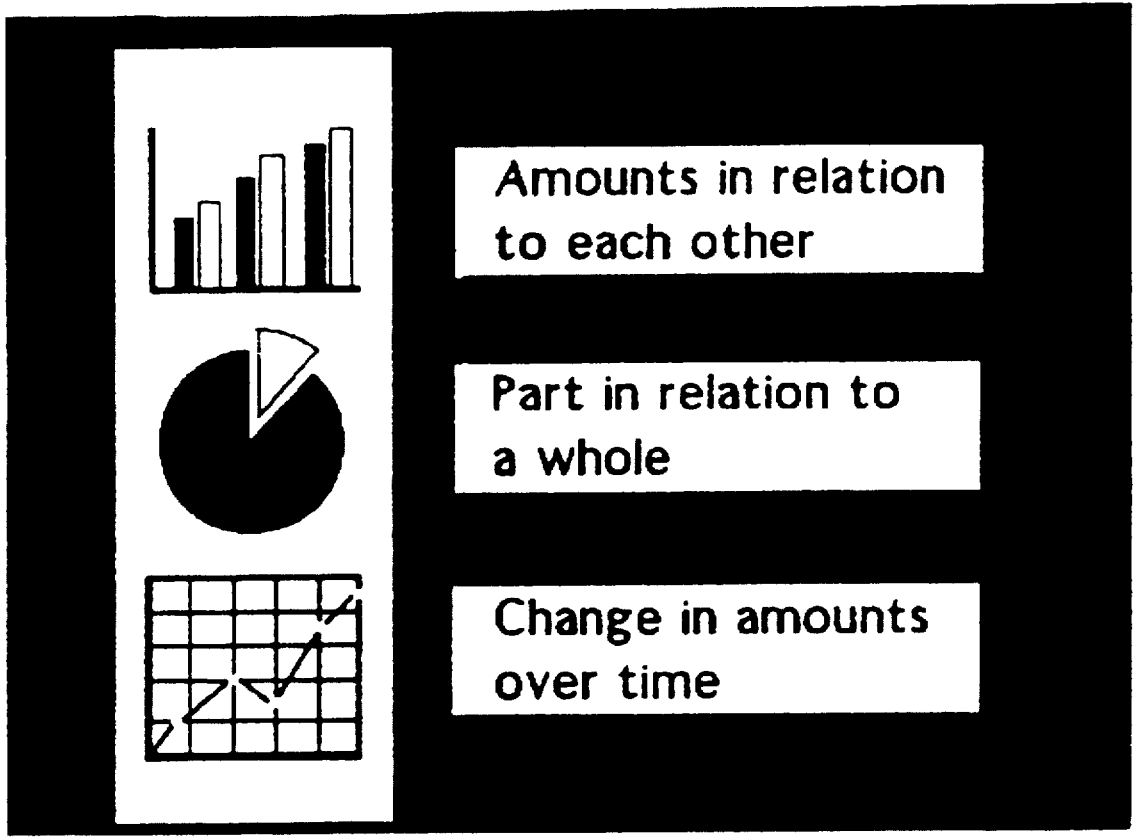
Figure 176:
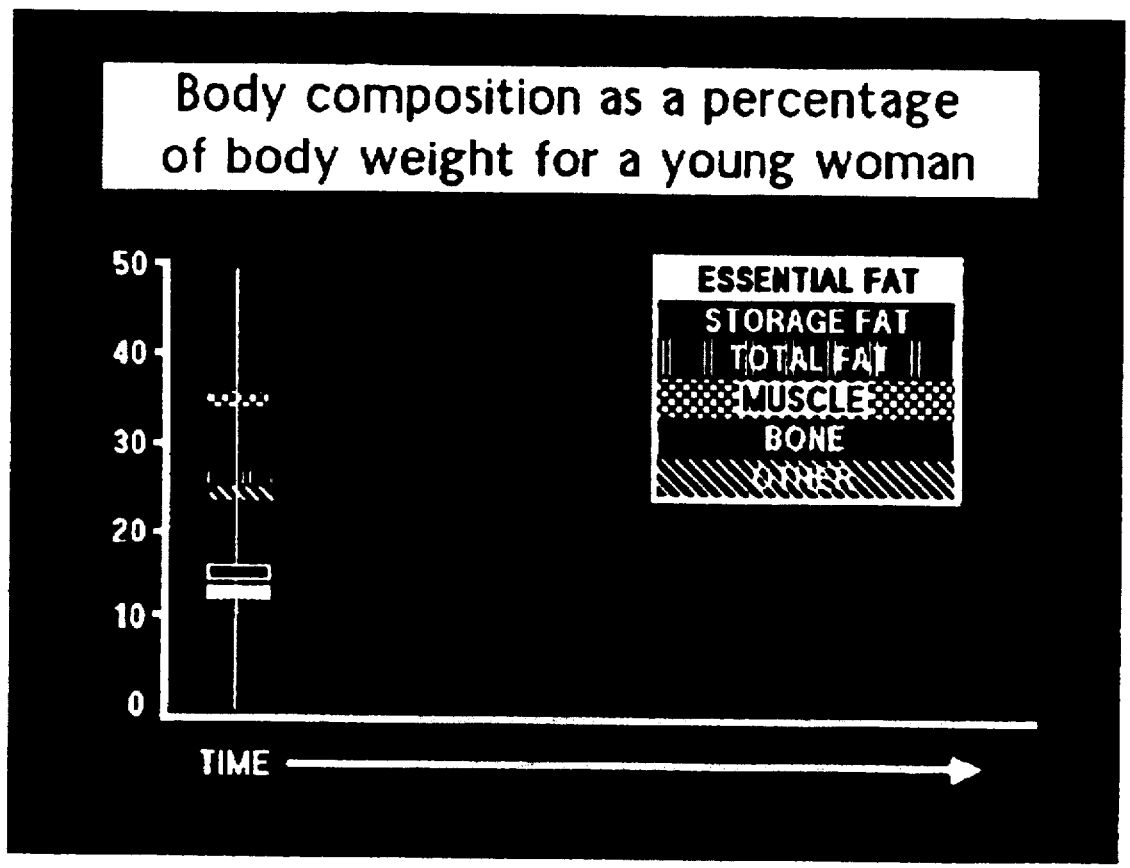

The Lesson Segment. First, students are told that, Each type of graph is best for showing a certain kind of information. Next, students are presented with a series of interactions. They are shown some information on the computer monitor and asked to pick which type of graph, represented on the video screen, is most appropriate for showing that information. The video screen display is shown in FIG. 175. If the students choose the inappropriate graph for showing the information, the graph they choose is displayed anyway. An example of a line graph when the correct answer is a pie chart is shown in FIG. 176.

Summary. Each type of graph is best for showing its own kind of information.

Figure 297:
Figure 298:
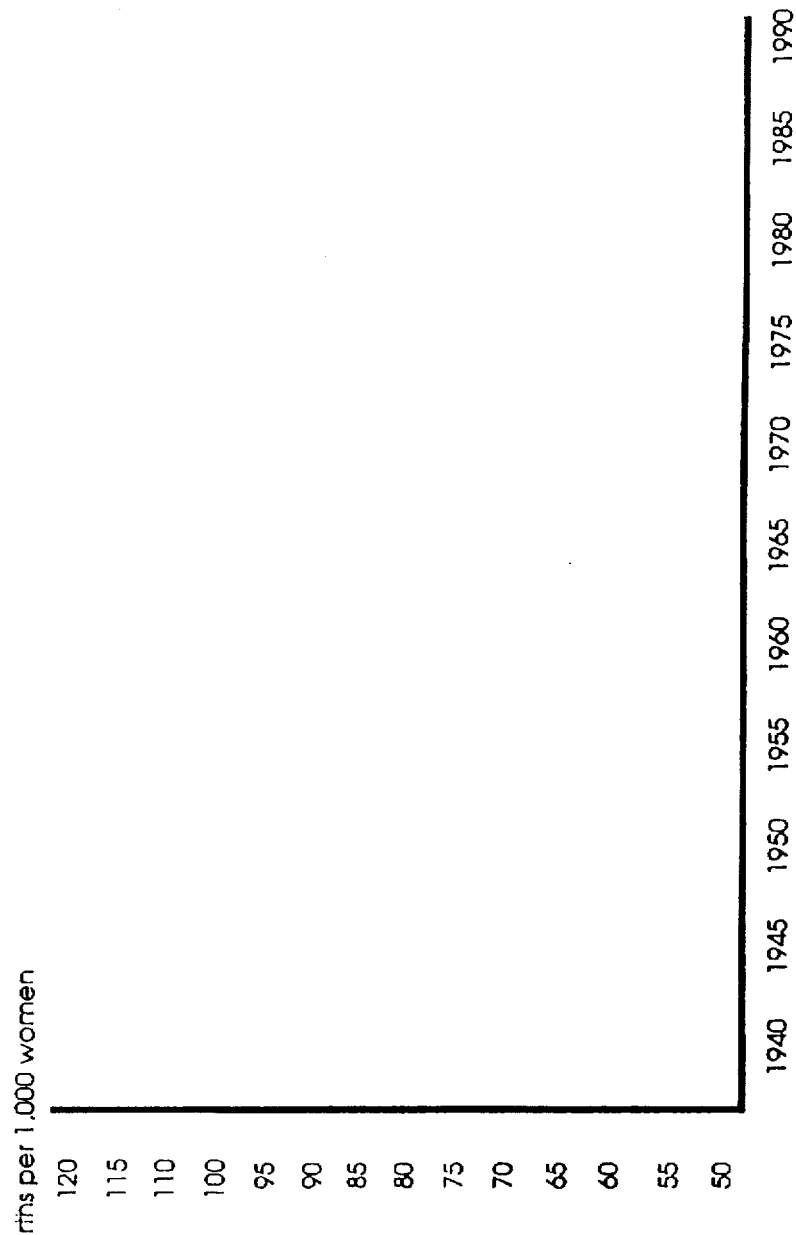
Figure 299:
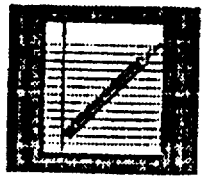
Figure 300:

The Class Exercise. In one preferred embodiment of the present invention, students are given two sets of pencil and paper exercises. In one set, students are asked to take the information from the combined list in FIG. 297 and use it to create a line graph on the axes in FIG. 298. In the second set, students are asked to take the information from the nested list in FIG. 299 and create a bar graph on the axes in FIG. 300. In another embodiment, these exercises are performed on the computer screen by use of an electronic pen.

(1) Pie Charts

The Computerized Literacy System's instruction on pie charts relies on several basic principles. First, pie charts are a common way to graphically represent certain types of information. A pie chart represents a feature or characteristic of some object or thing which is differentiated into two or more pieces. Second, a pie chart represents these various pieces as a percentage of the total object or thing. One way to understand pie charts as a type of document structure is to recognize that they can be derived from a particular type of intersecting list. Whereas most intersecting lists relate two sets of modifying information to a list of nouns, pie charts relate two sets of modifying information to a single noun.

Figure 177:
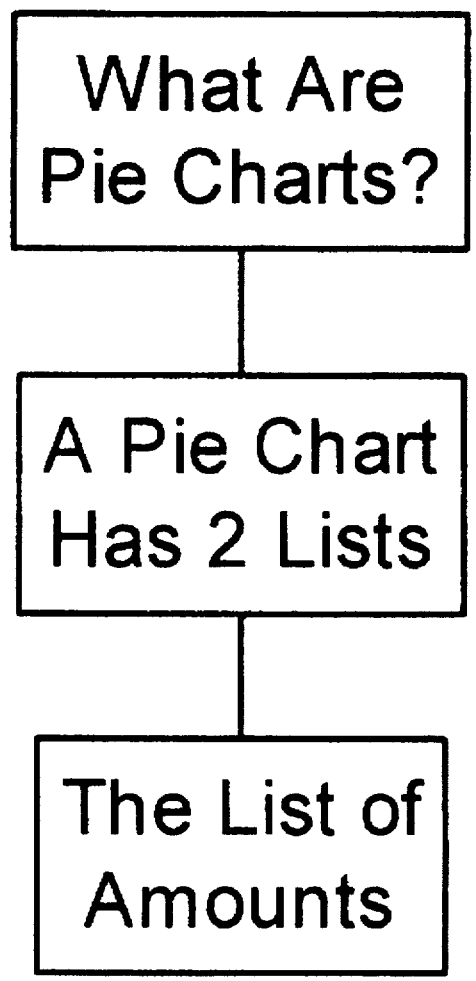

A third principle upon which the present invention relies is that pie charts always represent two pieces of modifying information. One piece modifies or extends a single feature or characteristic of an object or thing (e.g., frequency with which a vehicle is washed). The second piece provides percentage or ratio information relative to the feature or characteristic. In addition, pie charts are, with increasing frequency, being drawn with the noun represented iconically rather than always as a circle or pie. In accordance with the Knowledge Model Procedure, set forth above, the Computerized Literacy System requires users to choose from among a limited number of lesson segments. The lesson segment menu for pie charts is shown in FIG. 177.

In the first structure lesson segment for pie charts, "What are Pie Charts", students are introduced to the concept that pie charts represent the parts of something in relation to the whole. This segment starts with a video that shows how one man spends a typical day. The parts of his day are shown on a screen display as a pie chart. The video images are used to illustrate the points made in this lesson segment. In addition, instructors can encourage students to keep track of what they do in a day and how long they spend on each activity. The next time they come to class, students make a combined list, with activities in one list and time spent in the other, and then convert that list into a pie chart.

Vocabulary. The following definitions are shown during this lesson segment by clicking on the DEFINITION icon: "Relation"—some kind of connection between two things or people (e.g., the relation between a good diet and health; a family member is called a relation; the pieces of a pie chart can be seen in relation to the whole pie).

The Lesson Segment. Students are first taught that, A pie chart is in the shape of a circle, or pie. The circle is divided into pieces. (Text is italicized in this disclosure, as explained above, to indicate it appears on a screen display.) They are then shown a screen display of a pie chart representing the day of the man in the video, with each piece representing an activity during the day. The size of each piece shows students how much of the day is taken up by each kind of activity. Students are then asked to click on the piece that indicates what kind of activity fills up most of the man's day.

Summary. Pie charts show the parts of something in relation to the whole.

Figure 178:
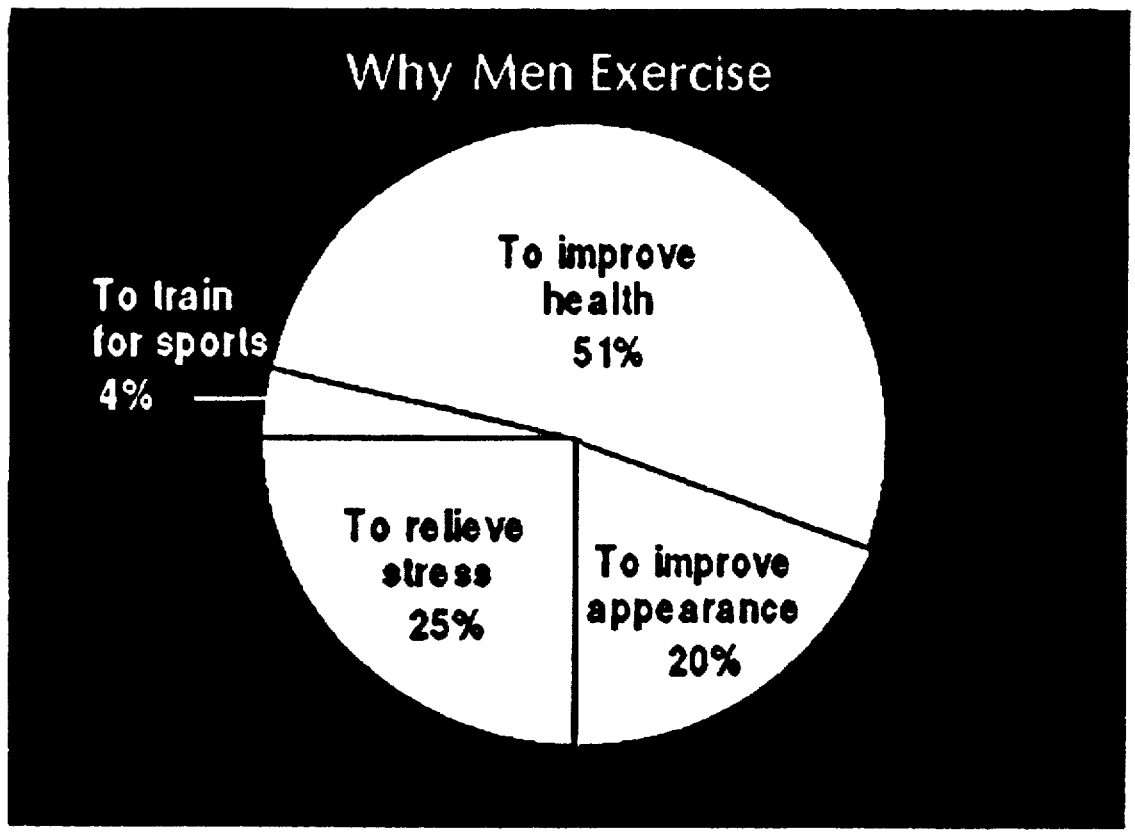

The Class Exercise. The class exercise presents a game in which students are divided into two teams. A screen display is shown which presents the following situation: 100 men were asked why they exercise. What do you think the biggest reason was? The teams guess from among four choices which was the biggest reason, which the next biggest, etc. The teams get one point for a correct guess. After each guess, right or wrong, the other team gets to guess. For every correct guess, the corresponding piece of a pie chart displayed on the other screen highlights. See FIG. 178. There is then a second situation which follows the same steps: 100 people were asked what they thought was the most important factor in staying healthy. What did people say?

In the second structure lesson segment for pie charts, "A Pie Chart Has Two Lists", students are taught that a pie chart is a graphic representation of a certain kind of combined list. They are taught that a pie chart has two lists of information: a list of words (called in the lesson the "list of names") and a list of amounts.

Figure 179:
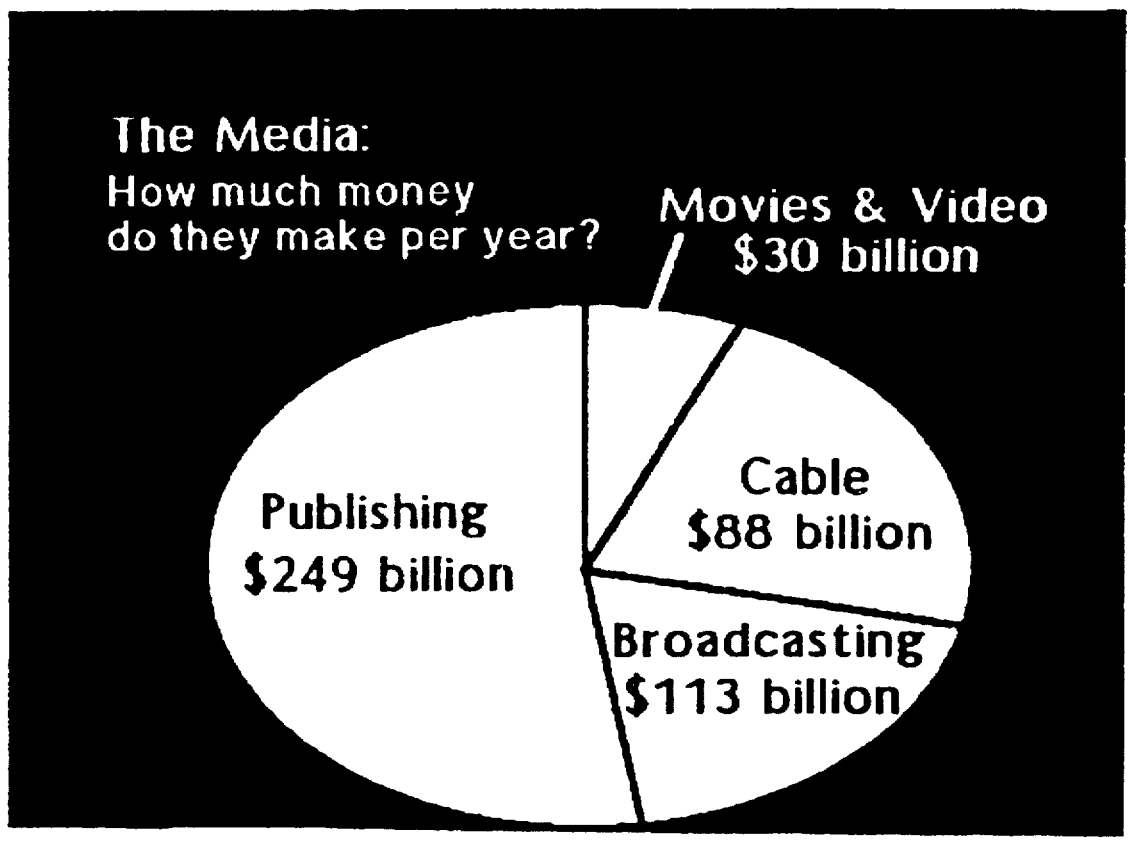
Figure 180:
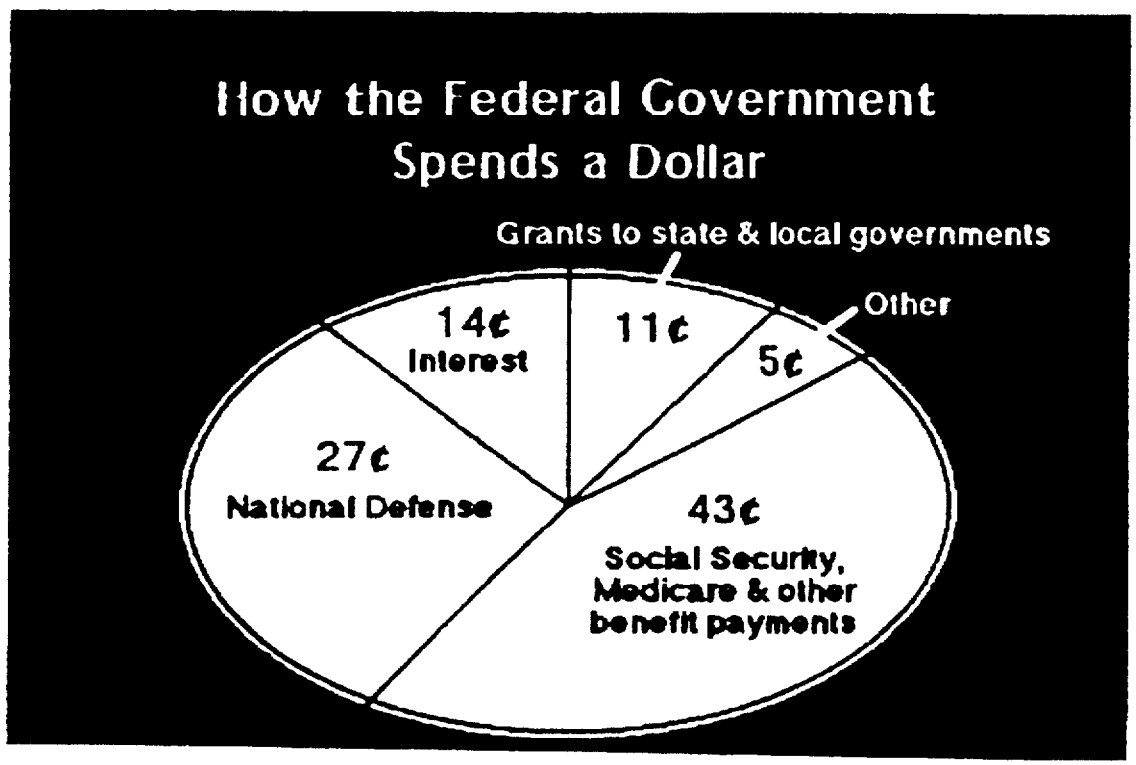

The Lesson Segment. Students are first taught that, One list in a pie chart tells what the pieces represent—this is the list of names. The other list in a pie chart tells how much of the whole pie each piece represents—this is the list of amounts. Students are shown the screen display in FIG. 179 to illustrate the points made about the two lists. Next, the screen display in FIG. 180 is shown, and students are asked two questions: (1) What would you label this list of names? by clicking on the SHOW ME icon, students are presented with one possible answer: "Things the federal government spends money on". (2) What would you label this list of amounts? SHOW ME: "Portion of a dollar spent".

Summary. Pie charts have two lists of information.

Figure 181:
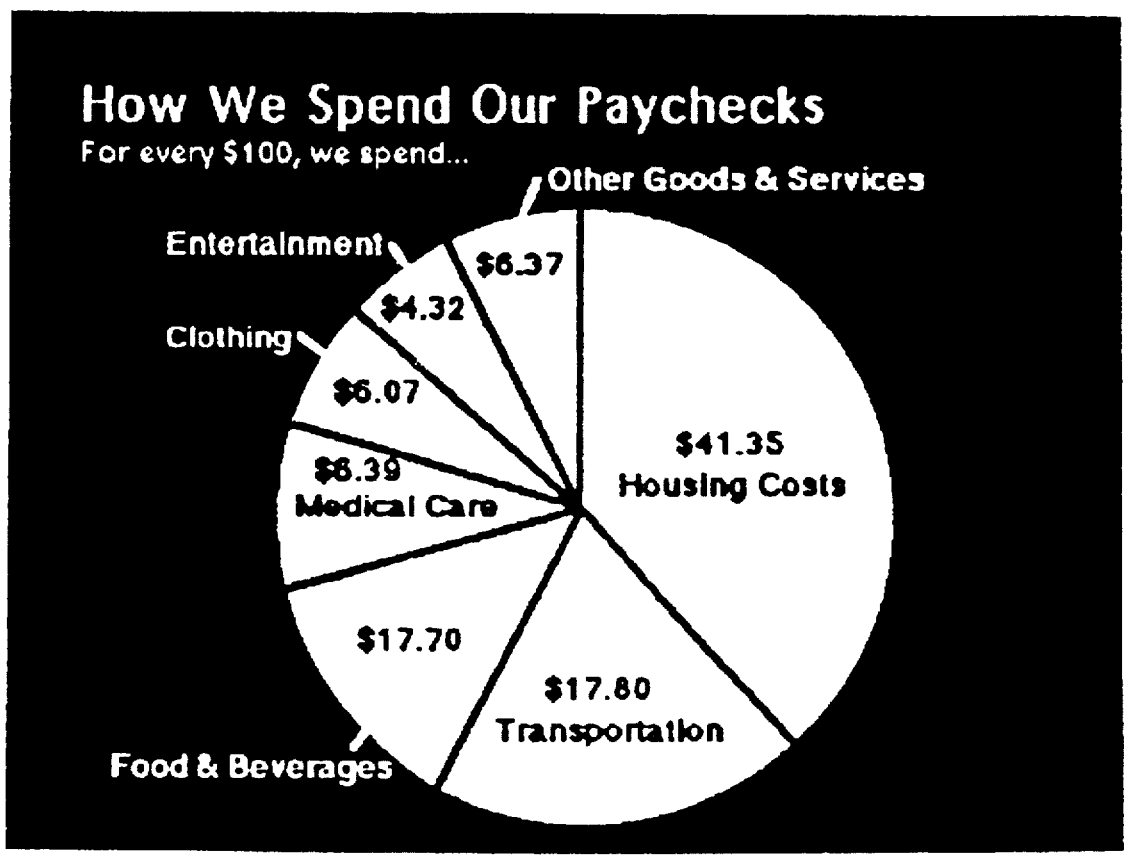

The Class Exercise. The pie chart pictured in FIG. 181 appears on the video screen display. Students are asked to drag the information from the pie chart to make two lists on the computer screen. After the students have made the two lists, they are asked to label each list. This is a good opportunity for an instructor to talk about the ways of ordering the information in the combined list, and to teach students about how the ordering of the information on the pie itself does not affect use in the way that the ordering of information in a combined list does.

The third structure lesson segment for pie charts, "The List of Amounts", introduces students to percents in pie charts.

Figure 182:
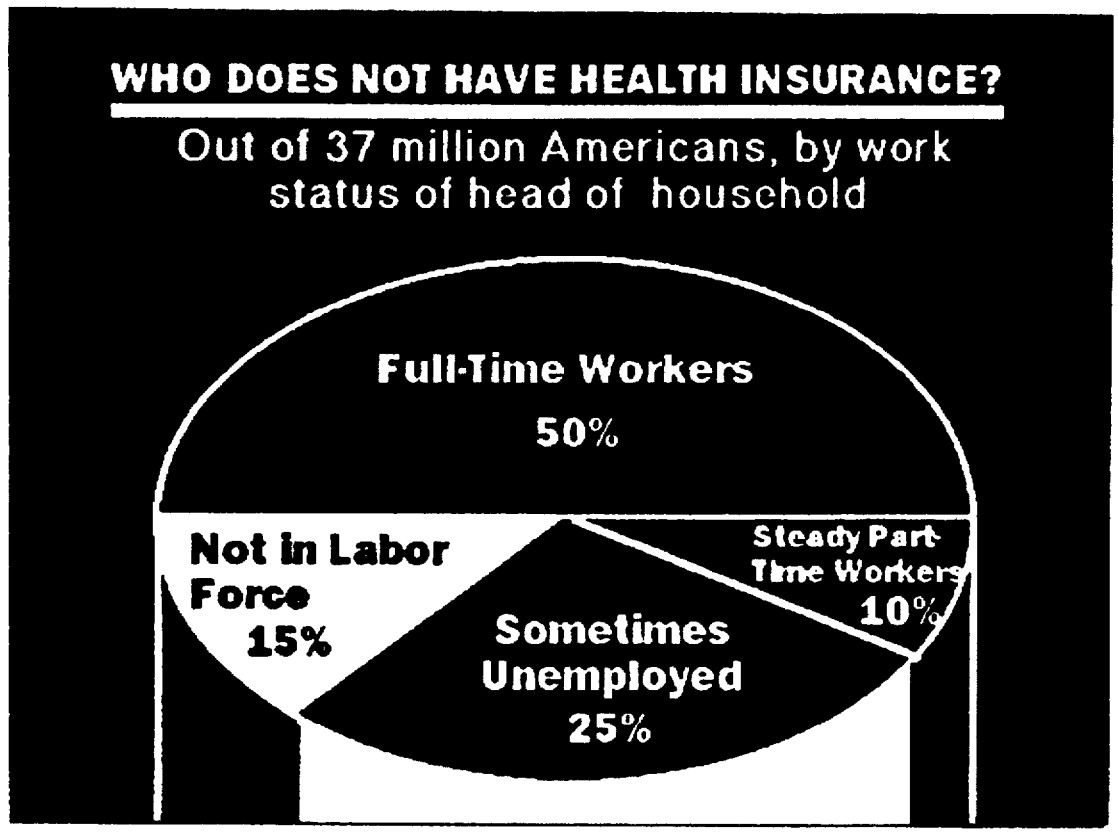

The Lesson Segment. Students are taught the following series of points (text is italicized in this disclosure to indicate it appears on a screen display): (1) The amounts in pie charts help you see differences in the sizes of the pieces more clearly. (2) The amounts are usually percents. (3) Percents tell you how much of the whole pie each piece represents. Students are then shown the screen display in FIG. 182 and asked to type in the percent for full-time workers. They are told that, The percents help you compare each piece to the whole pie, and each piece to the other pieces.

Summary. One list in a pie chart is a list of amounts. The amounts are usually percents.

Figure 183:
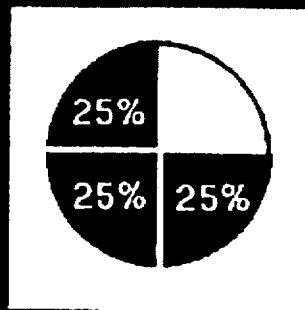

The Class Exercise. Three different sets of screen displays are shown. One such set is in FIG. 183. Displayed on the video screen is a pie chart with a piece missing. See FIG. 183a. The percents of the other pieces are marked. On the computer monitor are four choices of pieces of the pie. See FIG. 183b. Students are told to use the mouse to drag the correct piece from the computer monitor to fill in the pie on the video screen.

(2) Bar Graphs

The Computerized Literacy System's structure lessons for bar graphs rely on certain basic principles. First, bar graphs provide another common means for graphically representing information often presented in tables. Second, bar graphs, like pie charts, can be used to represent two lists of modifying information relative to a single noun. Unlike pie charts, however, which are limited in the amount and type of information which they can display, bar graphs can include one or more lists of noun and modifying information. Furthermore, whereas pie charts are restricted to presenting information in terms of percentages, bar graphs can represent amounts in terms of other units of measurement, e.g., dollars, inches, or years of education. Finally, bar graphs provide a more flexible structure for highlighting comparative information than either pie charts or other document structures, including combined, intersecting, and nested lists. In accordance with the Knowledge Model Procedure, the Computerized Literacy System requires users to select from among a reasonably limited number of structure lesson segments. The lesson segment menu is shown in FIG. 184.

In the first structure lesson segment for bar graphs, "What are Bar Graphs?", students are taught that bar graphs show amounts in relation to each other.

Vocabulary. The following definition is shown during this lesson segment when students click on the DEFINITION icon (in relation to appliances in the class exercise): "Life expectancy"—the average length of time appliances can be expected to work properly.

Figure 185:
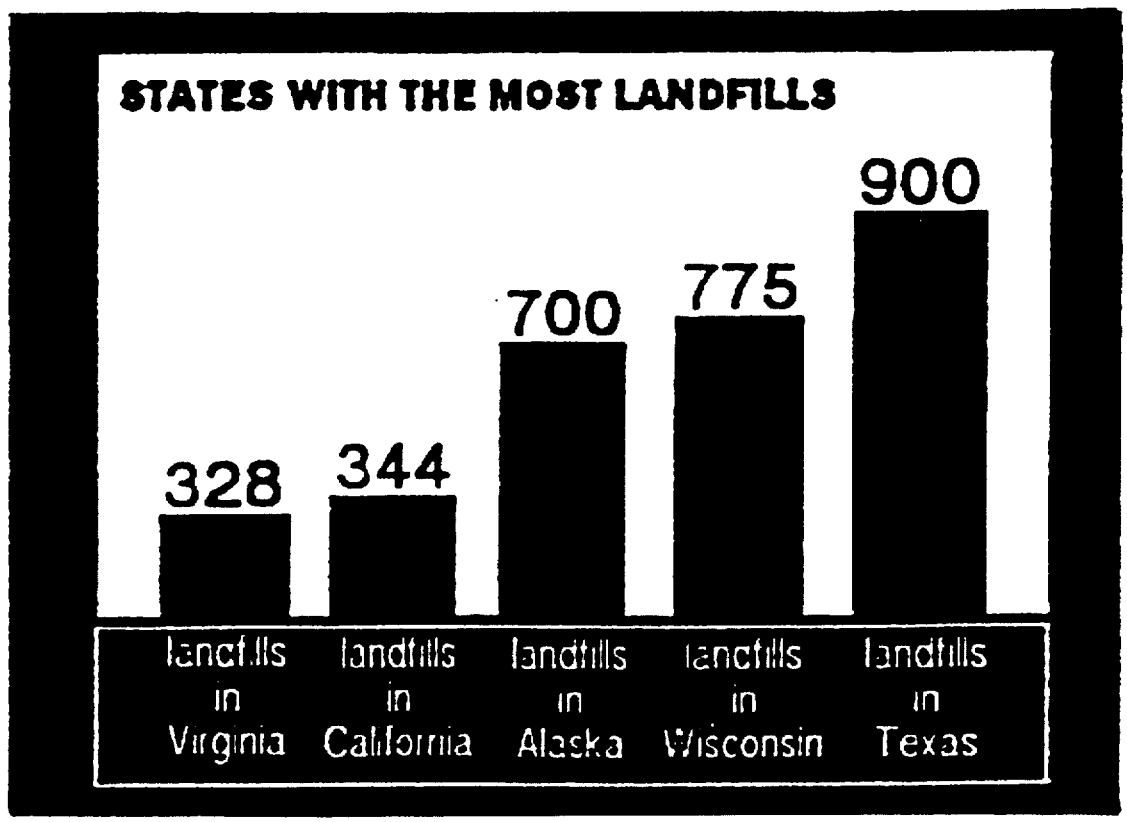

The Lesson Segment. Students are taught a series of points, while the screen display in FIG. 185 is shown as an example: (1) A bar graph uses bars to show amounts. (2) Bach bar represents a different thing. (3) The length of each bar represents an amount. (4) The longest bar always represents the largest amount. (5) The shortest bar always represents the smallest amount. (6) Bar graphs help you compare the amounts of things quickly and easily.

Summary. A bar graph uses bars to help you compare amounts.

Figure 186:
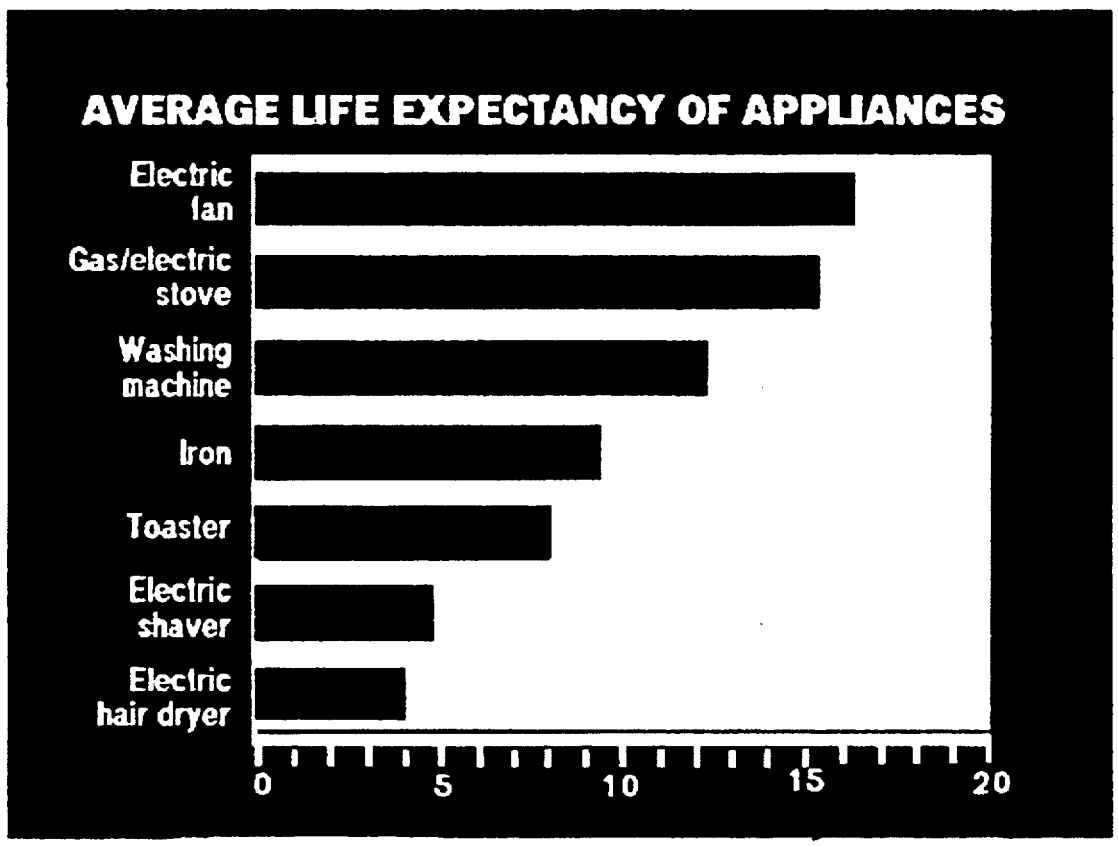

The Class Exercise. Students are shown the screen display in FIG. 186 and are asked to click on the name of the appliance that has the longest life expectancy. They are then asked which appliance lasts longer, an iron or a toaster. A third question asks them which appliance has the shortest life expectancy.

In the second structure lesson segment for bar graphs, "What are Bar Graph Axes?", students are taught that many graphs do not have axes because graphic qualities of graphs are more important to large-scale publications than actual representations of numbers. But there are plenty of graphs that do use axes to represent graphic information. This lesson segment introduces students to the concept of axes and the accompanying concept of a scale, and starts them thinking about graphic information represented in this way. By the end of the graphic documents use lessons, students will be looking for scales, looking critically at scales, and highly suspicious of any bar graph that lacks either a scale or numbers at the ends of the bars.

Vocabulary. The following definitions are displayed during this lesson segment by clicking on the DEFINITION icon: "Axes"—the plural of axis; axis is defined in the segment as one of two boundary lines of a graph. "Parallel"—running in the same direction as. "Scale"—numbers the graph is read by; examples of a scale in daily life are various kinds of weight scales, a ruler, a measuring cup.

Figure 187:
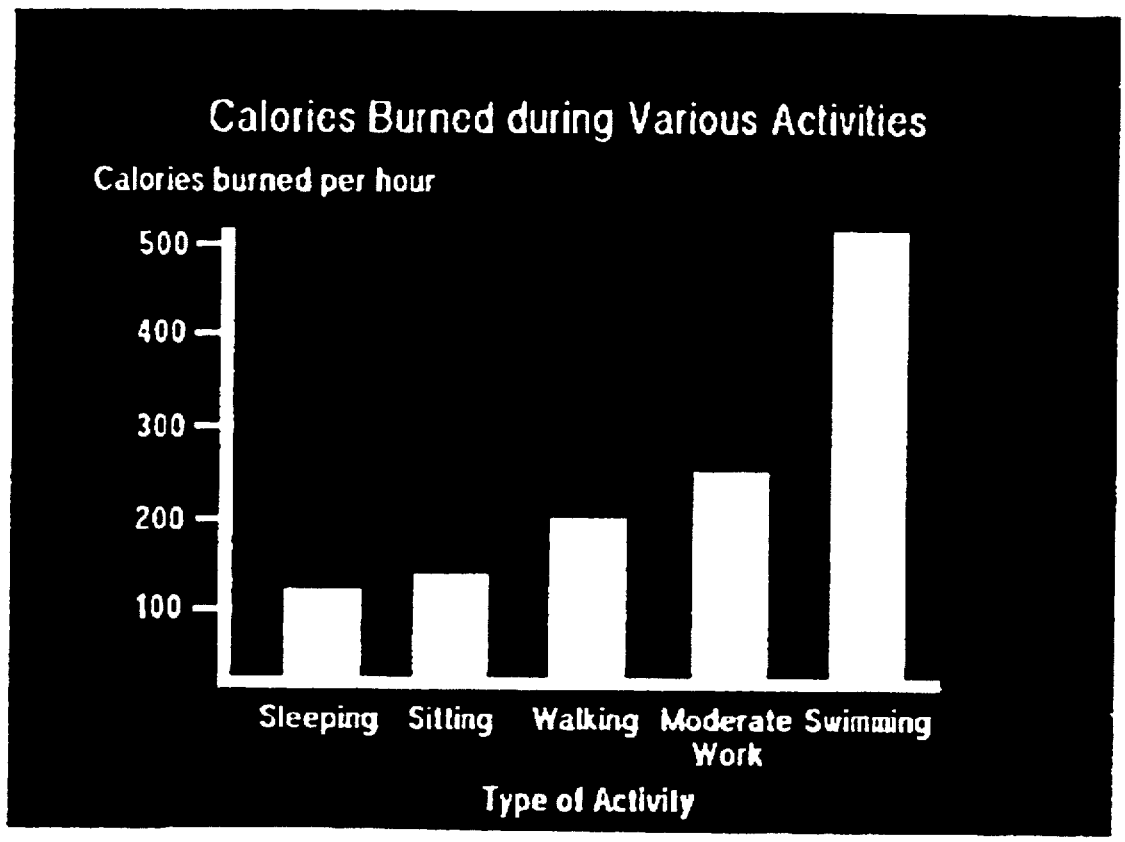

The Lesson Segment. Students are taught a series of points, while the screen display in FIG. 187 is shown as an example: (1) Bar graphs have two boundary lines, or axes. (2) One axis names what the bars represent. This axis can contain words or numbers. (3) The other axis contains amounts. This axis is called the scale. The scale can contain various kinds of amounts. (4) You read the amounts by looking across the top of the bars to the scale. (5) The names of the bars or the scale can be on either axis. But the scale is always parallel to the bars.

Summary. Bar graphs usually have two axes: One names the bars. The other has the scale.

The Class Exercise. On the video screen, students are shown a graph with a title. See FIG. 188a. On the computer screen are three scales to choose from. See FIG. 188b. Based on what this lesson has taught students about what is appropriate for each axis and the fact that the scale is parallel to the bars, students select the appropriate axes and drag them to the graph. There are three graphs and three scales: (1) "World Consumption of Petroleum", FIG. 188; (2) "Leading Countries in Number of Radios"; and (3) "How Much Do They Spend on Advertising?"

The third structure lesson segment for bar graphs introduces the multiple-bar graph. Students are reminded that a list is a group of related information. Because there are many simple lists represented in some bar graphs, as there are in intersecting lists, students are taught how bar graphs represent groups of information. The point they are taught is that bar graphs can be reconfigured into combined, intersecting, and nested lists, and vice versa, although it is not necessary for students to have to identify individual lists in graphs.

Figure 189:
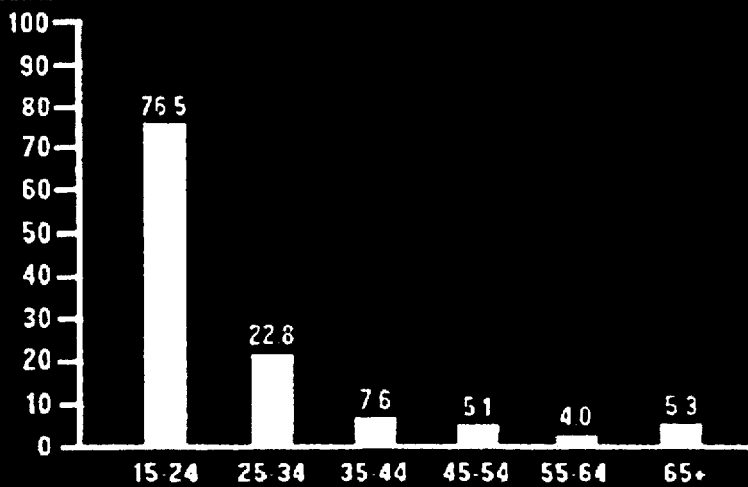
Figure 190:
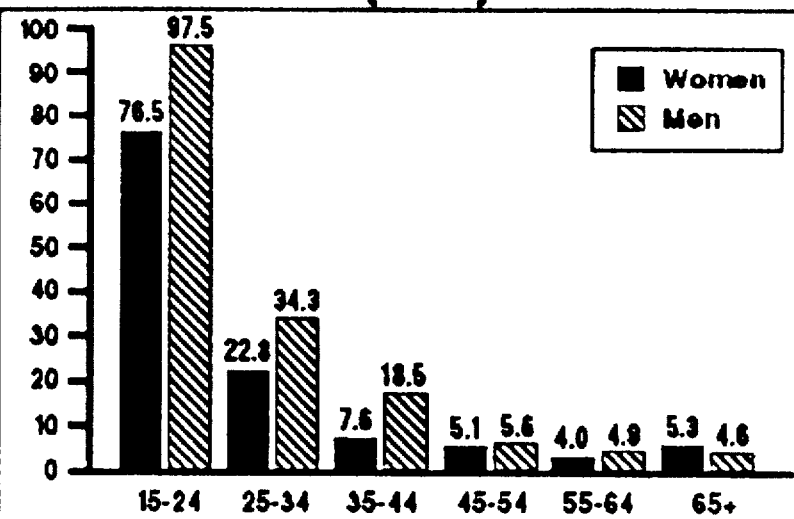
Figure 191:
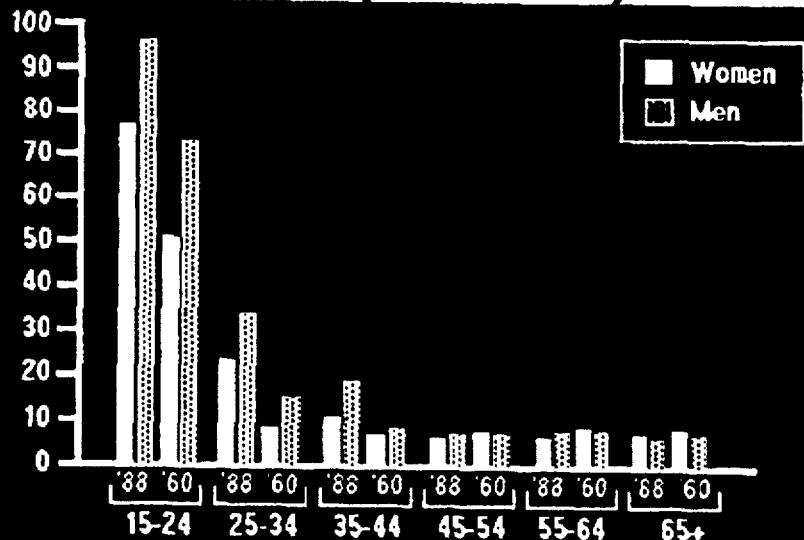

The Lesson Segment. Students are first told that, Bar graphs can represent two or more groups of information. The bar graph in the screen display in FIG. 189, with two groups of information, is shown, and information is added to show how the increased number of groups of information get configured in the graph. See FIG. 190. When students are shown the first bar graph and list, FIG. 189, they are told that, This graph represents two lists, or types, of information. When they are shown the second bar graph and list, FIG. 190, they are told, Now you have two types of information. When they are shown the screen displays in FIG. 191, they are told, Now you have five types of information.

Figure 192:
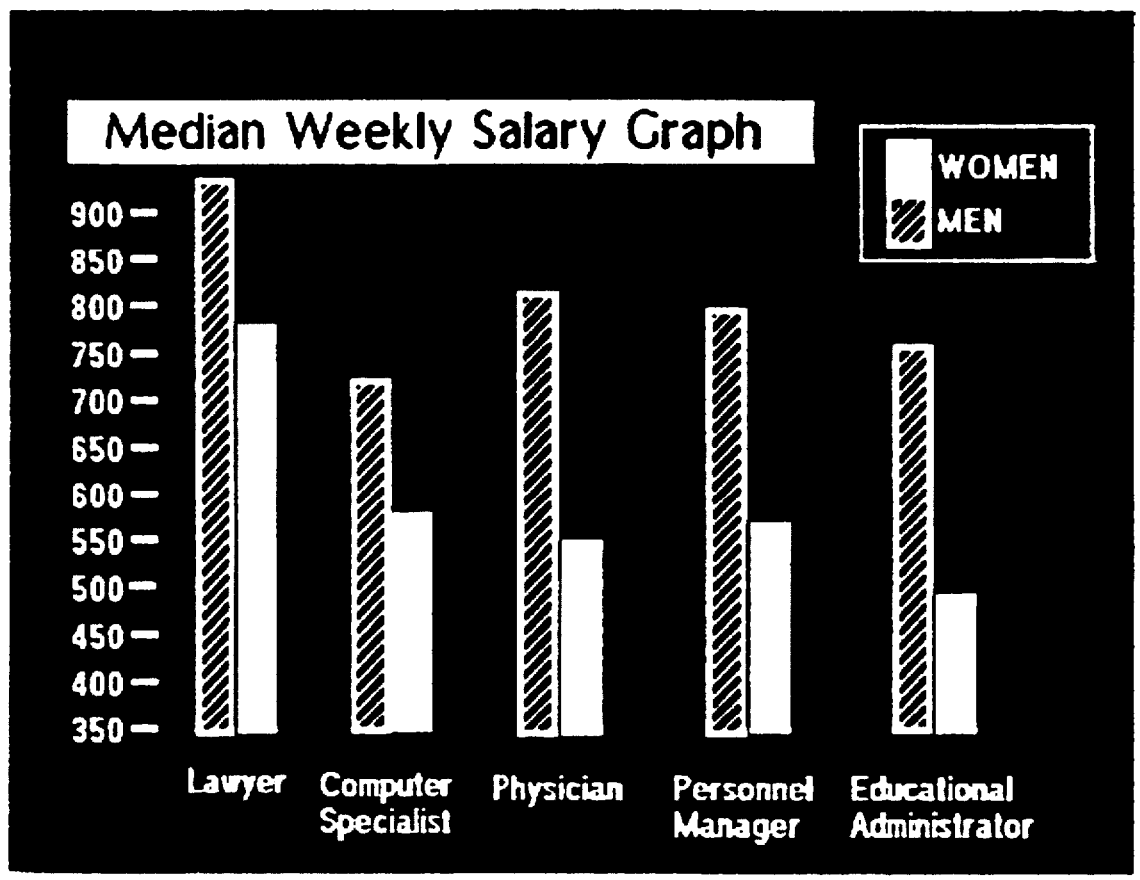

Next, based on the screen display in FIG. 192, students are asked how many types of information there are in the graphs. SHOW ME: There are three: occupations, salary of women in each occupation, and salary of men in each occupation.

Summary. A bar graph can have two or more types—or lists—of information.

The Class Exercise. A graph is shown on the video screen. FIG. 193a. An intersecting list is shown on the computer monitor. FIG. 193b. Students are asked to use the mouse to drag the correct numbers from the intersecting list to the tops of the bars on the video screen.

(3) Line Graphs

The instruction on line graphs by the Computerized Literacy System is based on several basic principles. First, line graphs provide a third way for representing tabular information pictorially. Second, as with bar graphs, line graphs are a useful means for representing certain types of combined, intersecting, and nested lists. Similar to bar graphs, line graphs have as one of their modifying lists information which represents some unit of quantity. Third, an additional list of modifying information in line graphs often represents some unit of time. Thus, line graphs can provide a more vivid way of showing comparative trends than either tables or charts. In accordance with the Knowledge Model Procedure, the Computerized Literacy System requires users to choose from among a limited number of line graph structure lesson segments. The lesson segment menu is shown in FIG. 194.

In the first structure lesson segment for line graphs, "What are Line Graphs?", a video is played that introduces students to the concepts of line graphs and trends. Students are shown what the line graph allows the father in the video to see that the list didn't show him, and why. Students are taught other things that could be shown with a line graph besides a baby's growth. The main idea students are taught is that line graphs show changes in amounts over time, and therefore show trends.

Figure 195:
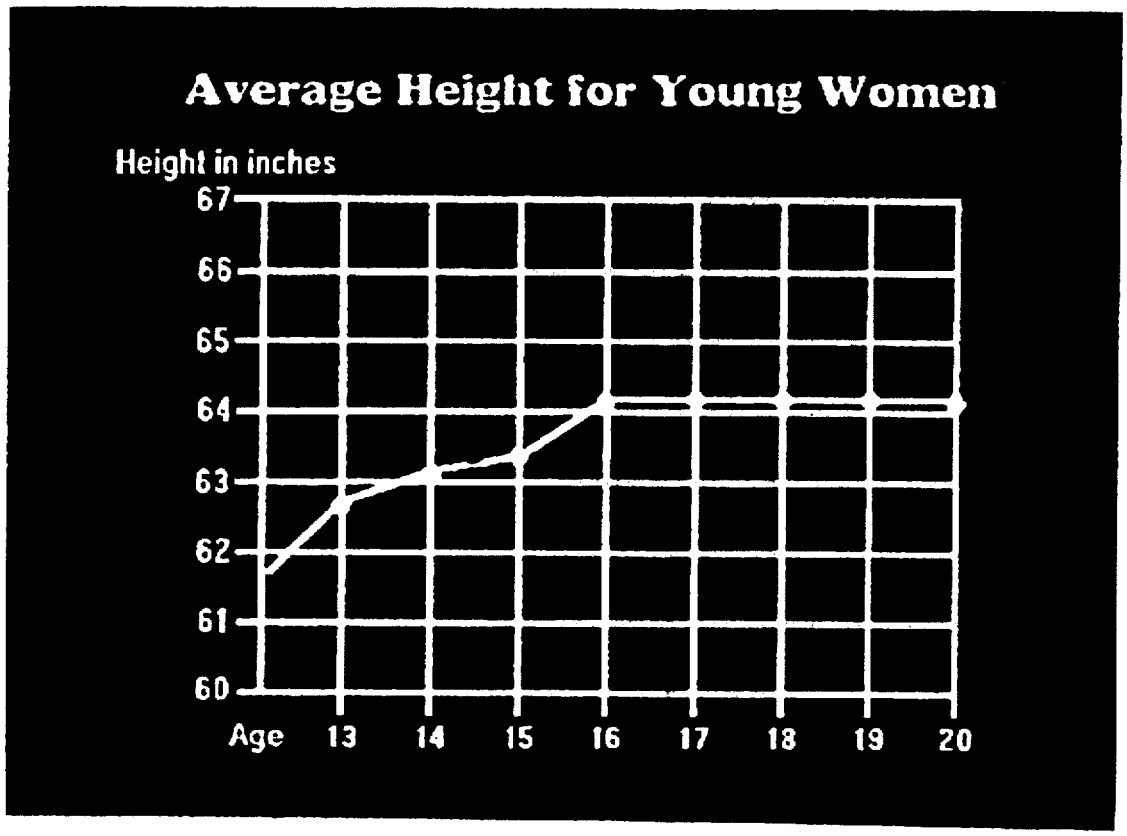

The Lesson Segment. Students are shown the screen display in FIG. 195, and are taught a series of points, which the graph in the display illustrates: (1) Line graphs use lines to show changes in amounts over time. (2) The line connects a series of points. (3) Each point represents a specific amount at a specific time. (4) Line graphs show you whether something is increasing or decreasing over time. A line moving upward from left to right shows that amounts are increasing. A line moving downward from left to right indicates that amounts are decreasing.

Figure 196:
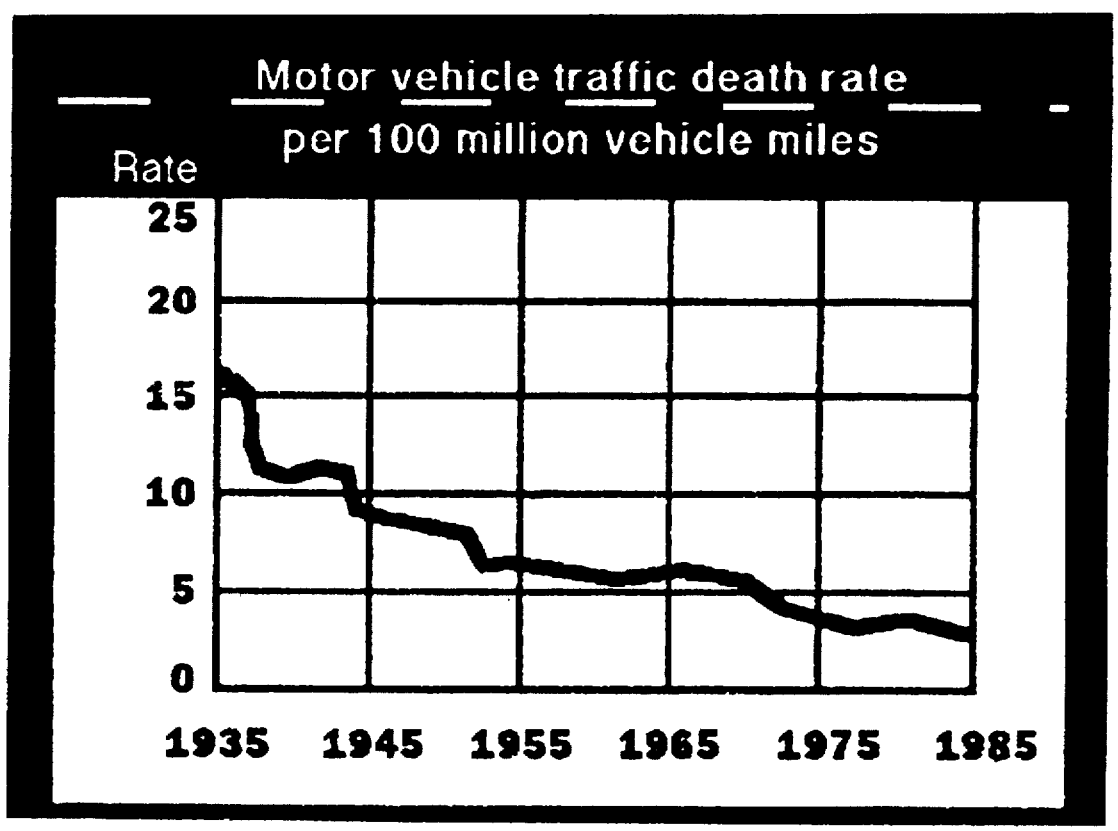

After students are introduced to the idea of a line moving upward or downward, they are shown the graph in the screen display in FIG. 196, and are asked whether the motor vehicle death rate is increasing or decreasing. They are asked to click on one choice or the other.

Summary. Line graphs use lines to show changes in amounts over time.

Figure 197:
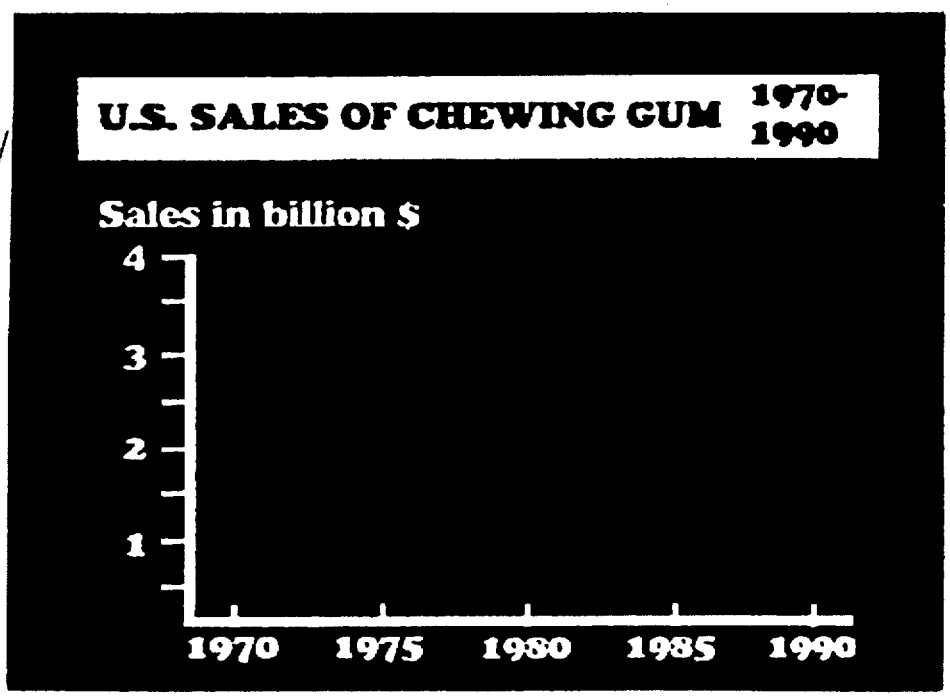

The Class Exercise. Students are shown the screen displays in FIG. 197, and are asked to decide what the line would look like if chewing gum sales had increased over the course of several years. There are three icons in the screen displayed on the computer monitor, FIG. 197a: a line moving upward, a line moving downward, and a line going straight across. They are asked to click on the appropriate one.

In the second structure lesson segment for line graphs, "What are Axes?", students are taught that the main difference between axes for bar graphs and axes for line graphs is that for line graphs both axes are scales. In addition, they are shown that for line graphs both axes have amounts; neither axis contains words, as a rule.

Vocabulary. The following definitions are shown during this lesson segment by clicking on the DEFINITION icon: "Axes"—the plural of axis; an axis is one of the two boundary lines of a graph. "Measure"—a size, weight, length, etc. "Quantity"—an amount you can count; a number of something is a quantity. "Ratio"—a comparison between two numbers or amounts; if there are twelve women in the class and six men, the ratio of women to men is twelve to six, or two to one.

Figure 198:
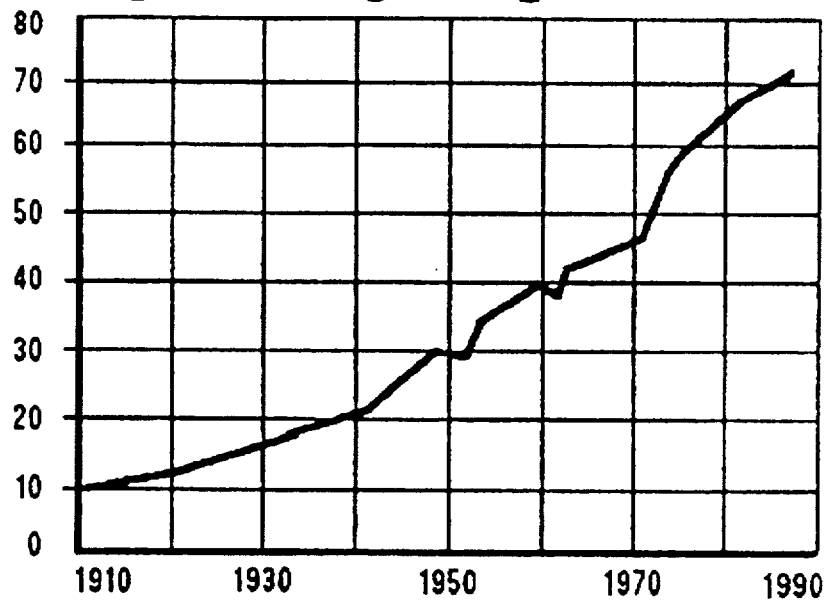

The Lesson Segment. Students are taught a series of points on the video screen, while there are icons on the computer screen that offer examples of graphs that illustrate the points being taught (text is italicized herein, as explained above, to indicate it appears on a screen display): (1) Line graphs have two axes, the time axis and the amounts axis. (2) One axis has units of time (examples are days, months, years, minutes). (3) The other axis has other kinds of amounts (quantities, measures, ratios). (4) Each point on the line graph represents the intersection of a number on the amount axis and a number on the time axis. Students are then shown the screen display in FIG. 198, and are asked, based on the graph in the display, to type in the approximate percent of students who completed high school in 1930.

Summary. Line graphs have two axes: one has units of time; the other has various kinds of amounts.

The Class Exercise. Students are shown the screen displays in FIG. 199, and are asked to choose the appropriate axes to drag with the mouse from the computer screen, FIG. 199a, to the line graph entitled "Soviet Refugees" on the video screen, FIG. 199b. By clicking on the NEXT QUESTION icon, students bring up a "Mushroom Consumption" graph and then a "World Records for the Mile" graph on the video screen, and perform the same exercise.

In the third structure lesson segment for line graphs, "Line Graphs and Lists", students are taught that each line on a line graph represents two lists of information. To help them see that each line represents two lists, students are reminded that each point on the line represents two numbers (a time and an amount).

Figure 200:
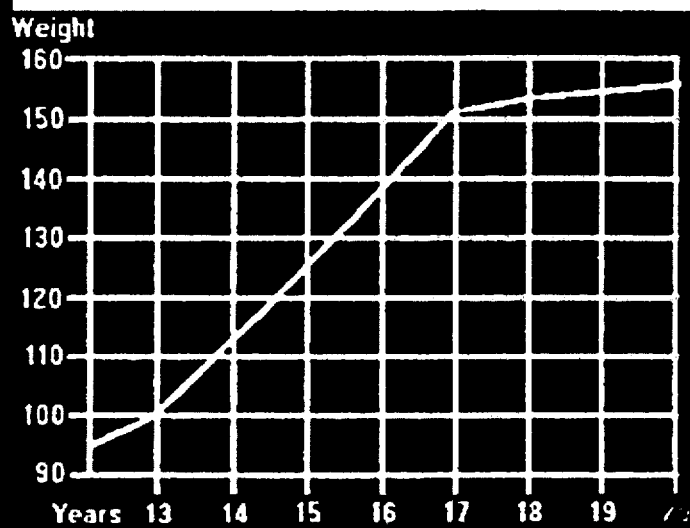

The Lesson Segment. While being shown the screen displays in FIG. 200, students are taught a series of points: (1) Each line on a line graph represents two related lists of information. (2) But the line contains more information than the list does. (3) A line contains all the points between the numbers in the list, no matter how many numbers you try to list (theoretically). (4) Practically speaking, a list that tried to show all the numbers a line graph can show would be very long, and it wouldn't show trends as clearly as the line does.

Summary. Each line on a line graph represents two lists of information.

Figure 201:
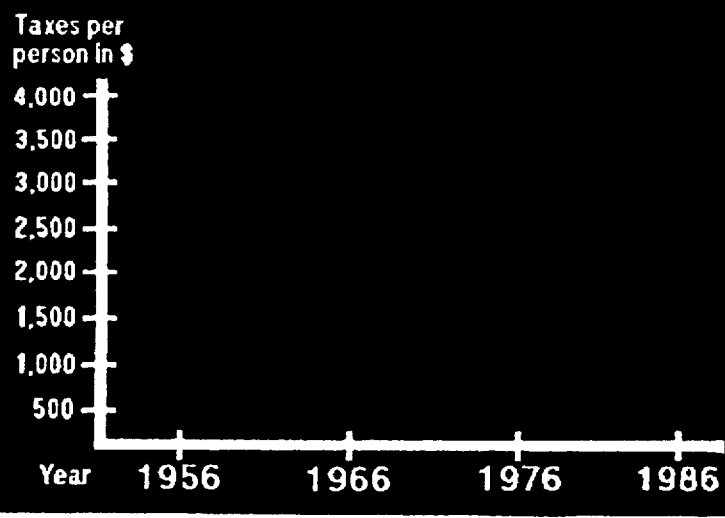

The Class Exercise. Students are given a list of taxes paid in the U.S. and are asked to complete or plot a graph. See FIG. 201. They click on the appropriate points on a graph set up on the video screen. The points appear on the graph when the correct spot on the graph is clicked.

The fourth structure lesson segment for line graphs, "Two or More Lines", is a fairly straightforward lesson, since everything students have been taught through the present invention about line graphs applies to graphs with more than one line. The only difficulty with graphs with more than one line is following the line being read without being confused by the others; this is particularly true if the lines overlap or intersect. Students are shown the kinds of comparisons that two or more lines allow.

Figure 202:
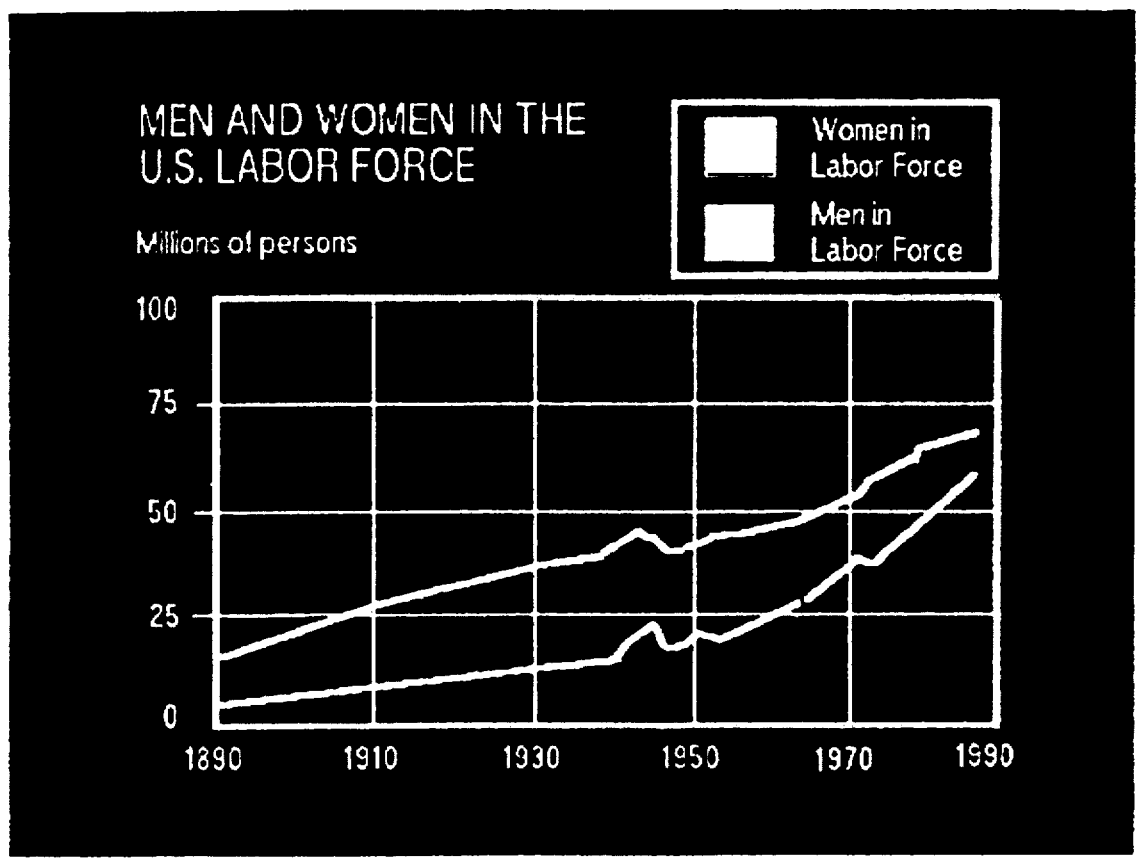
Figure 203:
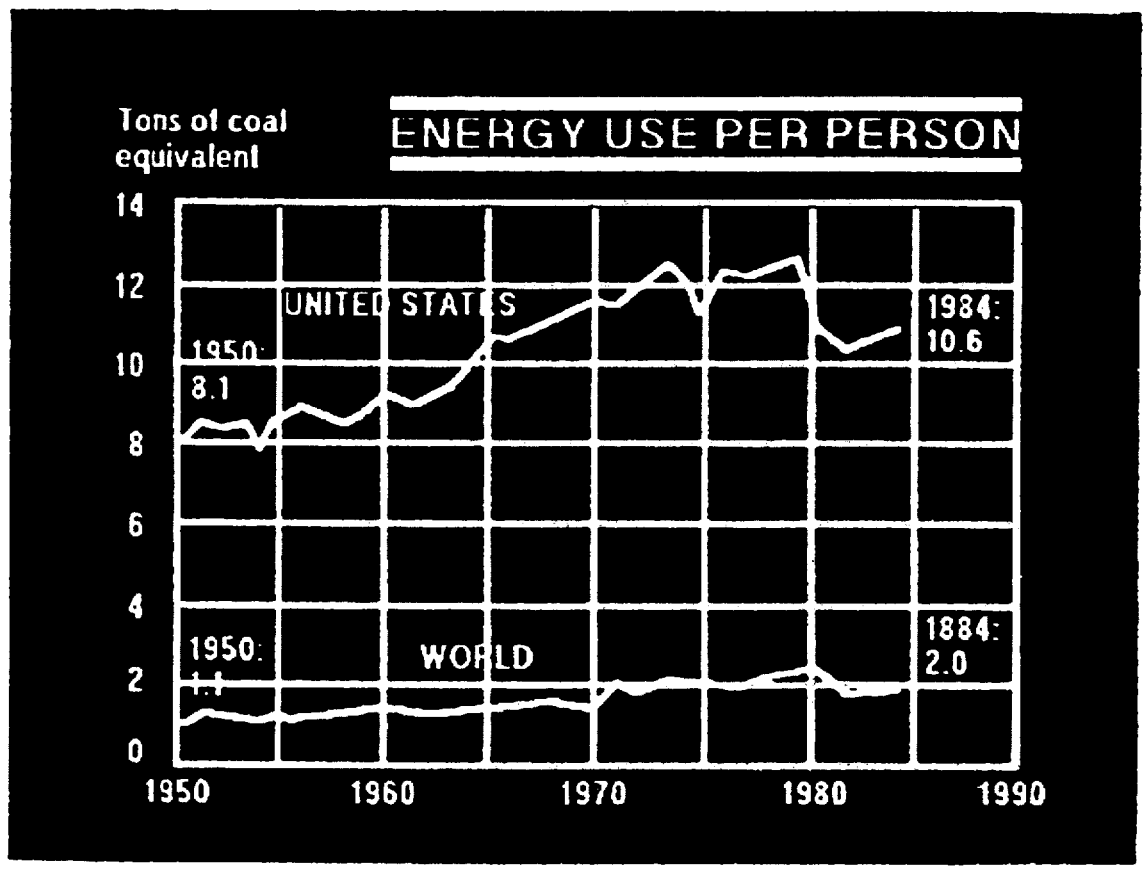

The Lesson Segment. Students are first told that, Line graphs with two or more lines help you compare amounts and changes over time. They are shown the screen display in FIG. 202 and told that, This is the example for line graphs helping you compare amounts. They are then asked in about what year was the difference between men and women in the labor force the smallest. They type in the number on the computer monitor. Next, students are shown the screen display in FIG. 203, and are told, This is the example for line graphs helping you compare the changes of two or more things over time. They are then asked whether the U.S. or the World shows the greatest increase in the use of energy.

Summary. Graphs with two or more lines help you compare: amounts and changes over time.

The Class Exercise. Students are shown a screen display with a graph showing four lines representing the rate of change of four diseases over time. Students are asked first to click on the names of the diseases that have increased since 1940, and then to click on the names of diseases that have decreased since 1940.

b. Use Lessons

In accordance with the Knowledge Model Procedure, described above, the Computerized Literacy System's graphic documents use lessons, like the use lessons for the matrix documents, teach students how to find information in documents. Also like the previous use lessons, they are organized by the strategies used for accessing the information: in the case of graphic documents, locating, connecting and comparing. Most of the segments that teach these strategies contain the following o three sections: (1) an introduction and demonstration of the strategy, including a discussion of all of the places on the graphic document the strategy can be used; (2) a discussion of factors about the graph that can make the strategy more difficult; and (3) a demonstration of the strategy applied to variations of the graph type (e.g., more than one pie chart, more than one line on a line graph). Not every segment contains all three parts of this format, but some part or parts of this format can be found in all the segments that explain strategies.

Because graphic documents are so useful for getting a quick general idea of the numbers they portray, there is a "Getting the Picture" segment for each graph type. In this segment, students are taught a method for getting the general idea, or "picture," of each of the three types of graphs. In this lesson segment for bar graphs, students are given practice in making predictions (with appropriate warnings about the pitfalls of such activities in a place like the stock market) based on the information in a graph.

After students have learned the strategies for finding information in graphs, the Document Literacy System provides a series of lesson segments in which students are taught to look more critically at graphs. One of these segments looks at how the presentation of information in a graph can affect the conclusion that is drawn from the graph. Another segment shows how changing the scale can affect the impression a graph makes. The third segment shows that, although graphic documents tell what happened, they do not tell why. These use lesson segments give students a chance to look critically at graphic documents, which are used more and more carelessly in popular culture to "prove" points they really do not make. The hope of the inventors is that students will not be intimidated by seeing graphic documents but rather will learn to look carefully and skeptically at them, extract their general idea, and evaluate their effectiveness.

Each part of the format described above is illustrated with a graph and a series of questions. There are usually three or four questions included with each point. The questions often concern points with which the students will be familiar through the use of the present invention, such as more than one answer, synonyms, and outside knowledge. The NEXT QUESTION icon can be used by the instructor to control the amount of practice students receive.

Figure 204:
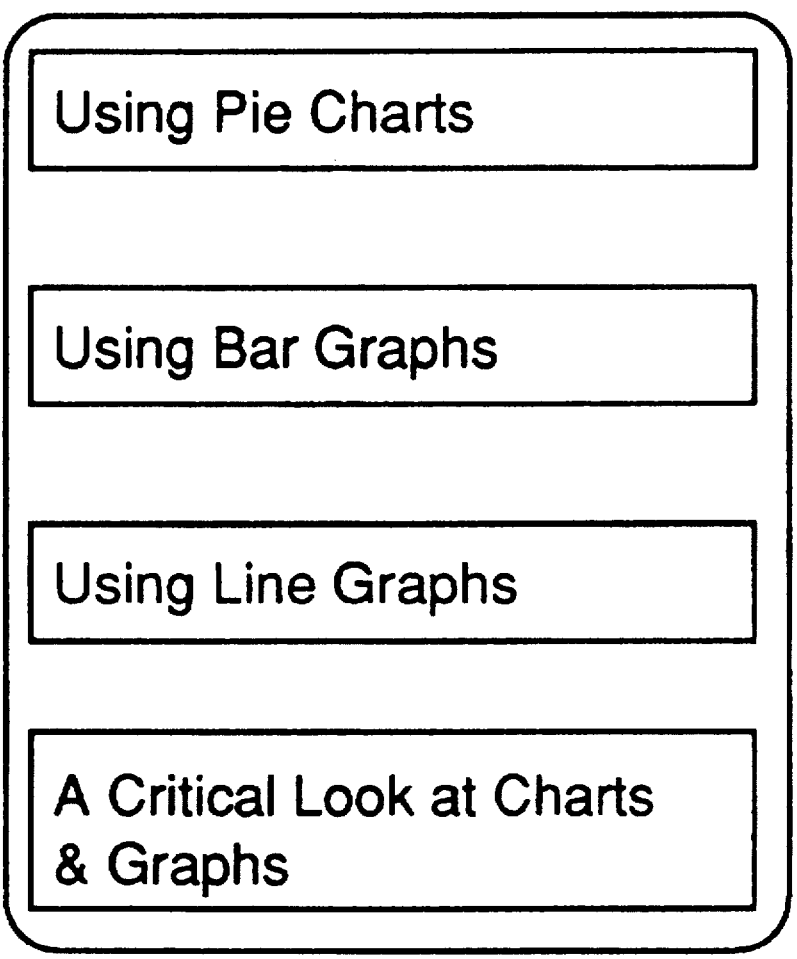

In accordance with the Knowledge Model Procedure, the Computerized Literacy System requires students to choose from among a reasonably limited number of use lesson segments. The lesson segment menu is in FIG. 204.

(1) Pie Charts

Figure 205:
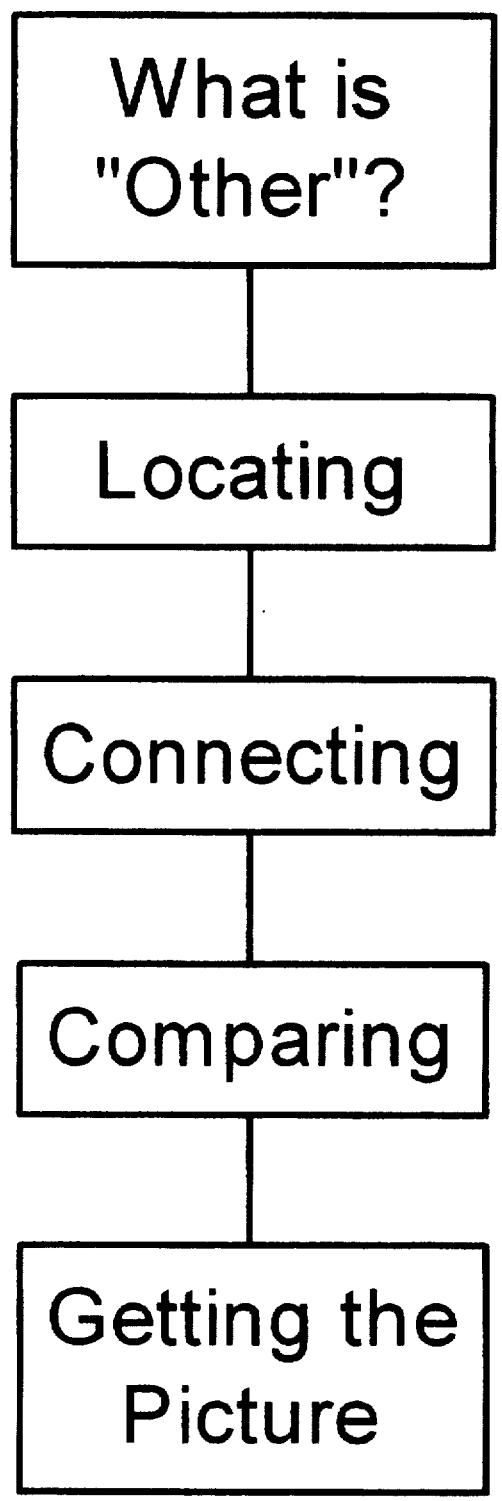

The Computerized Literacy System offers students a choice of several use lesson segments on pie charts. The lesson segment menu is in FIG. 205.

In the first use lesson segment for pie charts, "What is 'Other'?", students are taught that pie charts sometimes have a piece called "Other," which contains categories too small to list separately on the pie chart.

Figure 206:
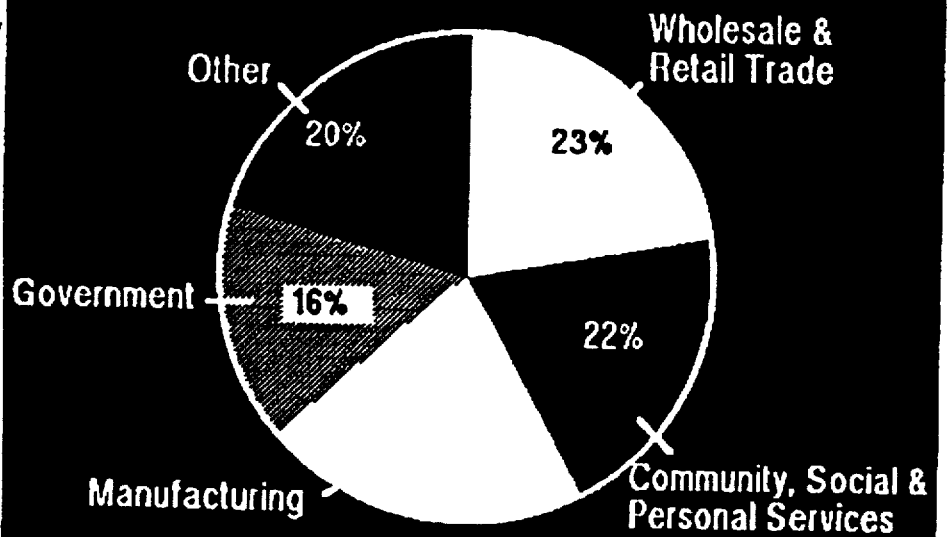
Figure 207:
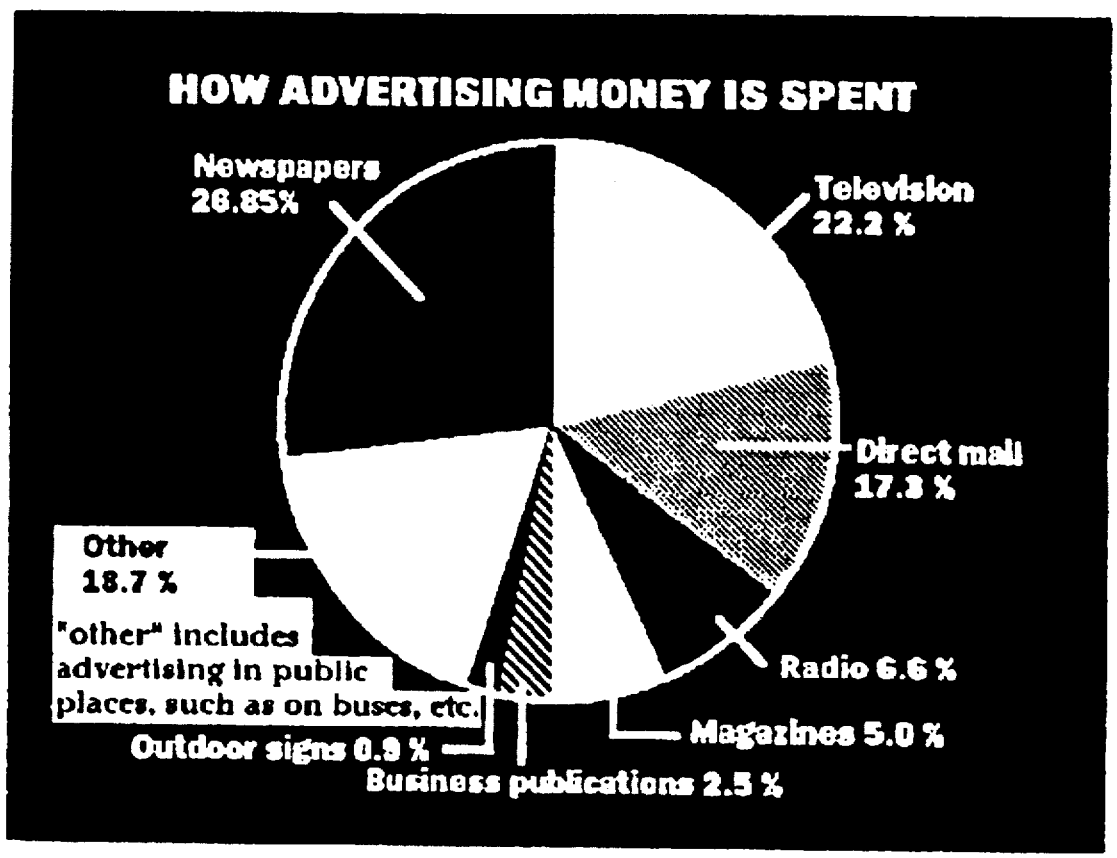
Figure 208:
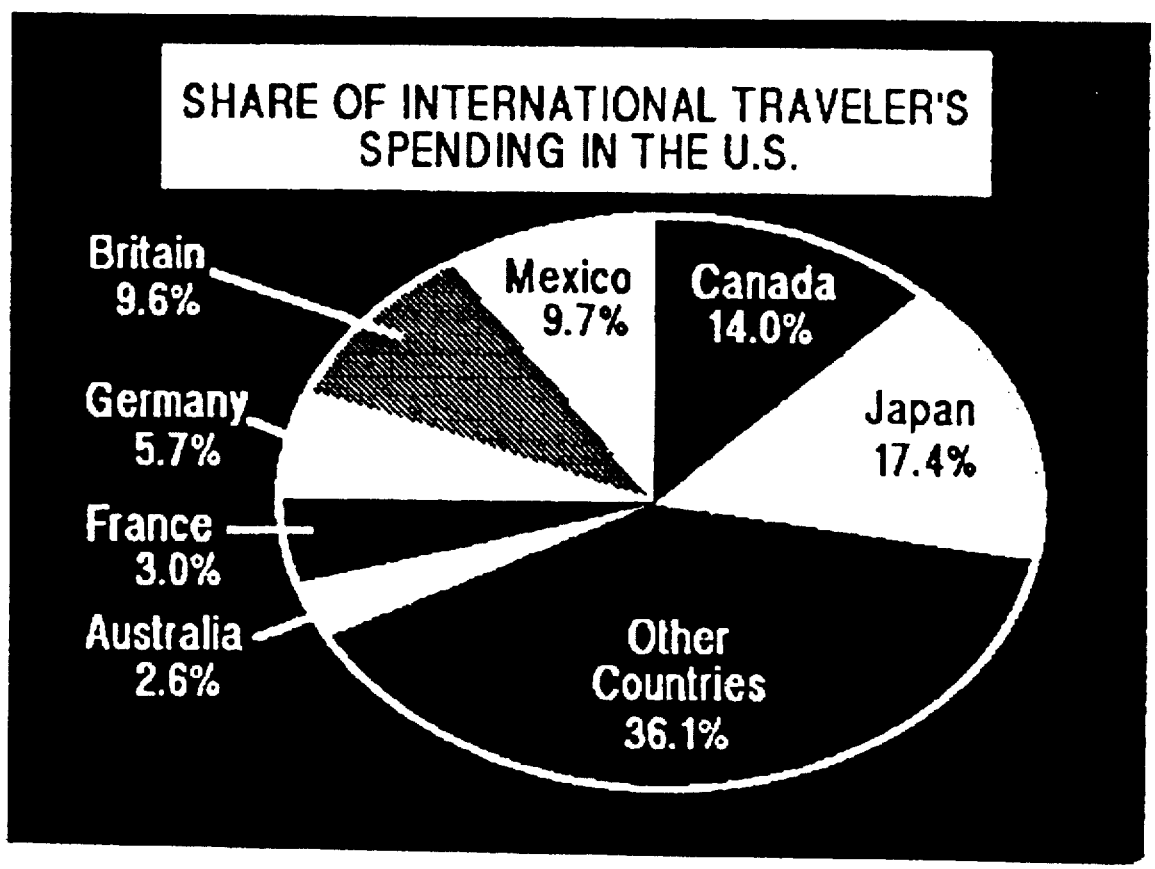
Figure 209:
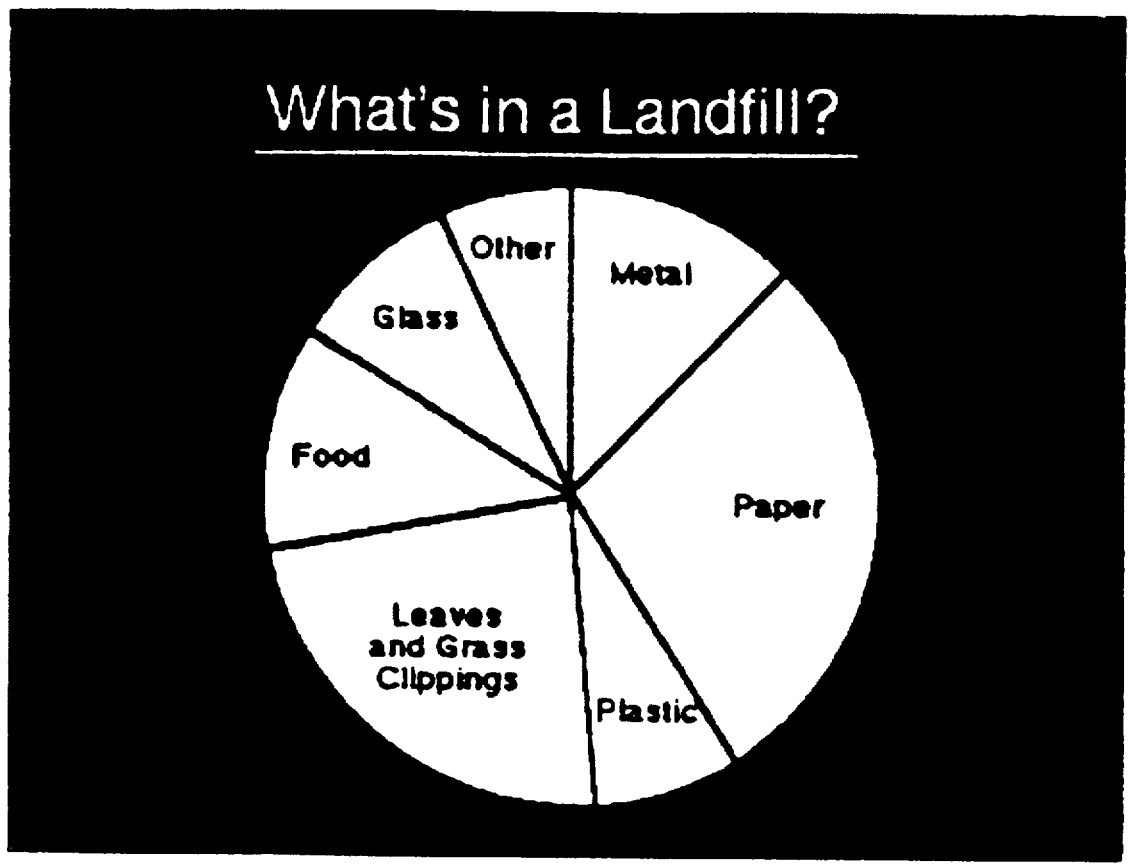

The Lesson Segment. Students are first told that, Some pie charts have a piece called "Other". Sometimes the "Other" piece contains several categories too small to list separately in the pie chart. (Text is italicized herein to indicate it appears on a screen display.) Students are then shown the screen displays in FIG. 206 and are asked to click on all the categories on the list, FIG. 206a, that belong in "Other" on the pie chart, FIG. 206b. They are then taught that, Some pie charts list what "Other" means, and are shown the screen display in FIG. 207 as an example. Next, they are shown the screen display in FIG. 208, and told, But most pie charts do not list the contents of "Other." It just means "everything else." Finally, they are taught that, Sometimes you just have you to use what you know to guess what "Other" might be. The screen display in FIG. 209 is shown as an example, and students are asked, What might "Other" contain?

Summary. Space is limited in a pie chart, so all the smallest categories usually get combined into one larger category called "Other."

The second use lesson segment for pie charts, "Locating," points out to students that, although they are familiar with the strategy of locating through the use of the present invention, there are many factors that can make locating information on a pie chart more difficult.

The Lesson Segment. Students are first taught that, As with other documents, telling whether something is listed on a pie chart or not is locating. They are asked, Where might you locate something on a pie chart?, and are given the following choices presented as a menu: (1) on the title; (2) on a subtitle; (3) on the amounts; and (4) on the legend. When students click on a selection, they are shown a pie chart on a screen display with the appropriate area highlighted. All four choices must be selected before advancing to the next screen display.

Figure 210:
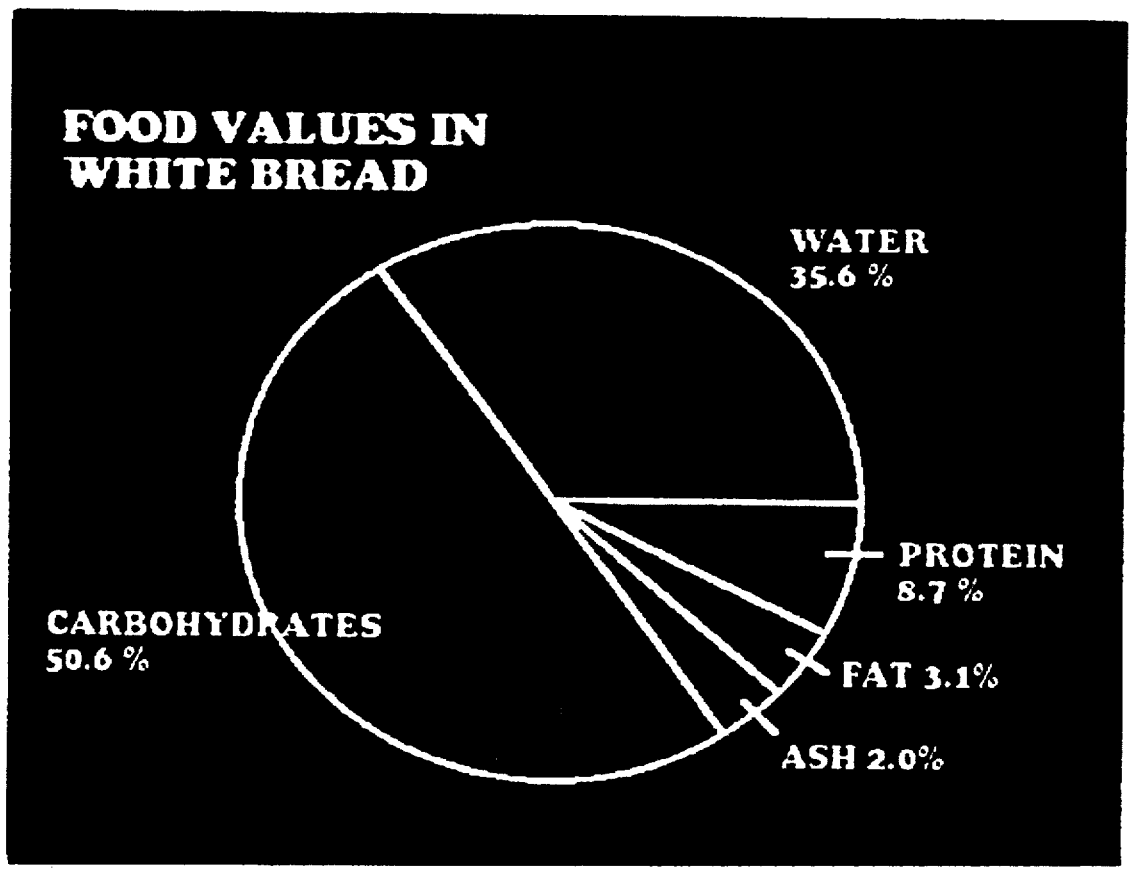

Next, students are taught that, As with locating questions for other documents, locating questions for pie charts usually have yes or no answers. They are then asked a series of questions based on the screen display in FIG. 210: (1) Is fat listed on the pie chart? (2) Are carbohydrates listed on the pie chart? (3) Is protein listed as a food value in white bread? (4) Is food coloring listed?

In the next part of this use lesson segment, students are presented with the question, What can make locating on a pie chart more difficult?, and are given a menu of the following four choices: (1) Lots of pieces; (2) Lots of words; (3) Outside knowledge; and (4) Pieces that are categories. Students click on a choice to receive an explanation of how this factor can make locating more difficult, and to be shown a pie chart as an example of that factor.

Figure 211:
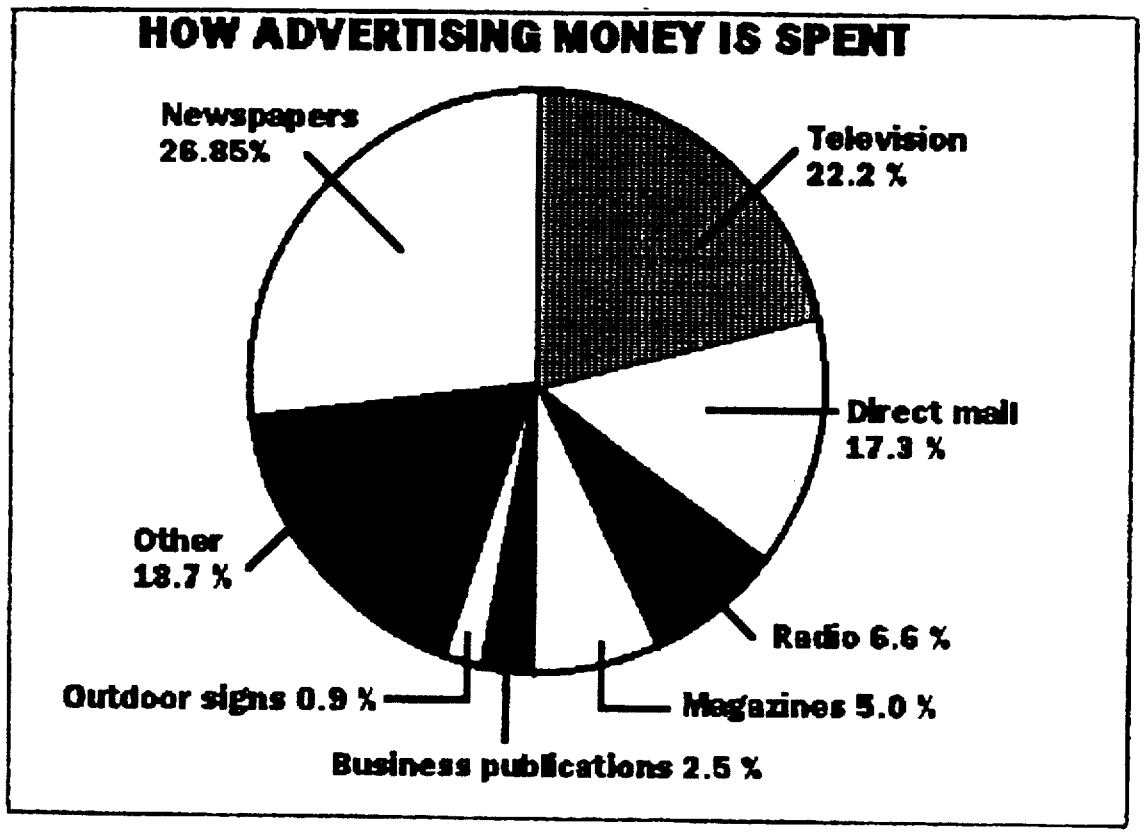

When students click on "Lots of pieces," they are shown the screen display in FIG. 211, and are asked a series of questions: (1) Is television listed? (2) Is advertising money spent on radio? (3) Are outdoor signs listed? By clicking on SHOW ME, students receive instruction on how the presence of many pieces in the pie chart on the screen make locating individual pieces more difficult.

Figure 212:
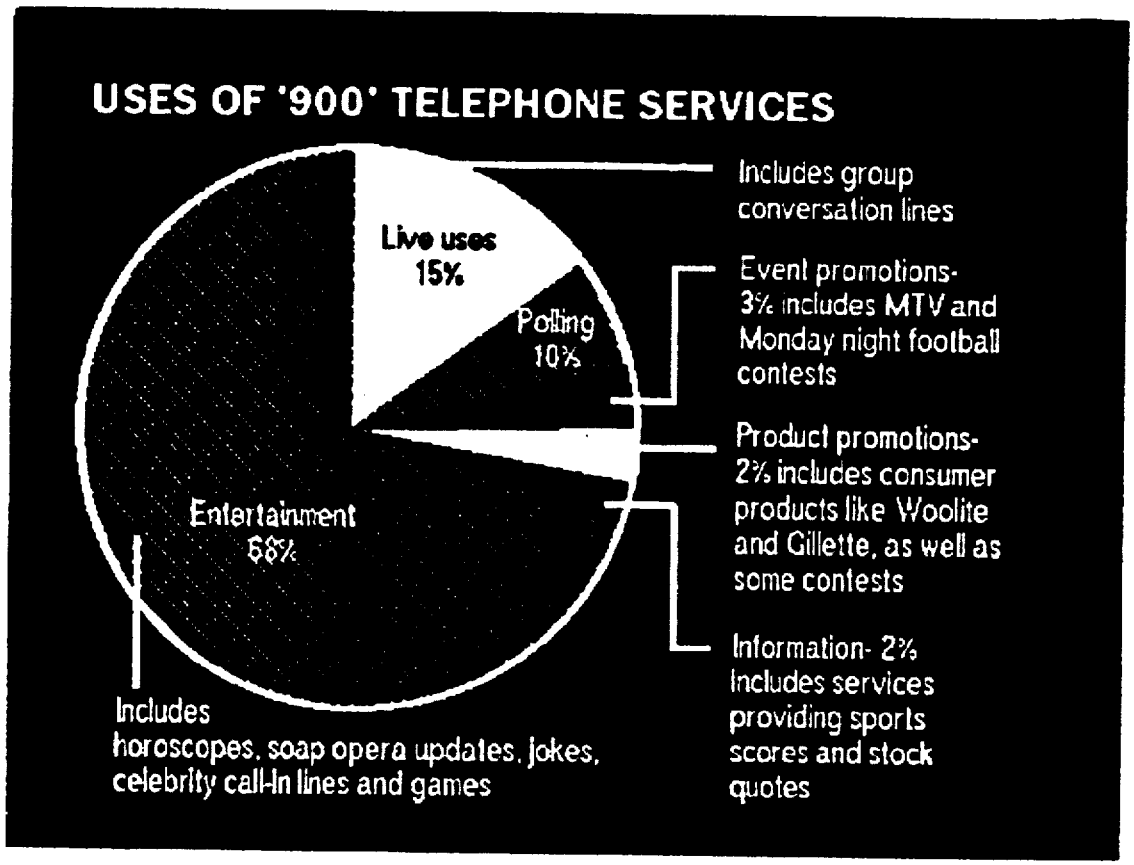

When students click on "Lots of words," they are shown the screen display in FIG. 212, and are asked the following series of questions: (1) Are jokes listed as a use of '900' numbers? (2) Are sports scores services listed? (3) Are group talk lines listed? (4) Is the weather forecast listed? By clicking on SHOW ME after each question, students receive instruction on how the presence of many words in the pie chart make locating individual pieces more difficult.

Figure 213:
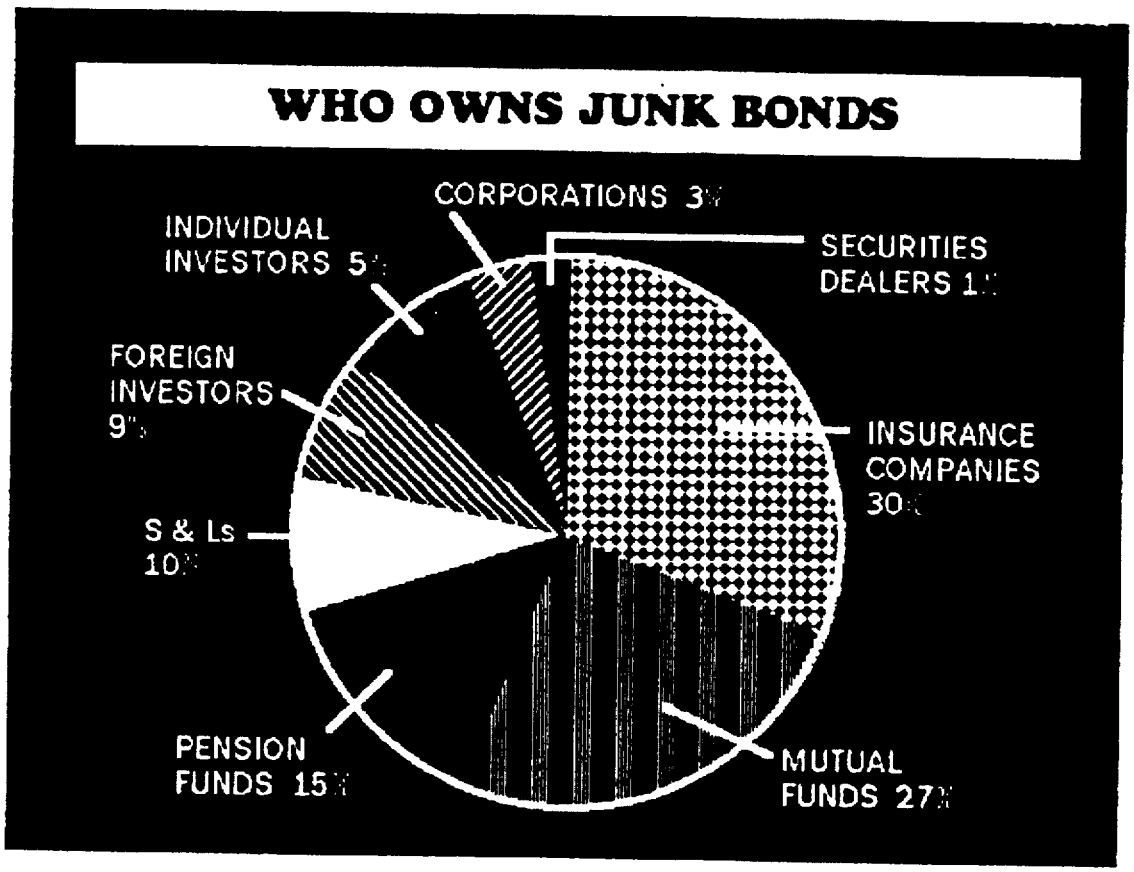

When students click on "Outside knowledge," they are shown the screen display in FIG. 213, and are asked a series of questions: (1) Are pension funds listed? SHOW ME: This is an exact match, showing that it is possible to answer some questions without knowing exactly what the words mean. (2) Are savings and loans listed? SHOW ME: This is a synonym and an outside knowledge question, showing that you have to know or guess that "S&Ls" stands for savings and loans before you can answer the question. After these questions, students are reminded that, Nobody can know all the special terms there are to know. What can you do if you do not know some special terms? SHOW ME: look it up in a dictionary; ask someone who is likely to know what the words mean; or, try to relate the unfamiliar term to other words around it.

Figure 214:
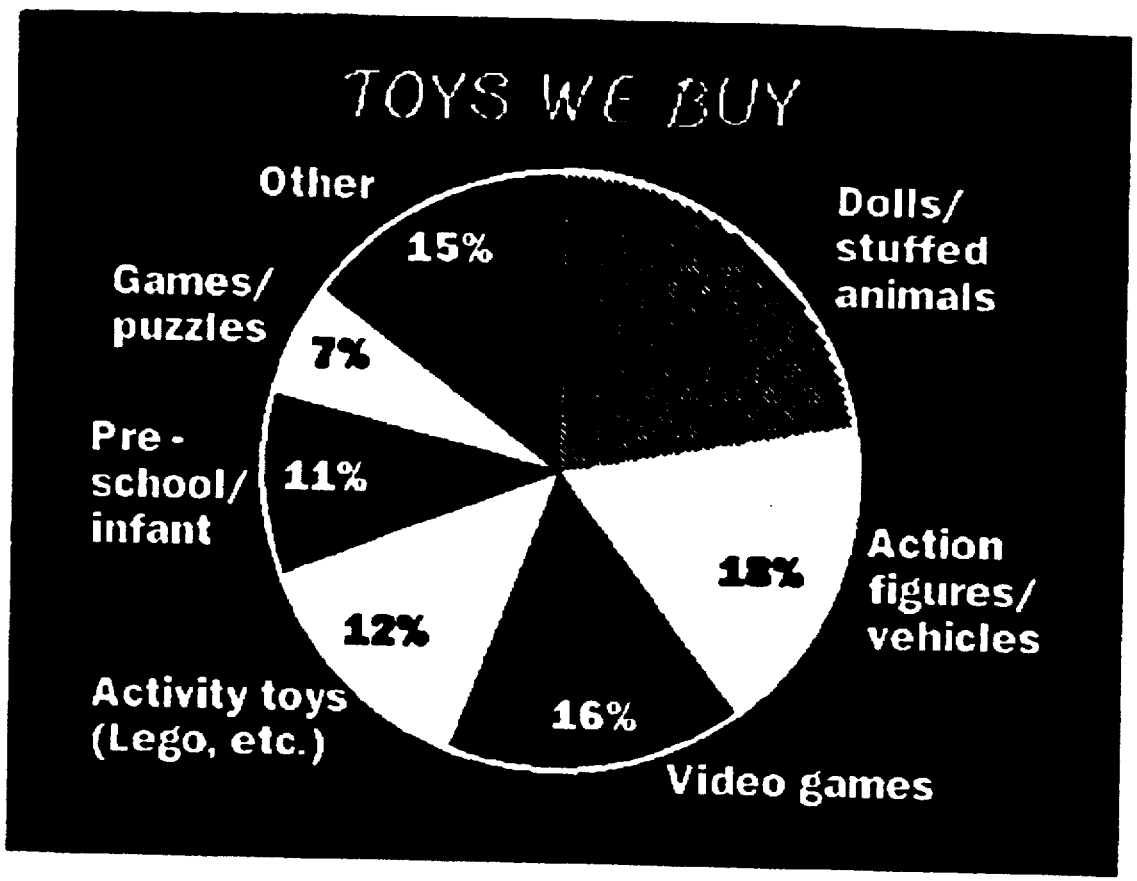

When students select "Pieces that are categories," they are told that, Sometimes you have to figure out whether the item you are locating fits into one of the categories on the pie chart. They are then asked a series of questions based on the screen display in FIG. 214: (1) Are trucks included in the pie chart? (2) Are teddy bears included? (3) Are building blocks included? By clicking on SHOW ME, students receive instruction on the process of locating individual items in a pie chart broken down into categories.

Summary. Locating on a pie chart means finding information on a particular part of the graph.

In the third use lesson segment for pie charts, "Connecting," students apply the strategy of connecting, which they were taught through the use of the present invention, to pie charts. They are taught that connecting is the strategy that most helps one explore the relationship between lists and pie charts; because a pie chart is a way of displaying a certain kind of two-column combined list, anything that can be done with a combined list can also be done with a pie chart.

Figure 215:
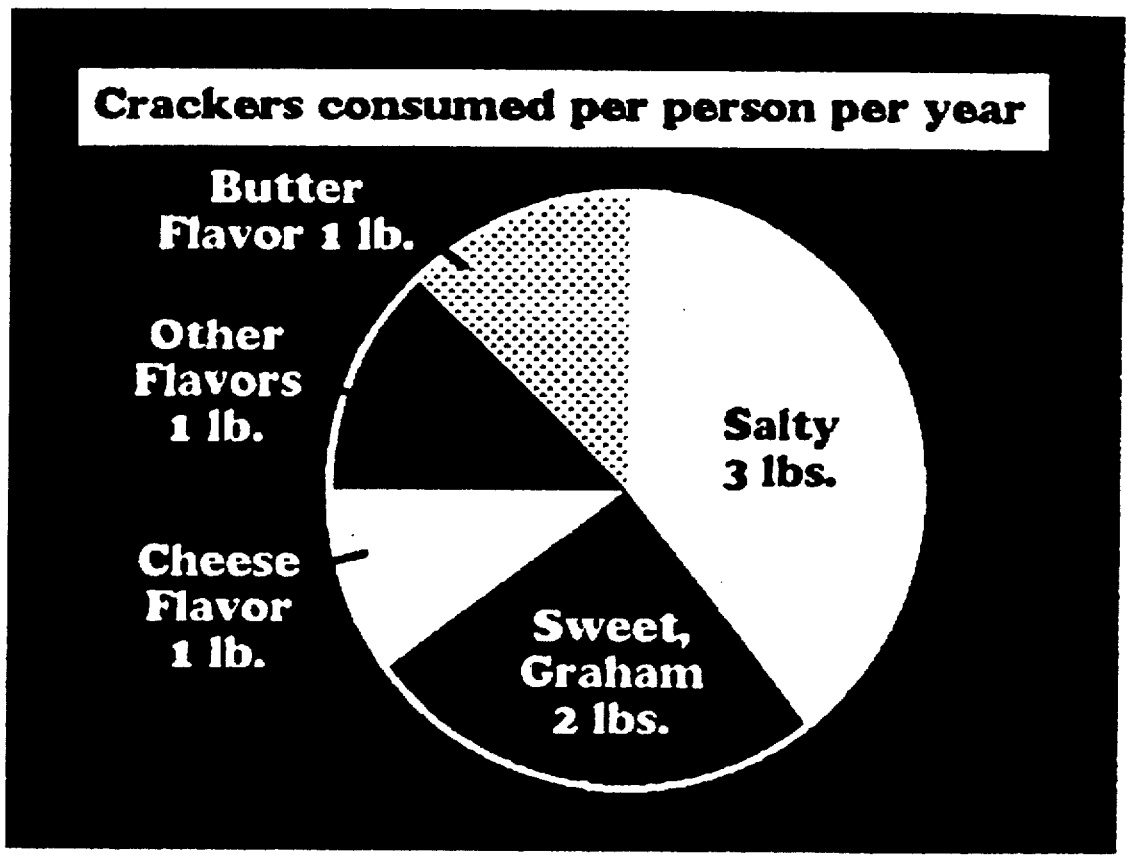

The Lesson Segment. Students are first taught that, To answer some questions about a pie chart, you have to connect an amount with a word. They are then shown the screen display in FIG. 215, and are presented with a series of questions and points: (1) How many pounds of sweet or graham crackers does the average person consume in a year? (2) As with other documents, you can connect in either direction. What kind of cracker does the average person eat three pounds of per year? (3) There may be more than one answer to a connecting question. On the average, each person eats 1 pound per year of what kinds of crackers? By clicking on SHOW ME, students are shown the clues in the questions that let them know that there is more than one answer.

Figure 216:
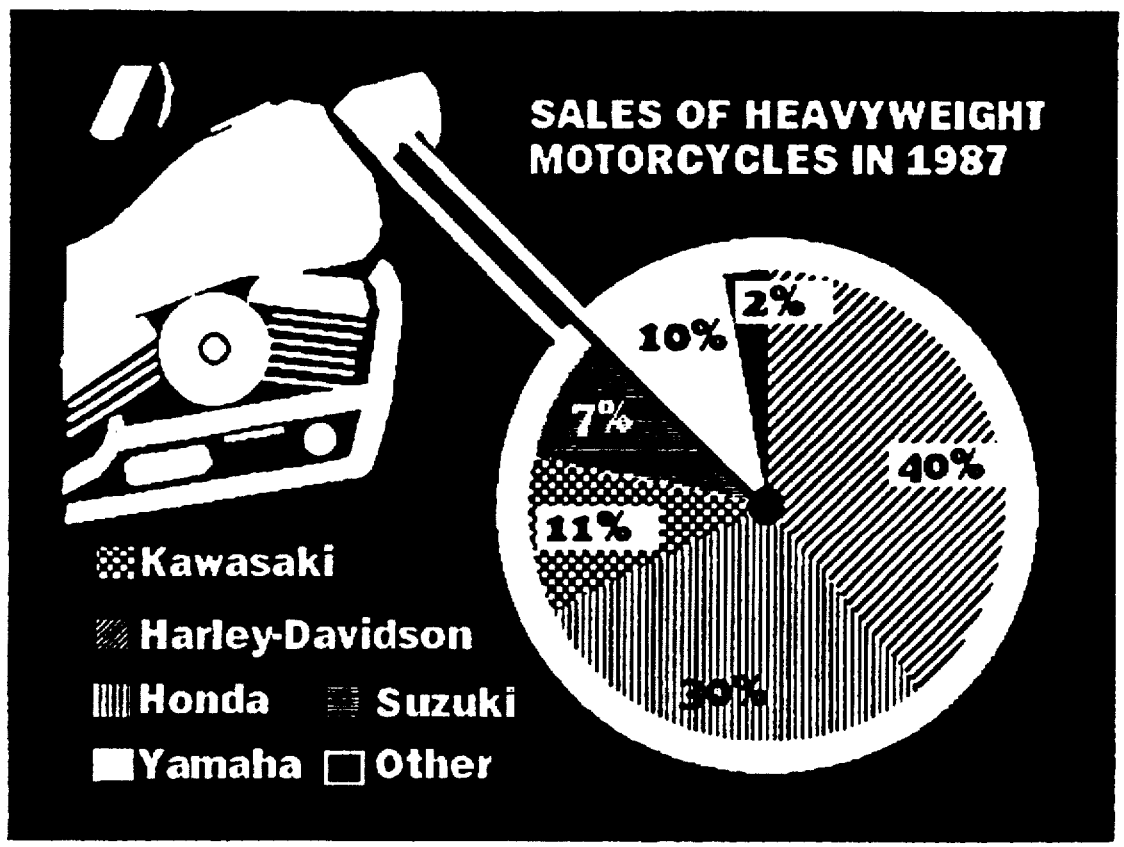

In the final part of this use lesson segment, students are taught that, When the words you are connecting are outside the pie chart (i.e., when there is a legend), connecting can be more difficult. They are then asked a series of questions based on the screen display in FIG. 216: (1) How much of the motorcycle market did Suzuki have in 1987? (2) Which company had 10% of the market? (3) How much of the market did the American motorcycle have? SHOW ME: This is an outside knowledge question.

Summary. Connecting on a pie chart is linking a word with an amount.

In the fourth use lesson segment for pie charts, "Comparing," students are taught that since pie charts show the parts of something in relation to the whole, one of the most common uses of pie charts is comparing. They are also taught that in a pie chart one can compare the amounts or the sizes of the pieces.

Figure 217:
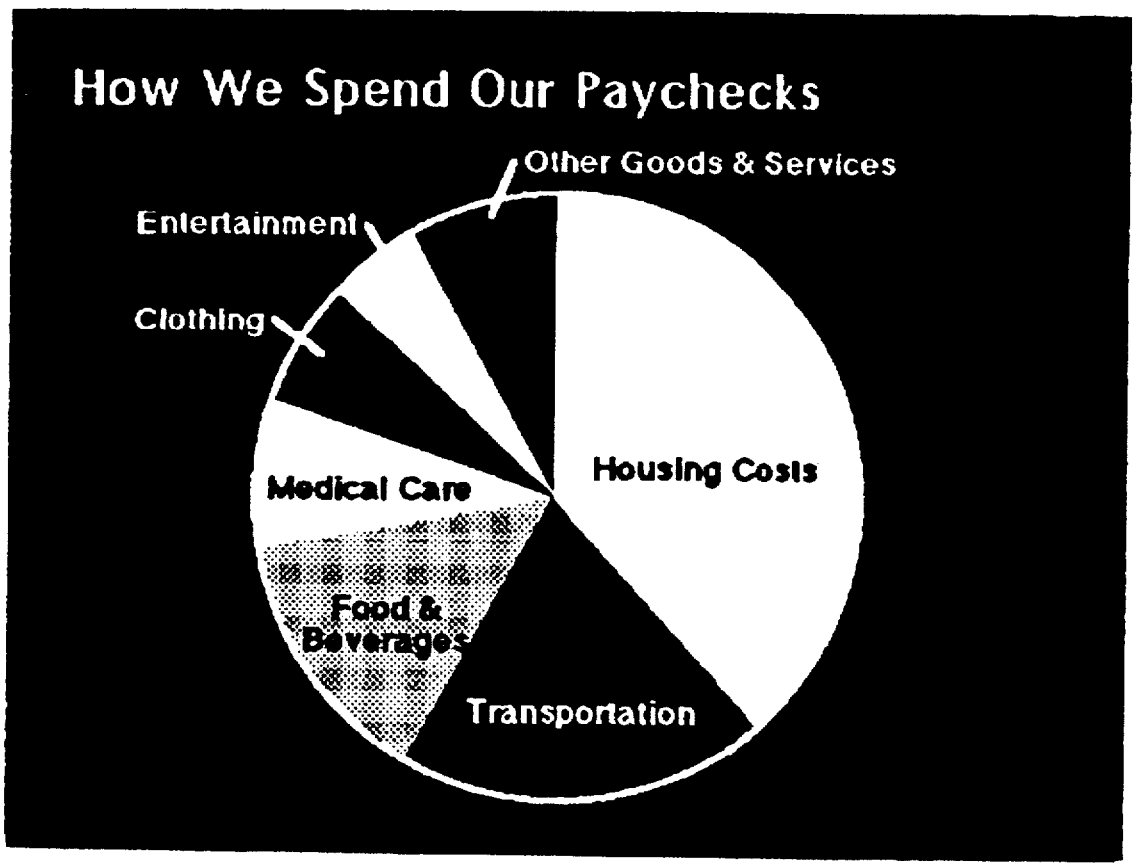

The Lesson Segment. Students are first told that, Like comparing questions about other documents, questions about pie charts have clue words that tell you you need to compare. Sometimes you compare just by looking at the sizes of the pieces. They are then shown the pie chart in the screen display in FIG. 217, and asked a series of questions: (1) What do we spend the largest portion of our paychecks on? (2) Do we spend more on transportation or medical care? (3) What do we spend the smallest amount on? Before being asked the next series of questions based on the same screen display, students are taught that, You answer most comparing questions by connecting and then comparing. They are then asked: (1) Do we spend more on clothing or entertainment? (2) Do we spend more on food and beverages or transportation? (3) Do we spend more on clothing or healthcare?

Figure 218:
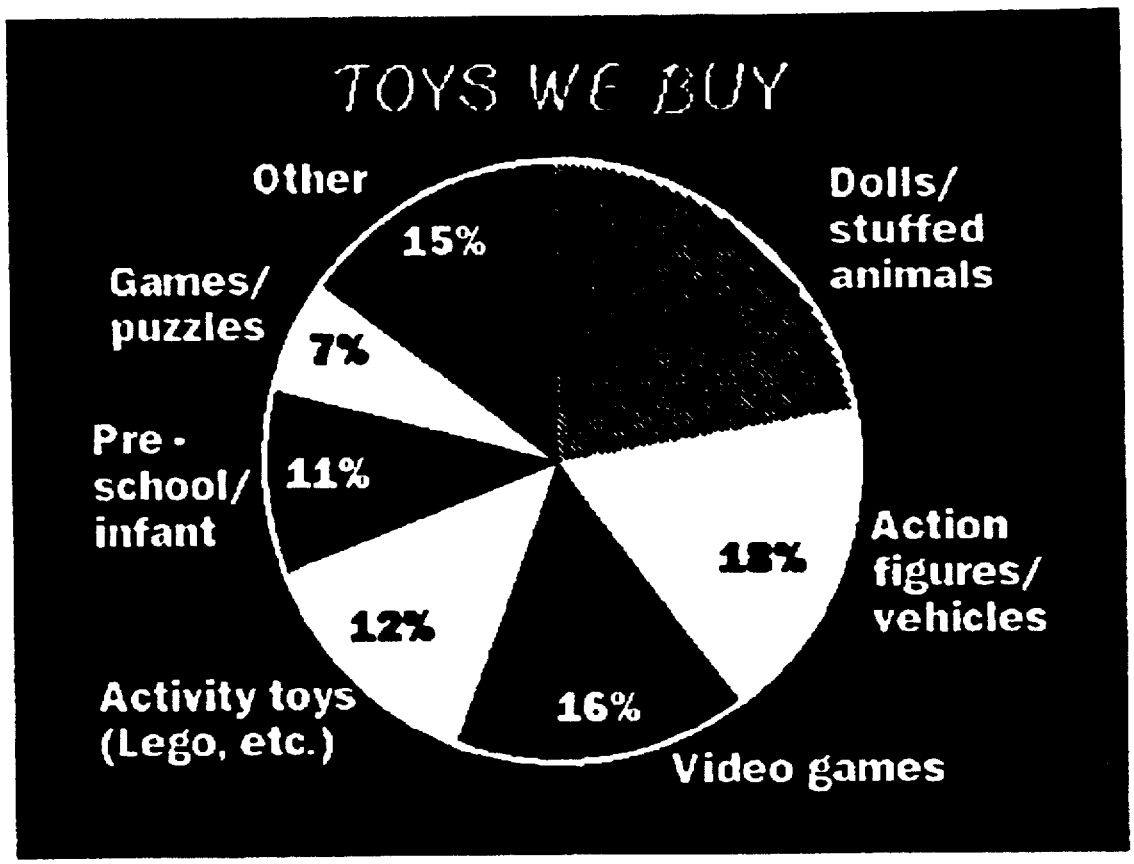
Figure 219:
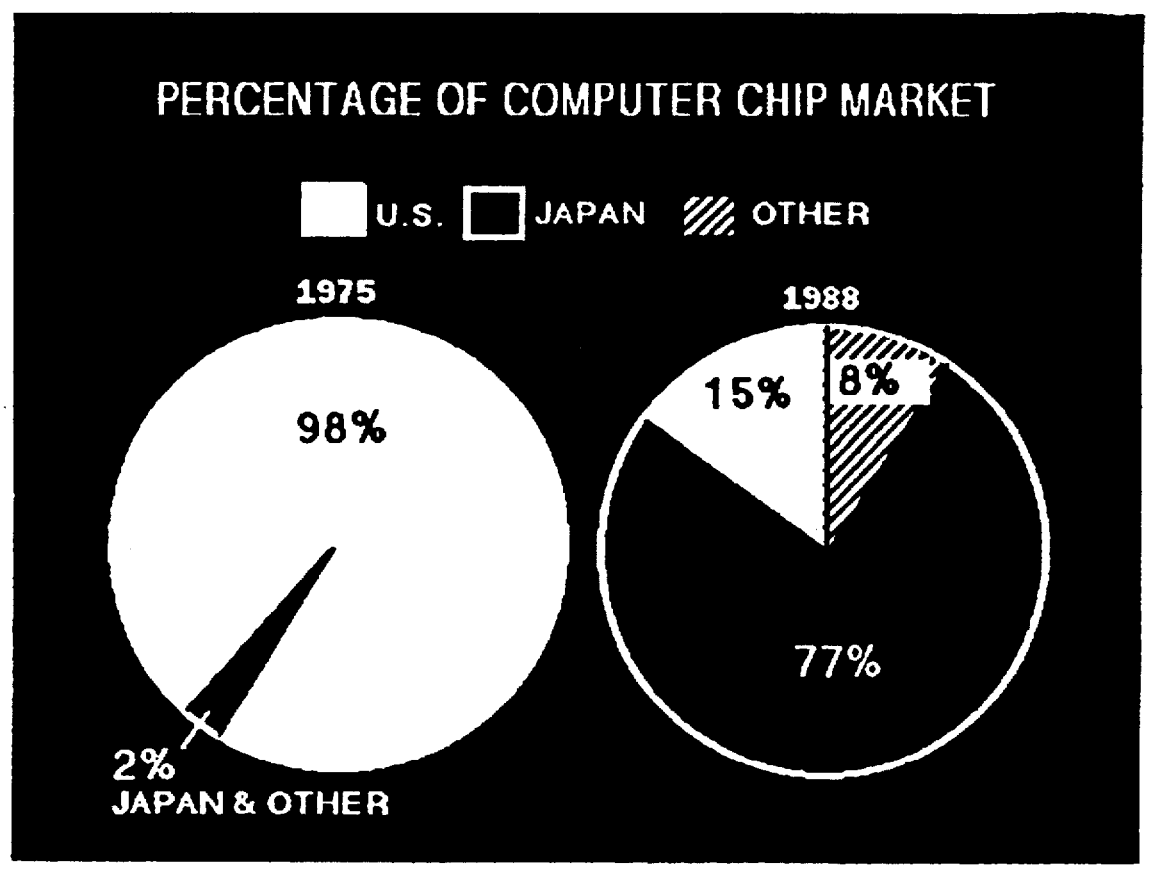
Figure 220:
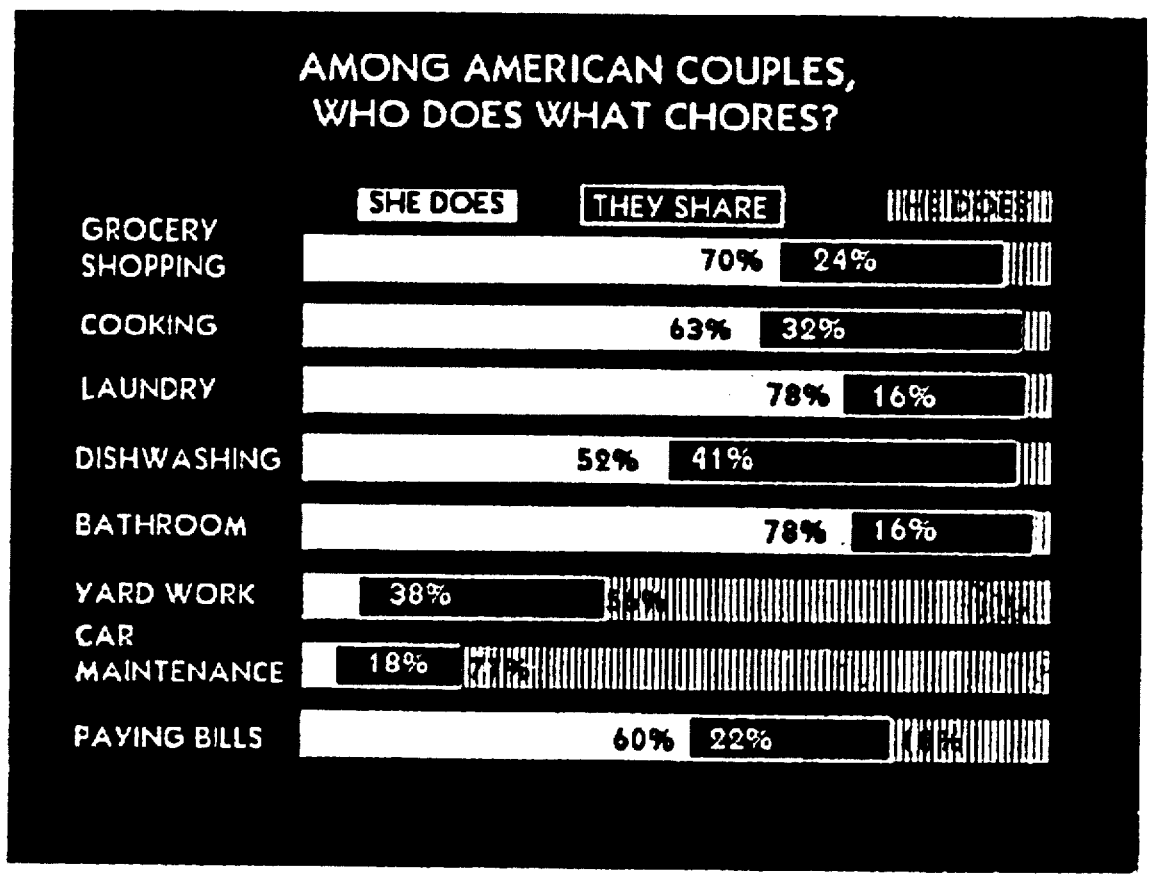

Next, students are shown a series of screen displays, and a point and question is given for each: (1) They are shown the screen display in FIG. 218 and told, Comparing is more difficult when you have many pieces of similar sizes. Based on the pie chart in the display, students are asked, Which category of toys sells more? (2) They are shown the screen display in FIG. 219 and told, Sometimes you compare amounts in more than one pie chart. Based on the pie chart in the display, they are asked, In which year was the United States' share of the computer chip market greater? (3) Students are shown the screen display in FIG. 220 and are told. When several pie charts are set next to each other they do not always look like pies. Based on the charts in the display, they are then asked a series of questions: (a) Who most often takes responsibility for car maintenance? (2) Who does most of the grocery shopping? (3) Do more men do car maintenance than women do laundry? (4) Do men and women share more yard work or laundry?

Summary. When you use pie charts you can compare: (1) the sizes of the pieces, and (2) the amounts.

In the fifth use lesson segment for pie charts, "Getting the Picture," students are taught a method for getting what tests often call "the main idea" or a "general idea," without giving them the notion that there is only one general idea for them to get. The segment uses the idea that a pie chart is a picture of amounts to teach students to look at the overall impression, or picture, the graph makes. The inventors hope that giving students a method they can use with every graph will help them approach even the most unfamiliar pie chart without fear.

The Lesson Segment. Students are first taught that: A pie chart is a picture of something divided into parts. One use of a pie chart is getting a general sense of the picture. One way to begin getting a general sense of the picture is to look at the title. They are then shown the pie chart in the screen display in FIG. 221, which builds from a circle to a pie with pieces, to a pie with numbers, as the lesson progresses. The students are then asked, What does this whole pie represent? The next screen display indicates, It represents the total amount of money one town has to spend.

Figure 221:
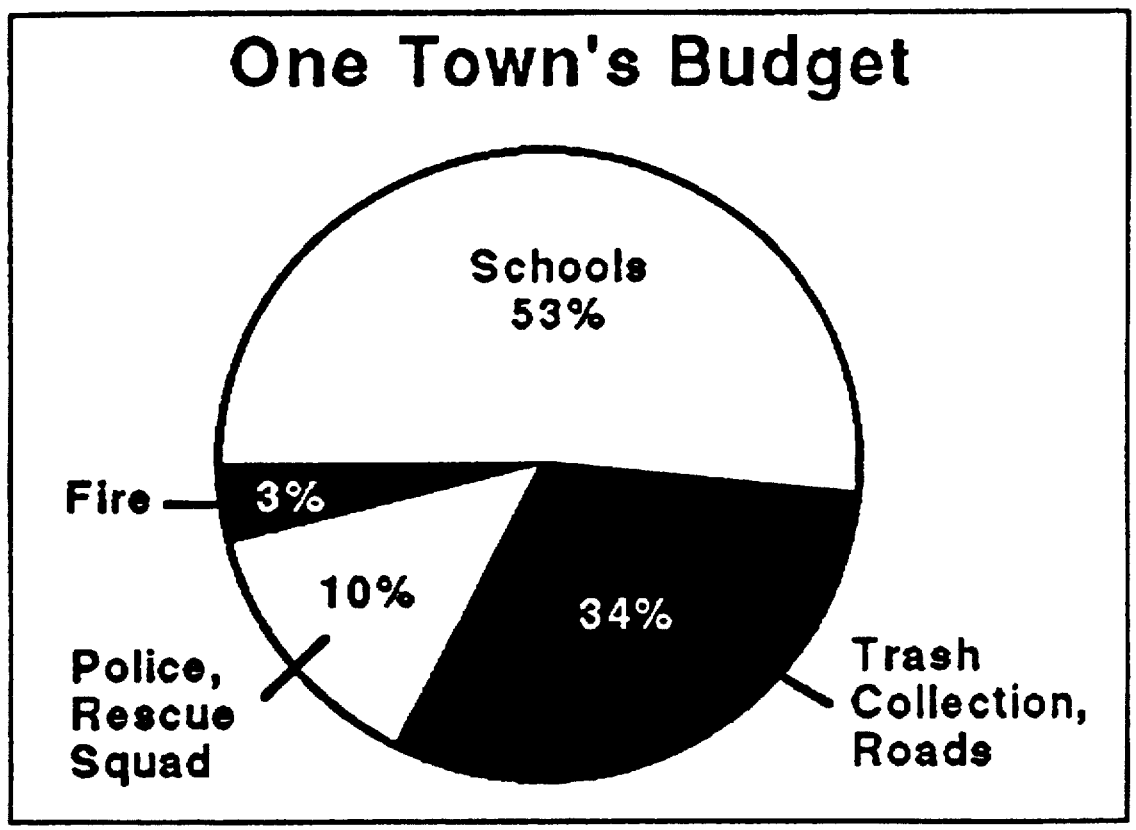

Next, students are told, You could look next at what the pieces represent, and they are instructed to drag with the mouse the names of the pieces from the pie chart in FIG. 221 to the computer monitor. The sizes of the pieces tell you something, too. Based on the same screen display, students are asked, Which is the largest piece? Students are told to click on the document to answer. Finally, they are taught that, You can put the title and the largest piece together to express a general sense of the pie chart, and are asked to Complete the following sentence by dragging the title and the name of the largest piece: _____ make up the largest portion of _____.

In the final part of this lesson segment, students are told that, If there really is no largest piece, maybe that's the idea of that particular pie chart. Every once in a while you find a pie chart in which the pieces are of nearly equal sizes.

Figure 222:
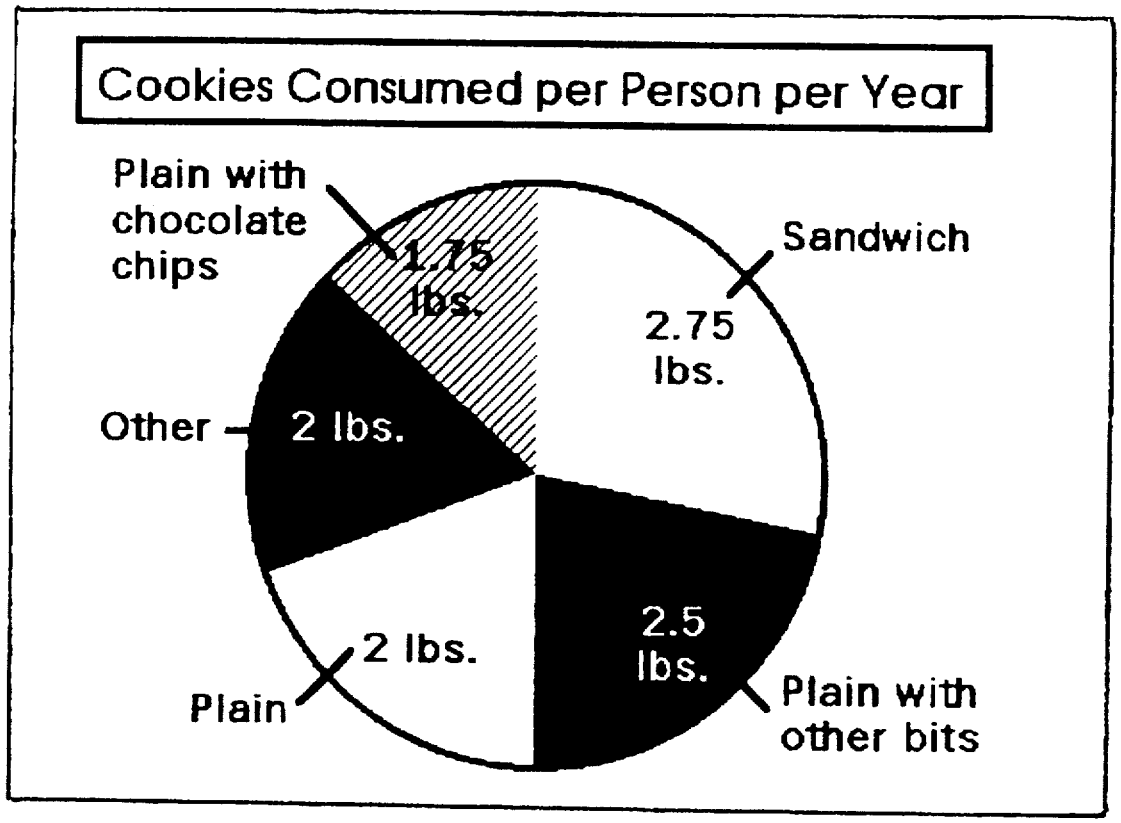

They are shown the screen display in FIG. 222, and are asked, What could be the general idea of this pie chart? SHOW ME: We eat nearly equal amounts of all kinds of cookies. We eat slightly more sandwich cookies than other kinds.

Summary. To get a sense of what a pie chart is about: (1) Look at the title. (2) Look at what the pieces represent. (3) Look at the sizes of the pieces.

(2) Bar Graphs

Figure 223:
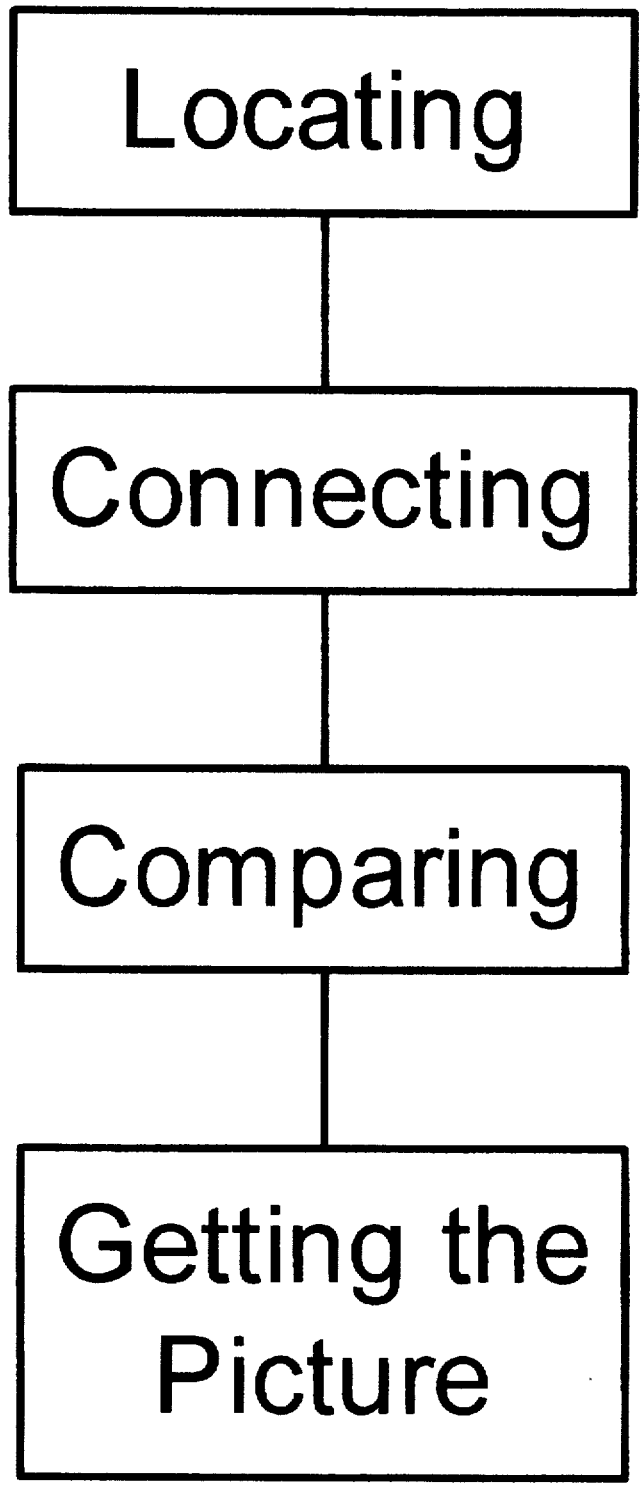

In accordance with the Knowledge Model Procedure set forth above, the Computerized Literacy System requires students to select from among a reasonably limited number of use lesson segments for bar graphs. The lesson segment menu is in FIG. 223.

In the first use lesson segment for bar graphs, "Locating," students are taught that locating on a bar graph, similar to locating on other documents about which they have received instruction through the use of the present invention, is finding information on a particular part of the graph.

The Lesson Segment. Students are first told that, Locating on a bar graph is finding information on a particular part of the graph. The places you can locate information on a bar graph are: on an axis, on a legend, on the numbers at the end of the bars, and on the title. These four places appear on the monitor as a menu, controlled by the MORE icon. Clicking on MORE will bring up the name of a place students can locate, and will highlight that place on the graph. For example, MORE will bring up "on a legend" and highlight the legend on the bar graph.

Figure 224:
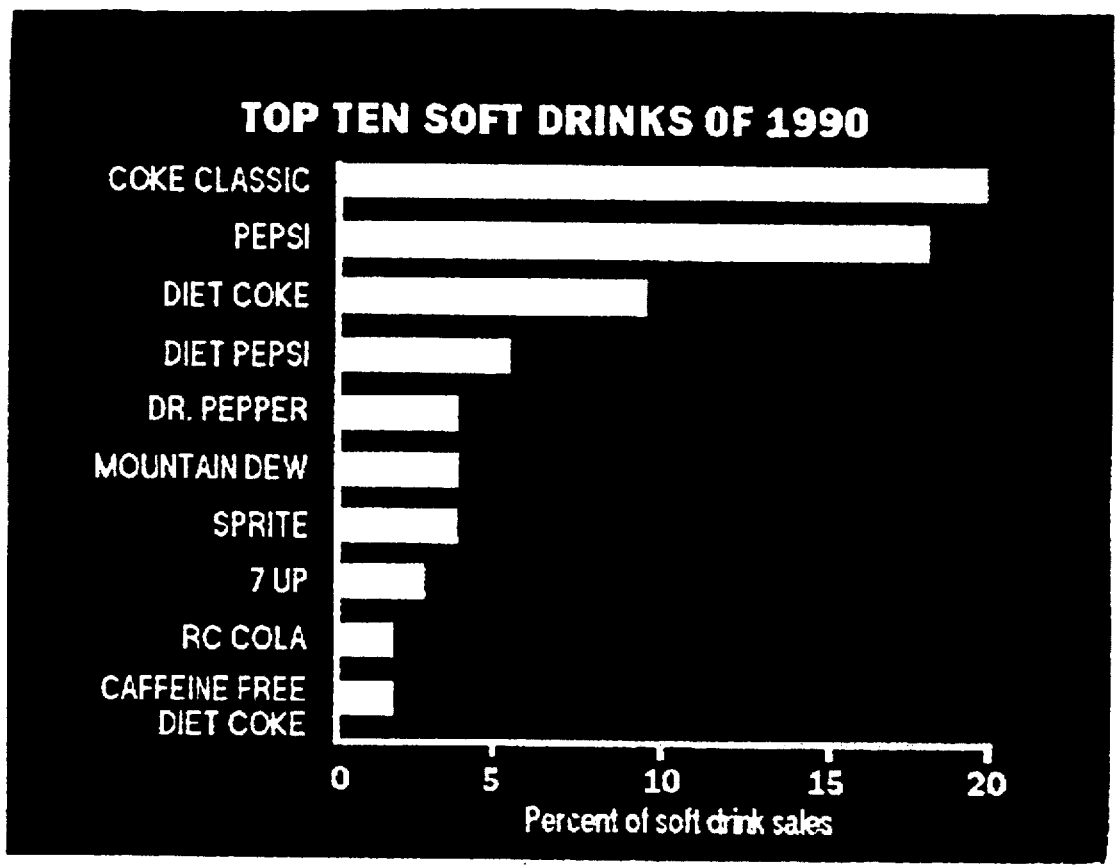

Next, students are taught that, Like other locating questions, a question that asks you to locate on a bar graph often has a "yes" or "no" answer. They are then asked a series of questions based on the screen display in FIG. 224: (1) Is Dr. Pepper on the graph? This question must be answered to get to the next screen display. (2) Is there a caffeine free drink on the graph? (3) Are there diet sodas on the graph? (4) Is there a 5% point on the scale? (5) Is there a Royal Crown Cola on the graph? SHOW ME: This is an outside knowledge question, since it helps to know that "RC" stands for "Royal Crown." (6) Directions sometimes tell you to mark the graph after you have located: Underline the words that tell you what the scale represents. Circle SPRITE on the list of sodas.

In the next part of this segment, students are presented with the question, What can make locating more difficult?, and are given two choices on the screen display that act as a menu: Outside knowledge and Lots of information. By clicking on each choice, students are shown a bar graph with a set of questions.

Figure 225:
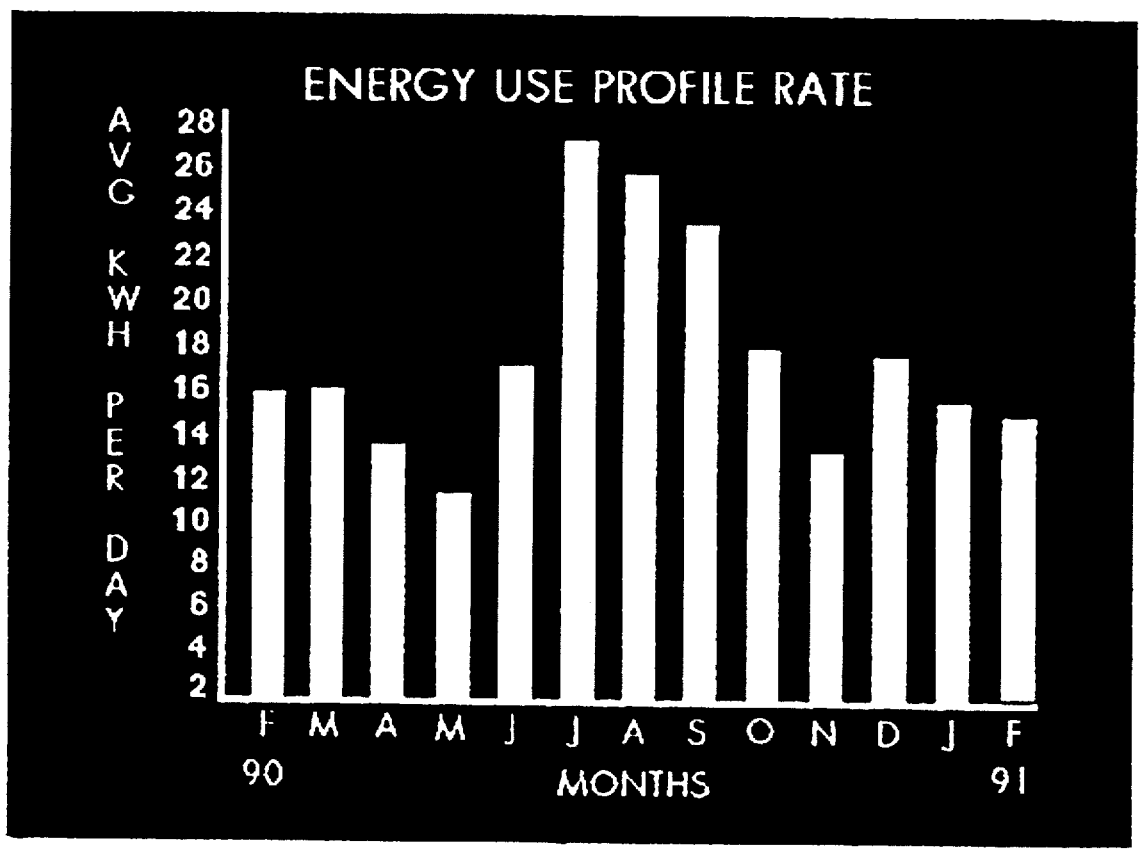

When students click on "Outside knowledge," they are shown the screen display in FIG. 225, and are asked a series of questions: (1) Are 6 Kilowatt hours on the scale? This question must be answered to get to the next screen display. (2) Are 30 kilowatt hours on the scale? (3) Is March represented on the scale? (4) Is October 1989 represented on the graph?

Figure 226:
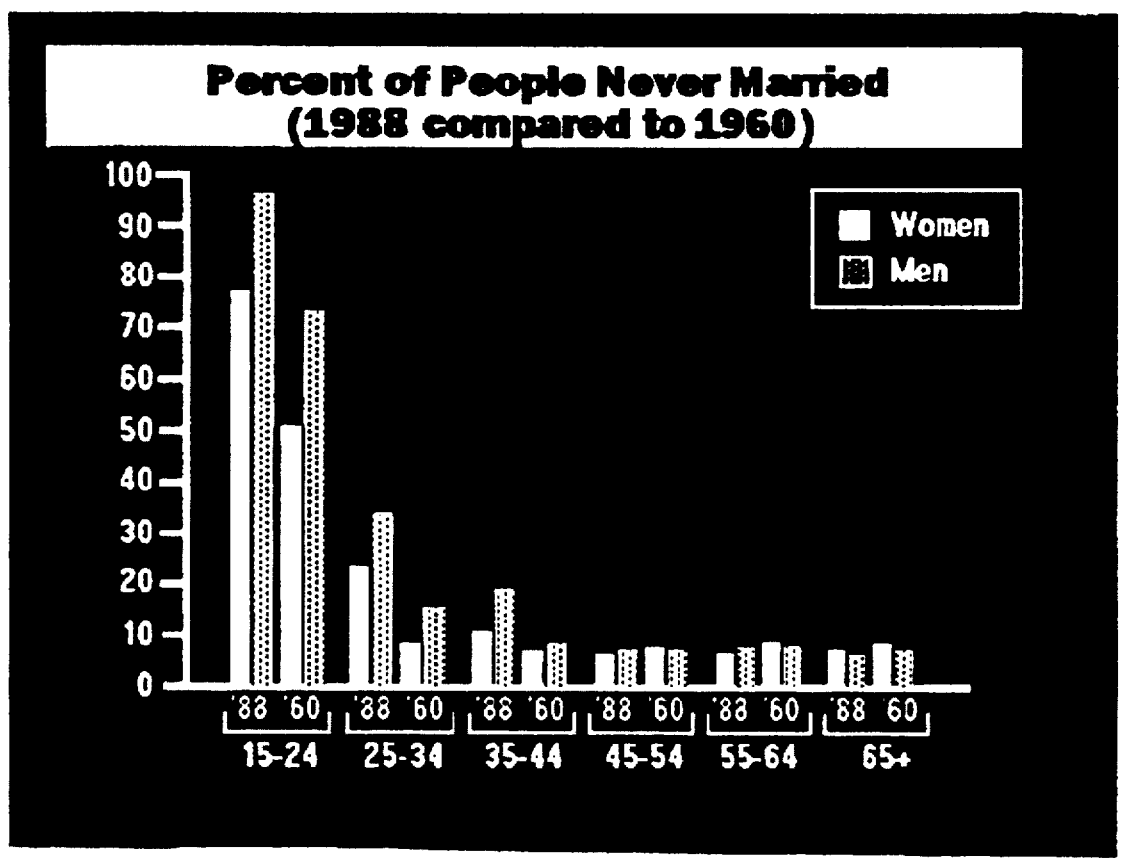

When students click on "Lots of information," they are shown the screen display in FIG. 226, and are asked a series of questions: (1) Is age 44 on the graph? This question must be answered to get to the next screen display. (2) Is age 53 on the graph? SHOW ME: You have to know that age group 45–54 includes age 53. (3) Is age 87 on the graph? SHOW ME: Outside knowledge—you have to know that "65+"includes 87. (4) Is 45% on the scale? SHOW ME: It's between 40 and 50. (5) Are women listed on the graph? SHOW ME: They're named on the legend.

Summary. Locating on a bar graph is finding information on a particular part of the graph.

In the second use lesson segment for bar graphs, "Connecting," students are taught that connecting is the strategy used to find out what the bars represent.

The Lesson Segment. Students are first taught that, Many questions about bar graphs require you to connect the name of the bar and the amount the bar represents. They are then shown the screen display in FIG. 227 and are told, You can connect in either direction, from the name to the scale (e.g., "On May 1, 32 students were present."), or from the scale to the name (e.g., "36 students were present on March 1.") If the amounts are printed at the tops of the bars, you have only to connect the top of the bar with the bottom. Based on the graph in the screen display, they are asked, How many students were present on June 1?

In the next section of this lesson segment, students are presented with the question, What can make connecting more difficult?, and are asked to click on one choice out of a menu: Large numbers, A scale that lacks detail, and Picture graphs. By clicking on a choice, students are shown a bar graph and asked a question.

Figure 228:
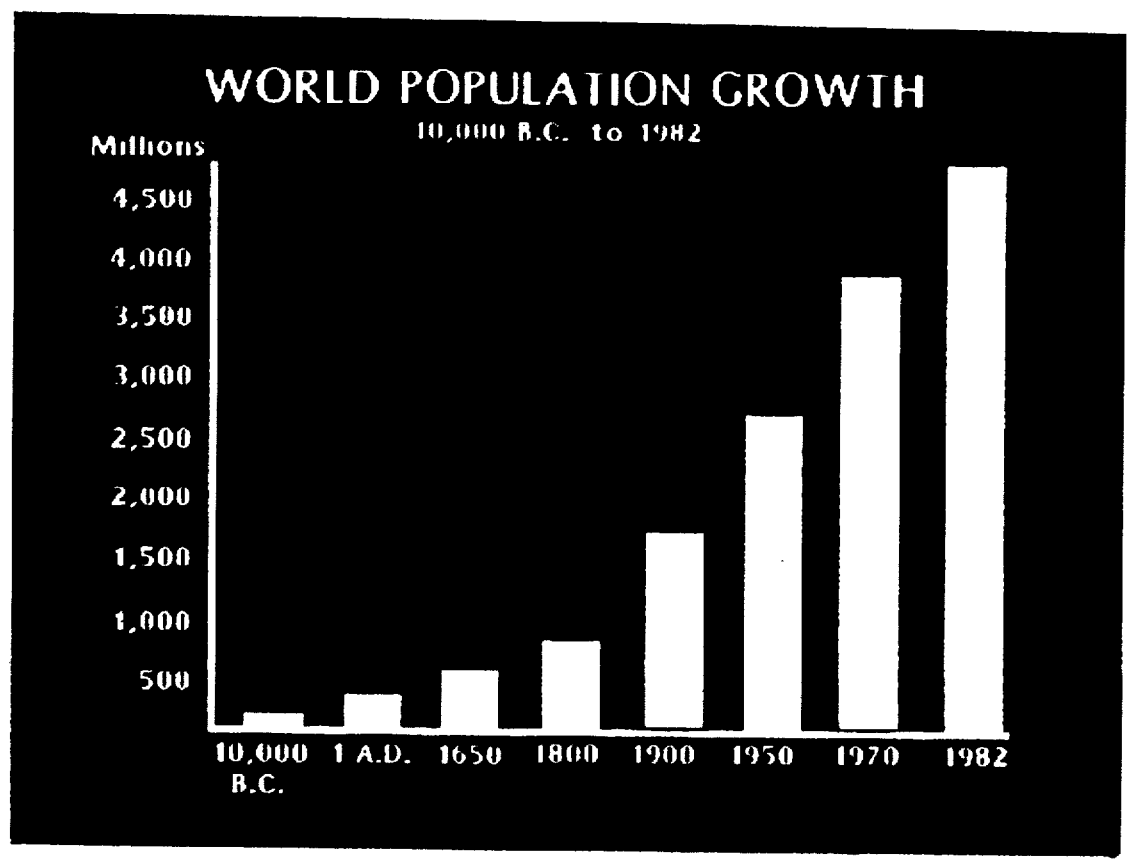

When students click on "Large Numbers," they are shown the graph in the screen display in FIG. 228, and are told, Large numbers are often abbreviated in the scale. When you deal with large numbers, you have to check to see what quantity the scale represents. They are then asked to, Estimate the world population in AD 1.

Figure 229:
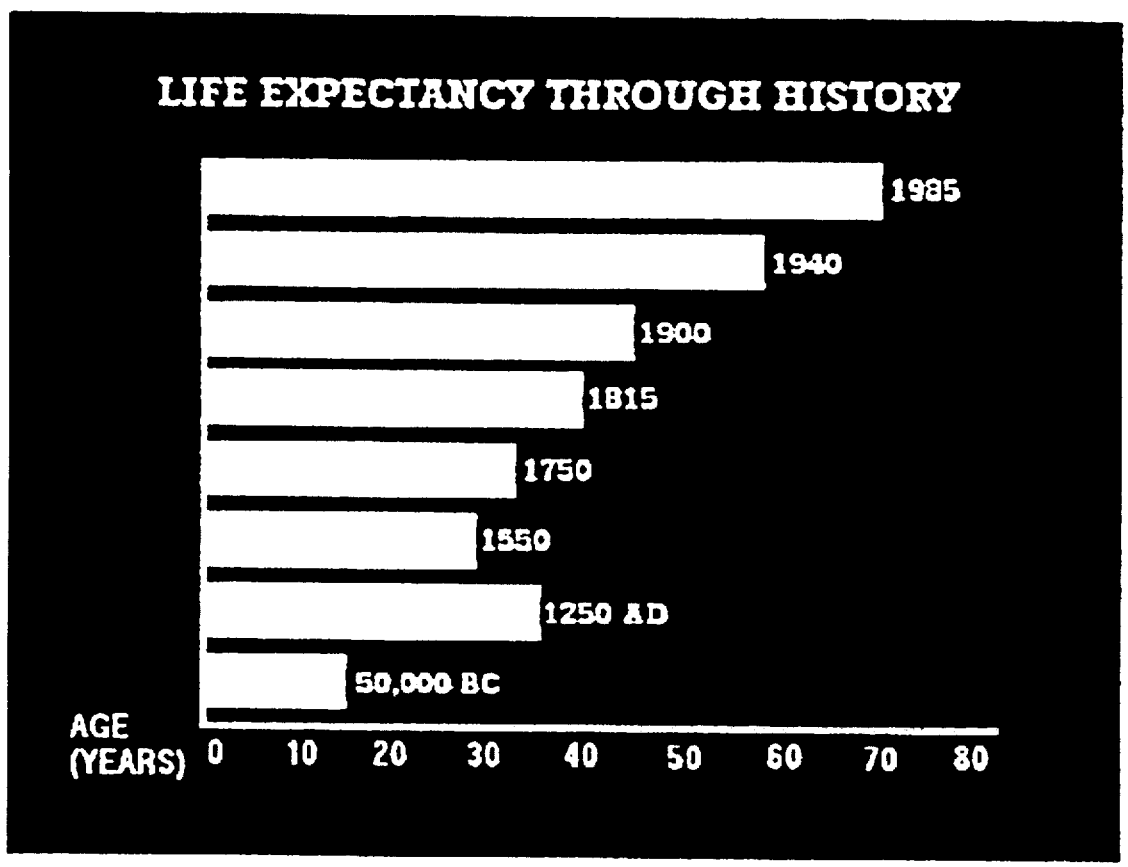

When students select "A scale that lacks detail," they are shown the screen display in FIG. 229, and are asked, Approximately what was life expectancy in 1900?

When students click on "picture Graphs," they are taught that, Picture graphs show the amounts as pictures. Each picture represents a number. They are shown the screen display in FIG. 227, and are asked, How many students were present on April 1?

Summary. Connecting a bar graph is linking the name with the amount.

In the third use lesson segment for bar graphs, "Comparing," students are taught that comparing is what most bar graphs are actually used for in the real world. Students are also taught that companies, government agencies, academic departments and other groups use bar graphs in this way.

The Lesson Segment. Students are first told that, Most bar graphs are not meant for you to read in an exact way. They are shown the screen display in FIG. 229, and are taught a series of points: (1) They are made for you to see the bars in relation to each other. The end of each bar in the graph in the screen display highlights in turn. (2) Some questions require you to compare in a general way. You answer these questions by comparing the sizes of the bars. Students are asked, What date on the graph shows the longest life expectancy? (3) Other questions require you to compare in a more exact way. Then you connect and compare the answers. Students are asked two questions after this point is made: (a) Was life expectancy greater in 1250 or 1750? (b) Was life expectancy in 1750 more or less than 30 years?

Figure 230:
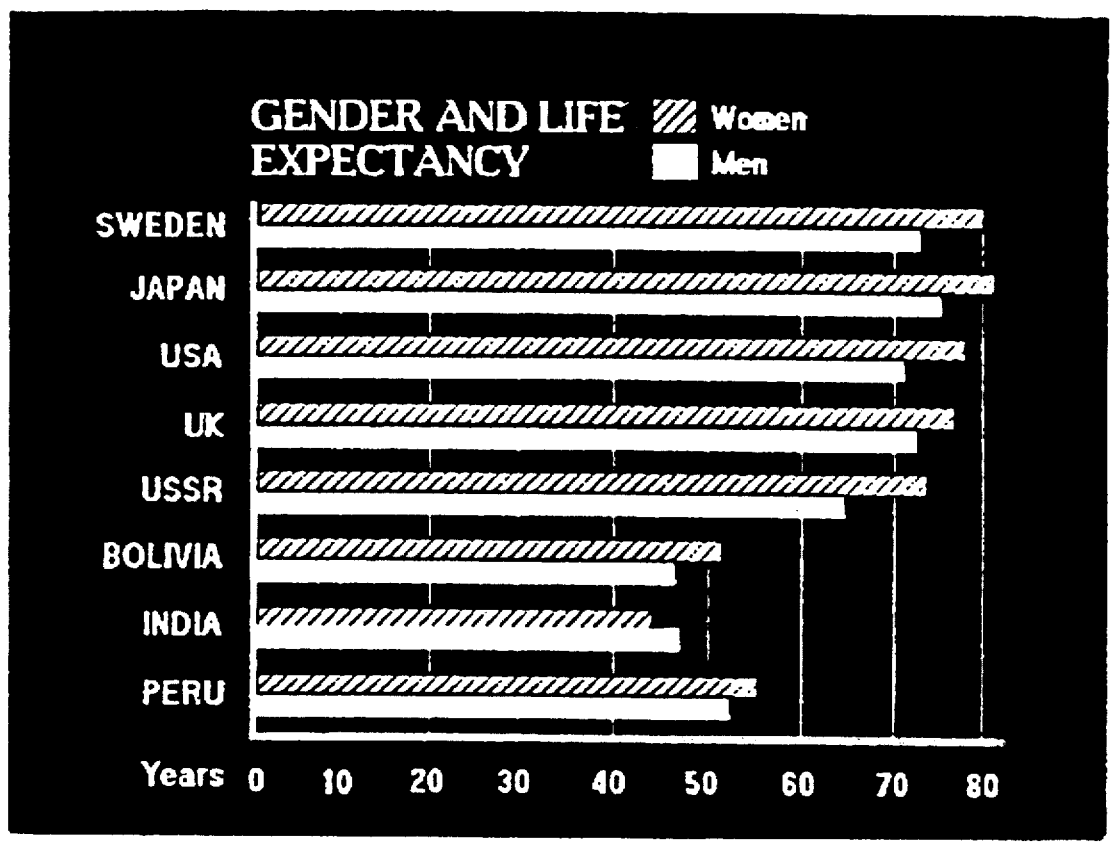

In the next part of this lesson segment, students are told, Many bar graphs are made for you to compare groups of bars to each other. They are then asked a series of questions based on the screen display in FIG. 230: (1) In which country do men have the longest life expectancy? This question must be answered before proceeding to the next screen display. (2) In which country do women have the longest life expectancy? (3) Is life expectancy longer for men or women in the U.S.A.? (4) Is life expectancy longer for men in Bolivia or Peru? (5) In which country is life expectancy for men longer than life expectancy for women?

Figure 231:

In the final section of this lesson segment, students are taught that, Lots of bars of similar lengths can make comparing more difficult. They are shown the screen display in FIG. 231, and are asked, Was a greater percentage of women unemployed in 1978 or 1981? This question must be answered before proceeding to the next screen display: What can help when comparing is difficult? A straight edge (for reading across to an axis); and writing the numbers down.

Summary. Bar graphs allow you to make several kinds of comparisons.

In the fourth use lesson segment for bar graphs, "Getting the Picture," students are taught that to get a sense of what a bar graph is about, they should look at the title, at what the bars represent, and at the pattern made by the bars.

Figure 232:
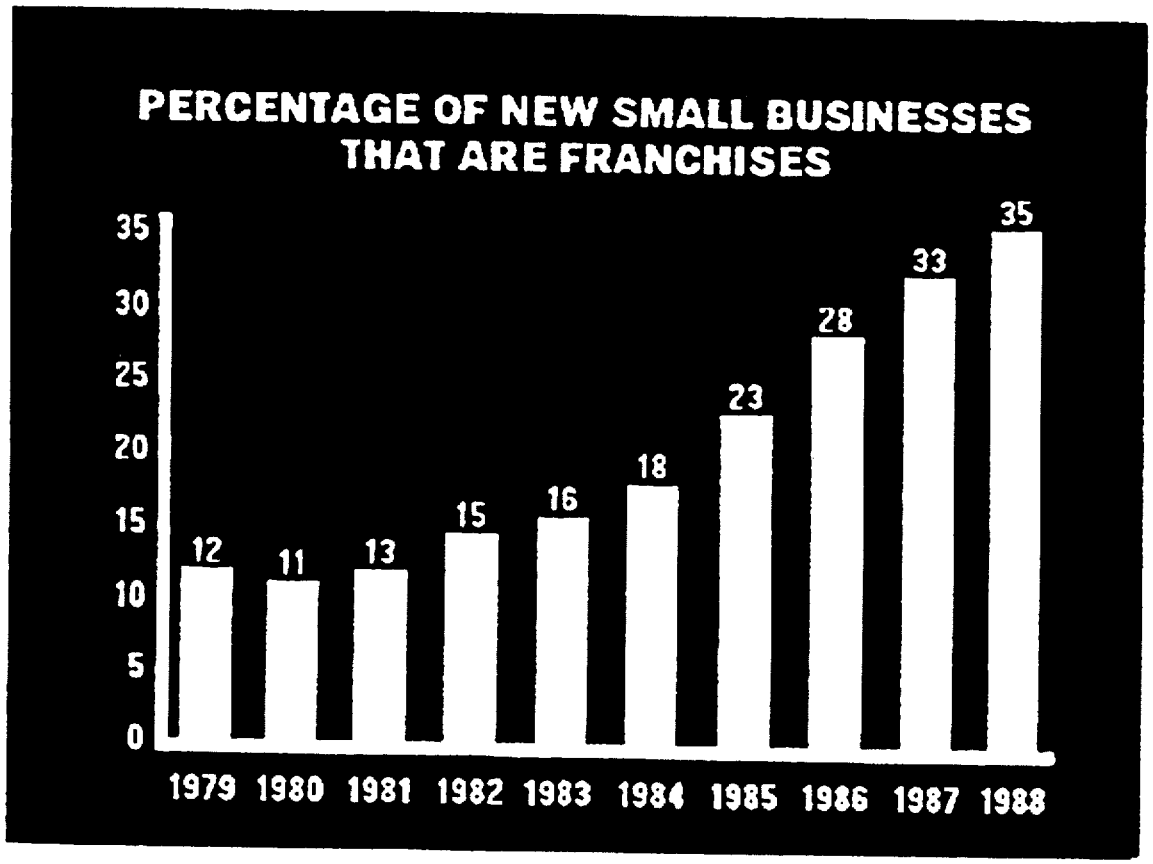

The Lesson Segment. Students are shown the screen display in FIG. 232, and are taught a series of points, some of which are accompanied by interactions: (1) Looked at as a group, the bars of a bar graph show you an overall picture, or a general idea. (2) One way to begin to get the overall picture is to look at the title. What does the title tell you this graph is about? Students type in their answer. (3) Next, you can look at what the bars represent. What do these bars represent? (4) By putting together what the title tells you and what the bars represent, you can get a general idea of what the graph is about. This graph shows the percentage of new businesses that were franchises from 1979 to 1988. (5) Look at what the longest bar represents. Students are asked to drag numbers with the mouse from the longest bar to complete a sentence: "In the year _____, the percentage of new small businesses that were franchises was _____." (6) Next, you could look at the shortest bar. What does it represent? Students are asked to drag numbers with the mouse from the shortest bar to complete another sentence. (7) Look at the bars between the shortest and longest bar. Do the amounts between 1980 and 1988 increase or decrease? (8) How would you describe the picture? What would you say is the general idea of this graph? (9) Looking at the pattern is the way some people use graphs to make predictions. This method is not foolproof (the predictions do not always come true). Would you expect the bar for 1989 to be longer or shorter than the bar for 1988?

Summary. To get a sense of what a bar graph is about: (1) Look at the title. (2) Look at what the bars represent. (3) Look to see whether the sizes of the bars make a pattern.

(3) Line Graphs

Figure 233:
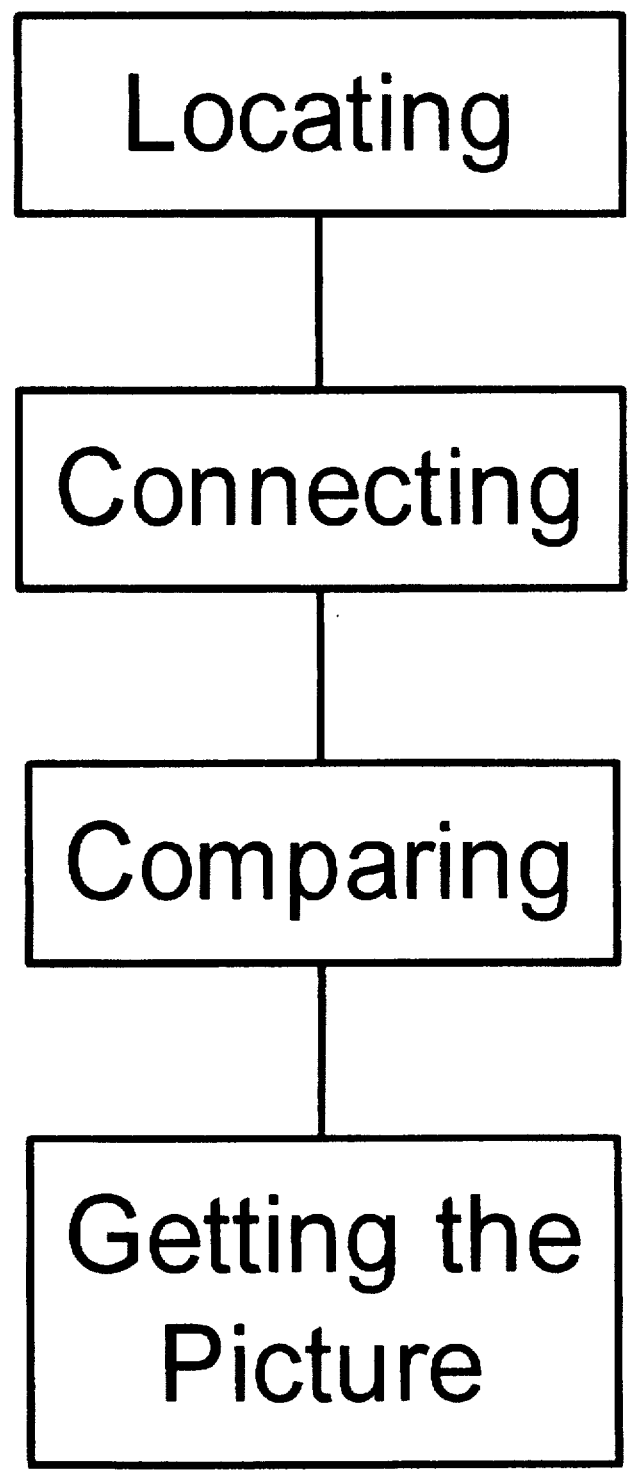

In accordance with the Knowledge Model Procedure, the Computerized Literacy System requires students to choose from among a reasonably limited number of use lessons segments for line graphs. The lesson segment menu is in FIG. 233.

The inventors believe that, through the use of the present invention, students will already have a clear idea of what locating is. However, they may need some guidance in thinking about how to locate on a line graph. Therefore, the first use lesson segment for line graphs, "Locating," provides instruction on the places on a line graph where locating can be done.

Figure 234:
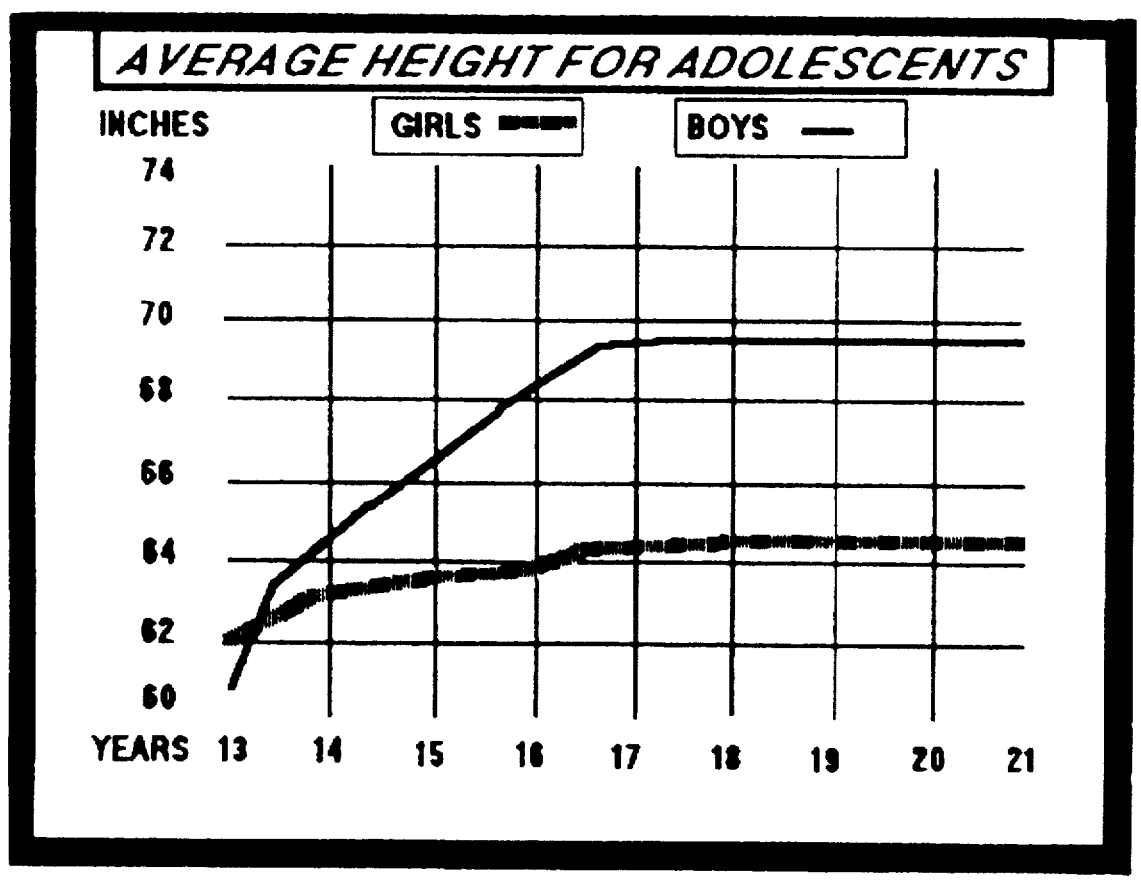

The Lesson Segment. Students are first reminded that, Locating on a line graph means finding information on a particular part of the graph. (Text is italicized herein, as explained above, to indicate it appears on a screen display.) The next screen display gives students a choice from a menu: The places you can locate on a line graph are: on an axis, on the words that tell what an axis represents, and on a legend. By clicking on an entry on this menu, students are shown a series of questions requiring them to locate on a particular part of a line graph. All questions are based on the line graph in the screen display in FIG. 234.

When "on an axis" is clicked, students are asked the following series of questions: (1) Is 45 inches on the axis of amounts? (2) Is 15 years on the axis of time? (3) Does the height scale start at 0 inches? (4) Does the years scale start at 0 years?

When "on the words that tell what an axis represents" is clicked, students are asked the following series of questions: (1) Is the time measured in years? (2) Circle the label that shows the unit of measure for the scale of amounts.

When "on a legend" is clicked, students are asked: (1) Does one line represent boys? (2) Is one of the legend entries for girls? (3) Does the legend entry for males say "men"?

Figure 235:
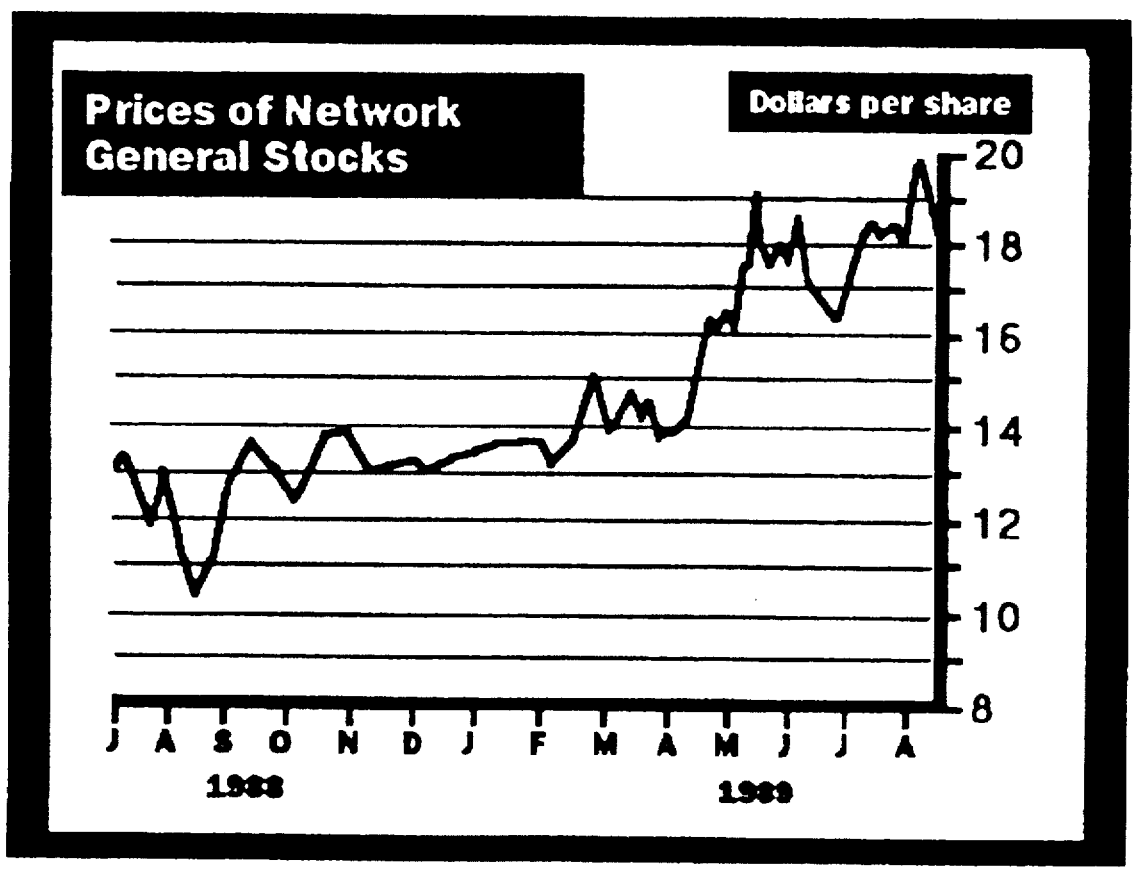

In the final part of this lesson segment, students are taught that, Outside knowledge can make locating more difficult. They are shown the screen display in FIG. 235, and are asked the following series of questions based on the line graph in the display: (1) Does the axis of amounts have $10 per share? HINT: You do not need to know what dollars per share means. (2) Does the axis of amounts have $25 per share? (3) Is June listed on the time axis? (4) Is October, 1988 listed on the time axis?

Summary. Locating on a line graph is finding something on a particular part of a graph.

In the second use lesson segment for line graphs, "Connecting," students are taught that connecting is the strategy used to read what a point represents on a line graph. They are taught that looking up from one axis and across from the other—the basic motion used to read a line graph—is connecting.

Figure 236:
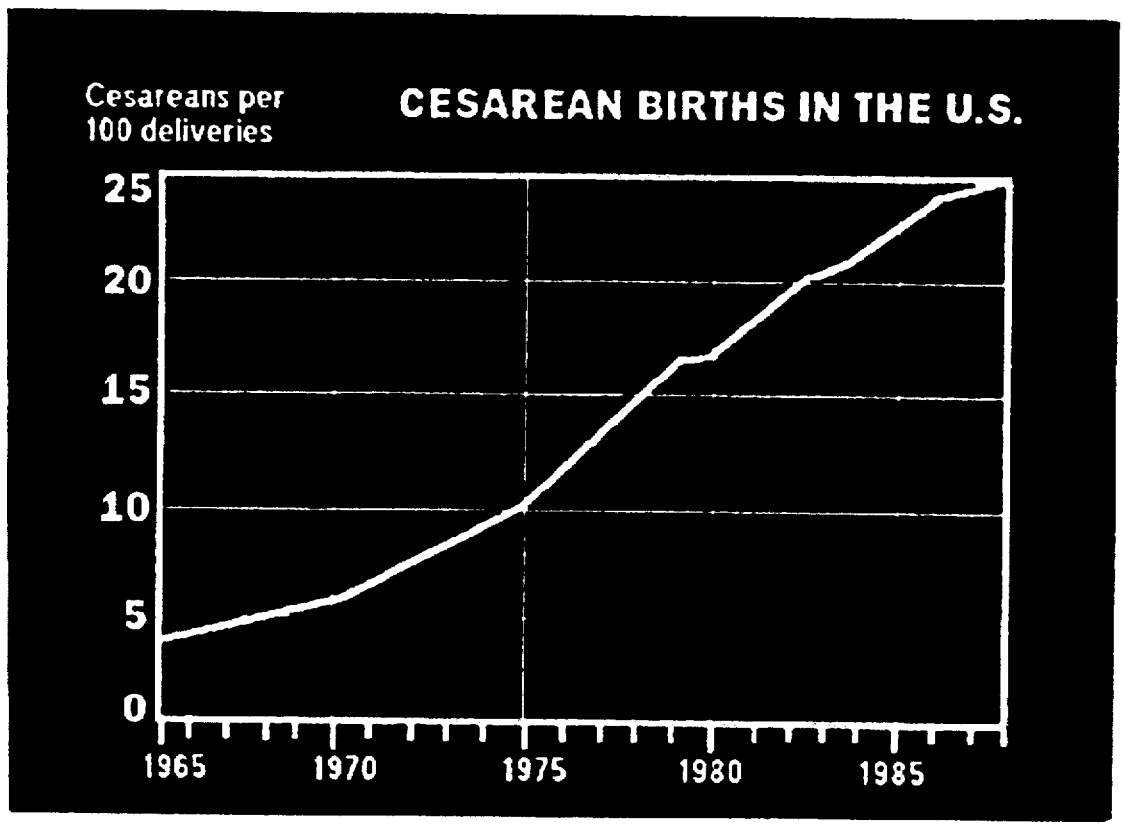

The Lesson Segment. Students are first told that, When you read a line graph to discover what a point represents, you are connecting. They are then shown the screen display in FIG. 236, and are taught, You can connect in either direction: across from one axis and down to the other axis ("There were 15 Caesareans for every 100 deliveries in 1978"), and up from one axis and across to the other axis ("In 1978 there were 15 Caesareans for every 100 deliveries"). Based on the same screen display, they are asked: (1) Approximately how many Caesareans were there in 1982? (2) In approximately what year were there 12 Caesareans for every 100 births?

Figure 237:
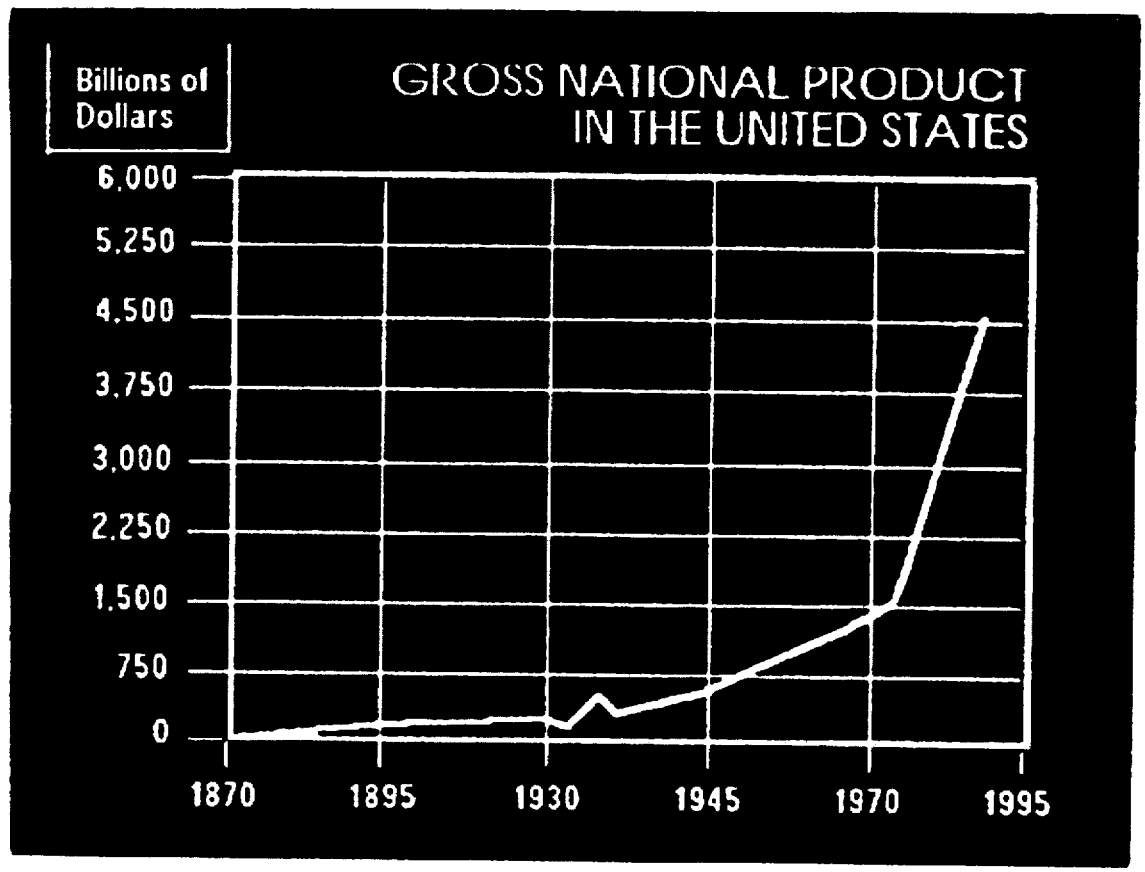

Next, students are taught that, Having only a few points on an axis can make connecting more difficult. They are asked, based on the screen display in FIG. 237, Approximately what was the Gross National Product in 1933? Finally, they are told, Line graphs like this one are not made for calculating numbers exactly at every point. Answering questions about the graph requires you to estimate.

Summary. Connecting is the strategy you use to find out what a point on a line graph represents.

In the third use lesson segment for line graphs, "Comparing," students are taught that line graphs can be used to compare different points on the same line, and points on different lines.

Figure 238:
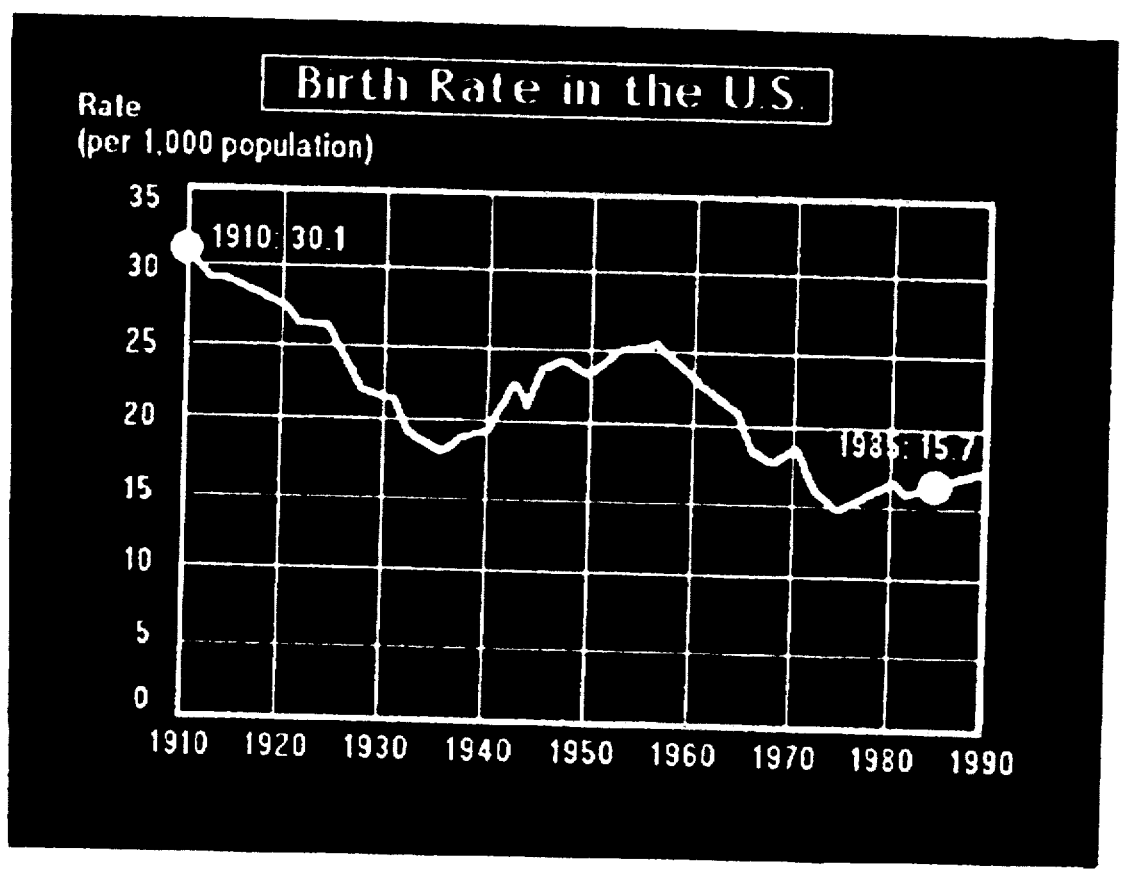

The Lesson Segment. Students are first taught that, A common use of a line graph is comparing one point on a line with another. A line graph can be used to compare amounts (a line going upward represents an increase, and a line going downward represents a decrease) and times (left to right represents earlier to later, right to left represents later to earlier). They are then told that, Sometimes you can compare two points on a line by looking at their placement on a line. Then you do not have to connect to both scales. Next, students are asked a series of questions based on the screen display in FIG. 238: (1) Was the birth rate higher in 1920 or 1960? (2) Was the birth rate lower in 1950 or 1980? (3) When was the birth rate at its lowest point? (4) Sometimes you have to look more closely to make comparisons. Was the birth rate in the United States higher in 1940 or 1960? Was the birth rate in the United States higher in 1935 or 1980?

Figure 239:
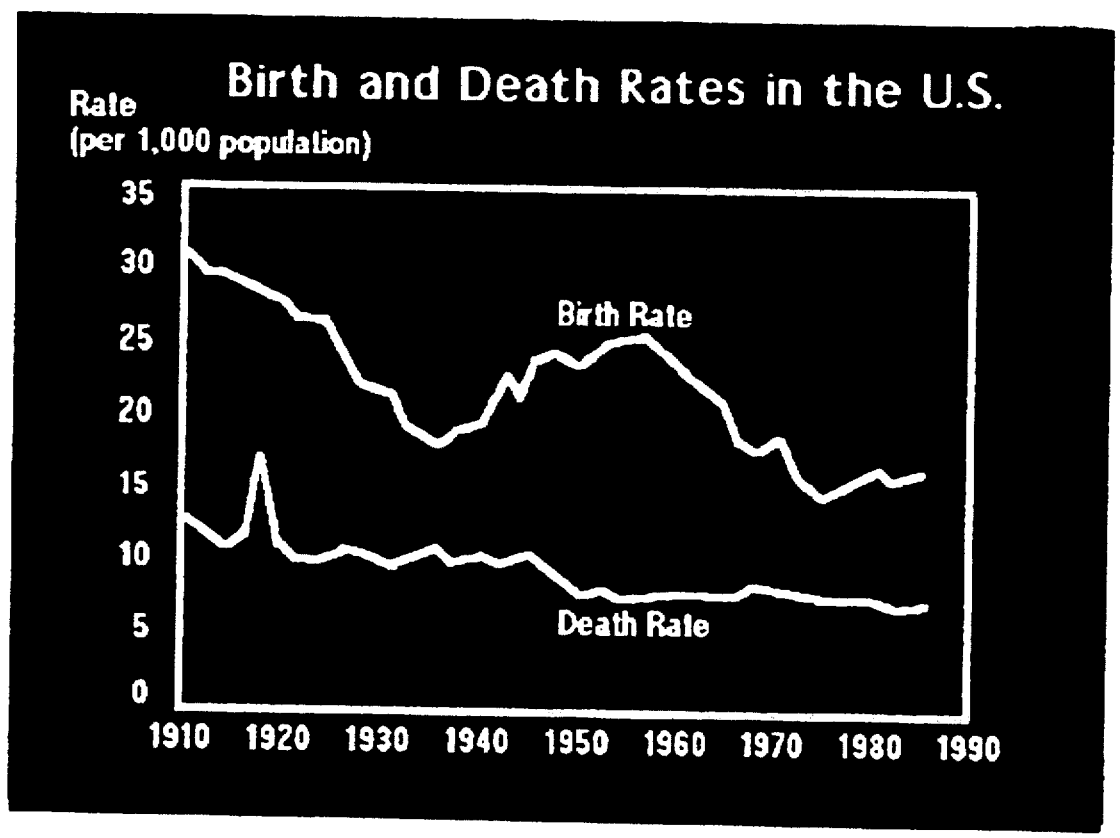

In the next part of this lesson segment, students are taught that, You can compare points on two different lines. They are then asked a series of questions based on the screen display in FIG. 239: (1) Which was higher in 1910, the birth rate or the death rate? (2) Was the birth rate at its highest point before or after the death rate was at its highest point? (3) In about which years were there the greatest differences between the birth rate and death rate?

Figure 240:
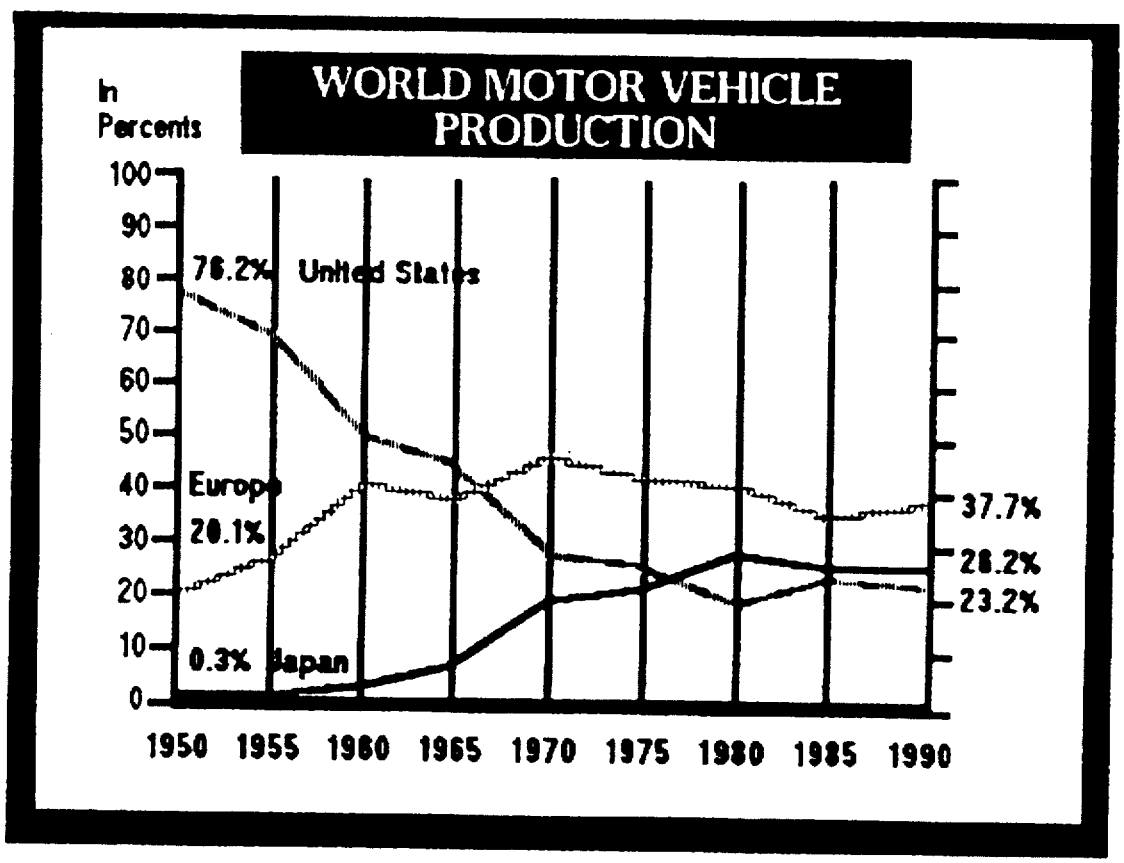

In the final part of this lesson segment, students are taught that, Having lots of lines can make comparing on a line graph more difficult. They are shown the screen display in FIG. 240, and are told, The more lines you have and the closer together they are the harder it is to compare them. Finally, they are asked a series of questions based on the line graph in the display: (1) Which area produced the most automobiles in 1965? (2) Which area produced the fewest automobiles in 1975? (3) In what year did the United States and Japan produce the same percentage of the world's automobiles? (4) In what year was the production of automobiles in Europe and Japan most nearly the same?

Summary. Line graphs allow you to compare two points on the same line, or on two different lines.

In the fourth use lesson segment for line graphs, "Getting the Picture," students are taught that they can get a sense of a line graph by looking at the title, the direction of the line, and the time axis.

Vocabulary. The following definition is available during this lesson segment by clicking on the DEFINITION icon: "Median"—the point at which there are as many cases above as below; The graph in this segment is called "Median Age of the U.S. Population." This means the age at which there are as many people older as younger.

Figure 241:
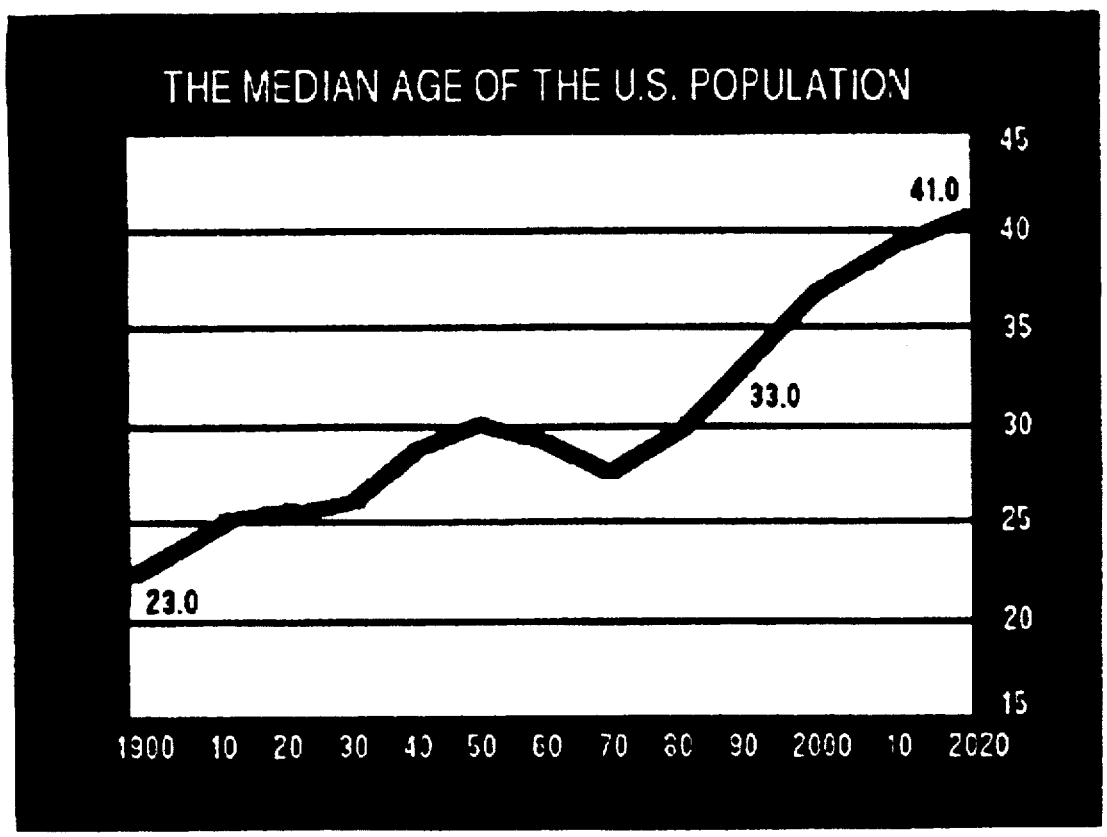

The Lesson Segment. Students are first taught, A line graph is a picture of something changing. The title of the graph usually tells you what's changing. They are then shown the screen display in FIG. 241, and asked, What does the title of this graph tell you? Next, students are told that, You can get more of the picture by looking at the general direction of the line. They are then asked to complete the following sentence based on the line graph in the display: Overall, the median age of the population is _____, and they are asked to click on "increasing" or "decreasing." Finally, students are taught that, The time axis tells you the time period the graph covers. They are asked to drag words with the mouse from the graph on the video screen to complete the following sentence on the computer monitor: _____ shows an increase over the time _____ to _____.

Figure 242:
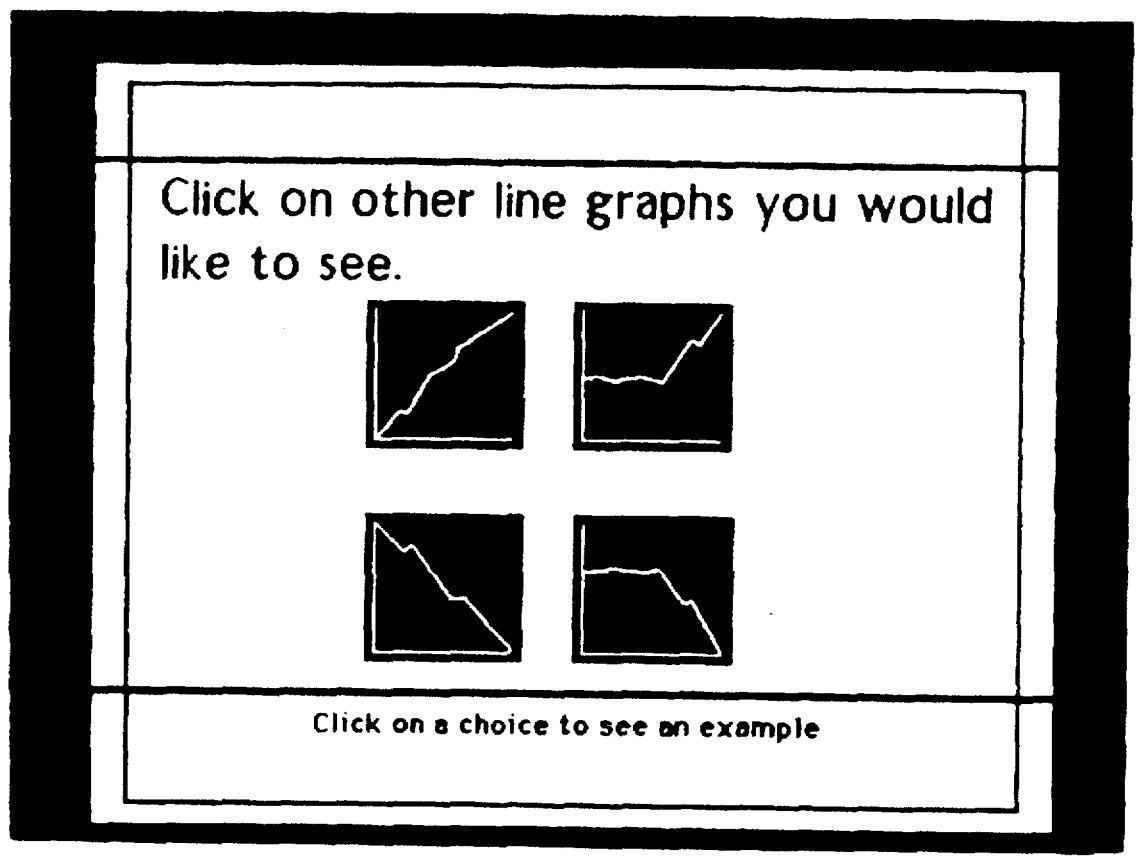

In the next section of this lesson segment, students are shown the screen display in FIG. 242, and they click on the icons in the display to see other line graphs. For each graph, there is a question for discussion: what do the title, the time axis, and the direction of the line tell you?

Figure 243:
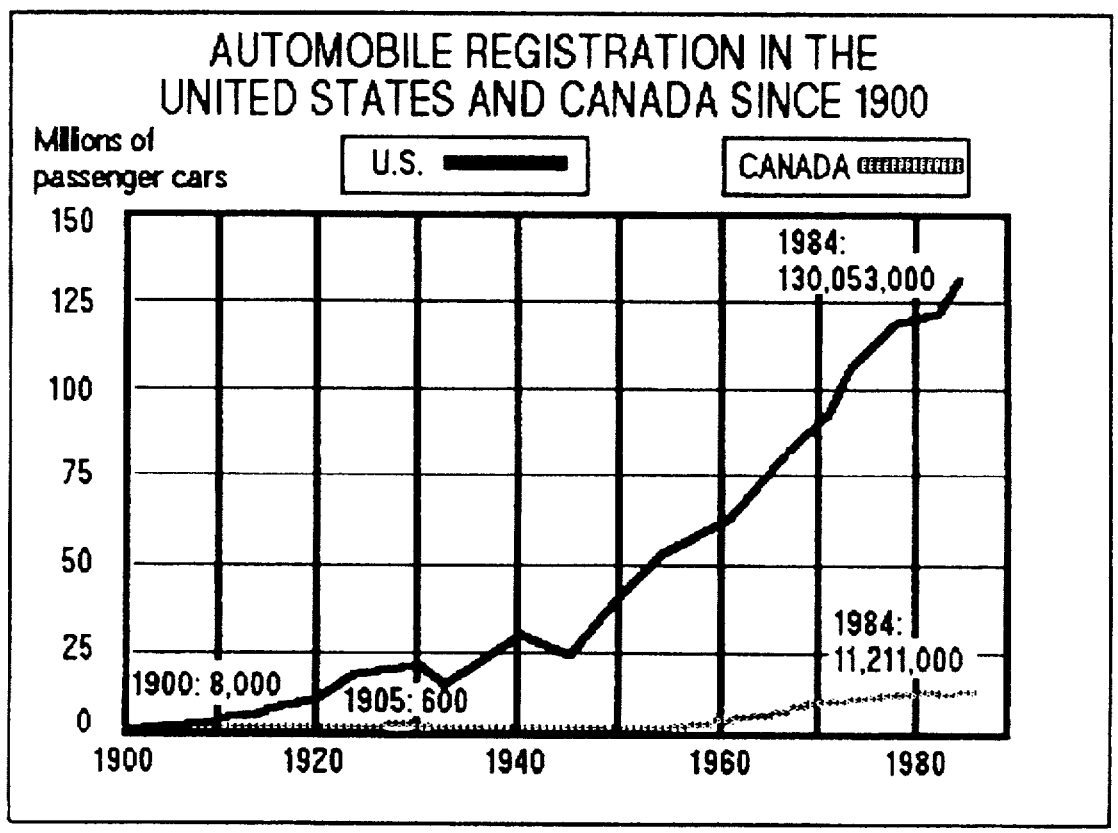

In the final part of this segment, students are told, A Graph with two or more lines shows changes in relation to each other. The screen display in FIG. 243 is shown, and students are told, In this graph the 2 lines are fairly close together, then one goes upward sharply.

Summary. You can get the general idea of a line graph by looking at: the title, the directions of the line, and the time axis.

(4) A Critical Look at Graphic Documents

The final three use lesson segments for graphic documents contain a more sophisticated treatment of graphs than the previous use lessons. They present ways that graphic documents can be used to lead the viewer to draw certain conclusions. The segments encourage students to draw on their knowledge of graphic documents to take a closer look at the way information is presented. The segments were designed with the understanding that students have acquired the skills they were taught in the graphic documents structure and use lessons.

The first of these use lesson segments, "Different Presentations/Different Conclusions," teaches students that when actual sales figures are presented on a bar graph, they look very different than when the sales figures are presented on a bar graph as increases or decreases from the year before. Even students who do not know the difference between a number and a proportion will be able to see just by looking at the examples in this segment that information given in different ways leads to different conclusions.

Figure 244:
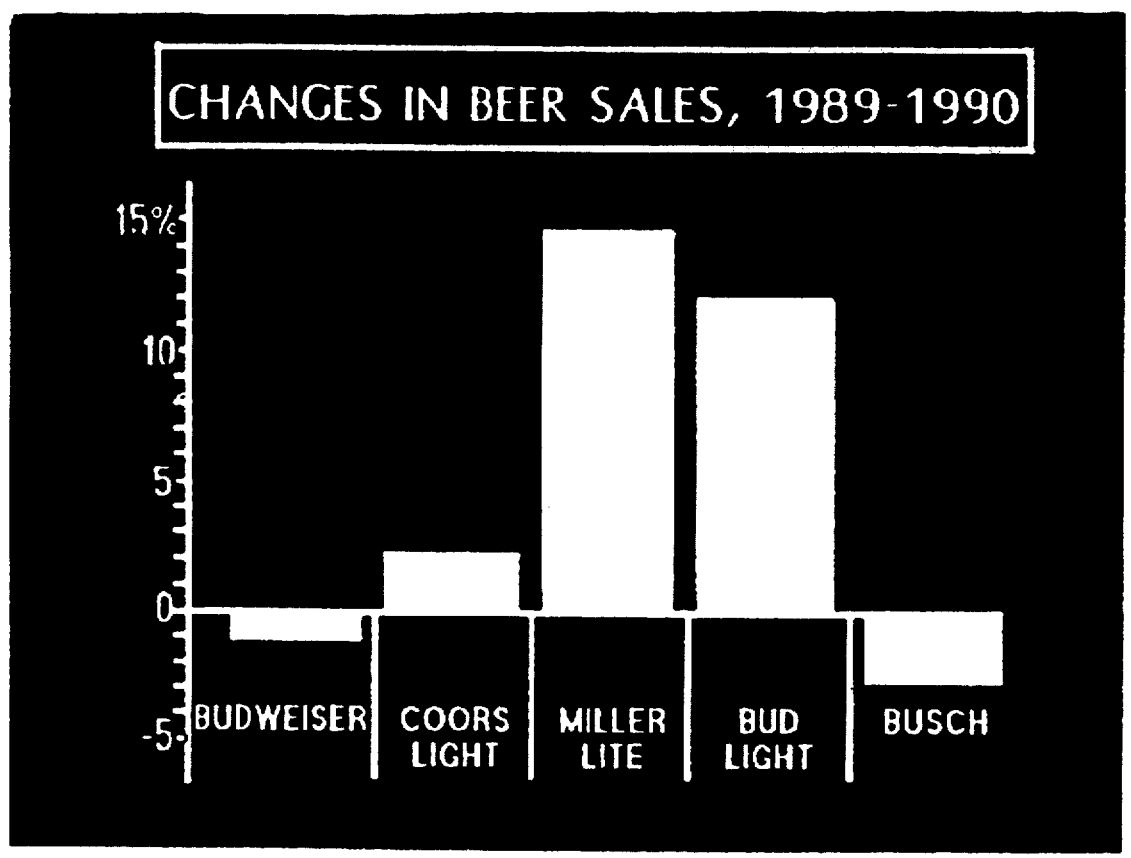
Figure 245:
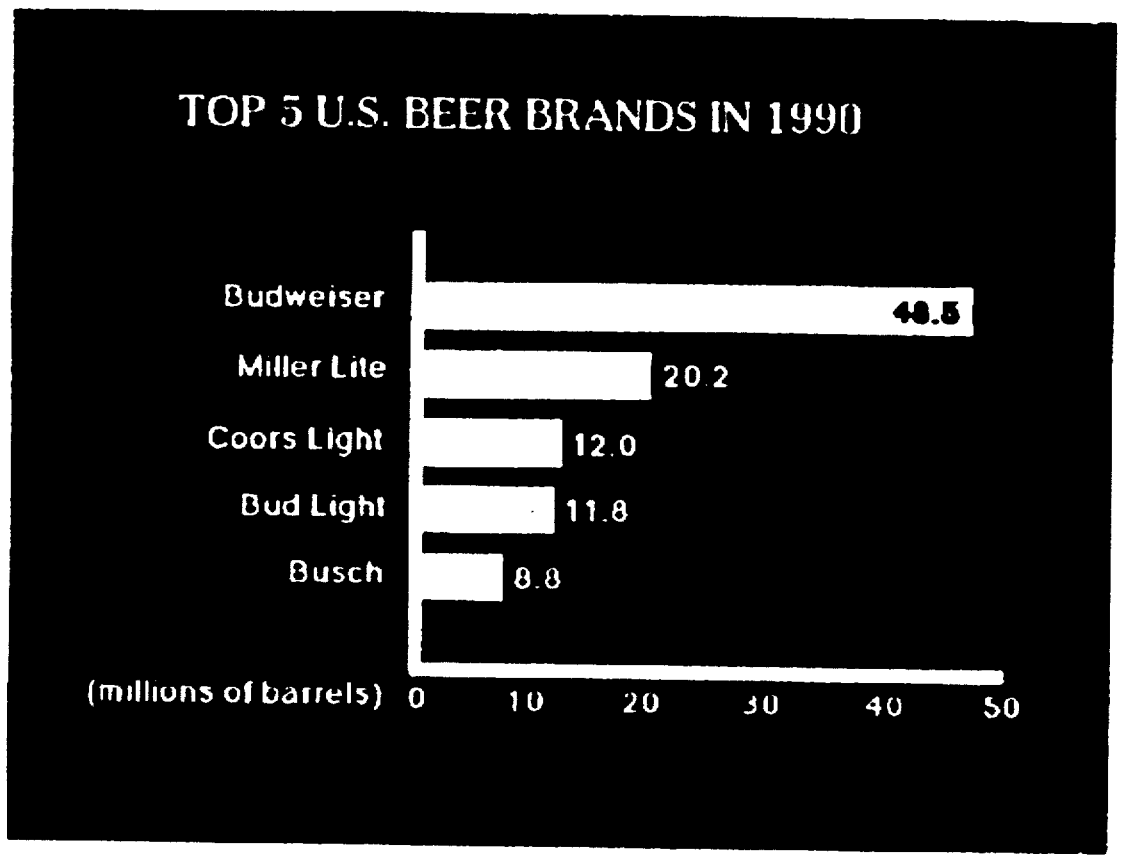
Figure 246:
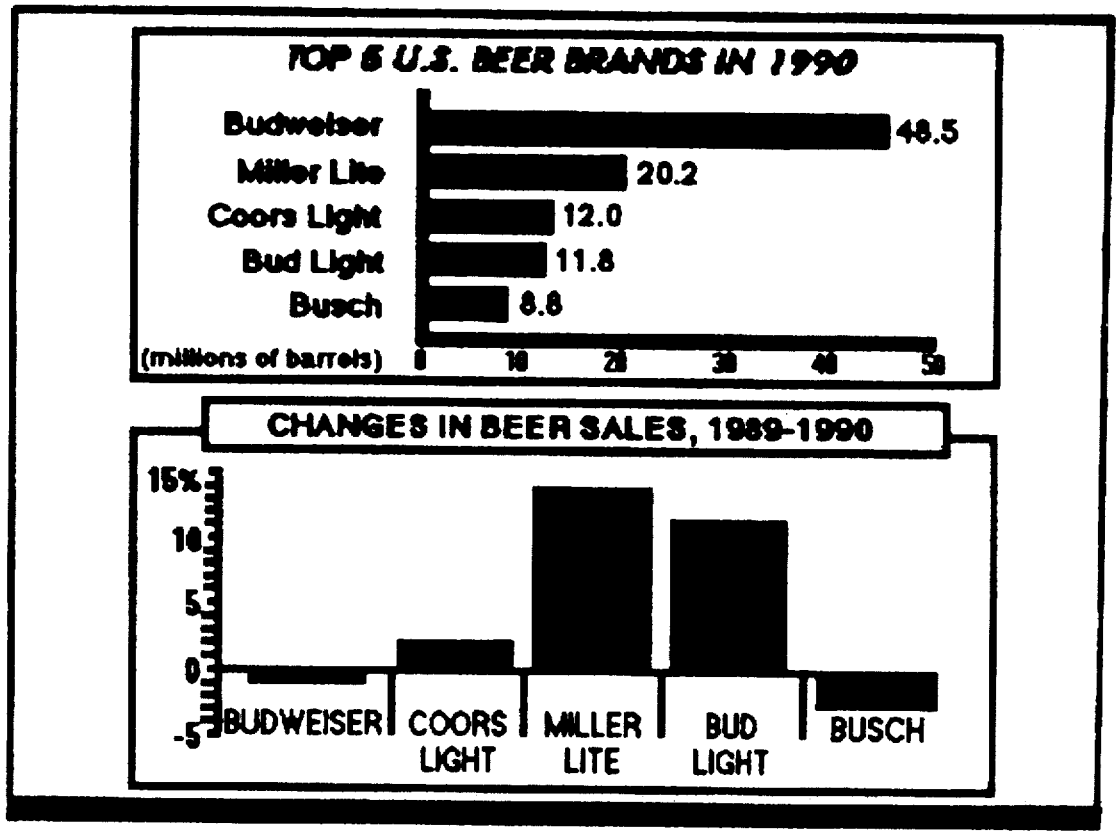

The Lesson Segment. Students are shown the following series of screen displays containing points, graphs or questions: (1) The information you choose to show on a graph will affect the conclusion that is drawn about the graph. The bar graph shown in the screen display is in FIG. 244. The changes on this graph are shown as percents (e.g., Coors Light's sales are shown as increasing 3% during the year 1989–90). Which brands sold less beer in 1990 than they sold in 1989? NEXT QUESTION: Which brand had the greatest increase in sales? (2) The bar graph shown in the screen display is in FIG. 245. This graph shows the number of barrels of beer sold by the same five brands in 1990. Which brand sold the most beer in 1990? (3) The two graphs are shown together on the video screen. See FIG. 246. If you wanted to emphasize the success of Budweiser, which graph would you show? NEXT QUESTION: If you wanted to emphasize the success of Miller Lite, which graph would you show?

Summary. The way information is presented affects the conclusions you draw.

The second of these use lesson segments, "What Happens When You Change the Scale," shows students what happens when information is presented against different scales. It shows how exaggerated or minimized the information can be, depending on the scale. This segment portrays dramatically to students how important it is to watch the scale. Since all the examples in this lesson segment are bar graphs, students may review the structure and function of a bar graph's scale before proceeding.

Figure 247:
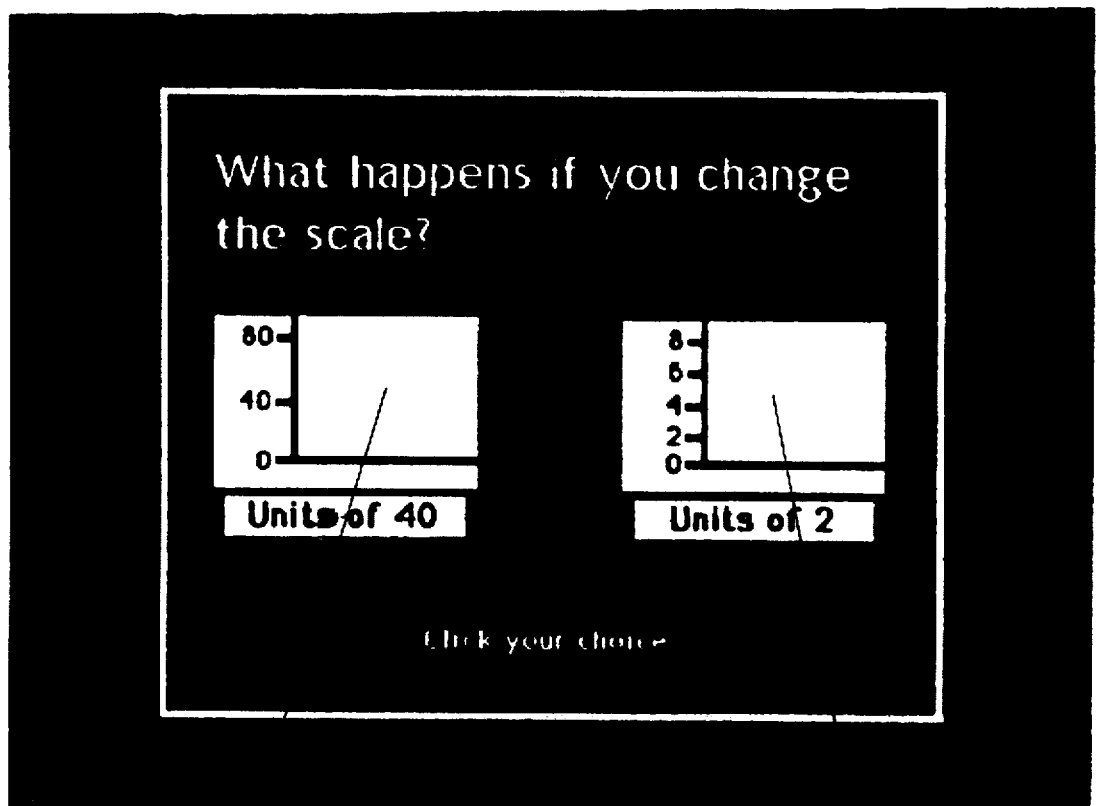

The Lesson Segment. Students are first taught that, For bar graphs and line graphs, changing the scale can really change the picture. They are shown the screen display in FIG. 227, and are told, The scale shows every 10th point. Another way of saying this is that the scale is in units of 10. Next, they are shown the screen display in FIG. 247. By clicking on the icons in the display, students are shown the same bar graph as in FIG. 227 with different scales. When the left icon FIG. 247a is clicked, students are shown the screen display in FIG. 248, labeled Numbers of Students Present on the First of Each Month (Units of 40 Scale). They are told, If you didn't look carefully at the scale, you would think that this graph represented smaller numbers and smaller differences. When the right icon FIG. 247b is clicked, the screen display in FIG. 249 is shown, labeled Number of Students Present on the First of Each Month (Units of 2 Scale).

Figure 227:
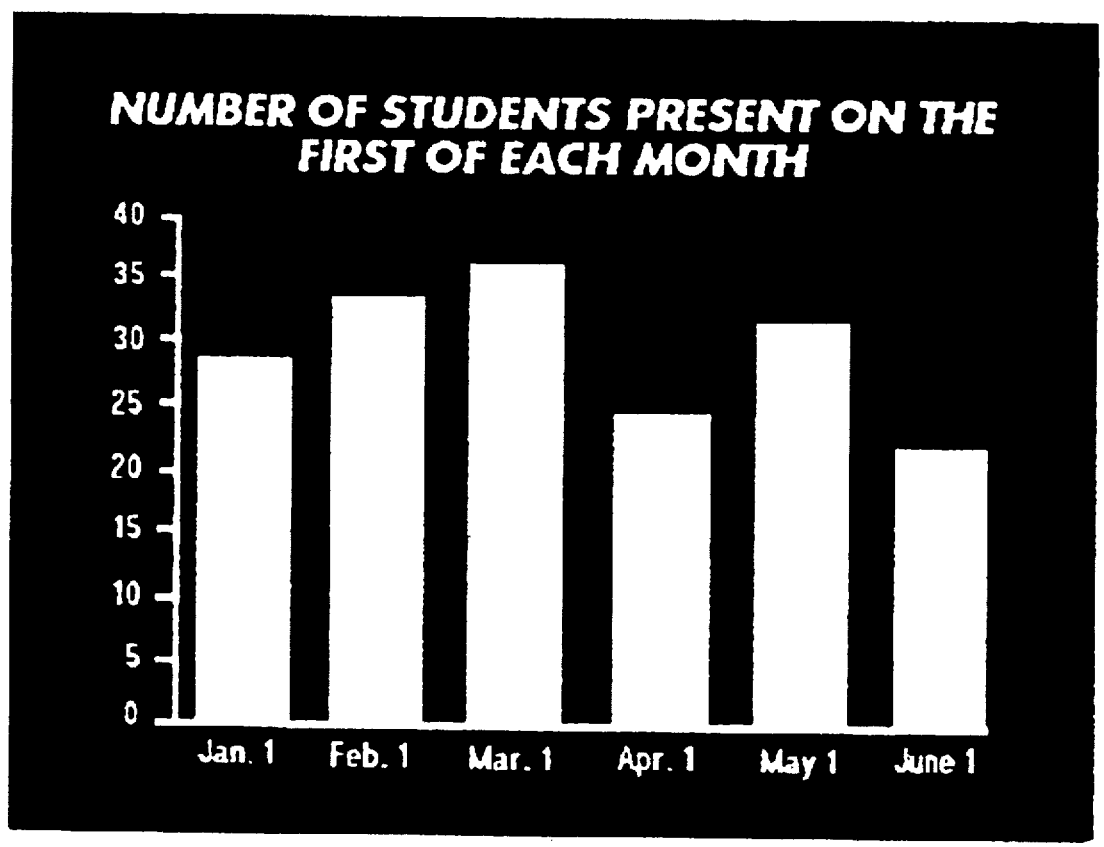
Figure 248:
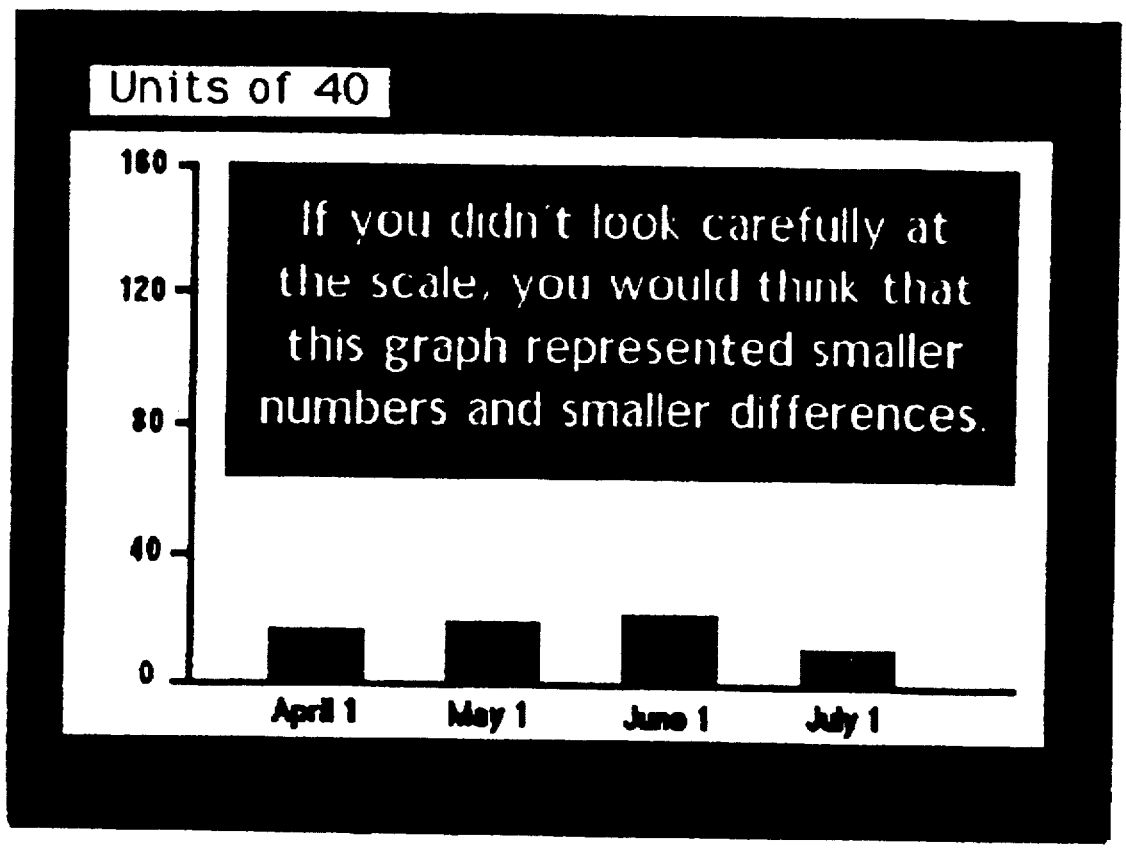
Figure 249:
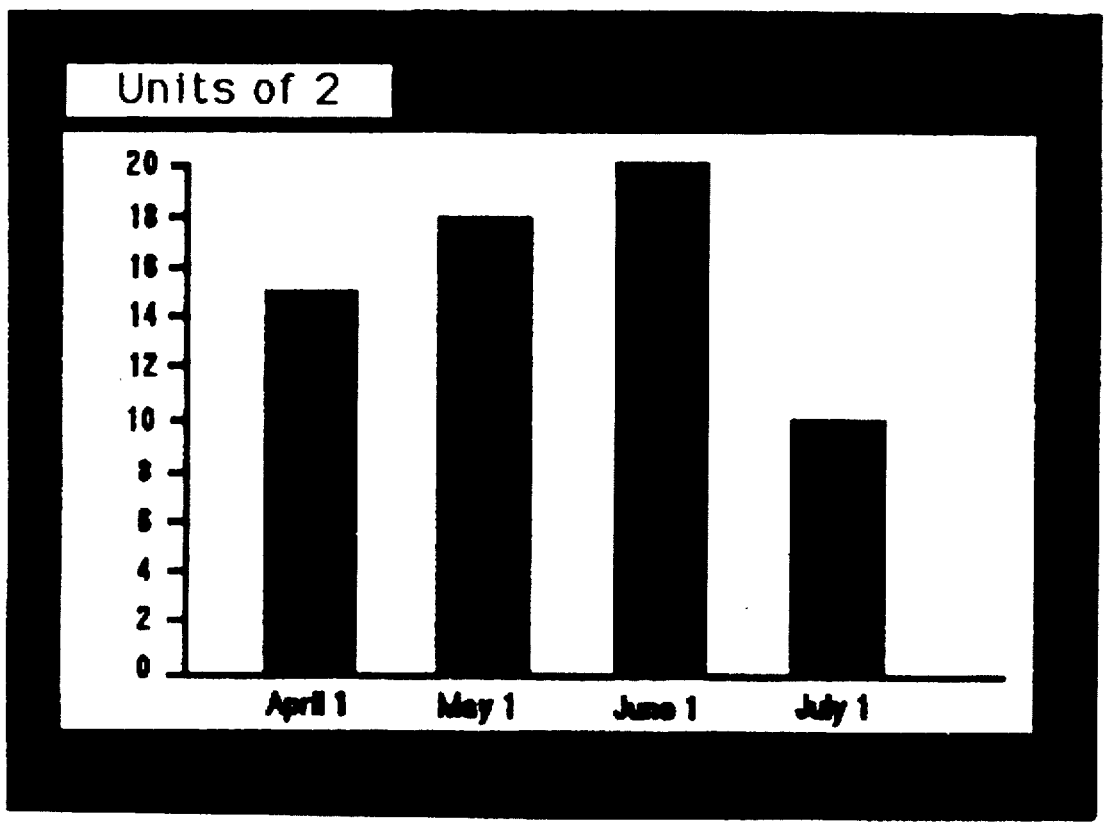
Figure 250:
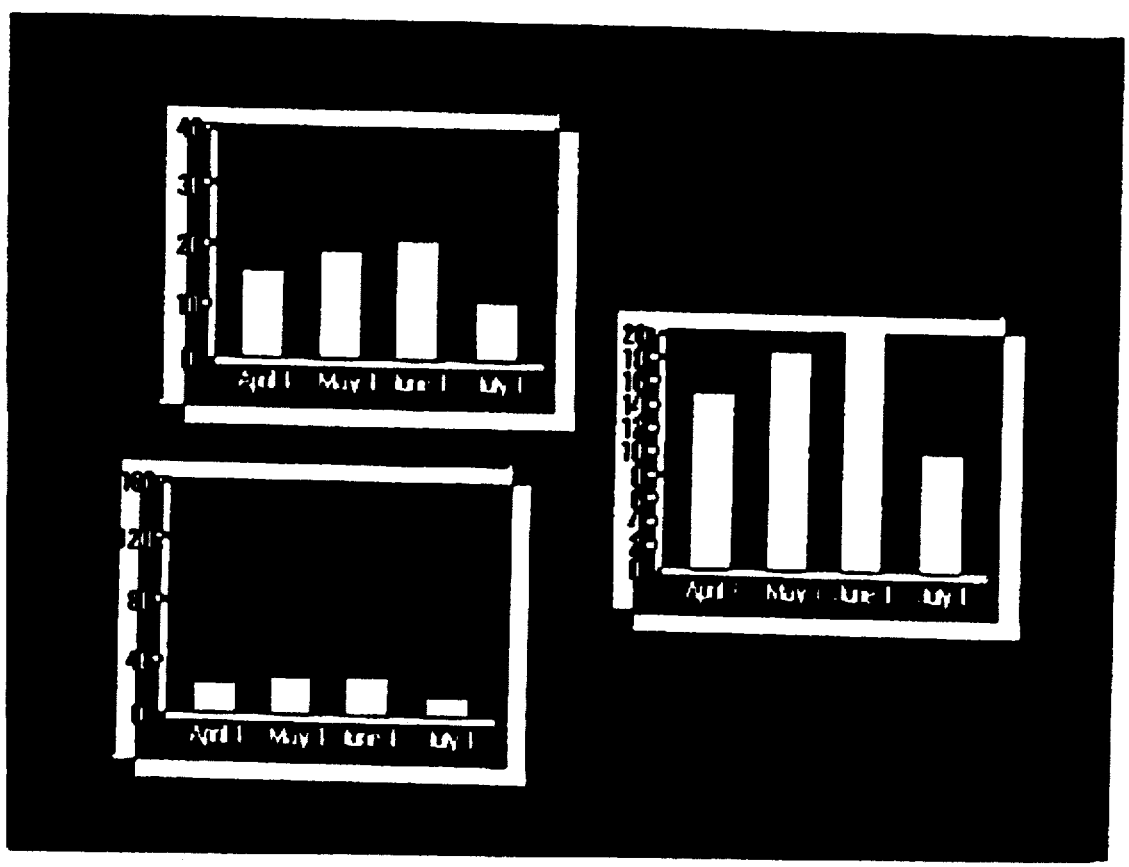

Next, the three bar graphs, FIGS. 227, 248, and 249, are shown together on the video screen. See FIG. 250. Students are asked a series of questions based on these graphs: (1) Based only on the sizes of the bars, which graph seems to show the largest numbers? (2) Based only on the sizes of the bars, which graph seems to show the smallest numbers? (3) Based only on the sizes of the charts, which graph seems to show the biggest drop in attendance?

Figure 251:
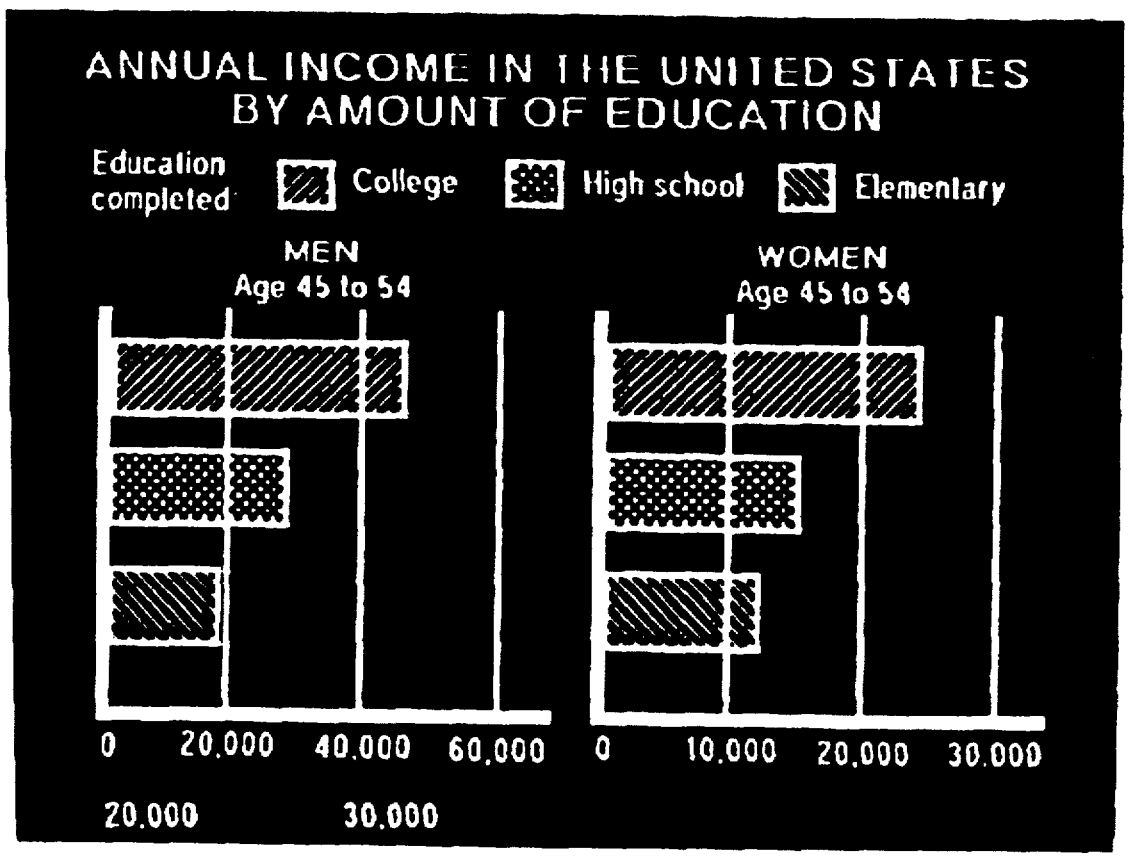
Figure 252:
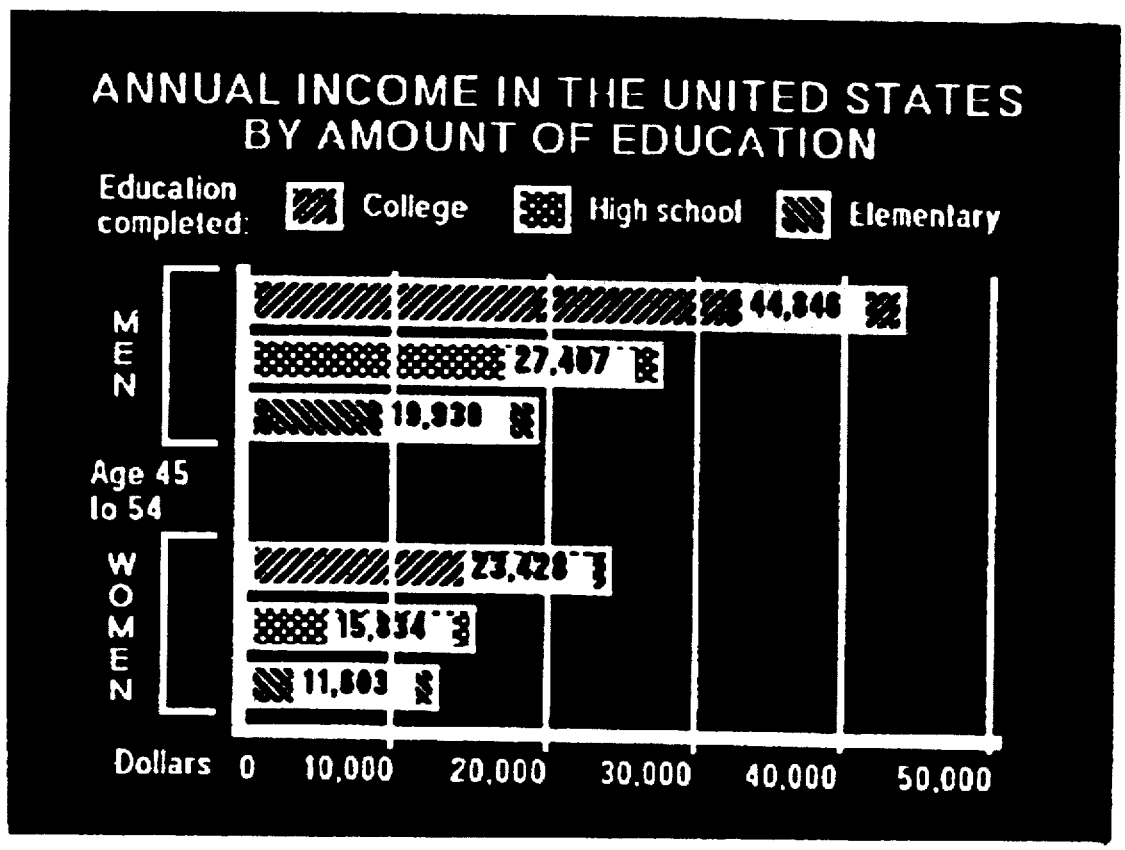

In the final part of this lesson segment, students are shown the screen display in FIG. 251, and are asked: (1) Who makes more money, men with a college education, or women with a college education? (2) Do men or women make more money at all levels of education, on the average? Then, students are directed to look at the scales of the two graphs, and are told, Although the bars seem to be comparable, the scales are different. Finally, the screen display in FIG. 252 is shown, and students are informed that the bar graph now represents Annual Income in The United States reconfigured to the same scale.

Summary. Changing the scale changes the impressions made by the graph.

The third segment shows students the limitations of graphs: they can tell what happened, but they can not tell why. Students are taught that a graph usually does not give the whole picture, but just the first part of the picture. It is important in the current culture for students to know what the limitations and pitfalls of graphs are, because large claims are often made about graphs that actually do not show very much. Students are told that being a skeptical viewer of graphs is an important part of being a responsible consumer and citizen. The first half of this lesson segment shows students the three graph types and describes what the pictures show. Then the segment gets into what the pictures do not show, and explains that graphs usually provide no explanation for the pictures they give.

Figure 253:
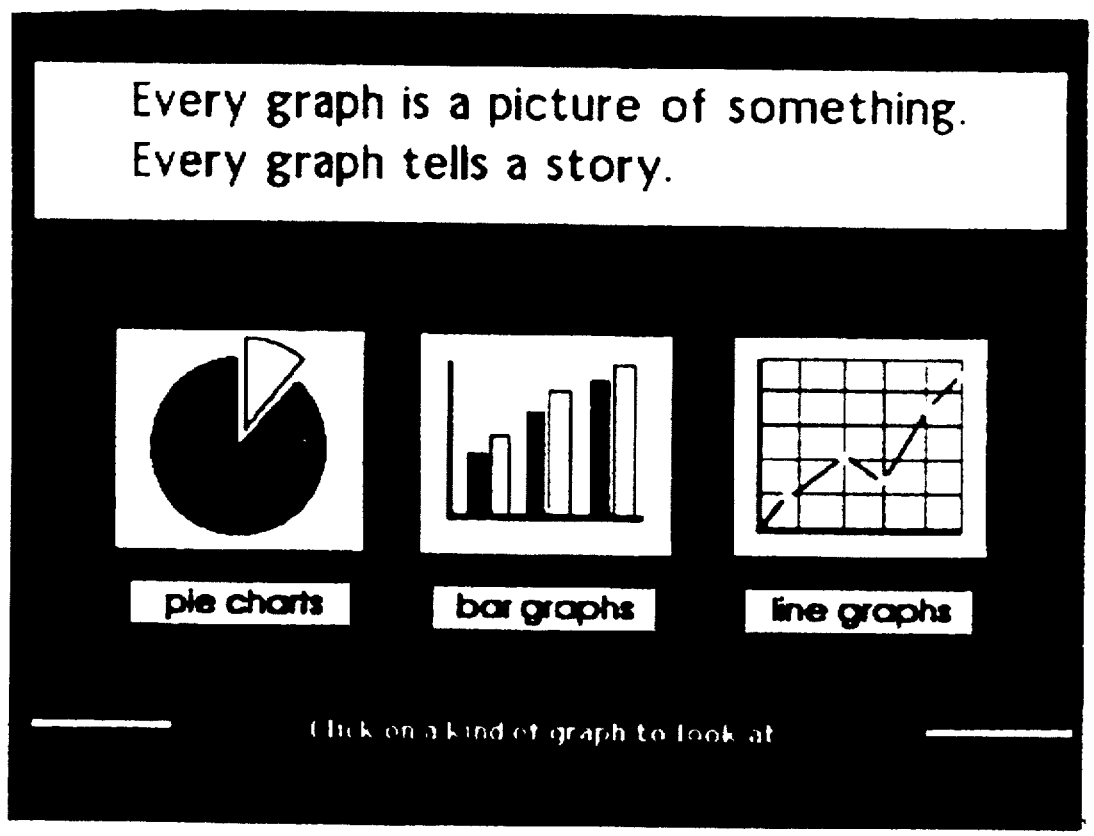

The Lesson Segment. Students are first told that, Every graph is a picture of something. Every graph tells a story. They are shown the screen display in FIG. 253, and, by clicking with the mouse on a graph type icon shown in the display, they are shown an example with an explanation of what the graph shows.

When the pie chart icon is clicked, students are shown the screen display in FIG. 209, and are told, Every pie chart is a picture of the parts of something. This pie chart shows the parts of a landfill. The story it tells is a description of the landfill at a particular time.

Figure 254:
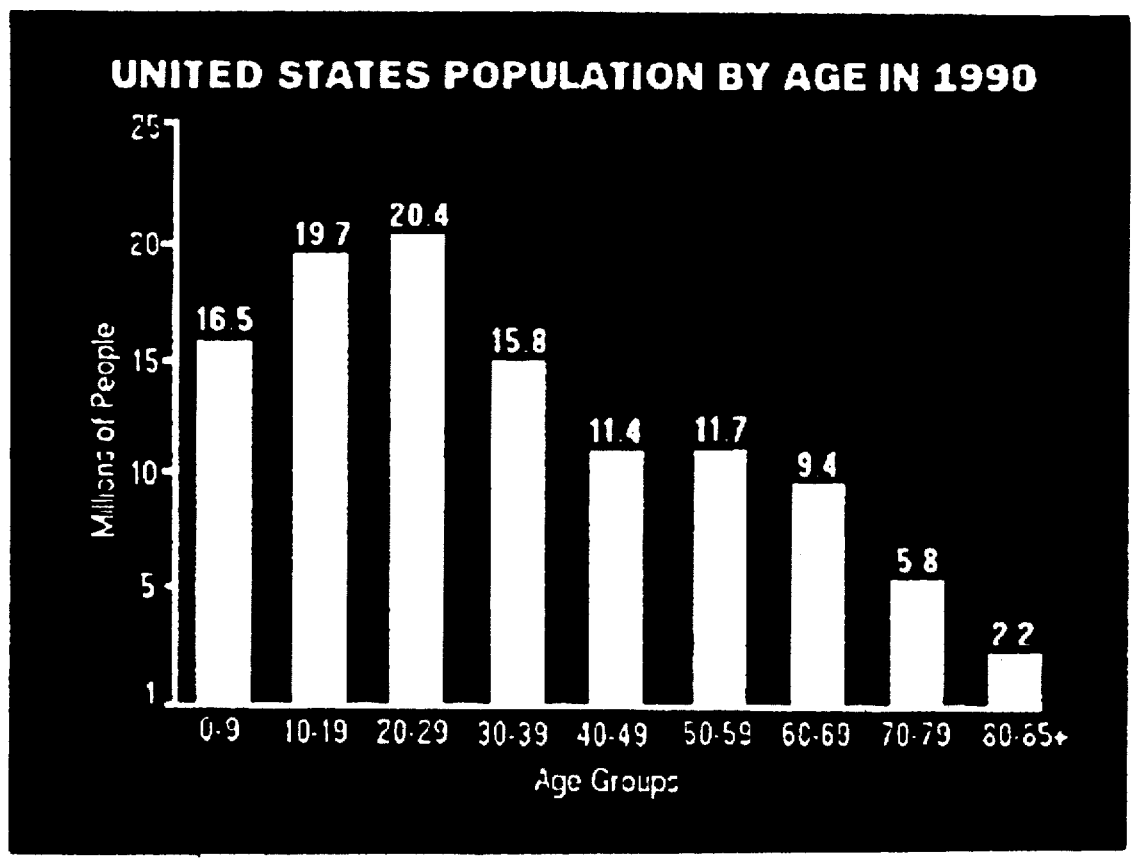
Figure 255:
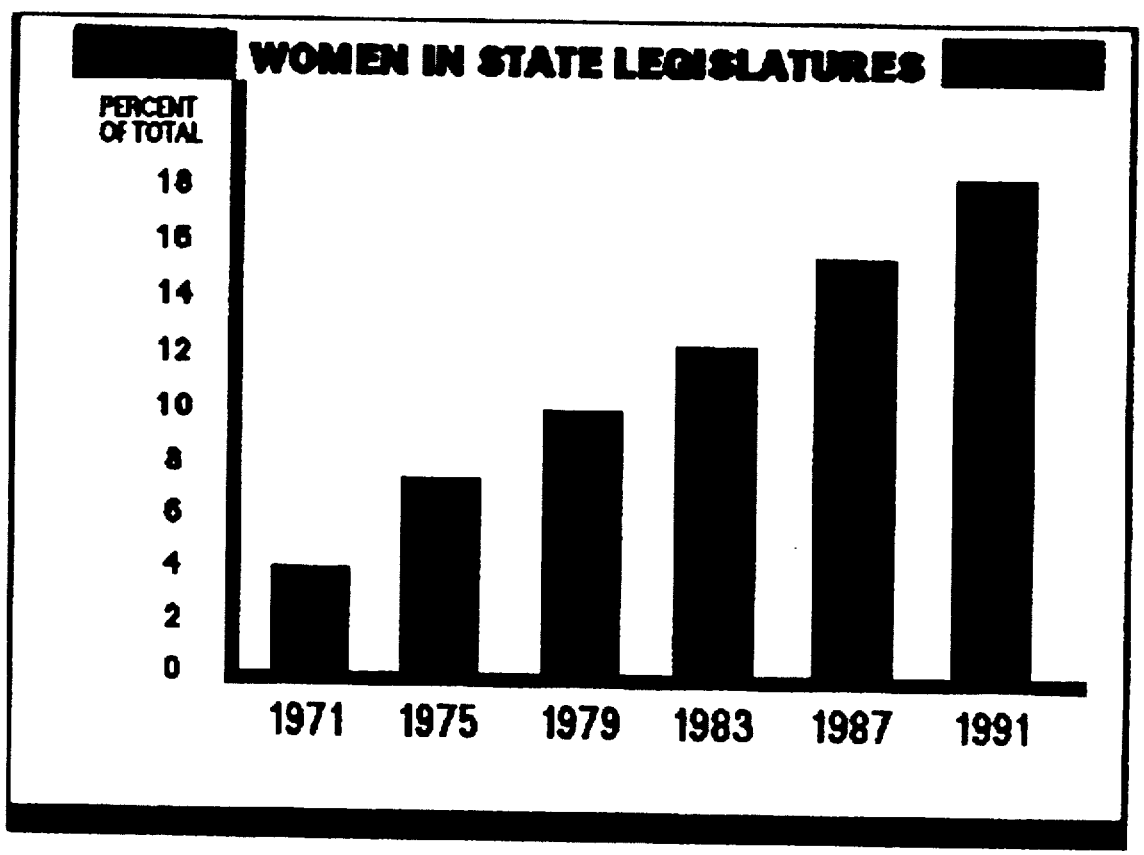

When the bar graph icon is clicked, students are shown the screen display in FIG. 254, and are told, Every bar graph is a picture of a group of amounts. Some bar graphs—like this one—show the members of the group in relation to one another. The screen display in FIG. 255 is then shown, and students are told, This bar graph shows the proportion of women to men in state legislatures at various times in the last two decades. It is like a series of snapshots.

Figure 256:
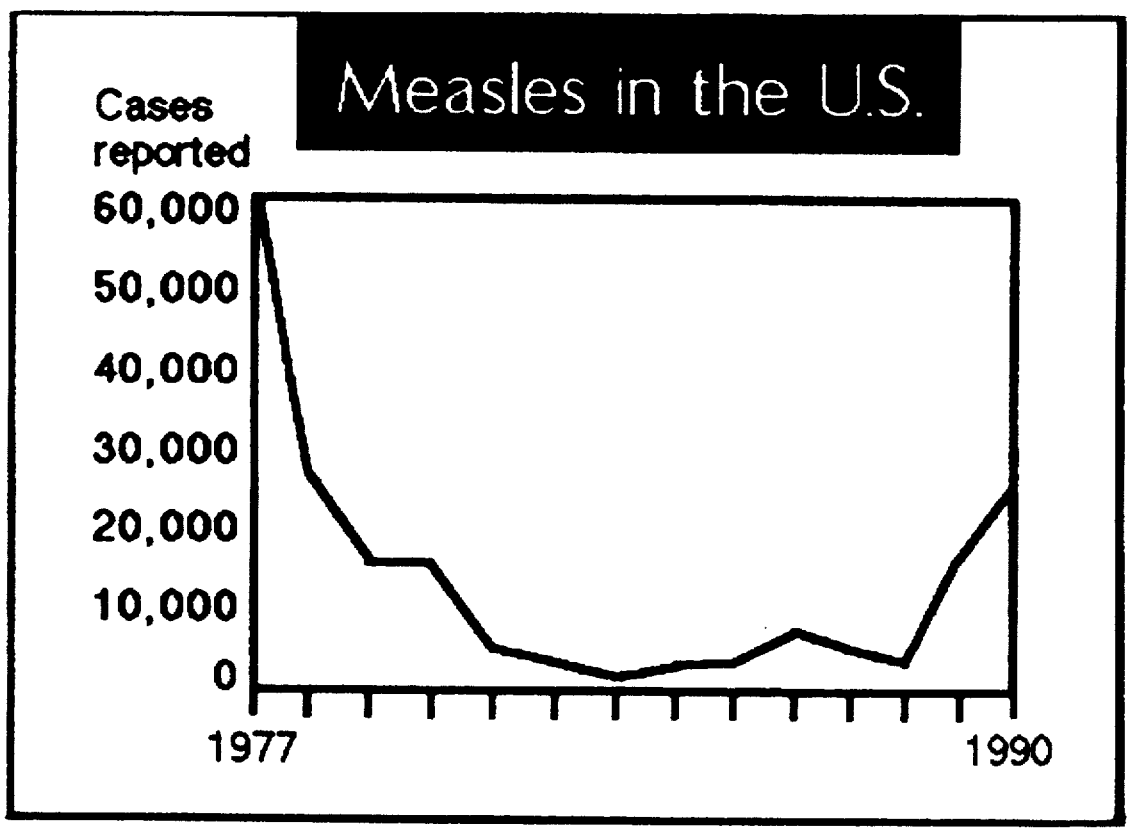

When the line graph icon is clicked, the screen display in FIG. 256 is shown, and students are taught that, Every line graph is a picture of something happening as time passes. This line graph tells the story of the number of cases of measles decreasing then suddenly increasing.

After all three icons have been clicked, students are told, Graphs give you a picture of what happened, but they do not tell you why it happened. How can you tell why something pictured in a graph has happened? Sometimes you can figure it out. The screen display in FIG. 255 is then shown again, and students are asked, Why would there be more women in state legislatures now than at any time in the past 20 years? SHOW ME: One possible reason is that more women are running for office at the state level.

Figure 257:
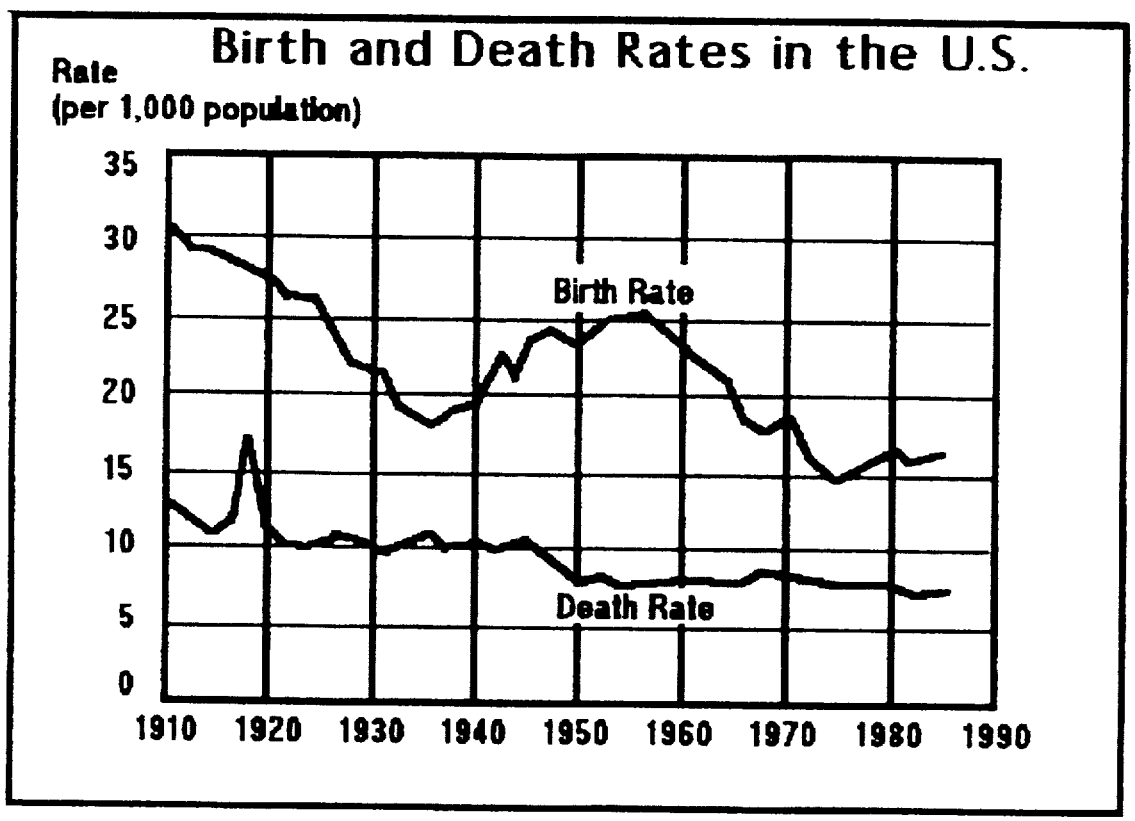

Next, students are taught that, Sometimes you can do research ("look it up") to find out why something pictured in a graph has happened. The screen display in FIG. 257 is then shown, and students are asked, Where would you look to find out why there was a sudden increase in the death rate around 1918? Finally, the graph in FIG. 256 is shown again, and students are told, Sometimes the graph is part of an article that explains the graph. The measles graph was part of an article that said that fewer people were being immunized against measles, and that the number of cases of measles had increased as a result.

Summary. Graphs tells you what happened, but they do not tell you why. Sometimes: (1) You can figure it out. (2) You can look it up. (3) There is an explanation with the graph.

Following the completion of the graphic document use lessons, in one preferred embodiment of the present invention students are given a series of pencil and paper exercises. In the first exercise, students are given the series of questions in FIG. 301 and the pie chart in FIG. 302 about which the questions are asked. In the second exercise, students are given the series of questions in FIG. 303 and the bar graph in FIG. 304 about which the questions are asked. In a third exercise, students are given the series of questions in FIG. 305 and the line graph in FIG. 306 about which the questions are asked. In the fourth exercise, students are given the series of questions in FIG. 307 and the bar graph in FIG. 308 about which the questions are asked. In the fifth exercise, students are given the series of questions in FIG. 309, the line graph in FIG. 310 and the line graph in FIG. 311. Through the questions, students are asked to compare and contrast the two line graphs.

In another embodiment of the present invention, these exercises are presented on screen displays and students answer the questions with the use of electronic pens.

3. Forms

The instruction on forms by the Computerized Literacy System is based on certain basic principles. First, forms are documents that must be filled in by someone. This common characteristic distinguishes forms from all other types of documents. In accordance with the present invention, students are taught to consider four characteristics of forms: (1) use/function; (2) information source and type; (3) response mode; and (4) structure.

Second, the uses and functions of forms can be arrayed along a continuum ranging from personal to societal. At the societal end of the continuum, forms are used to regulate behavior. In brief, these are forms that require individuals to take an action on behalf of agencies, businesses and government. Typically, these forms are used to monitor personal conditions and behaviors. They are also used to verify an individual's arrival and departure in life (e.g., birth certificate). Moreover, these forms are used to update information which, when aggregated and analyzed, is used to influence policy decisions at various levels in our society. At the other end of the continuum are forms that are used to satisfy a personal need, for example, to help one remember particular facts or upcoming events, to direct others to take a particular action, to obtain information, and to enable one to engage in various activities which bridge personal and societal functions (e.g., driving a car).

Third, to learn to complete forms, students need to consider both the source and type of information being requested. Different types of content are associated with different information sources. One source of information is prior knowledge. The types of information available through prior knowledge are facts from personal memory, including name, address, phone number, and personal, biographical information such as date of birth and education history. The second source is information located on the form itself, referred to as the primary source. Forms containing primary source information provide all the possible answer choices and call for an individual to indicate which information he wants to convey. Examples of primary source forms include medical history forms, product surveys and product order forms. The third source is information located in secondary sources which an individual must transfer to the form. The types of secondary source information include mail-order product descriptions, financial transactions and automobile information.

A fourth principle upon which the instruction by the Computerized Literacy System is based is that there are about five kinds of spaces in forms: (1) lines to write on; (2) boxes to print in; (3) half-boxes to print in; (4) boxes to check; and (5) numbers or choices to circle. Once students understand that the kinds of spaces, and the ways to fill them in, are limited in number, forms begin to seem more manageable to them.

Another important point upon which the instruction is based is that although forms appear to organize their requested information very differently, the structural variation of forms is actually very limited. At the simplest level, forms consist of a peculiar "single-item" list, usually consisting of just one label and one item. At a second level, forms consist of a list of single-item lists. At a third level, forms might consist of several rows or columns of lists made up of single-item lists. The structure of these forms is not unlike the structure of combined and intersecting lists. Finally, at a fourth level, forms might consist of different labels which include items organized in any one of the previously described structures.

Because forms are so much a part of every student's life, one embodiment of the present invention makes as much use of motion video as possible in the lessons on forms. There are several short motion video segments used as illustrations which give a more "real-life" feel to the forms lessons.

In addition, graphics are used to create examples of forms for students to fill out on the screen, because having students enter their own information into the computer is believed by the inventors to be a powerful motivator for learning. The SHOW ME icon is available for all of the forms examples which, when clicked, causes the forms to be filled in. The examples can then be erased so that students can fill in their information after they have seen the example. Because forms exist most often on paper, not on computers, instructors also provide examples of forms for students to fill out whenever it seems appropriate, particularly during the use lessons.

(1) Structure Lessons

Figure 258:
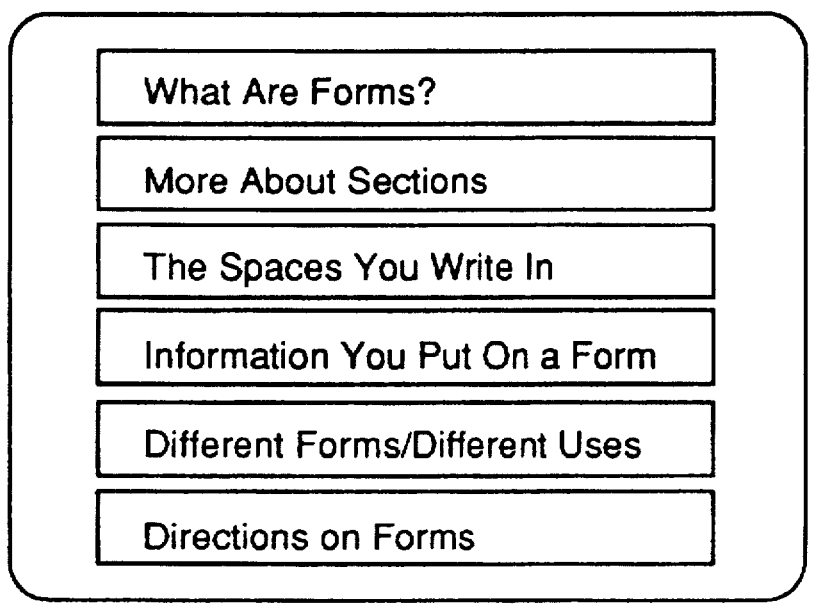

The forms structure lesson segments give students some general ways of organizing forms, and of approaching the task of filling them out. In accordance with the Knowledge Model Procedure, the Computerized Literacy System requires students to choose from among a reasonably limited number of forms structure lesson segments. The lesson segment menu is in FIG. 258.

In the first structure lesson segment for forms, "What are Forms?", students are introduced to forms and to the idea that all the documents they have studied so far required them to find information in the documents, whereas forms are documents into which information is put.

Figure 260:
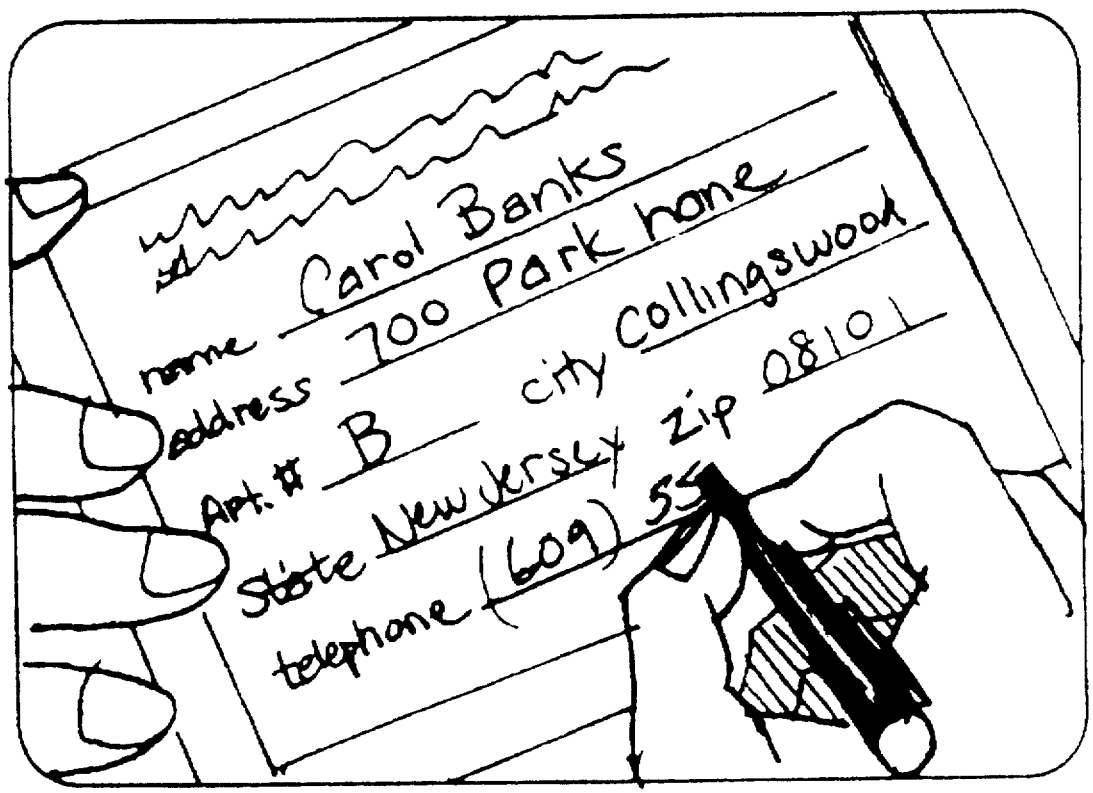

The Lesson Segment. Students are first told that, Most documents contain information. You use these documents by finding information in them. (Text is italicized, as explained above, to indicate it appears on a screen display.) There is then a short video clip on the video screen of a person's finger locating information in a combined list. See FIG. 259. Students are then told that, Forms are documents you fill in. A video still of a form in the process of being filled in is then displayed on the video screen. See FIG. 260.

Figure 261:
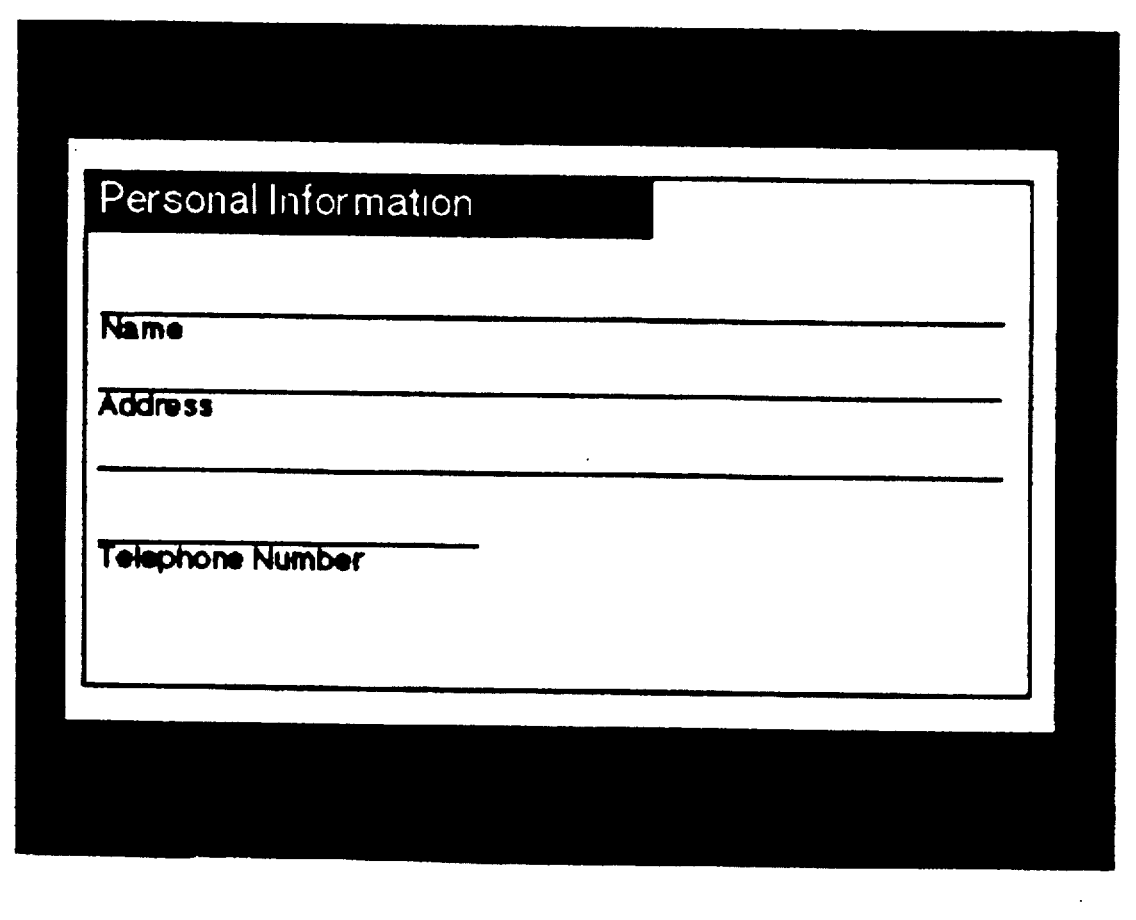

Next, students are taught that, Forms are usually divided into sections and usually have spaces for you to write in. When you complete a form, you usually fill in information about yourself. The screen display in FIG. 261 is shown, and the students fill in a section of an employment application in the display.

Figure 262:
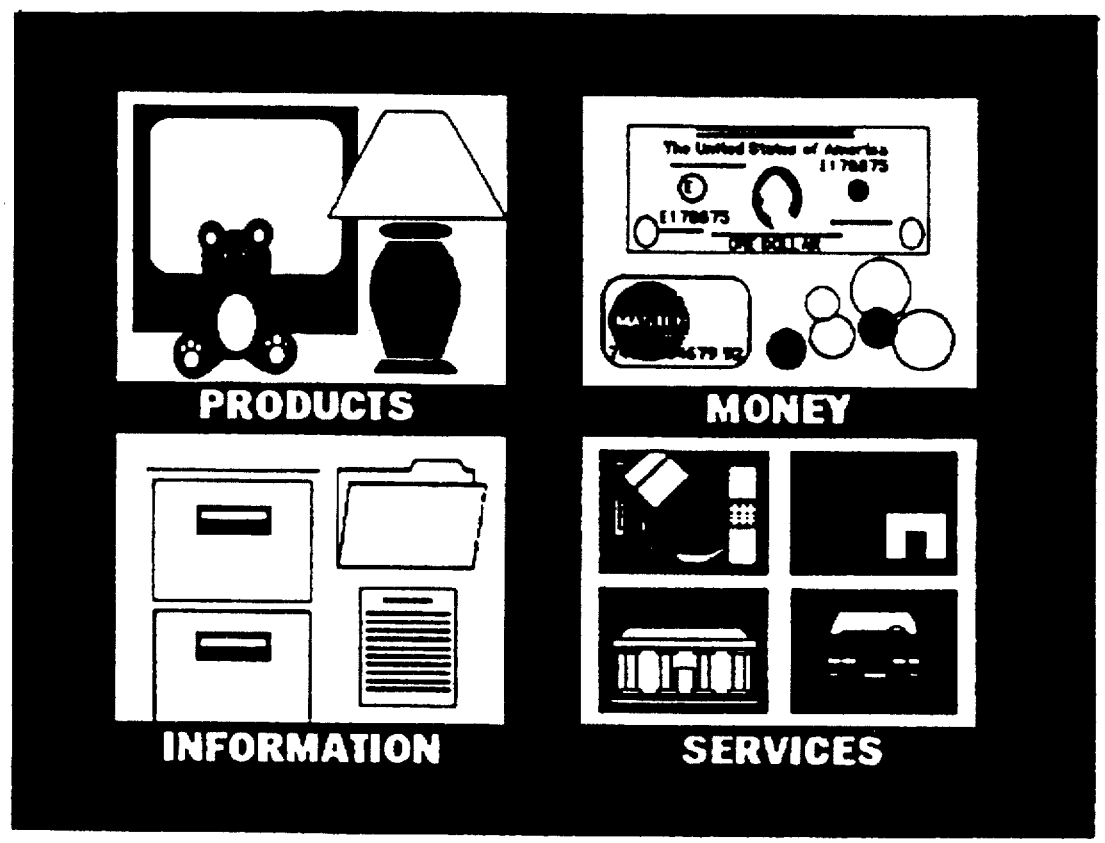

Finally, students are taught that, There are two good reasons for filling out forms: (1) Sometimes the law requires you to; (2) You usually get something in return for filling out a form. The screen display in FIG. 262 then appears on the video screen, and students are offered a choice of four graphics:

products, money, information, and services. By clicking with the mouse on a box on the screen, students are shown a video clip of a person filling out a form and receiving that type of item in return.

Summary. Forms are documents you fill in.

Figure 263:
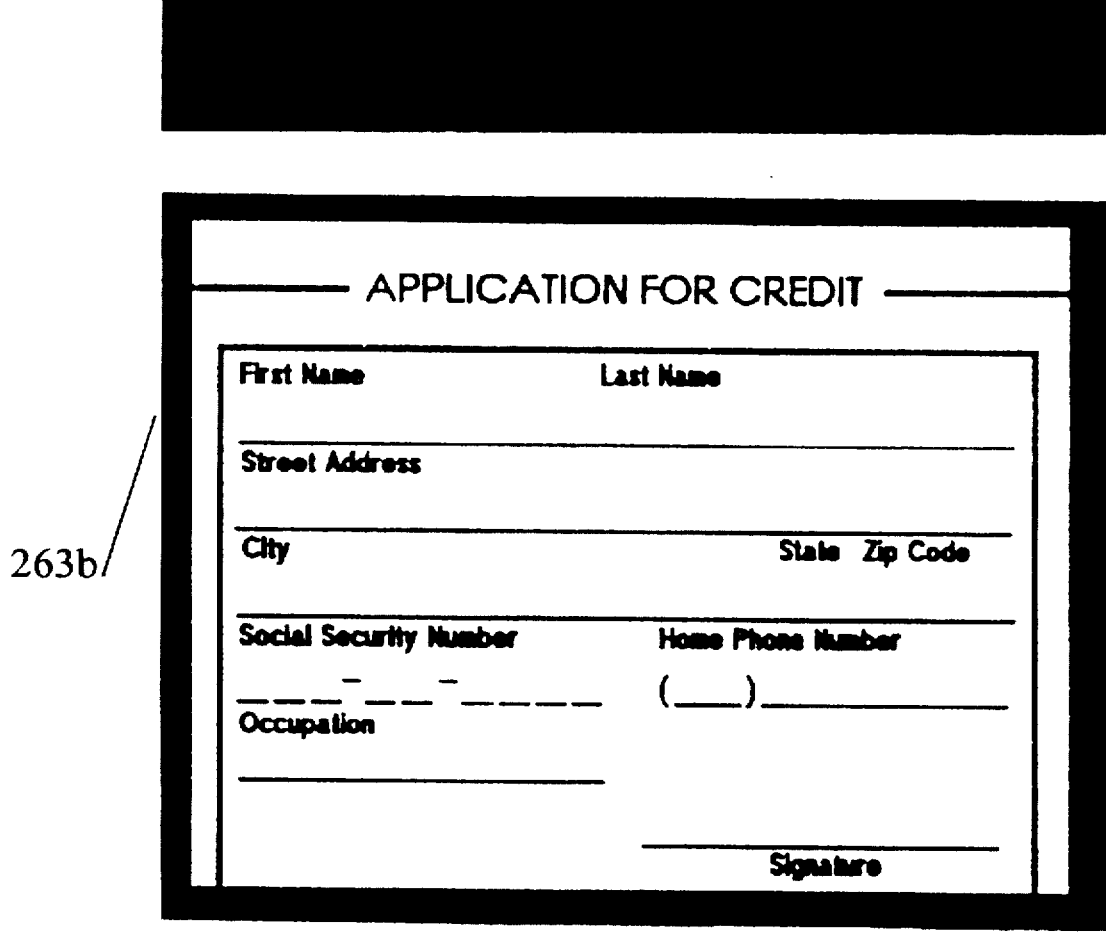

The Class Exercise. A screen display showing an application for credit appears on the video screen, and a list of possible answers appears on the computer monitor. See FIG. 263. Students are asked to drag with the mouse each piece of information from the computer monitor FIG. 263a to its appropriate space on the form pictured on the video screen FIG. 263b.

In the second structure lesson segment, "More about Sections," students are taught that one thing the structures of forms have in common is that they are usually divided into sections. They are taught that although the sections look different from each other and do not always serve the same function, looking at them can help students approach a form in a more organized way, and fill out a form more efficiently.

Figure 265:
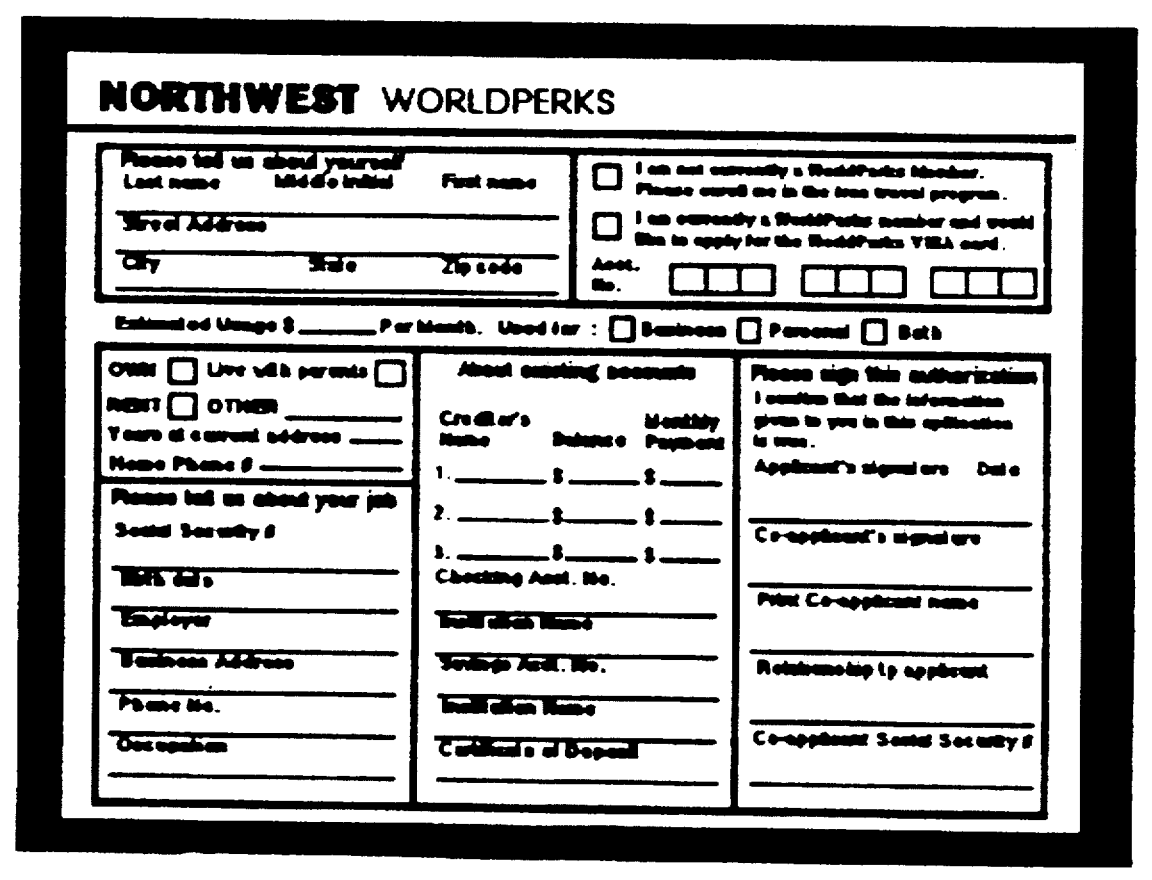

The Lesson Segment. Students are first taught that, A form is usually divided into sections to make it easier to read. The screen display in FIG. 264 appears as an example. Students are then taught that, The sections usually divide the form according to the information required. There may be section headings to tell you what the kinds of information are. The screen display in FIG. 265 is shown as an example. Clicking on NEXT EXAMPLE brings up another screen display, with a Change of Address form.

Figure 266:
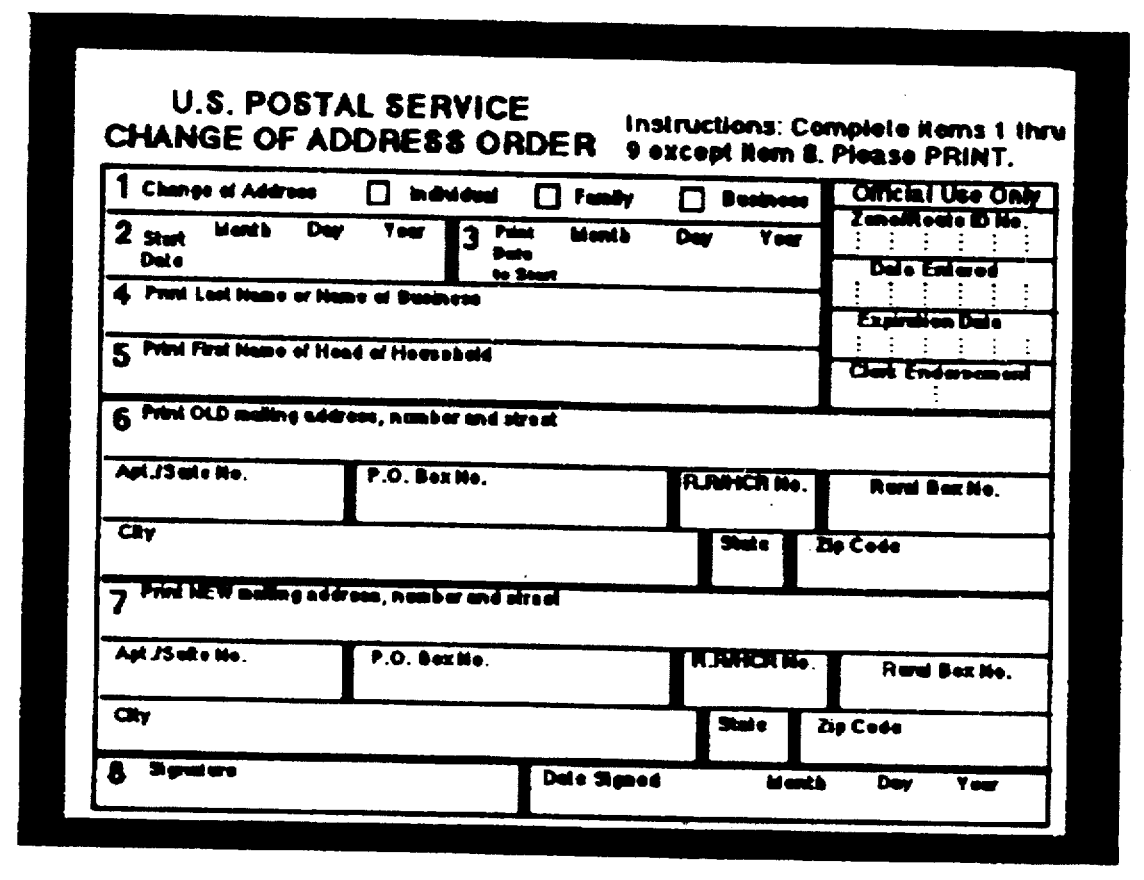
Figure 267:
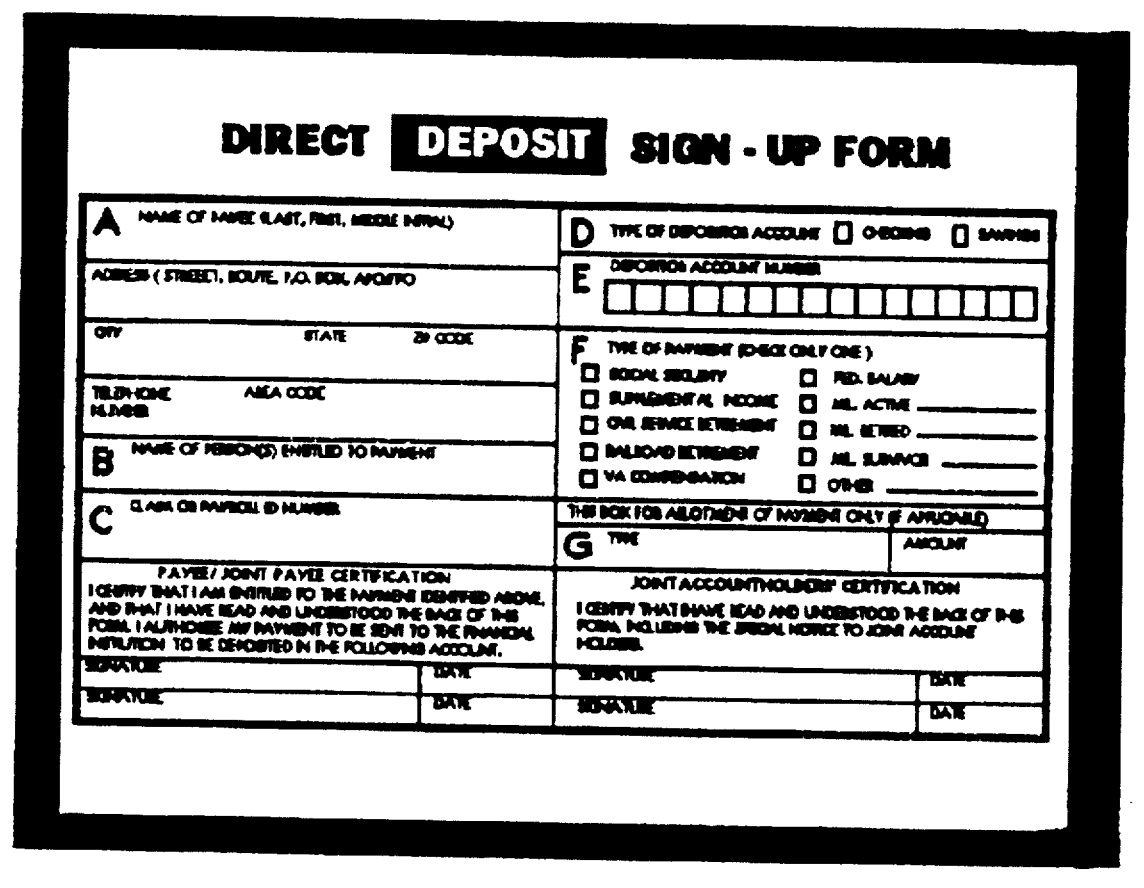
Figure 268:
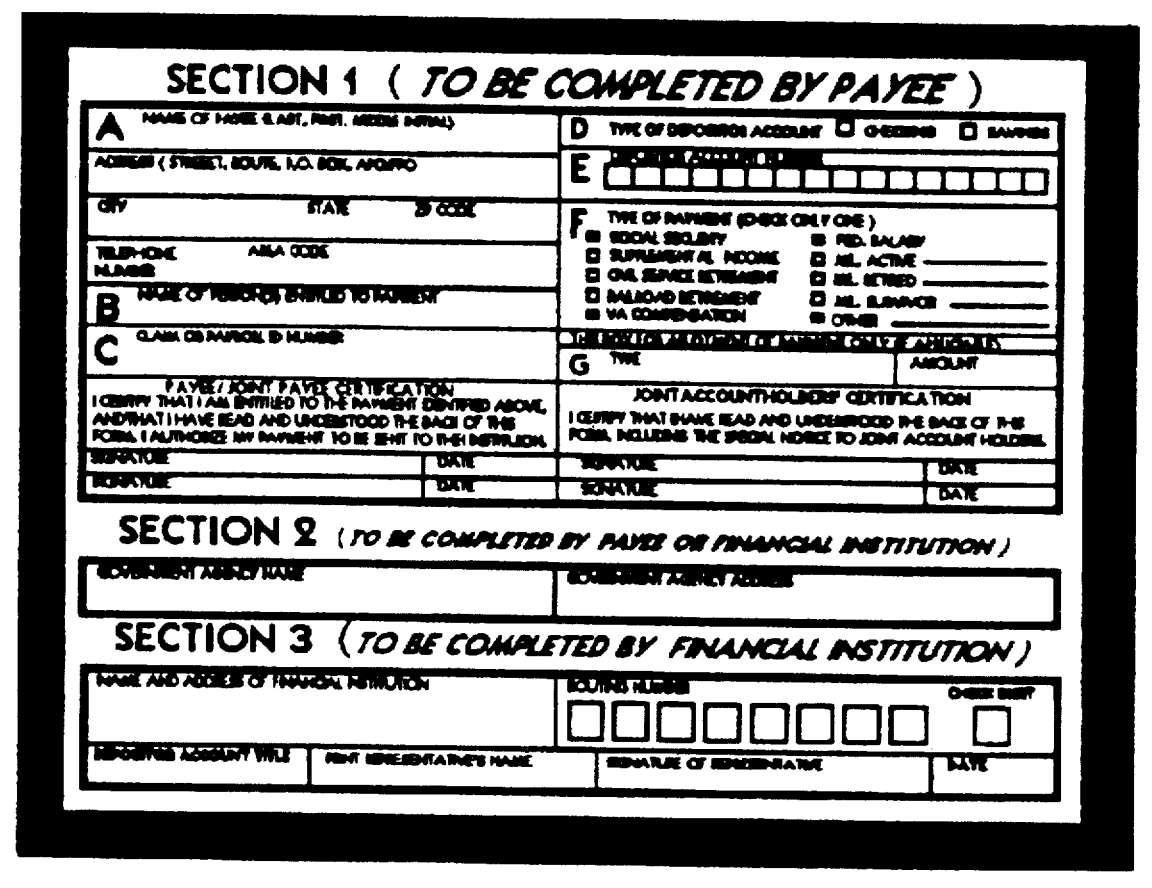

Next, students are taught that, Sometimes a form is divided into sections to make it easier for the people who transfer the information onto computers. A 13 second video clip is shown on the video screen in which a person transcribes information from a form and enters it into a computer. Afterwards, a series of screen displays is shown indicating different kinds of sections: (1) The screen display in FIG. 266 appears. Students are told, This form has section headings that are numbers, and the numbers highlight on the screen. (2) The screen display in FIG. 267 appears. Students are told, This form has section headings that are letters, and the letters highlight. (3) The screen display in FIG. 268 appears, and students are told, Some forms even have sections inside of sections.

Summary. The section headings of a form can help you see: how the form is organized, and what kinds of information you need to provide.

The Class Exercise. An employment application appears in a screen display on the video screen. FIG. 269. Students are asked, What would be a good heading for Section A? They type their answer on the computer monitor, and it flies over to the form on the video screen. There are three sections that students are asked to label: personal information, education, and employment history.

In the third structure lesson segment, "The Spaces You Write In," students are taught that forms all consist of spaces to be filled in. They are told that although the kinds of spaces may seem infinite in number, there are actually about five: (1) lines to write on; (2) boxes to print in; (3) half-boxes to print in; (4) boxes to check; and (5) numbers or choices to circle. Once students understand that the kinds of spaces, and the ways to fill them in, are limited in number, forms begin to seem more manageable to them.

The Lesson Segment. Students are first told, Forms have different kinds of spaces for you to write in. The next screen display offers students a choice of the five kinds of spaces, and students select which choice to learn about by clicking with the mouse on that area of the screen: There may be: (1) lines for you to write on; (2) boxes for you to write in; (3) boxes for you to check; (4) half-boxes for you to write in; and (5) numbers for you to circle. All the choices must be selected to proceed to the end of this segment, but they can be selected in any order. The forms that appear in the screen displays shown after the selection of each choice can be filled in by the students.

When "lines for you to write on" is clicked, the screen display in FIG. 270 is shown, and students are taught, This kind of space is usually used for answers that contain more than one word, like name and address. Students are asked to type in their name and address information on the form in the display.

When "boxes for you to write in" is selected, students are shown the screen display in FIG. 271, and are taught, You are expected to put one letter or number in each box. The boxes limit the number of letters or numbers you can put in. Students are asked to make up a savings account number to fill in the form in the display.

When "boxes for you to check" is clicked, the screen display in FIG. 272 appears, and students are taught, These are used when you have a choice among a limited number of answers. They are asked to place checks in the appropriate boxes on the video monitor by clicking there with the mouse.

When "half-boxes for you to write on" is chosen, students are shown the screen display in FIG. 273, and are told, You are expected to put one letter or number in each half-box. If you have to print more than one word, be sure to leave a space between words. Students type one letter in each half-box to fill in the line for "name" in the display.

When "numbers for you to circle" is clicked, the screen display in FIG. 274 is shown. Students are taught, These are used when you have to choose from among several possibilities. Students use the mouse to click on their subscription choice in the screen display.

Finally, students are shown the screen display in FIG. 275, and are taught that, Forms usually have a combination of kinds of spaces.

Summary. Forms have different kinds of spaces for you to fill in.

Figure 277:
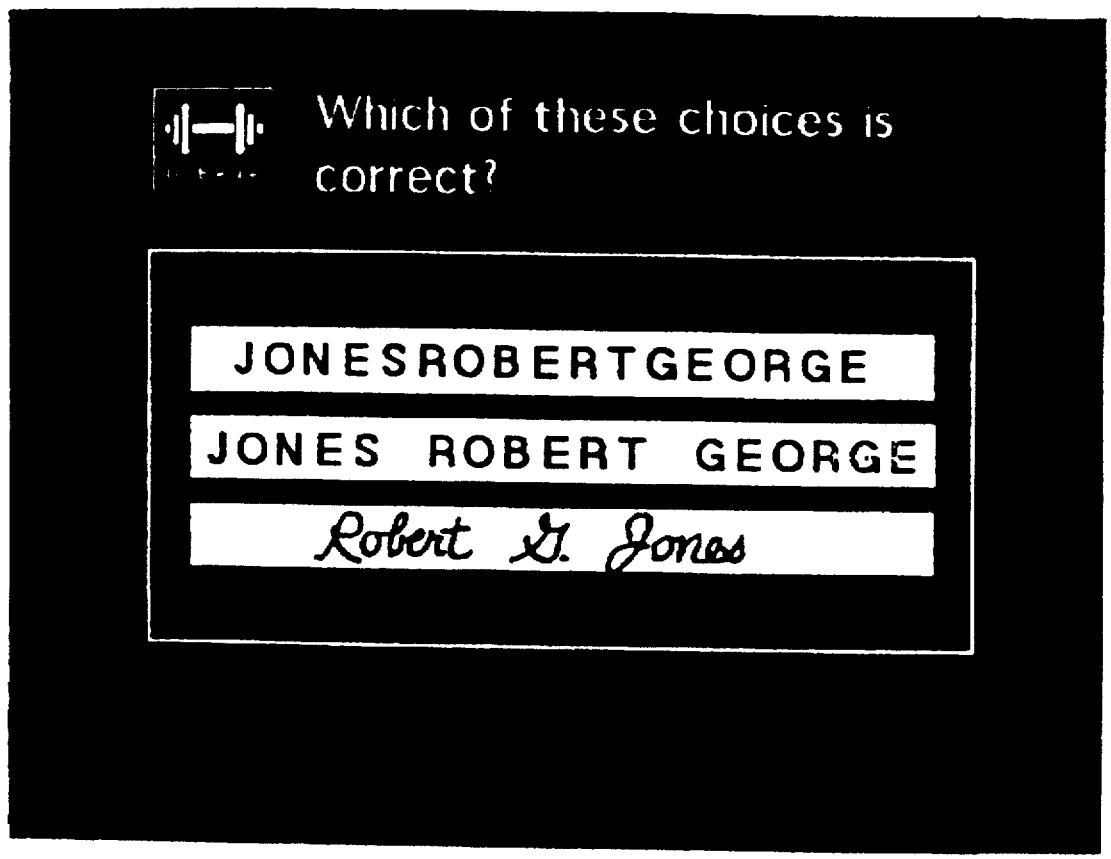

The Class Exercise. Students are shown the screen display in FIG. 276 on the video screen. They are then shown a series of screen displays on the computer monitor such as the one in FIG. 277, each containing a list of possible choices to fill in the spaces in the form in FIG. 276. Students use the mouse to drag the correct choices from the computer monitor to the appropriate spaces on the video screen.

The fourth structure lesson segment, "Information You Put on a Form," teaches students that all forms require information, and that filling out forms can be seen simply as a transfer of information from one place to another. This lesson segment helps students organize their thinking about forms in terms of the information the forms require and where they get that information. Students are taught that there are three "places" to get information: their own memory, the form itself, and records.

The Lesson Segment. Students are taught a series of points and are shown a series of screen displays displaying samples of forms that serve as examples for each point: (1) When you fill out a form, you are transferring information from one place to another. (2) Sometimes you know the information (like your name and address). (3) Sometimes the information comes with the form itself: as a choice you need to select; as a code you have to find; or as a pamphlet you need to refer to. (4) Sometimes you have to find the information from another source: your records, or someone else's records.

Next, students are shown the screen display in FIG. 278, and are asked, Where would you get the information to complete this section of the form? By clicking on the NEXT QUESTION icon, students are shown additional screen displays of a medical form and an appliance warranty.

Finally, students are taught, Once you get the information, how do you transfer it onto the form? If you know the information, you just write it down. Sometimes you copy it directly. Sometimes you figure it out from the information you have (like totaling an order form).

Summary. When you fill out a form: first you find the information, then you transfer it onto the form.

The Class Exercise. Students are shown screen displays of five pages from a JCPenney's catalog and an order form. They are then directed to: (1) Select three items of your choice. (2) Select three items that add up to less than 100 dollars. (3) Select an item from each of three different pages. This exercise shows students the different places they get the information to fill out the order form, including the order total. All of the places are specified by the form. Clicking on SHOW ME shows students one sample line on the form filled out.

The fifth structure lesson segment, "Different Forms/ Different Uses," teaches students that some forms are harder to fill out than others, often because of the purpose of the form. Students are told that if someone wants to sell them something, the form is fairly easy to fill out, but if they are applying for something (e.g., credit, public service aid), the form is usually more difficult to fill out. They are also taught that forms that allow them access to money or services usually require more information and more reading. Finally, they are told that these forms are often harder to understand as well, because they are designed for and sometimes by the people who process the information after it is entered on the form.

The Lesson Segment. The first screen display tells students: What makes some forms harder to fill out than others? Sometimes it depends on the purpose of the form. (Text is italicized herein, as explained above, to indicate it appears on a screen display.) Students are then directed to, Pick a type of form to find more information about:, and they select from three choices: consumer/shopping; credit; and public agency. Students click with the mouse on their selection. All three selections on the menu screen must be made before proceeding to the end of the segment.

Figure 279:
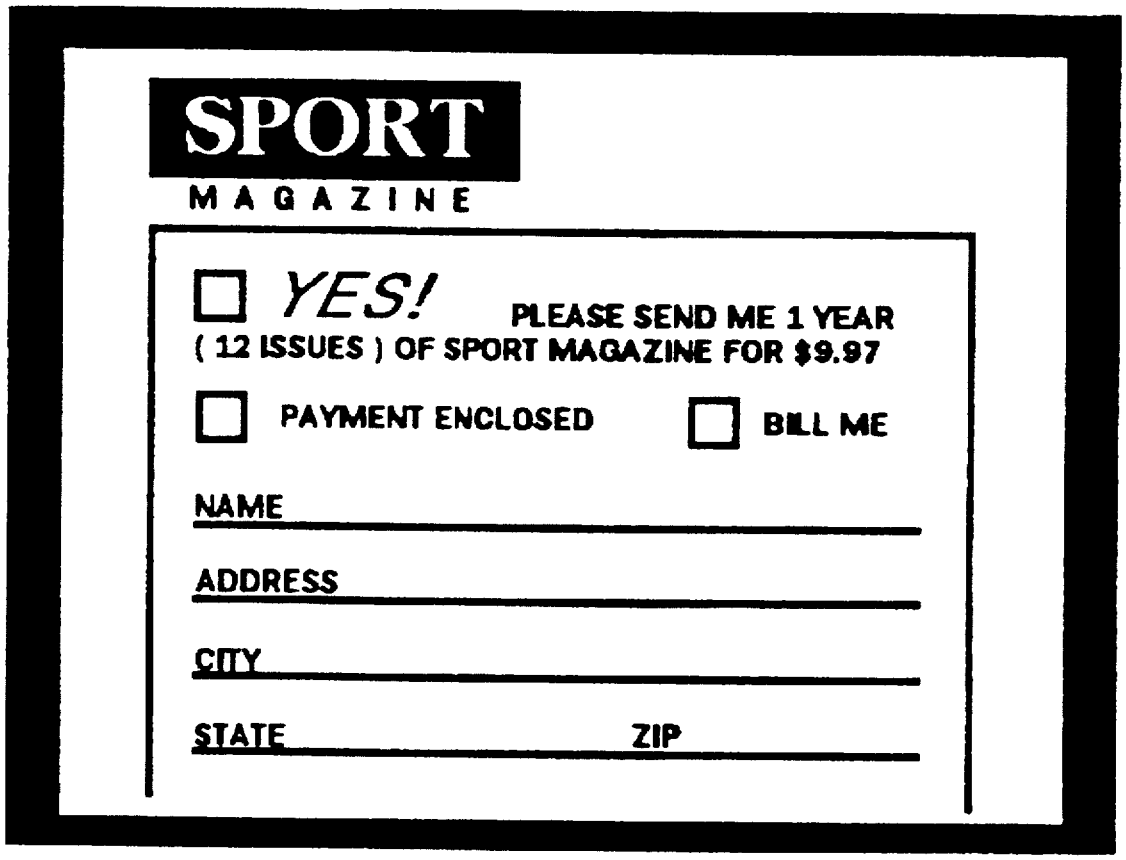

When "consumer/shopping" is clicked, students are first told that, Forms for consumer goods are usually pretty easy to fill out. They ask you: your name; your address; and how you want to pay. Students are then shown the screen display in FIG. 279, and, by clicking on the NEXT EXAMPLE icon, they are shown a screen display with a coupon to order a tie-dye T-shirt, and then with a "Cassette Express" order form. Finally, students are told, Consumer forms are fairly easy to fill out because they want to make it easy for you to buy a product.

Figure 280:
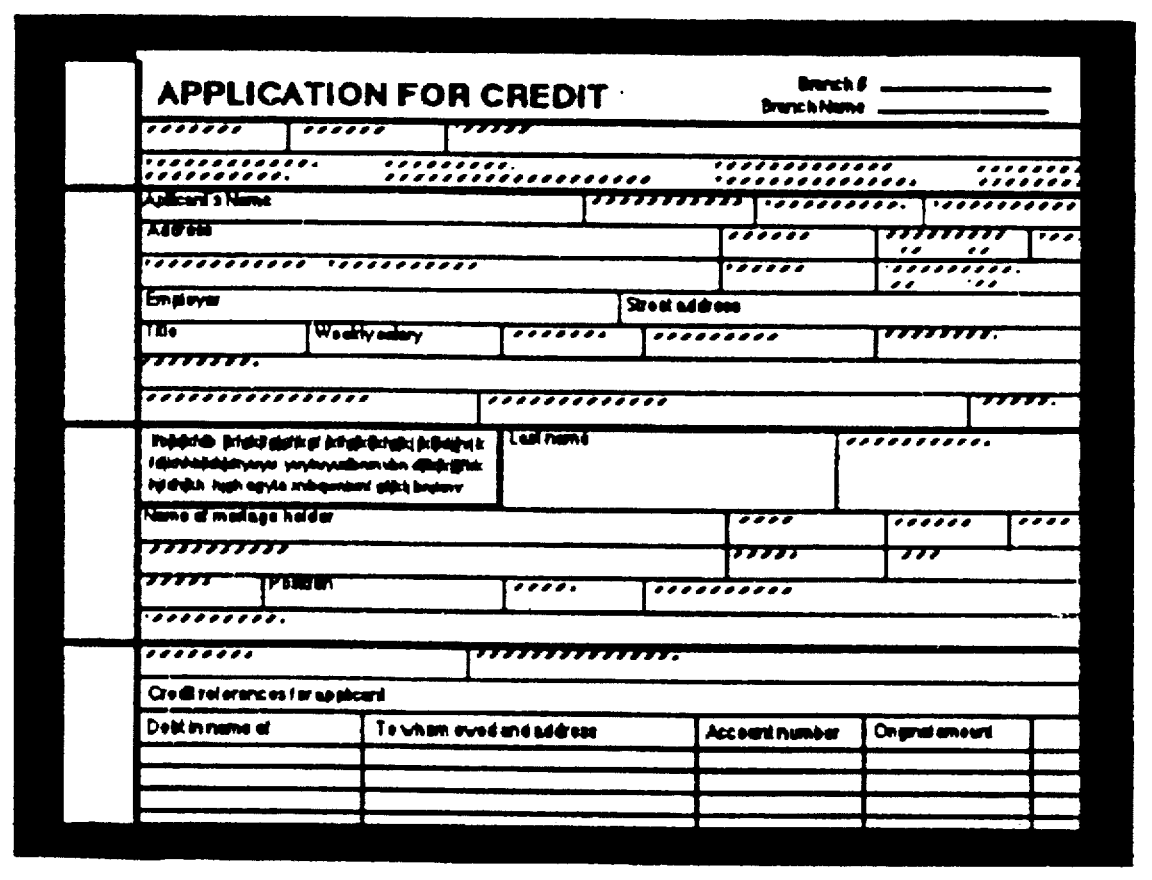

When "credit" is selected, students are first taught that, Credit forms are usually complicated. They ask you for a lot of information. Sometimes there is a lot to read. The screen display in FIG. 280 appears as an example. NEXT EXAMPLE: a screen display showing an American Express Card application. Because the forms in these screen displays are just meant to give students the look of these forms, and are not meant to be read closely, the words in these screen displays are not necessarily perfectly legible. Students are then taught that, Applications for credit are complicated forms because the people who are considering lending you money need to know a lot about you to know whether or not you can pay the money back. Finally, students are told, When you are filling out credit forms, it is important to read the terms of agreement, and they are shown the screen display in FIG. 281 as an example.

When "public agency" is selected, students are first taught that, Public agency forms are often complicated and hard to fill out. They ask you for a lot of information. There is often a lot of reading for you to do. They use specialized vocabulary. Students are then shown the screen display in FIG. 282, and told, This form illustrates the point about specialized vocabulary. It would be difficult to know what to put in some of these blanks. Public agency forms are often hard to fill out because these forms are often designed for the people who process the information rather than for the people who fill out the forms.

Summary. Some forms can be harder to fill out than others. Often it depends on the purpose of the form.

The Class Exercise. Students are shown the screen display in FIG. 283, and asked, Why would this consumer form ask for a name and address? By clicking on NEXT QUESTION, students are shown a screen display with a credit application, and asked, Why would this credit application ask for information about your income and savings? Clicking on NEXT QUESTION a second time shows a screen display with a Philadelphia Housing Authority application, and students are asked, Why would this credit application ask for information about your household members?

In the sixth structure lesson segment, "Directions on Forms," students are taught that one unifying principle of forms is that they usually contain directions. This lesson segment is essentially a presentation segment, showing students what kinds of directions are typical on forms, and giving examples of those types of directions.

The Lesson Segment. Students are first taught that, Forms almost always contain some directions. The directions on a form can tell you: (1) how to write; (2) where to write; (3) where not to write; and (4) what to do with the form after you fill it out. The screen displays for each of these points is accompanied by screen displays showing forms with the appropriate direction(s) highlighted.

Figure 284:
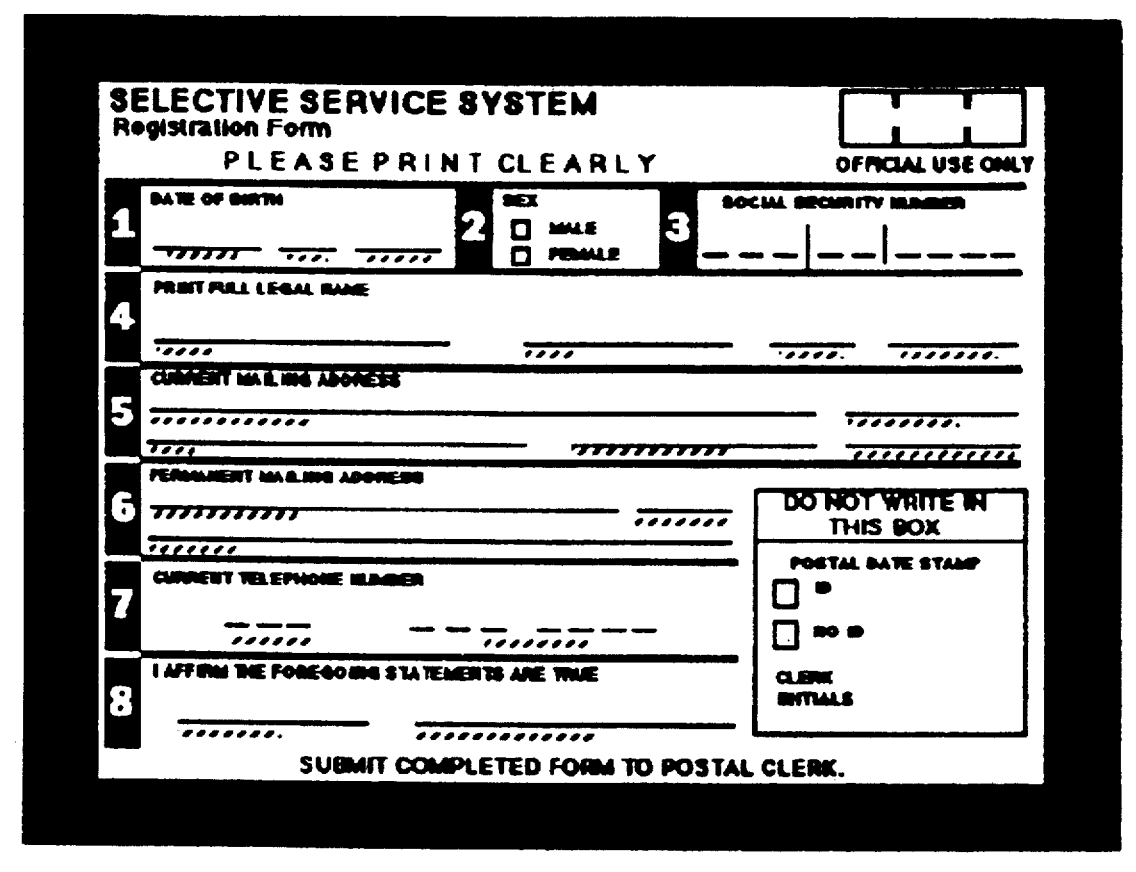

Next, students are shown the screen display in FIG. 284, and are asked a series of questions: (1) What directions tell you how to write on this form? (2) What directions tell you where not to write on this form? HINT: There are two answers to this question. (3) What directions tell you what to do with the form after it's filled out? All three questions must be answered before proceeding to the remainder of the lesson segment.

Figure 285:
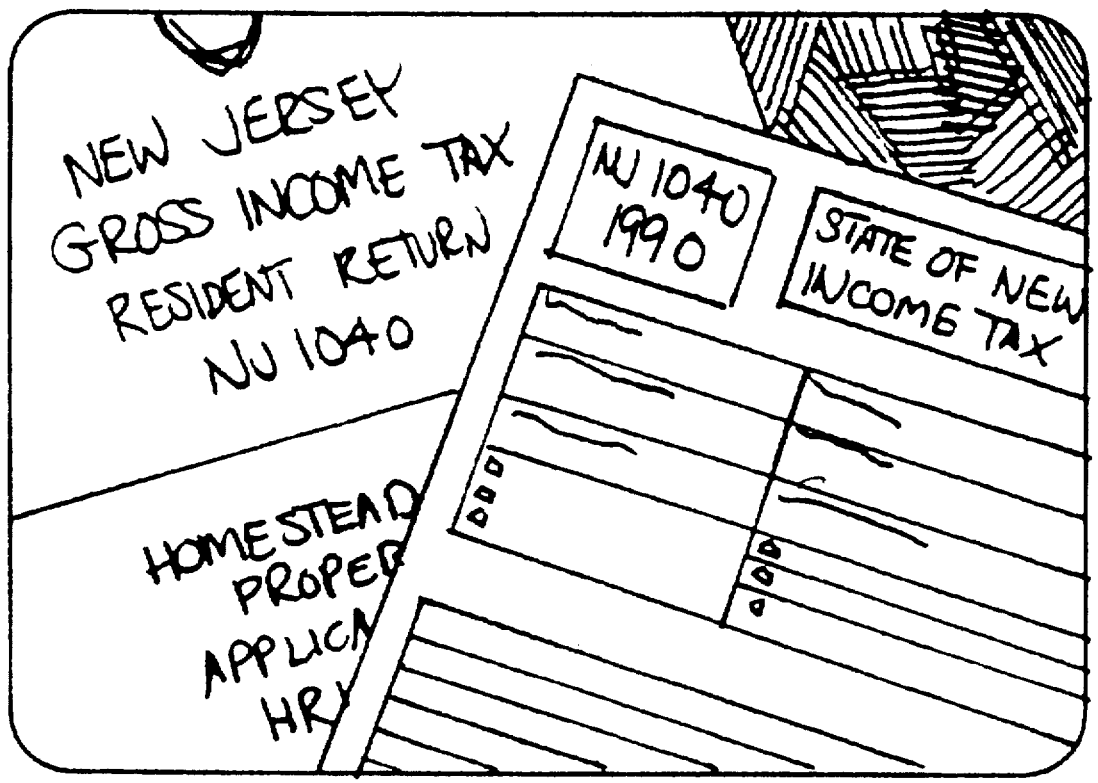
Figure 294:
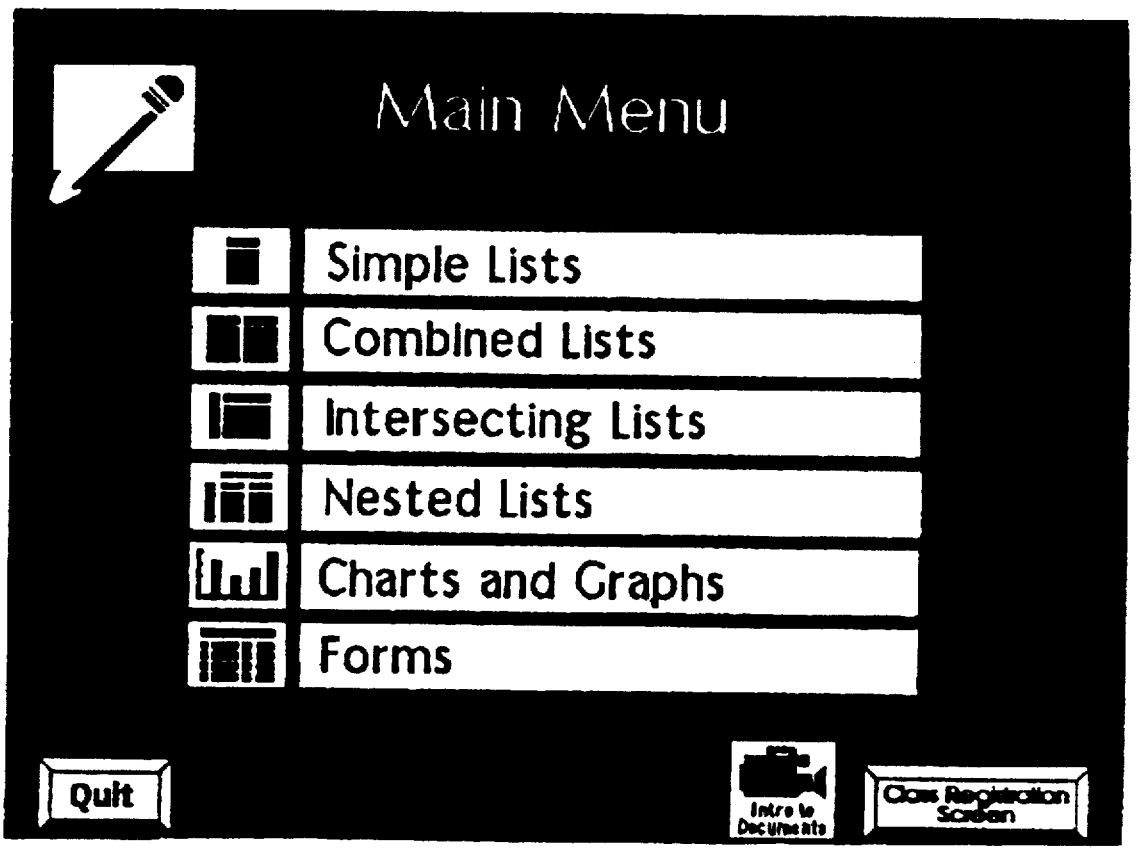
Figure 295:
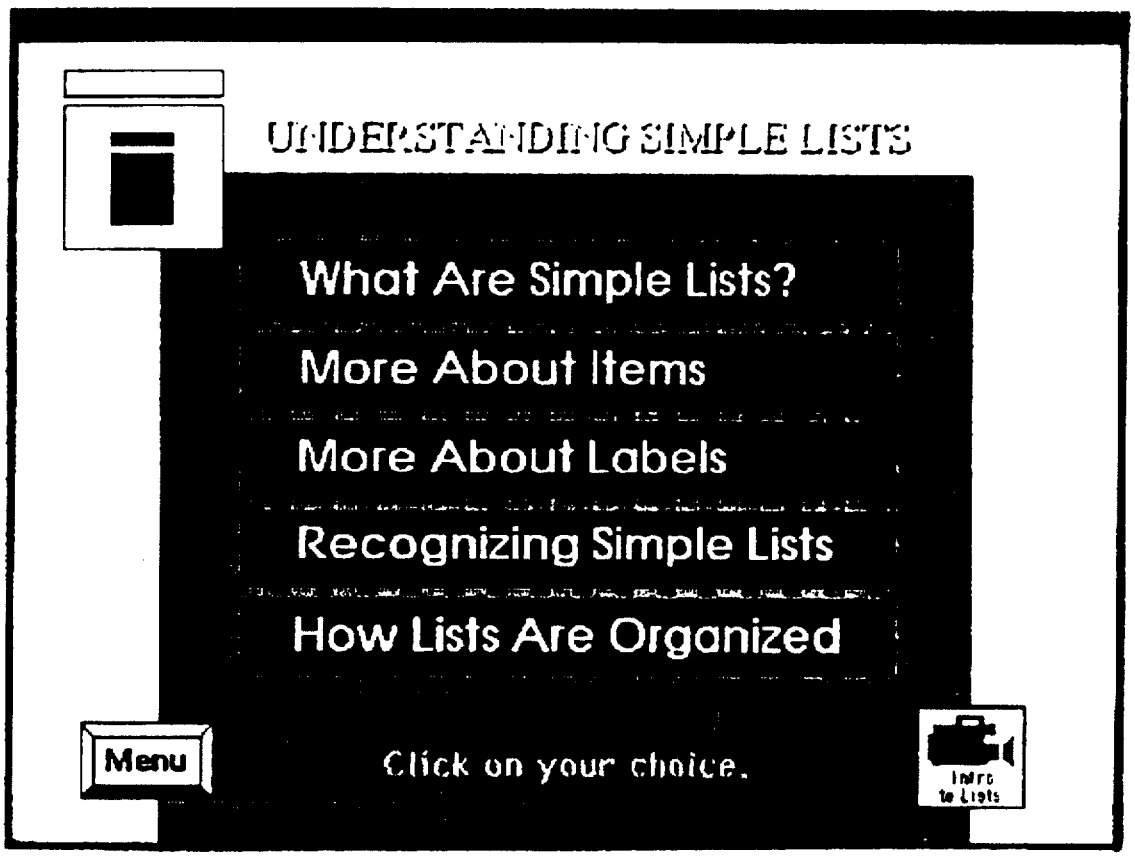

Finally, students are taught that, Directions are sometimes outside the form itself. They are then shown a video image of a tax form and instruction booklet. See FIG. 285.

Summary. Reading the directions carefully before you begin to fill out a form can help you complete the form successfully.

The Class Exercise. Students are shown a completed application for a Social Security Card and are asked to identify where the form has been filled in incorrectly. Clicking on SHOW ME indicates where the mistakes are.

(2) Use Lessons

The forms use lesson has only three lesson segments. Because the inventors believe it is important for students to practice working with forms on paper, the structure of these lesson segments is looser than usual, and allow the students to move back and forth among video presentations, class discussions, and paper and pencil activities. They also give the students menus within menus to allow them to move among kinds of forms, or to view them together so that students can examine the common aspects of forms within content areas.

Figure 5:
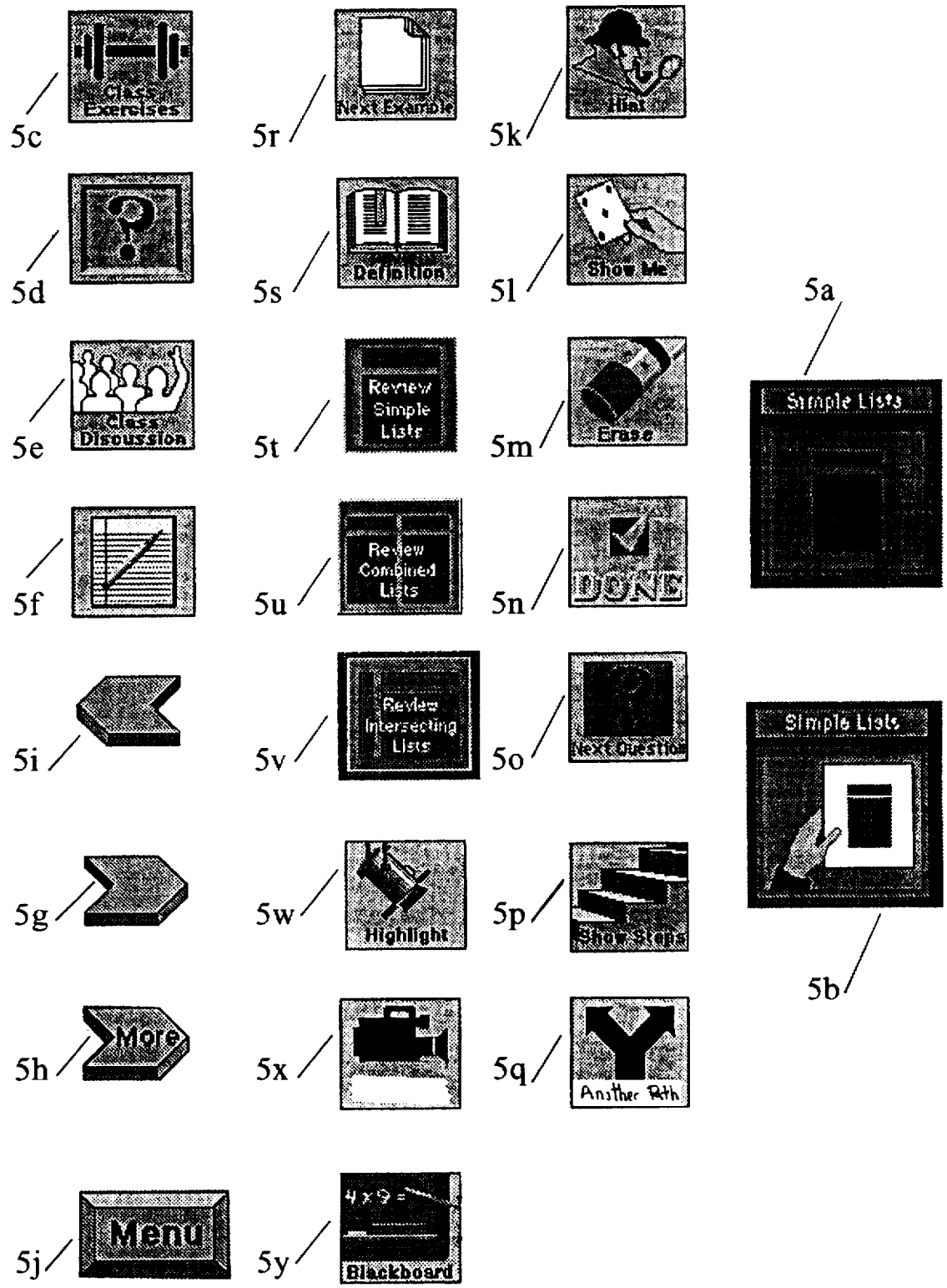
FIG. 5 shows icons that appear on screen displays shown during the operation of one preferred embodiment of the Computerized Literacy System.

Besides using video presentations, the Computerized Literacy System provides a BLACKBOARD feature that is accessed by clicking on the icon shown in FIG. 5y. Clicking on the BLACKBOARD icon allows students to type on the screen and thus "think aloud." Clicking on the SHOW ME icon while the BLACKBOARD feature is active displays on the video screen a list to either stimulate discussion or compare with what the class has said.

The Computerized Literacy System requires students to select from among a reasonably limited number of use lesson segments for forms. The lesson segment menu is in FIG. 286.

In the first use lesson segment for forms, "Forms in Different Content Areas," students are taught that the kind of form determines the kind of information required. Students are shown several different examples of forms from various content areas—job applications, credit applications, health-related forms, and public assistance forms—to discover what kinds of information are required. They are also taught what the forms from any given content area have in common.

The Lesson Segment. Students are first told, When you have to fill out a form, it helps to think about the kind of form you are filling out. The kind of form you are filling out determines the kind of information you have to provide. They are then shown a screen display that acts as a menu of four kinds of forms about which to receive instruction: (1) Job application; (2) Credit application; (3) Health-related forms; and (4) Public assistance. Students choose a kind of form to look at by clicking with the mouse on one of the areas on the screen display.

When "Job application" is selected, students are first told, Before you fill out a job application, it helps to think about the things a prospective employer would like to know. They are then shown several examples of job applications and are asked, What do job applications ask about you? SHOW ME: A prospective employer needs to know whether you have the education, skills, or experience to begin the job. You can prepare to fill out job application forms by writing down in advance the information you know they will ask for.

When "Credit application" is selected from the menu screen, students are first told, Before you fill out an application for credit it helps to think about the things lenders would want to know about you before they lend you money. They are then shown several examples of credit applications and are asked, What do the credit applications ask about you? SHOW ME: A prospective lender needs to know whether or not you can pay the money back. If you know that a credit application will ask you about your finances, you can prepare to fill out the form by collecting your financial information.

When "Health-related forms" is clicked, students are first told that, Health-related forms usually require you to tell about your health. When you see a doctor you might be asked to tell about the health problems you or your relatives have had in the past. The screen display in FIG. 287 appears as an example. Next, students are told, If you have insurance that helps pay for doctor or hospital service you might be asked what the service was for or who the service was for. They are shown an example of a health insurance claim form and are asked, What kinds of information does the Health Insurance Claim form ask for? They are then shown an example of a medical record form and are directed to, Look at the Record of Medical History. What kinds of information does it ask for? In both cases, the BLACKBOARD icon can be clicked to allow students to record their comments on the computer monitor.

When "Public agency" is selected, students are taught the following series of points: (1) The information you are required to put on a public agency form depends on what you are applying for. (2) Most public agency forms ask you for a lot of information about your household and income. (3) Forms related to employment ask for a lot of information about your employment history. Students are then shown a screen display with a menu offering them a choice of three kinds of public agency forms: (1) Work registration form; (2) Public assistance form; and (3) Driver's license application. Clicking on each of these choices shows students examples of forms. In each case students are asked, What kind of information does the form ask for? The BLACKBOARD icon can be used to allow students to record their observations.

Summary. The kind of form you are filling out determines what kind of information you have to provide.

In the second use lesson segment, "Steps in Filling Out a Form," students are shown a motion video in which people fill out forms. The rest of the segment is structured around the video, and many clips from the video are used to illustrate the points being made in the segment. Students are taught to follow the same steps they see in the video, and, during the segment, fill out the same form shown in the video. They are taught that the steps they see in the video and follow in the lesson segment can be used for any form they fill out. The segment is divided into parts, which allows instructors to present it over more than one period of time, and to assign students to gather the information they will need for filling out the form at the next instruction period. Students are taught what to do before filling out the form, what to do upon getting it, and what to do after having filled it out.

The Lesson Segment. After they are shown the video, students are told that, No matter what kind of form you have to fill out, it helps to follow some basic steps. They are then shown a screen display which gives them the option of choosing one of the following three topics on which to receive instruction: (1) Before you get the form; (2) When you get the form; and (3) Before you give back the form.

When "Before you get the form" is selected, students are directed to, Think about the kind of form you'll be filling out. In this lesson you'll be completing a job application. They are then asked two questions: (1) What kind of information will you probably need for a job application? (2) Where would you get the information you'll need to fill out a job application? For each question, the BLACKBOARD icon can be used to allow students to record their answers, and the SHOW ME icon can be clicked to put an answer list on the video screen. Finally, students are directed to: Write down as much information as you can before you get the form. Make a list of the specific information you'll need to fill out a job application.

When students select "When you get the form," they are shown copies of the employment application. They are then shown the following series of screen displays (text is italicized herein to indicate it appears on a screen display): (1) Look at the sections of the job application. (2) Read the directions carefully. Do you need a certain kind of pencil or pen? Can you tell where to write on the form and where to leave it blank? (3) Here are some suggestions to help you fill out the form: If you can, fill out a copy of the form first. Begin with what you know. Ask for help if you need it. (4) If you are filling out the form at home, who could you ask for help? If there is no one to ask for help, use what you know about this kind of form. What kind of information is it probably asking for? (5) Fill out the job application.

When "Before you give back the form" is selected, students are told that before they give back the form, they should Check it over. They are then told to examine the form to see: Were you supposed to sign it? Were you supposed to date it?

Summary. You can use these steps for any form you fill out: (1) prepare, collect information; (2) fill out the form (a copy first, if possible); and (3) check it over.

In the third use lesson segment, "What Makes Forms Harder to Use?", students are taught that there are elements common to some forms that make them harder to use. A series of graphic examples shows students what can be frustrating about filling in forms, including not enough room to write and unclear directions. The segment points out that these things make filling out forms more difficult for everyone, and encourages students to ask for help if they need it. The inventors believe it is important for students to know that these difficulties are not the students' fault, and that everybody has the same set of options when it comes to a badly designed form: to either ask somebody for help, or make the best of it.

The Lesson Segment. Students are first told, Several things can make filling out a form more difficult. They are then shown a series of screen displays each pointing out a factor and showing an example: (1) Unclear directions. The screen display in FIG. 288 is shown; (2) Legalese—words that are long and legal-sounding. The screen display in FIG. 289 is shown; (3) Not enough room to write. The screen display in FIG. 290 is shown; (4) Unclear categories. The screen display in FIG. 291 is shown; (5) A lot of reading. The screen display in FIG. 292 is shown; and (6) Skipping from area to area. The screen display in FIG. 293 is shown.

Summary. These things make forms difficult for everybody. Be sure to ask for help if you need it.

4. Maps a. General Reference Maps

The inventors believe that the approach to teaching students to understand the structure of a general reference map and how to use it to access information depends in large part on the map's complexity. Therefore, one preferred embodiment of the present invention provides for structure and use lessons that are divided according to the level of complexity of maps.

(1) Structure Lessons

In accordance with the Knowledge Model Procedure set forth above, the present invention requires users to choose from among a reasonably limited number of structure lesson segments for general reference maps.

Figure 316:
Figure 317:
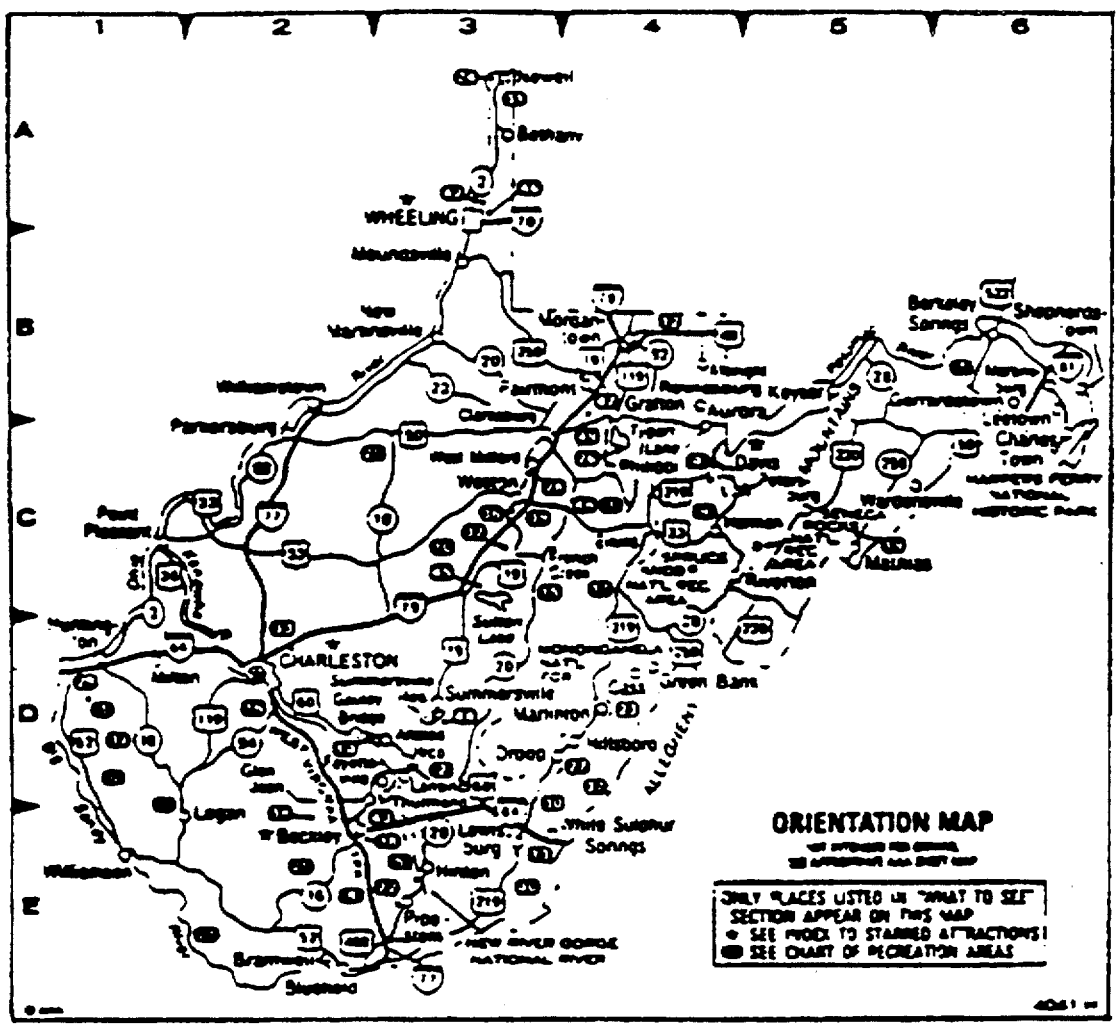

The first structure lesson segment for general reference maps introduces students to the concept that general reference maps vary in the number of purposes and types of users they serve. Students are taught that although some maps serve a very limited number of purposes and users, others may simultaneously serve a variety of different purposes and users. Students are shown how the amount of information stored in a map is directly proportional to the number of purposes and user groups. They are then shown a series of screen displays as examples: (1) They are shown a screen display depicting a map of pre-World War I Europe, and are told that the users would probably be limited to individuals interested in understanding what countries made up Europe before World War I. (2) They are again shown the screen display in FIG. 316, and are told that the users most likely would be individuals interested in understanding the location of the Sea of Marmara. (3) They are shown the display in FIG. 317, and are told: Some people might use this map to locate a particular recreation area, designated by the various circled numbers. Others might use this map to locate one or more "star attractions." Some might use this map to drive across the state of West Virginia.

The next section of the first lesson segment introduces students to the idea that to deal with large amounts of information, the information in maps is represented in an index. As an example, they are shown the screen display in FIG. 318. In addition, they are taught that maps containing a lot of information also have a set of coordinates imposed on them to enable users to more quickly match information in an index to its corresponding location on the map.

In the second structure lesson segment for general reference maps, students are told that maps that serve a single purpose and a single user group usually contain only one or two simple lists that each contain a relatively small number of items. They are again shown the map in the screen display depicting a map of pre-World War I Europe, and are told that it contains a single list of information. They are asked to identify a label for this list. By clicking on the SHOW ME icon, students are told that the label for this list might be "The major countries of Europe before World War I", and that the items in this map would include the 22 countries identified, such as Norway, Sweden, Denmark, Germany, and Russia. Next, they are shown the map in FIG. 316, and are told: This map consists of two lists: one might be labeled "Countries bordering the Sea of Marmara", and the second might be labeled "Marmara and surrounding seas". The items in the former list would include: Yugoslavia, Romania, Bulgaria, Turkey, Italy, Greece, and Albania. Items in the latter would include: the Mediterranean Sea, the Black Sea, and the Sea of Marmara.

Next, students are taught that maps serving limited purposes and groups of users tend to contain a limited number of items that make up only one or two simple lists. Students are taught that the locations of these items are marked by the items' names in a spatial array that corresponds to their geographic location in reality. To identify an item on such maps, students are taught to search among all the items spatially arrayed within the represented area.

In the third structure lesson segment for general reference maps, students are taught that sometimes a single map is designed to meet the needs of several user groups. They are shown a screen display of a road map of the United States as an example, and are taught a series of points based on this screen display: (1) To address all the different purposes and user groups that potentially might use this map, the map contains an exceptionally large amount of information. (2) This information can often be represented as a large number of lists, each containing a large number of items. (3) An index, which facilitates the search for information in maps, contains two or more simple lists that are concatenated into a combined list. Students are shown, as an example of an index, the screen display in FIG. 318, and are told that: This index is a partial listing of the information in the map of West Virginia. Two simple lists can be identified in the index, one labeled "Recreation Areas of West Virginia", and the second labeled, "Identification Number". When put together (or concatenated), the second simple list identifies the number equivalent of the recreation area in the corresponding row. In turn, the map shows the spatial location of these number equivalents in West Virginia. (4) The items in these lists are often ordered alphabetically to facilitate locating specific items on a map. (5) The title or label of each list in the index corresponds to the different purposes for which people might use the map.

In the final part of this lesson segment, students are shown two screen displays containing combined lists. One display contains a combined list titled "Recreation Areas and Parks," and students are told it would accommodate people wanting to picnic or camp. The second display shows a combined list titled "Hotels, Motels, and Inns," and students are told it would accommodate travelers needing a place to stay.

In the fourth structure lesson segment, students are taught that although indexes are useful in that they make it easy to identify items on a map, they are limited in that they do not assist in matching a specific item with its corresponding location on the map. They are shown the screen display in FIG. 317, and are told, The problem is that while we can easily determine that Sutton Lake is on this map, and that Sutton Lake is equivalent to the number 45 on the map, the question remains, Where is 45? With nearly 50 recreation areas and another 50 points of attraction and some 30 roads all listed on the map, it becomes quite difficult to locate a single recreation area, or in this case location 45.

Next, students are taught that to facilitate the process of locating a specific item, a coordinate system is imposed on a map's overall geographic area. Students are taught that this coordinate system consists of equal intervals, with the horizontal coordinates often being denoted by numbers and the vertical coordinates often being denoted by letters. They are again shown the screen display in FIG. 317, and are told that the area of West Virginia is divided into six numerical horizontal coordinates and five alphabetical vertical coordinates. Students are also taught that in large-scale maps of the world, the numerical and alphabetical coordinates are sometimes replaced or supplemented by meridian lines, representing intervals of 15 degrees longitude, and parallel lines, representing intervals of 15 degrees latitude.

(2) Use Lessons

In accordance with the Knowledge Model Procedure, the present invention requires users to select from among a reasonably limited number of use lesson segments for general reference maps. In these use lessons, students are taught to recognize the different parts of general reference maps as forms of matrix documents. Students are then taught to apply the strategies they were taught about other document structures through the use of the present invention to locate a set of items on a map for any particular purpose.

In the first use lesson segment, students are taught that a map with a coordinate system is, in effect, an intersecting list. They are taught to recognize the intersecting list structure in coordinate maps. Students are then told to apply what they have learned about intersecting lists and other matrix documents through the present invention to help them understand how to access information in maps. In addition, they are taught that within each cell defined by the intersection of a coordinate number and letter lies one or more items such as recreation areas, points of interest, or roads. They are shown how these points represent, in essence, three different simple lists whose items may all be arrayed in one coordinate square.

In the second use lesson segment, students are taught that unlike conventional intersecting lists that have only one item in a coordinate square, maps can have several items. They are shown a screen display with a TV schedule and told that this schedule has only one show per channel and time. Students are then taught that the items in a map's coordinate square may come from one list, and are shown a screen display of a coordinate square on a map that only contains items from the list of points of interest. Finally, students are told that the items may also come from all the lists, and are shown a screen display of a coordinate square in which there are items from the lists of points of interest, recreation areas, and roads.

In the third use lesson segment, students are taught that when maps are transformed into intersecting lists, the combined list in the indexes of such maps contains a simple list in which the items are the horizontal and vertical coordinates. They are shown the screen display in FIG. 319, and are taught that here coordinates for several recreation areas on the map are delineated in the simple list titled "Map Location".

b. Thematic Maps

The instruction by the Computerized Literacy System on thematic maps relies in part on the fact that the early development of thematic maps was limited due, in part, to problems associated with acquiring and interpreting large-scale data. Over the years, through the development of aerial and satellite capabilities for surveying broad areas, the availability of computers for storing vast amounts of information, and the application of statistical routines for analyzing these data, thematic maps have become an important part of everyday life. In accordance with one preferred embodiment of the present invention, students are provided with an understanding of the structure of thematic maps and how to use them for hypothesis testing.

(1) Structure Lessons

In accordance with the Knowledge Model Procedure, described above, the present invention provides students with a reasonably limited number of structure lesson segments on thematic maps.

In the first structure lesson segment, students are introduced to thematic maps and are taught a series of points: (1) Thematic maps show how a single phenomenon is distributed over a given geographical area. This phenomenon is usually abstract and not directly observable from a single observation point. (2) Phenomena represented in thematic maps most often include weather patterns, land elevations, population densities, natural resources, and consumer or voter preferences. (3) Thematic maps are similar to graphic documents in that they pictorially represent patterns of data. Students are told about the importance of learning to discern these patterns, to identify trends, and to generate hypotheses about the relationships underlying these trends. (4) Unlike graphic documents, however, thematic maps do not contain the quantified data they pictorially represent.

In the second structure lesson segment, students are taught that the content of thematic maps, like graphic documents, can be represented in terms of simple and combined lists. A screen display depicting a thematic map of the population of North America is shown to help students understand the role of simple and combined lists in thematic maps. Students are directed to examine the legend of this map, and are taught to identify three simple lists: (1) The label of the first simple list in the legend would be "Density of Population in North America Per Square Mile". The items that make up this simple list include: "Uninhabited," "Under 2," "2–25," "25–60," "60–125," "125–250," and "Over 250." (2) The label for the second simple list in the legend would be "Density of Population in North America Per Square Kilometer". The numerical ranges of the items that make up this list are smaller than in the first list because the unit of measure is smaller. They include: "Uninhabited," "Under 1, " "1–10," "10–25," "25–50," "50–100," and "Over 100." (3) The third simple list students are taught to identify in this legend consists of the coropleth categories, i.e., uniform shading patterns with lighter tones used to represent lower ranges of values and with darker tones used to represent higher values. These coropleth categories make up the items in the simple list that might be labeled "Population Density Equivalents".

In the next part of this lesson segment, students are taught that, taken together, the three simple lists created from the displayed map make up a combined list. Students can then apply what they have learned through the use of the present invention about the structure of matrix documents to help them access information in the map. Students are asked, based on the thematic map screen display, to associate an item in the coropleth list with its corresponding item in the lists of density ranges. Finally, students are taught that the geographical outline of North America shown in the map is divided into contours, i.e., areas in which the population falls within a given numerical range corresponding to those defined by the lists found in the legend.

The third structure lesson segment deals with more complex thematic maps. Students are taught that one type of complex map combines the characteristics of thematic maps and general reference maps. They are taught that this type of map shows the dispersion of some phenomenon with respect to specific locations. They are also taught that thematic maps can be more complex when they contain information representing two or more phenomena. Students are shown a screen display depicting a thematic map of the heights above sea level of North American locations, and are taught a series of points: (1) In such a map two simple lists make up the combined list in the legend. (2) One list might be titled, "Physical Relief of North America". The items in this list consist of five coropleth categories: "5,000 feet," "2,000 feet," "1,000 feet," "Sea Level," and "Below Sea Level." (3) The second list might be labeled "Physical Relief Equivalents". The items in this list would consist of the different coropleth shadings. Students can then apply what they have learned about matrix documents and simpler thematic maps to understand the relations between the two phenomena.

Next, students are shown the two North American thematic map screen displays together, and are told that, in addition, this map contains a third list that is not specified or "listed" in the legend, i.e., political boundaries. They are told that the first display shows an outline of the continent of North America, and has contours that depict different regions having a common elevation. They are also told that the second display contains items depicting political boundaries, e.g., "Canada," "United States," "Mexico," and "Greenland." Students are then taught that by relating political boundaries with relief data, it can be seen that most of Greenland and Mexico tends to be 5,000 feet above sea level, as is much of western United States and Canada.

In the fourth structure lesson segment, students are instructed that because thematic maps usually deal with one phenomenon and the distribution of its characteristics over a given geographical area, a person must usually refer to two or more thematic maps to compare different sets of phenomena over a given area.

Students are taught about two types of comparison that are generally made between thematic maps. One type is the comparison between the distribution of two or more phenomena over the same geographical area at the same point in time. Students are taught to compare these phenomena to determine whether similar distributions exist within a given geographical area's contours. If such similarities exist, students are taught to formulate a hypothesis about the relation, be it correlational or causal, that might exist between these phenomena.

The second type is the comparison between the distribution of two or more phenomena over the same geographical area at different points in time. Students are taught how researchers use this comparison to determine if any co-occurring distribution patterns can be related to temporal, seasonal, or cyclical changes.

(2) Use Lessons

In the first use lesson segment for thematic maps, students are taught the basic steps used to formulate hypotheses based on thematic maps. They are shown three screen displays—the two thematic map screen displays from the structure lessons and a third screen display depicting a thematic map of the distribution of natural vegetation in North America—and are asked a series of questions: (1) They are asked to identify the combined lists in the legends of each of the three maps. (2) They are asked to describe the relations between the coropleth categories and what they represent. (3) They are asked to describe the relations between the coropleth categories in each of the legends and the coropleth contours on each of the three maps. By clicking on the SHOW ME icon, students are told that they should act as "pattern detectors," noting the distribution patterns of natural vegetation, physical relief, and population densities within each of the three maps. (4) They are asked to identify relations between patterns of phenomena, e.g., vegetation, relief, and population. (5) They are asked to suggest possible hypotheses of how these patterns came to be.

The second use lesson segment for thematic maps presents students with a comparison of thematic and general reference maps. They are first shown assorted screen displays from the general reference and thematic maps structure lessons, and are asked to distinguish between the purposes of the two types of maps. By clicking on the HINT icon, students are reminded that general reference maps enable one to locate one or more of the physical features that can typically be observed within a given region, while thematic maps deal primarily with the distribution of some abstract or unobserved phenomena. Next, they are directed to make lists of and distinguish between the phenomena found in both. They are then shown screen displays of an index for a general reference map and a legend for a thematic map and are asked to compare and contrast the information contained in both. Finally, they are asked to tie their observations back to the different purposes the two types of maps serve.

5. Mimetic Documents

The instruction provided on mimetic documents by one embodiment of the present invention is based on several principles. First, there are two dimensions associated with understanding phenomena such as objects, states and events. The first dimension is the denotative, which is made up of features common to all instances of a phenomenon. These features are often considered "critical," i.e., they characterize all instances of a phenomenon and render this phenomenon distinct from other phenomena. For example, the denotative features of a keyboard instrument include keys and pedals. The second dimension of a phenomenon is the connotative, which is made up of all those features that are characteristic of some but not all instances of a phenomenon. Connotative features are variations within a set of instances that make up the same phenomenon. For example, the number and shape of legs are connotative features of a keyboard instrument.

A second principle upon which the instruction is based is that mimetic documents, including pictures, diagrams and processes, are visual forms of documents which characterize the denotative and connotative features of some object, state or event. In accordance with the Knowledge Model Procedure, in one embodiment of the present invention, the system provides students with structure and use lessons on each kind of mimetic document.

a. Pictures

The instruction provided on pictures by one embodiment of the Computerized Literacy System is based on at least one central principle—a person's understanding of the world depends in part on his ability to identify and sort instances of objects into broader categories. To help identify, sort, and extend a student's knowledge, modern instructors and textbook designers relate pictures to words in many different configurations. In one common configuration, a labeled picture, a visual rendition of a single instance of a phenomenon is matched with the label or name that signifies this phenomenon. This type of configuration is quite frequently found in dictionaries, encyclopedias, and content-area textbooks. Another configuration, the picture list, extends the label of a phenomenon by providing several visual instances of this phenomenon along with the names or labels of these instances.

In accordance with the Knowledge Model Procedure, one embodiment of the system provides the means to teach students how to understand the information contained in both configurations by identifying or formulating the types of matrix documents they have learned through the use of the present invention.

(1) Structure Lessons

Figure 320:
Figure 321:
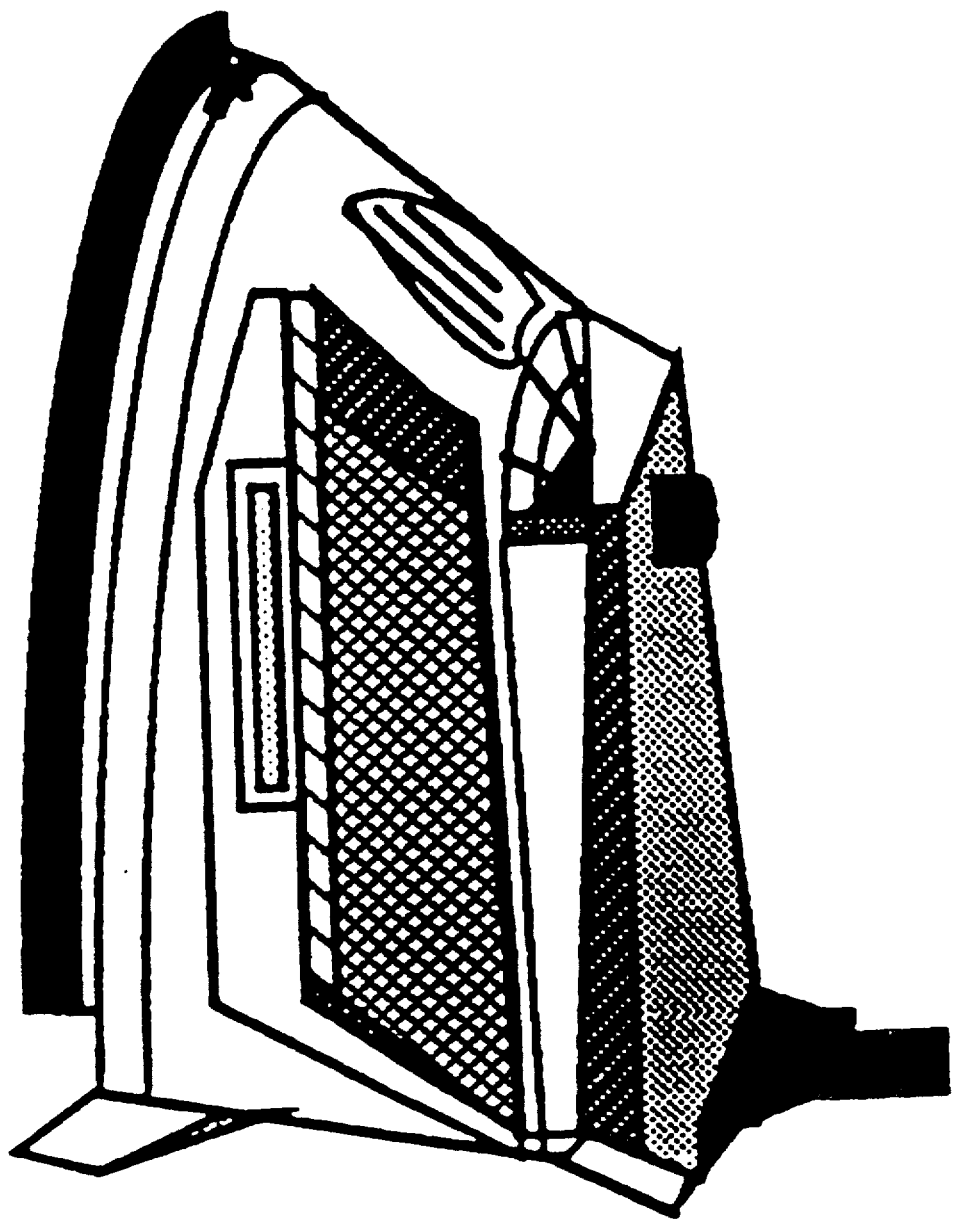

In the first structure lesson segment, students are taught how to create a simple list of the observable features of a labeled picture. The system displays the labeled picture of a bugle, see FIG. 320, and students are taught to create a simple list labeled "Brass Instruments" in which the items include: mouthpiece, rope adornment, rope tassels, tube with two bends in it, tube bent in oval pattern, and flared opening. Students are then shown that without more information, there is no way of distinguishing between features denotative of brass instruments and features connotative of bugles in general and the displayed picture of a bugle, FIG. 320, in particular. By clicking on NEXT EXAMPLE, students are shown the picture in the screen display in FIG. 321, which is accompanied by the label "Iron", and the system takes them through an analysis of this picture similar to above.

In teaching the structure of pictures and pictorial knowledge, the second lesson segment emphasizes that the underlying linguistic structure of pictures is a combined list. Students are taught that the labels for the list would include identification of several parts which comprise a phenomenon as well as the characteristics of these parts. Students are then told that in addition, the labels would have information regarding location, time, and condition of a phenomenon's parts and characteristics.

Next, students are taught that different types of a phenomena could also be listed in a combined list. They are shown that the phenomena types would make up the subject list in a combined list, and the characteristics would make up the modifying lists.

As an example, the system displays a picture of several Old World monkeys and a picture of several New World monkeys. The system highlights the notable parts of these animals on the screen display, including their nostrils, tails, and teeth. Students are taught that the physical characteristics of an old World monkey's nostrils include the description that they are large and close together, and the system highlights this aspect of the nostrils on the picture on the screen display. Students are also told that, in contrast, the physical characteristics of a New World monkey's nostrils would include the description that these are large and far apart, and this aspect is highlighted on the screen displaying the picture of the New World monkeys. By pressing on MORE, students are shown in a similar fashion other examples of pictorial information about both these types of monkeys, including the characteristic that their local habitat is either in trees or on the ground.

(2) Use Lessons

The use lessons for pictures of one embodiment of the system teaches students, in accordance with the Knowledge Model Procedure, strategies for organizing their observations by several categories, including the types of a phenomenon, the physical characteristics of a phenomenon, and the conditions which characterize the different phenomena types. In addition, one embodiment includes use lesson segments which teach students strategies for locating, recycling, integrating, and generating as related to pictures. The design and structure of these use lesson segments are similar to the use lesson segments for these strategies available on the system for other document types, as described in detail above.

b. Diagrams

In teaching the structure and uses of diagrams, one embodiment of the system emphasizes to students that the underlying linguistic structure of diagrams is also the combined list.

(1) Structure Lessons

The system contains several structure lesson segments, each of which is similar in form and presentation to the structure lesson segments for the other document types. In one segment, students are taught that the labels for the combined list corresponding to a given diagram would include those that were found for the combined list made from pictures. In another lesson segment, students are taught that the combined list labels would also include information about the functions of a phenomenon's parts and the structural relations between these parts. In another lesson segment, students are taught that in diagrams, "parts" tends to be the subject list in a combined list, and "physical characteristics", "functions of parts", and "structural relations between parts" are the modifying lists. Students are shown the screen display in FIG. 322 to help illustrate this concept. Another structure lesson segment in one embodiment of the system teaches students that in some instances, "parts" may be nested by type, thus resulting in a nested list.

As with the structure lessons for other document types, the system provides numerous examples to help illustrate the points being taught. One such example shown by the system is a diagram of an Old World monkey next to a diagram of a New World monkey. The system identifies on the screen display certain parts in each diagram, including "arms," "legs," "hands," "feet," and "tail." In addition, the diagram further displays the physical characteristics and structural relations of the identified parts, thus showing students how to draw comparisons and contrasts between two diagrams. To enhance this instruction, the system shows a motion video of the diagrams to illustrate the functions of these parts, such as a motion video showing a monkey using its arms to swing through trees, and one showing a monkey using its tail to maintain balance on a narrow branch.

(2) Use Lessons

The use lessons for diagrams in one embodiment of the present invention teach students knowledge model procedures for organizing their observations by parts of a phenomenon. There are use lesson segments for strategies such as locating, recycling, integrating, and generating related to diagrams. These use lesson segments are similar in form and presentation to the use lesson segments teaching the corresponding strategies for the other document types.

Figure 323:
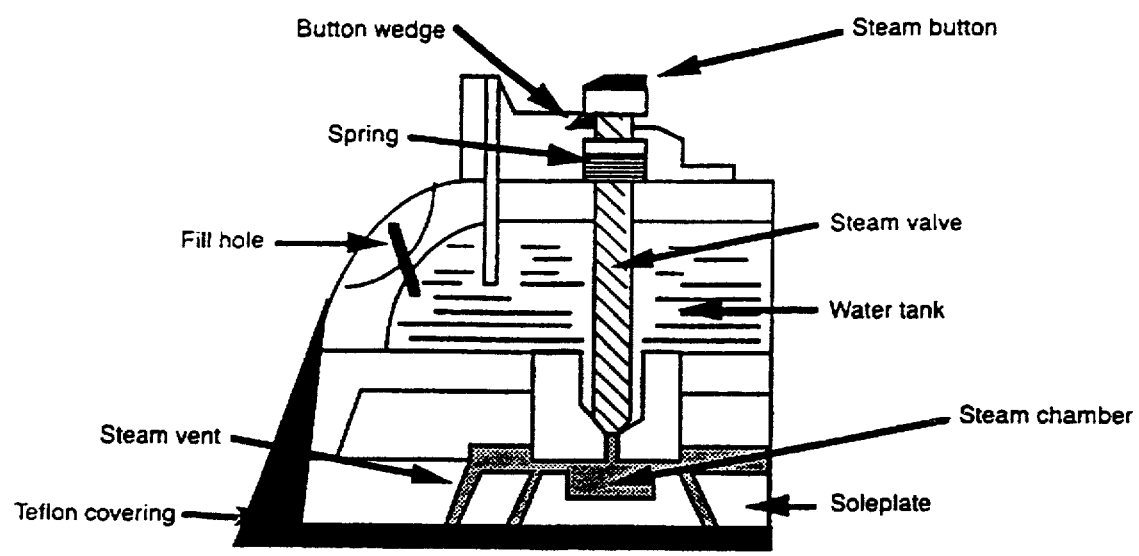

To help illustrate these strategies, the system displays on the video monitor the diagram in FIG. 323. Next to the diagram, the system displays the following text: "The Quick Press Iron, Model T2-4, has an extra large water tank which enables you to press more clothes with fewer refills. The iron's teflon soleplate ensures easy pressing, no matter whether you are using steam or dry heat. The steam vents are narrowed to allow only steam and not water to pass; should the steam button be disengaged, water will not seep through the steam vents when the iron is cold." Students are asked to create a combined list based on this diagram, with four columns labeled "Parts", "Physical Characteristics of Parts", "Functions of Parts", and "Structural Relations between Parts". The structure of this combined list appears on the computer monitor, and students fill out the list by typing in their entries.

To create this combined list, students are first told to locate the parts in the diagram and list them under the label "Parts". Next, students are told to identify the physical characteristics, the functions of parts and the structural relations, by looking at the diagram and reading the text. They are asked to list what they identify under the appropriate labels. SHOW ME displays the combined list in FIG. 324.

C. Process Schematics (1) Structure Lessons

In accordance with the Knowledge Model Procedure, described above, the Computerized Literacy System of one embodiment requires users to select from among a reasonably limited number of structure lesson segments for process schematics.

In the first structure lesson segment, students are introduced to process schematics. They are taught that process schematics are built upon pictures and diagrams. They are shown that these schematics and their accompanying text frequently include the same types of information found in pictures, diagrams, and their accompanying text. They are taught how schematics built upon pictures tend to visually depict information of an object's parts and their physical characteristics, and how schematics and text built upon diagrams may include mention of an object's parts and the physical characteristics of each part, the structural relations between two or more parts, and the functions of each part.

In the second structure lesson segment, students are first taught that although process schematics begin by depicting a stationary state, they also illustrate changes in states. They are told that schematics may show changes associated with single objects, and are shown a screen display depicting an electric motor, a human heart, and an air conditioner. Next, they are told that process schematics can show changes with multiple objects and systems, and are shown screen displays of the solar system, the nervous system, and the food-chain system.

In the next part of this lesson segment, students are taught that because the types of processes associated with objects and systems are diverse, process schematics appear to vary in the types of information they include to depict change. They are told that process schematics, however, usually describe changes in terms of four or more of the following seven types of information: (1) agent, (2) object, (3) action, (4) reference point, (5) direction path, (6) effect, and (7) condition. They are shown a screen display depicting a diagram of a nail clipper, and are told that this display shows the major parts of a nail clipper, including the "handle", two "cutting blades", "cutting edges", a "handle fulcrum", and a "blade fulcrum". Each of these parts on the screen display is highlighted when its corresponding text is displayed on the computer monitor. Students are then taught that in addition, this display shows the structural relations between these various parts.

Next, students are asked to write a text that might accompany the diagram in the screen display. They type their text on the computer monitor. By clicking on the SHOW ME icon, students are shown the following text on a screen display: "Nail Clippers. Nail clippers are a neat combination of two levers that produce a strong cutting action while at the same time being easy to control. The handle is a second-class lever that presses the cutting blades together. It produces a strong effort on the blades, which form a compound third-class lever. The cutting edges move a short distance to overcome the tough resistance of the nail as they slice through it." By clicking on a phrase on the screen, students can cause the corresponding feature in the diagram to highlight.

In the final section of this lesson segment, students are told that based on this diagram and its text, the various types of information found in a process schematic can be illustrated. They are then shown the following definitions: (1) An "agent" is a thing (e.g., "the handle") that acts upon one or more objects (e.g., "cutting blades") to produce a change. (2) An "object" is a thing acted upon or an object part that acts in an intransitive manner (i.e., has no direct object). (3) "Action" (e.g., "cutting" and "slicing") is what the agent does to the object. (4) The "reference point" (e.g. "handle fulcrum" and "blade fulcrum") refers to the point or locus about which an object's change in direction takes place. (5) The "direction path" (e.g., "together" and "distance" represented by the various schematic arrows) describes the trajectory that an object moves relative to a specified reference point. (6) An "effect" (e.g., "effort" and "slicing the nail in two") is the result, or outcome, of the agent acting upon one or more objects. (7) "Condition" refers to characteristics (e.g., "strong" and "short") that qualify the agent, object, effect, action, reference point, or direction path that make up a process. Conditions may include adverbs, adjectives, certain types of prepositions, and phrases that qualify a state or an action in time or manner.

These definitions for the types of information can be seen again by the students by clicking on the DEFINITION icon any time they appear throughout the remainder of the process schematics lessons.

Summary. Students are told that in addition to the types of information associated with pictures and diagrams that describe stationary states, these four or more of the seven types of information they have just been taught are used in process schematics.

In the third structure lesson segment for process schematics, students are taught about the different types of process schematics. They are told that, given the seven types of information they were taught in the prior lesson segment, there are four different groups of process schematics. They are shown a menu screen display listing the following four groups: multiple causation, direction path, step schematics, and stage schematics. By clicking with the mouse on a given area of the display, students receive instruction on one of these four groups.

When students click on "Multiple causation schematics", they are told the following: (1) Sometimes, illustrators and authors want to emphasize that a single effect may have multiple causes. (2) In such cases, they often will use a multiple causation schematic. (3) In this group of schematics, the types of information most frequently included are agent, object, action, and condition. The definitions of these terms, as set forth above, can be seen by clicking on the DEFINITION icon. (4) Schematics of this group tend to define a process as: various agents acting on various objects, under various conditions, producing a common effect.

Next, students are shown two screen displays showing two different causes of soil formation. The first display shows moving air or wind that contains sand particles blown against rock, turning rock into dust particles that form soil. The second display shows water that contains sand particles running over stones, turning stones into soil particles. Students are told when being shown the first display: (1) Air and wind are the agents. (2) The action is blowing. (3) The effect of air and wind blowing against rock is turning rock into small soil particles that form soil. When being shown the second display, they are told: (1) Water is the agent. (2) Running over is the action. (3) Rock is the object. (4) The effect is turning stones into soil particles. Finally, they are taught that in both cases, the condition necessary for soil to be formed is that the agent, be it air, wind, or water, must contain particles of some type. After this material has been presented, students are asked to convert these schematics into a combined list. An empty, labeled combined list is displayed, and students type their entries into the boxes in the list. Clicking on SHOW ME displays one answer, as in FIG. 325.

Students are told the following points at the end of this part of the lesson segment: (1) Multiple causation schematics tend to depict an event phenomenon as a process in which various agents act either directly or with the help of one or more intermediary agents to produce a common effect. (2) In many cases, the conditions by which an agent specifically influences an object to produce an effect are specified. (3) In multiple causation schematics, process is defined in terms of several causes acting upon one or more objects to produce a common effect.

When "Direction path schematics" is selected, students are taught a series of points: (1) In some cases, the concern of illustrators and authors has little to do with depicting and discussing cause-and-effect relations. (2) Rather, one purpose in creating a process schematic is to illustrate the range of motion and the various directions associated with the action of one or more objects moving relative to a single reference point. They are shown a screen display of the directions of a pivot joint moving about a bone's hinge. By clicking on NEXT EXAMPLE, students are shown a screen display of the planets orbiting about the sun. (3) Another purpose in creating process schematics is to illustrate the course that an object assumes in passing from one point to another. They are shown a short motion video display of blood passing from the heart's right ventricle through the arteries and veins back to the heart's left auricle. (4) To accomplish both purposes, illustrators and authors most often use direction path schematics. (5) In this group of schematics, the types of information most frequently found are action, object, reference point and direction path. The DEFINITION icon can be clicked to display the definitions of these type of information.

Next, students are taught that schematics of this group, and their accompanying text, tend to define a process as an action of an object assuming a prescribed direction path relative to a given reference point. They are shown a screen display of a process schematic of an airplane's basic movements, consisting of three separate labeled pictures. They are then shown the following text, which they are told could accompany this schematic: "An airplane has three principle movements. These include: (1) pitch, (2) roll, and (3) yaw. A plane makes each movement on an imaginary axis. Pitch refers to a plane's movement on its lateral axis with the plane's nose moving up or down. Roll is a plane's movement along its longitudinal axis whereby the one wing tip dips lower than the other. Finally, yaw refers to a plane's movement on its vertical axis as the plane's nose turns left or right." Students are then taught that: In all three instances, the object consists of the "plane." The first action "pitch" is defined in terms of the direction path movement "up or down" relative to the reference point "lateral axis." Similarly, the second action "roll" is defined in terms of the direction path whereby one wing tip dips "lower" than the other wing tip relative to the reference point "longitudinal axis." Finally, the third action "yaw" is defined in terms of the direction path movement whereby the plane's nose turns "left or right" relative to the reference point of the plane's "vertical axis."

After this material is presented, students are asked to convert the schematics into a combined list. An empty, labeled combined list is displayed, and students type their answers into the boxes in the list. Clicking on SHOW ME displays one answer, as shown in FIG. 326.

The following review points are told to students at the end of this part of the lesson segment: (1) Direction path schematics serve to define trajectory and range of motion of an object as it undergoes an action with respect to a particular reference point. (2) While the range of motion itself may not always be illustrated in a direction-path schematic, the direction of motion always is shown using arrows. (3) In direction path schematics, process is defined more in terms of the range of motion and directions that an object can assume in the course of change.

When "Step schematics" is clicked, students are taught about the following points: (1) A third type of process schematic is the step schematic. (2) Step schematics show a series of major steps that, together, over time, define some process. (3) In most cases, the pictures or diagrams that make up step schematics show an agent acting on an object; this object is then shown acting, as an agent, on a second object. (4) This sequence of events continues, via a series of minor steps, until a final, often desired, effect is achieved. They are shown a step schematic of a nail clipper in operation, and are told that here the handle of the nail clipper acts as an agent on the cutting blades, which then act as agents on the nail, producing the effect of a "sliced" finger nail.

Next, students are taught that in other step schematics, a series of different agents may operate on the same object to produce several effects that lead to a final effect. To illustrate this point, students are shown two short motion videos, one showing how mail is processed from the time it leaves home until it reaches a mailbox, and another showing how sugar cane is refined into raw sugar.

Next, students are taught that because step schematics incorporate information found in both multiple causation and direction path schematics, they often make use of all seven types of information about which they have learned in the second lesson segment for process schematics. They are shown a screen display depicting the operation of a steam engine. They are told that text can define the process of how a steam engine works in terms of both major steps, corresponding to the information represented in the pictures, and minor steps (or MS), which correspond to the series of action events. They are shown the following text on the computer monitor, and the parts of the schematic highlight while the text describing each step is highlighted on the monitor: "Major Step 1. (MS 1) Steam operates the engine by (MS 2) pushing on one side of the piston and (MS 3) then on the other. (MS 4) A slide valve directs the steam from side to side. (MS 5) In the first diagram, steam enters from the left side of the cylinder and (MS 6) forces the piston to the right. (MS 7) As the piston moves (MS 8) the piston rod turns the flywheel half a turn. Major Step 2. (MS 9) When the piston reaches the right side of the cylinder as shown in the second diagram, (MS 10) the slide valve moves and (MS 11) directs the steam behind the piston again. (MS 12) The steam forces the piston to the left. (MS 13) The piston rod then pulls the flywheel around (MS 14) to complete one turn. (MS 15) Steam in the left side of the cylinder escapes through the exhaust."

Students are next shown the screen display in FIG. 327 on the video screen, and are told that this a combined list that represents the preceding information in terms of the seven information types. They are then told that: In terms of the combined list, step schematics incorporate the information types from both multiple causation and direction path schematics. Similar to multiple causation schematics, the information types "agent," "object," "action," "effect" and "condition" are represented. These types highlight in the combined list in the video screen when they are highlighted on the computer monitor. Similar to direction path schematics, the information types "object," "action," "reference point" and "direction path" are represented. These types highlight in the video screen and computer monitor.

Finally, students are taught the following series of points: (1) Step schematics break processes into a series of successive, time ordered steps. (2) These steps may be shown by different pictures or diagrams, or by a single diagram. (3) In many instances, step schematics illustrate a chain of cause-effect events that lead to either a final effect or a continuous cycle, wherein the cause-effect events repeat themselves over and over. (4) In other instances, step schematics may illustrate different agents acting on a single object, or on multiple objects which result in a terminal effect. They are shown two screen displays as examples, the first showing a schematic of the process of producing pasteurized milk, and the second showing a schematic of the process of manufacturing steel. (5) In both instances, step schematics tend to make use of all seven types of information found in process schematics.

At the end of this part of the lesson segment, students are told that step schematics combine the information in both multiple causation and direction path schematics, as step schematics define a process as a series of successive changes in stationary states in which various cause-effect relations take place within specified direction paths and, often, with objects serving as different reference points upon which agents act.

When students select "Stage schematics", they are taught a series of points: (1) A fourth type of process schematic commonly used by illustrators and authors to show change is the stage schematic. (2) Stage schematics are similar to step schematics in that they show a process as a series of stationary states. (3) Unlike step schematics, however, stage schematics show processes that involve qualitative changes.

Next, students are told that there are two configurations of stage schematics that show changes in different levels of detail. One configuration involves schematics that show different effects after an object has undergone a substantial amount of change. They are shown a screen display of an example of such a schematic titled "The Metamorphoses of a Beetle." At the same time, the following text appears on the computer monitor: "The lives of beetles are divided into four different stages, like those of flies, wasps, ants, and butterflies. The first stage is the egg. After the eggs hatch, the larva emerges. The larva resembles a worm with a large head. Some beetle larva have legs while others do not. Some are covered with long bristles while others are not. After four years, each lava sheds its skin and enters a resting stage; this stage is called pupa. At long last, the skin of the pupa splits and the winged adult beetle emerges." The corresponding parts of the text and schematic screen displays are highlighted together.

After this sequence is finished, students are taught the following series of points: (1) This configuration of a process schematic contains the types of information commonly found in picture lists in general. (2) It emphasizes the parts (e.g., "head," "legs," and "bristles") and physical characteristics of the beetle (e.g., "some are covered with long bristles while others are not") in each stage. (3) It does not illustrate or discuss the nature of the changes that an object (such as a beetle) undergoes in being transformed from one thing at one stage into another thing at another stage. (4) Because the differences between parts and their physical characteristics are so large between stages, it is difficult to infer the nature of these changes.

Next, students are taught the following series of points: (1) To depict growth or evolutionary changes more gradually, authors and illustrators often use a second configuration of stage schematics. (2) This configuration shows the addition of new parts, the changes in physical characteristics of the old parts, the changes in the structural relations between new and old parts, and the actions of new parts relative to specific direction paths and reference points. (3) Moreover, the accompanying text describes how various parts function to permit the development or evolution of new parts. (4) Finally, the conditions which must be met before successive actions can take place are specified. (5) This configuration of a stage schematic is likely to contain the following types of information: agent, action, object, function, direction path, reference point, and condition.

Students are then shown a screen display depicting a schematic of the growth of a seed into a plant, and are told that the text contains major steps corresponding with each of the four diagrams in the display, and, as in the example for step schematics, minor steps consisting of successive actions. While the screen is displayed on the video monitor, they are shown the following text on the computer monitor: "Major Step 1. (MS 1) The seed splits and (MS 2) the hypocotyl emerges (MS 3) to form the primary root. Major Step 2. (MS 4) As the root grows downward (MS 5) the stem breaks through the soil. Major Step 3. (MS 6) The cotyledons open (MS 7) to free the plumule, and (MS 8) the seed coat drops off. Major Step 4. (MS 9) As the stem grows upward, (MS 10) the plumule forms the first leaves." The parts of the schematic in the video screen display highlight when the corresponding text highlights on the computer monitor. After the end of this sequence, students are shown the screen display in FIG. 328 and are told that it is an information matrix classifying the information in each of the four major steps according to whether it represents an agent, action, object, function, direction path, reference point or condition.

At the end of this part of the lesson segment, students are told that stage schematics define change as a series of either dramatic or developmental stationary states. The emphasis in this type of schematic is not on how an object works but rather how an object changes physically over time.

Summary. After all four types of process schematic have been selected, students are told that different types of process schematics depict changes in stationary states in significantly different ways. Because these different types of schematics emphasize different types of information in portraying change, they, in essence, define event phenomena differently.

(2) Use Lessons

In accordance with the Knowledge Model Procedure set forth above, the present invention requires users to select from among a reasonably limited number of use lesson segments for process schematics.

The first use lesson segment for process schematics briefly illustrates how process schematics, which focus on event phenomena, are different from pictures and diagrams, which focus on object phenomena. It emphasizes that the former attempt to define events associated with changes in stationary states while the latter always attempt to define objects within a particular stationary state. To illustrate these differences, students are shown some of the screen displays from the structure lessons.

In the second use lesson segment, students are taught to refer to encyclopedias, illustrated encyclopedic dictionaries, science text books, and books that describe how things work for examples of process schematics. They are shown screen displays of several process schematics and their accompanying texts from these kinds of books. Students are asked to identify what event phenomenon is being defined by these schematics. Of the process schematics shown to the students, they are asked to identify those that are multiple causation, direction path, step and stage schematics. Clicking on SHOW ME identifies a few examples of each.

The third use lesson segment discusses the use of multiple path schematics. Students are directed to list various agents, actions, and conditions that might result in each of the following common effects: "feeling tired at the end of the day", "being hungry at lunch time", and "feeling happy on a birthday". The questions take the form of sentences which students are directed to complete, such as: "At the end of the day, I feel tired because ____." Students type in their answers. By clicking on SHOW ME, students are shown these possible answers: "because my mom wakes me up early each morning" and "because the teacher makes me work so hard at school." The responses students type in appear on the computer monitor, and are rearranged into a combined list with the labels "agent," "object," "action," "effect," and "condition". For the responses shown above that appear after clicking on SHOW ME, two different agents are identified: "my mom" and "teacher". Each agent has a different action: "wakes up" and "makes work." The object in both cases is "me". The common effect is that the student feels tired. One condition is "at the end of the day". Other conditions are "early" and "so hard".

The fourth use lesson segment discusses the characteristics of direction path schematics. A motion video is shown that illustrates the actions of opening and closing a door. It begins by showing the action "open". Students are told that a door opens relative to the reference point of where the hinges of the door are located and whether the hinges permit the door to open outward to inward. They are shown how the direction path of the door might be different if the hinges were located on the opposite of the door, at the top of the door, and on the bottom of the door. Next, they are shown the action "close" using the same procedures used to illustrate the concept of "open" only this time emphasizing that the direction path is in the opposite direction of open. As "open" and "close" are shown relative to different reference points and hinge locations, the process schematic for each appears on a screen display on the computer monitor illustrating the direction path with arrows showing the direction the door swings. At the bottom of each display appears a sentence describing the action of the door, such as, "The door opens inward to the left in a 90 degree arc with hinges on the right."

Next, the information represented in the process schematics shown on the display is re-represented in a combined list consisting of the labels "action" (e.g., open), "object" (i.e., door), "reference point" (e.g., hinges on the right), and "direction path" (e.g., inward to the left in a 90 degree arc). Students are then asked to apply the strategies they were taught through the use of the present invention to access the information in these combined lists.

Additional motion videos showing examples of direction path schematics are shown by clicking on NEXT EXAMPLE. In each case, students are asked to identify the action, the reference point, and the direction path.

The fourth use lesson segment illustrates how step and stage schematics often make use of the types of information found in both multiple causation and direction path schematics. Students are shown a motion video illustrating the principles of a steam engine. Students are told during the video how each step acts on the subsequent step. Afterwards, they are asked to array the information describing these events into a combined list.

The fifth use lesson segment teaches students how to use stage schematics. It begins by presenting students with several examples of stage schematics and their accompanying text. Students are asked to identify similarities and differences between the stage schematics and step schematics. By clicking on SHOW ME, students are taught that while the list of all minor steps enables them to infer changes between major steps, this is not the case in stage schematics. Students are then taught that stage schematics typically are used to represent evolution and development. They are asked to identify the evolution or development of a particular object and to illustrate a stage schematic representing the changes underlying this schematic. Finally, students are told how the two configurations of schematics tend to contain different types of information. Screen displays are shown by which students practice arraying text into combined lists.

d. Procedural Schematics

The substance of the instruction provided on procedural schematics by one embodiment of the present invention builds on and is similar to the process schematic lessons. The form and presentation of the procedural schematics structure and use lessons are similar to those of the other document types.

(1) Structure Lessons

In one structure lesson segment for procedural schematics, students are taught the following points: (1) Procedural schematics comprise basically the same types of information as process schematics. (2) Procedural schematics are often found accompanying instructions which require a person to act as an agent who follows and executes directions for the purpose of bringing about a desired effect, such as remedying a problem or achieving a goal. (3) The main difference between procedural and process schematics is that, in the former, the implied "you" is always the control agent who carries out processes stated as instructions. (4) Agents almost always engage in the procedure set forth in the schematic to achieve a goal or solve a problem. (5) Thus, procedural schematics usually contain "goal" or "purpose" information, which usually replaces the direction path information given in process schematics.

To help contrast procedural schematics with process schematics, one embodiment of the system also provides the user with the option to review the following points about process schematics: (1) The parts of process schematics phenomena, or the phenomena themselves, are the agents which bring about changes in another phenomenon's states. (2) While parts in process schematics may function to bring about effects, they usually are not imbued teleologically with motives and problems.

In another structure lesson segment for procedural schematics, the system teaches students the underlying organizational framework related to procedural schematics and their accompanying list of instructions. To illustrate this, the system presents three process schematics: "Disconnecting a Disposal", "Dismantling the Disposal", and "Replacing the Seal Unit". In the teacher-controlled embodiment of the Computerized Literacy System, the teacher has the option to run any one or all of these examples.

In the first example, "Disconnecting the Disposal", the system displays a procedural schematic on the video monitor, depicting the procedures for disconnecting a garbage disposal, and displays the following text with it: "After turning off power to the disposal circuit at the service panel (Procedure 1), disconnect the wires at the disposal's bottom (Procedure 2). Keep in mind that they must be reconnected according to color—black to black, and white to white, with the ground wire securely attached. Next, loosen the screw on the clamp around the dishwasher hose (Procedure 3) and unscrew the slip-joint nut on the drainpipe connection (Procedure 4). As you loosen the screws from the sink mounting, keep a firm hand under the disposal so it will not fail (Procedure 5). Once the unit is free of the sink, use a screwdriver to pry open the insulated cover at the team; it should snap off easily (Procedure 6). Then dismantle the machine by the method to be described."

Students are asked to create a combined list from this schematic. Clicking on HINT allows the students to review the method for creating combined lists from process schematics. SHOW ME shows students how the above procedural information could be arrayed in a combined list format, and displays the table in FIG. 329.

In the next example, "Dismantling the Disposal", students are first told that following the procedures from the first example would set the stage for the next set of procedures. These procedures are presented by the system as a procedural schematic displayed on the video screen with the following accompanying text: "Once the insulated covering is off (Procedure 1), unscrew the hopper bolts (Procedure 2) and remove the motor housing (Procedure 3), being careful to lay aside the gaskets and grind ring in the proper sequence for reassembly (Procedure 4). Remove the motor bolts from the bottom of the stator, and lift out the motor housing and rotor (Procedure 5)."

Students are asked again to create a combined list from this schematic. Clicking on HINT allows the students to review the method for creating combined lists from process schematics or from the first example. SHOW ME shows students how the above procedural information could be arrayed in a combined list format, and displays the table in FIG. 330.

In the third example, the system enables the students to consider the final series of procedures called "Replacing the Seal Unit". The text associated with this procedural schematic is as follows: "Because the rotor and the turntable revolve together you will have to immobilize the rotor with one hand (Procedure 1) before unscrewing the locknut (Procedure 2). You can now take off the turntable (Procedure 3), exposing the spacer and the seal unit directly beneath it. Take off the spacer (Procedure 4), and lift out the seal unit (Procedure 5). Examine the surfaces of the rings to determine whether dirt has come between them and unseated the seal (Procedure 6). Also, look over the rings for nicks or scars (Procedure 7), and examine the boot for tears (Procedure 8). If there is any evidence of damage, the entire seal unit should be replaced. Remember that the seal is delicate and that its ring surfaces must be perfectly smooth. In reseating the seal, handle the rings with care because even new parts can be damaged by rough treatment (Procedure 9)."

Students are again asked to reconfigure this information to create a combined list from this schematic. Clicking on HINT allows the students to review the method for creating combined lists from process schematics or from the other two examples. SHOW ME causes a screen to be displayed which shows students how the above procedural information could be arrayed in a combined list format, and displays the table in FIG. 331.

Summary. After reviewing one or more examples, the students are told that the above procedural schematics provided the complete set of steps for dismantling and replacing a seal unit.

(2) Use Lessons

The use lessons for one embodiment of the system emphasize the procedural strategies for following directions. There are use lesson segments for strategies such as locating, recycling, integrating, and generating as they relate to specific tasks for using procedural schematics.

B. Prose

The prose lessons of one embodiment of the Computerized Literacy System are parallel to the document lessons in a number of important ways. First, the general instructional approach is the same, as is the organization of the lessons. The lessons in the system teach students about prose materials, the range of uses for those materials, and the interaction between the materials and their uses. Second, the prose instruction is designed for different types of use: by a teacher with a small group of students; by students alone according to a prearranged sequence; or to be modified by one skilled in the art to operate according to a desired mix of teacher-controlled and automated instruction. All the lessons in the Computerized Literacy System focus upon the process of using print. The prose instruction encourages students to think about how they read, how they go about creating meaning from text, and how they might improve their Prose Literacy Skills.

As in the document system, the prose lessons are divided into short segments, each focusing on a single principle or concept. In one embodiment, teachers are able to control the pace of instruction, vary the sequence in which instruction is presented, and control the amount of practice students receive. The prose lessons make increased use of embedded instruction which provides the means for teachers to choose the instruction they present, and teachers are able to go through a lesson highlighting key points or choosing to explore some points in more depth.

Like the document lessons, the prose lessons utilize interactive multimedia tools that integrate video, sound, still images, and graphics in interactive lessons and exercises. The prose lessons use motion video segments, still images, graphics and sound in ways similar to the document lessons. In the prose instruction, use is made of QUICKTIME™, available through Apple Computer, Inc. of Cupertino, Calif., to make real people such as newspaper reporters and magazine editors available on the system to explain features of their particular medium and how they go about their jobs. The instruction on prose also provides a teacher with the option to utilize paper and pencil support materials such as student workbooks, pre- and post-tests, and a teacher's manual.

1. Structure Lessons

Like the document lessons, the prose structure lessons are organized around material types. In prose, these are familiar material types rather than the linguistically structured models used in the document lessons. The system has separate structure lesson segments for the following six types of prose materials: brochures, manuals, magazines, textbooks, newspapers, and fiction. Brochures, magazines, newspapers and manuals represent functional materials that adults use in their everyday lives. Textbooks are used by students in education and training programs and fiction materials are used in school-based programs as well as by adults for personal reading.

For each type of prose material, one embodiment of the system contains an introductory structure lesson segment focusing on the general characteristics of the material and how it is written. Other structure lesson segments teach reading strategies which encompass different purposes for reading as well as the underlying process for understanding text. Writing activities related to each material type are also included.

2. Use Lessons

Unlike the document lessons, the prose use lesson segments are independent of the types of prose material. One set of use lesson segments focuses on the different ways in which text can be organized. A second set provides students with strategies for actively constructing meaning from text. Finally, the system contains practice question lesson segments that teach students how to understand questions and relate questions and text.

C. Quantitative Material

The general instructional approach for the quantitative material lessons in one embodiment of the Computerized Literacy System is the same as for document and prose lessons, as is the organization of the lessons. Like the document and prose instruction, the quantitative instruction is designed for use by a teacher with a relatively small group of students, by students alone, or at desired points in between as programmed by one ordinarily skilled in the art. As with the other literacy types, quantitative lessons are broken into short segments, each focusing on a single principle or concept.

The quantitative instruction, like the document and prose instruction, uses interactive multimedia tools that integrate video, sound, still images, and graphics in lessons and interactive exercises. This use of multimedia capabilities provides opportunities for groups of students to work together, and provides motivation for students who have not previously been successful with more traditional, paper and pencil forms of instruction. The system's multimedia capabilities also allow students to manipulate materials on-screen, thus making abstract concepts more concrete and visual, and to experience quantitative concepts in words, pictures, and numbers. The system also utilizes multimedia games to provide students the means to apply new skills they have learned in a way they enjoy. In addition, the system provides auditory capabilities to give feedback, to pose problems to students, and to explain concepts. The quantitative instruction includes paper and pencil support materials, such as student workbooks containing exercises and extension activities, pre- and post-tests, and a teacher's manual.

Figure 332:
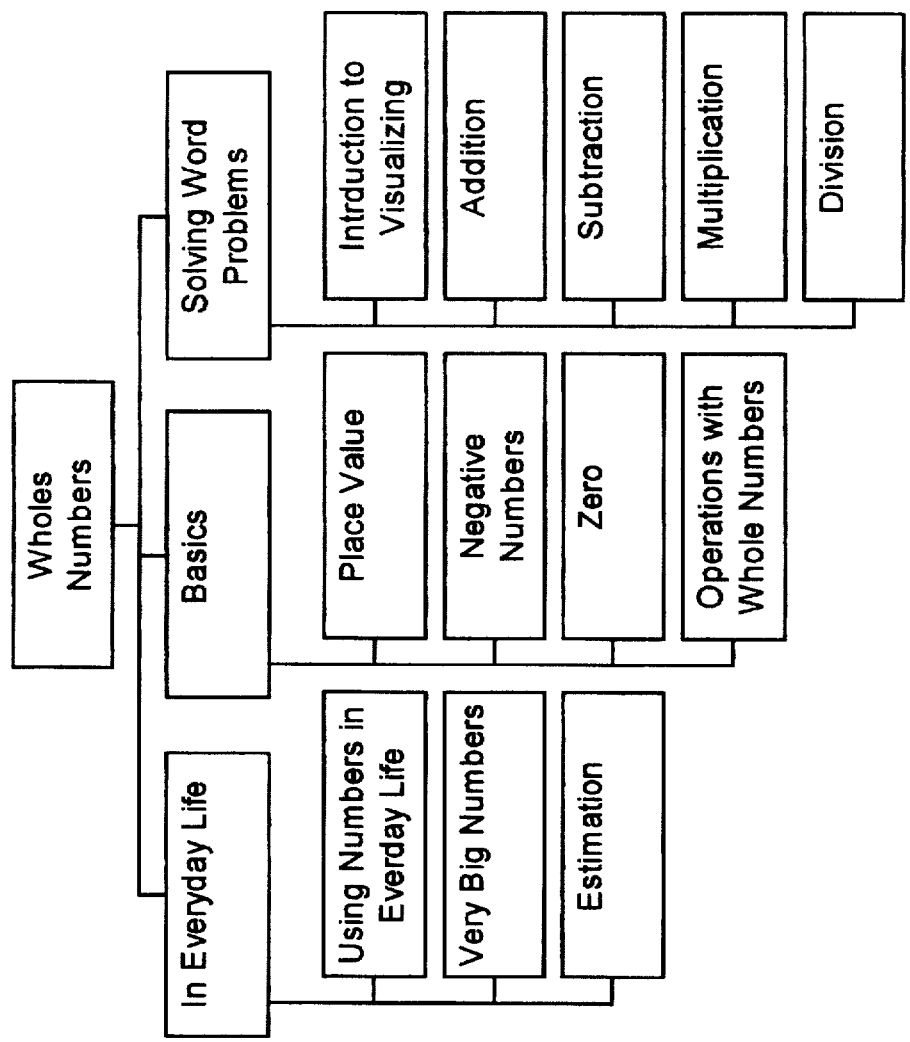
FIG. 332 is a flow chart showing the structure of instructions for teaching whole numbers in accordance with one embodiment of the present invention.
Figure 333:
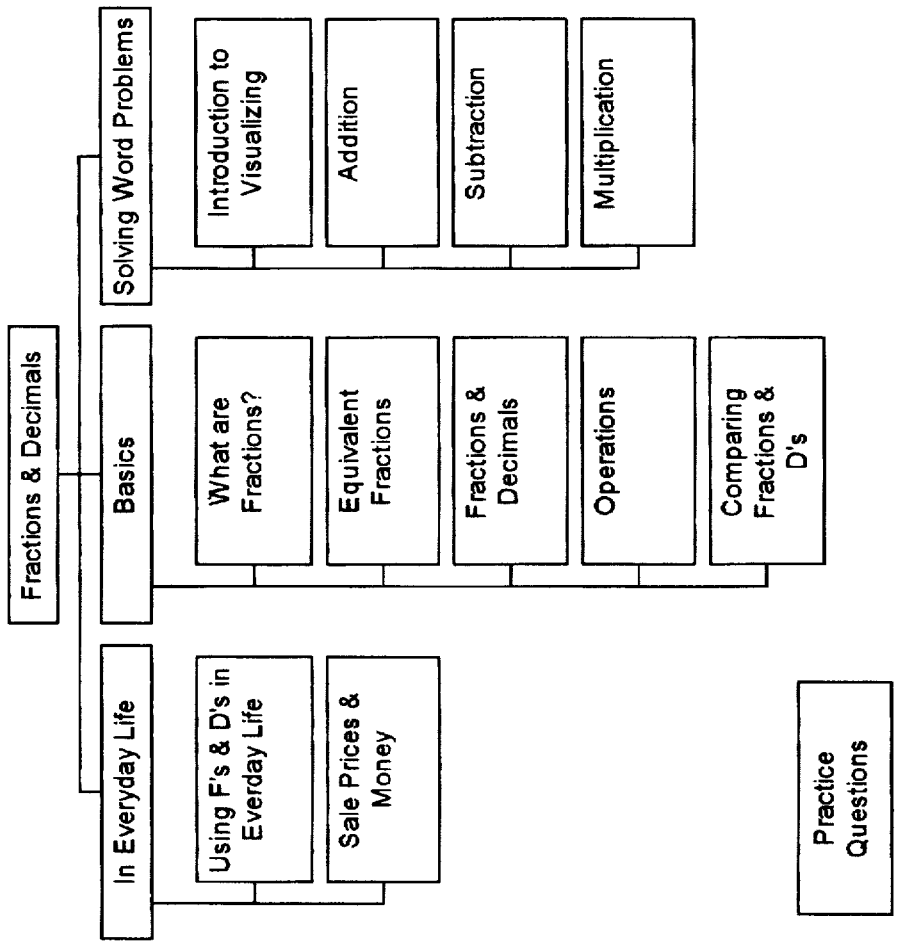
FIG. 333 is a flow chart showing the structure of instructions for teaching fractions and decimals in accordance with one embodiment of the present invention.
Figure 334:
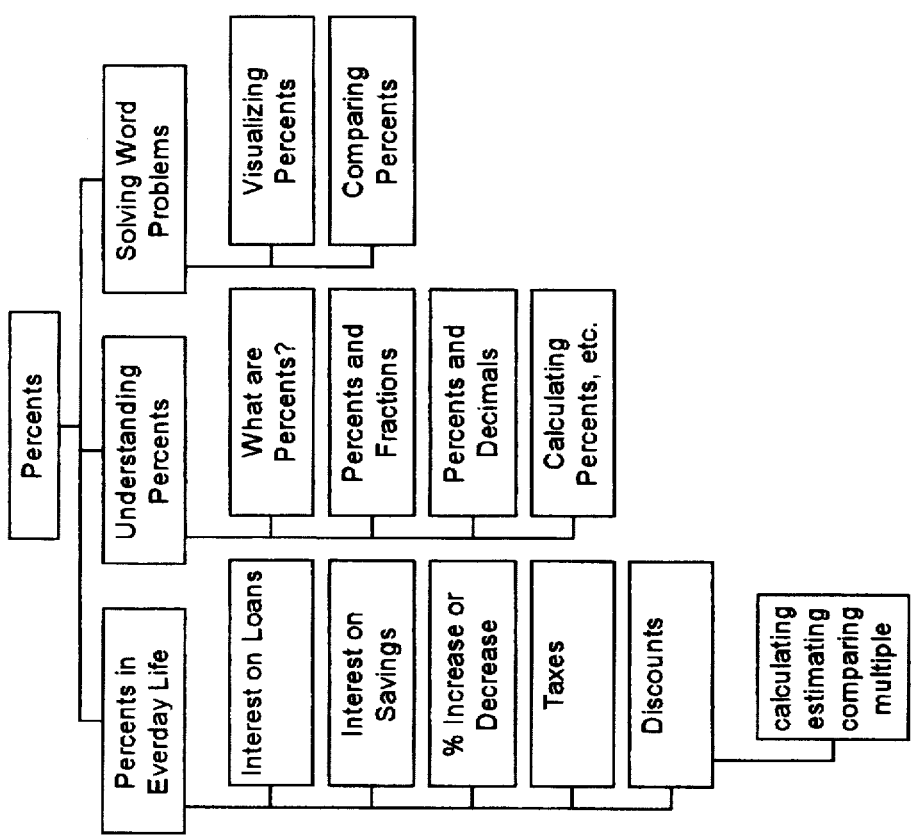
FIG. 334 is a flow chart showing the structure of instructions for teaching percents in accordance with one embodiment of the present invention.

The quantitative instruction contains six lessons. Each lesson is organized around a mathematical system or theme. Unlike the linguistically structured models used in the documents instruction, the mathematical systems taught in the quantitative instruction are familiar. The mathematical systems are: Whole and Signed Numbers; Fractions; Rates and Ratios; Proportions; Percents; and Measures. Like the document instruction, the quantitative instruction is organized in a hierarchy of increasing complexity. See FIGS. 332–334.

The six quantitative materials lessons of one embodiment of the Computerized Literacy System are organized around three approaches to instruction. One approach, "Math Tools", teaches fundamentals, such as calculation and operations appropriate for each mathematical system. Another approach, "Math in Everyday Life" presents some of the real-life contexts in which adults need to apply the mathematical systems, such as borrowing money, figuring taxes, or planning and preparing a meal. The third approach, "Solving Word Problems", gives students strategies for understanding questions, visualizing mathematical problems using visual representations, and processes for translating the problem from words into mathematical sentences.

Many of the quantitative use lessons utilize documents as stimuli. For example, in the lesson segment "Percents in Everyday Life", the "Discounts" subsegment contains several advertisements in which students find the numbers they need to perform the processes they are learning, such as figuring a discount or sale price as a percent of a regular price.

As explained above, in certain embodiments, teachers can control the pace of instruction, vary the sequence in which instruction is presented, and control the amount of practice students receive. For example, a teacher may begin by exploring a context area in the lesson segment "Math in Everyday Life" and then move to a lesson in "Math Tools" if students need instruction in a specific concept or operation. On the other hand, the system may be used to teach from only one of the instructional approaches, for example, only "Math in Everyday Life", across all the mathematical systems.

HARDWARE REFERENCE

Figure 2:
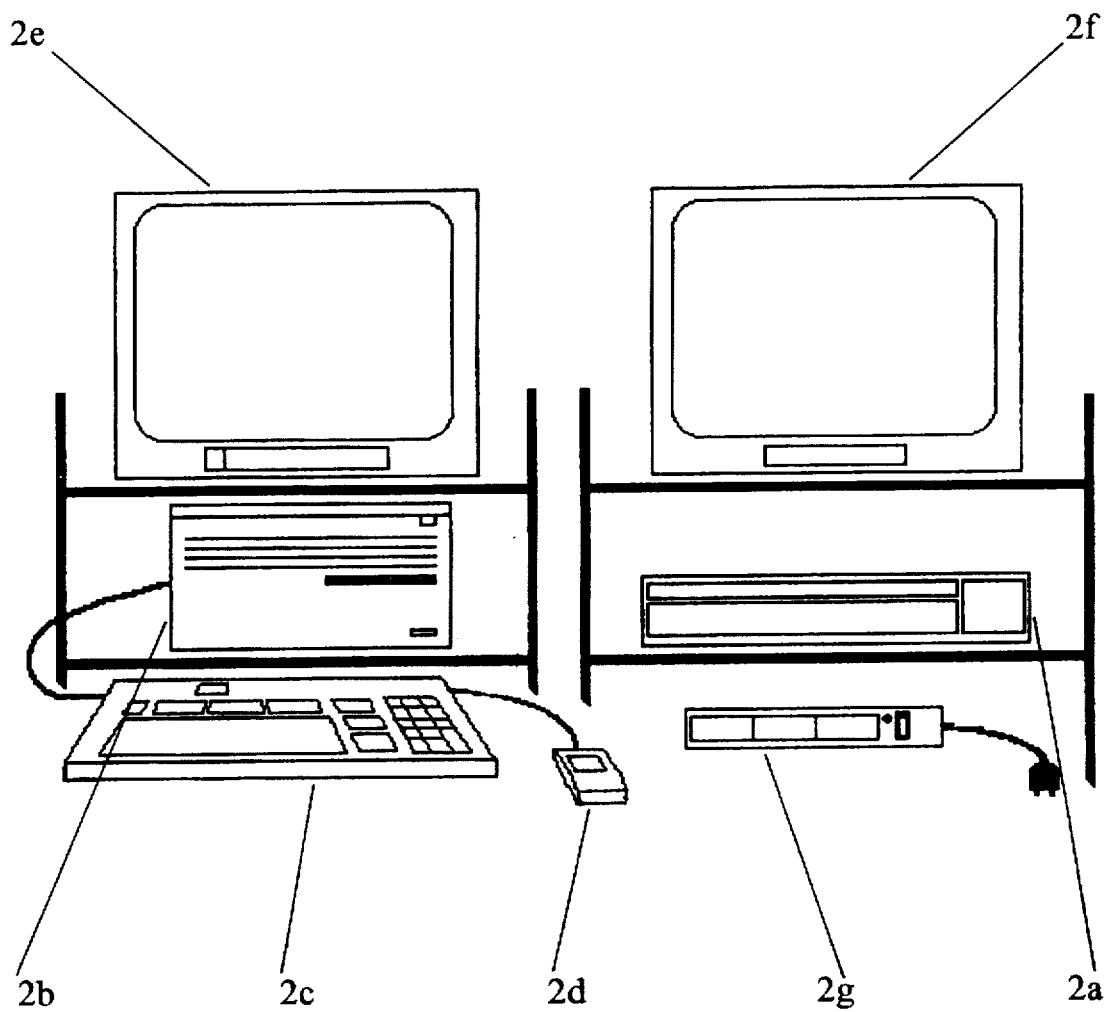
FIG. 2 shows a front view of the components of one embodiment of the multimedia Computerized Literacy System.
Figure 3:
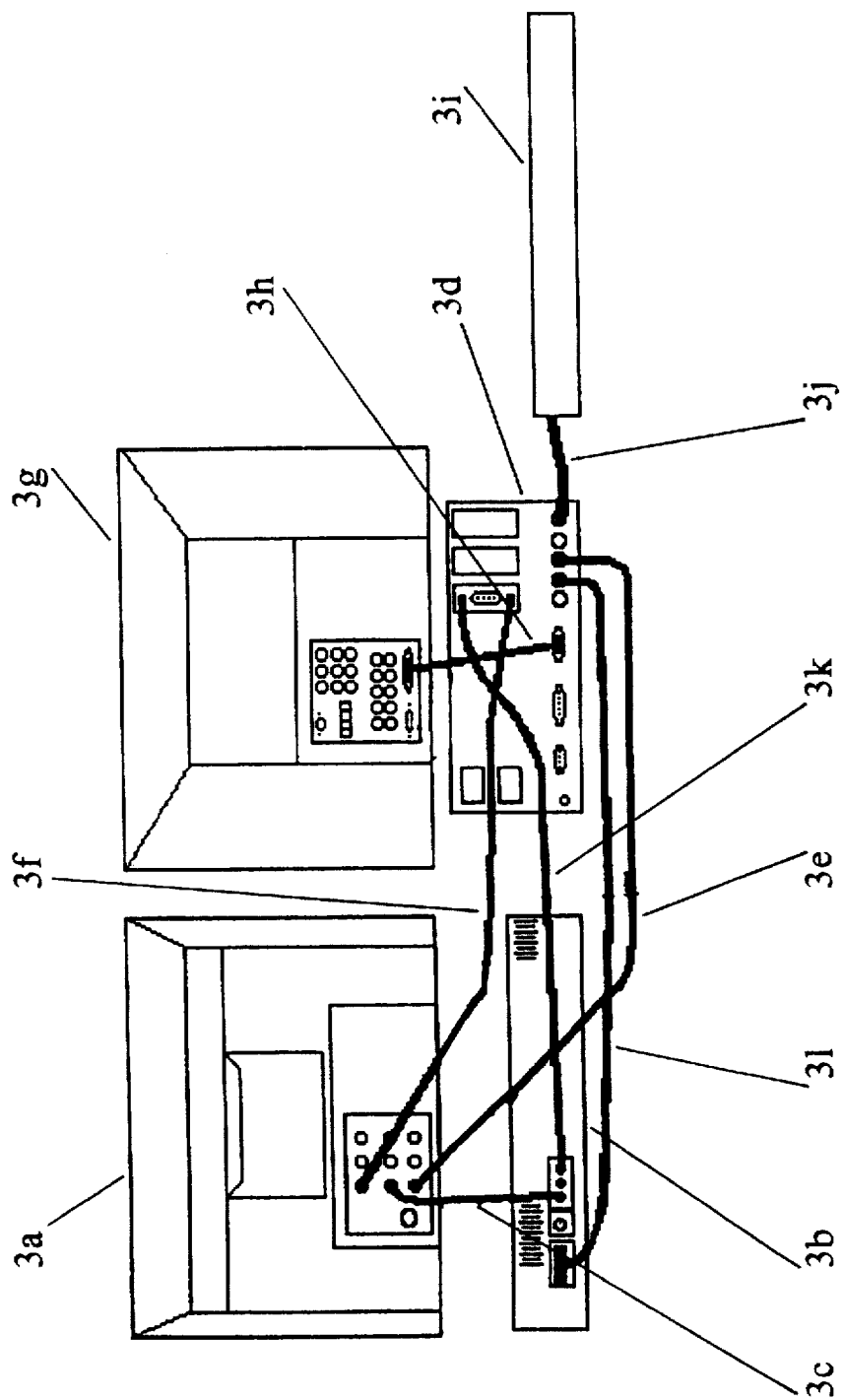
FIG. 3 shows a back view of the components of one embodiment of the multimedia Computerized Literacy System and shows the connections required between the components.
Figure 4:
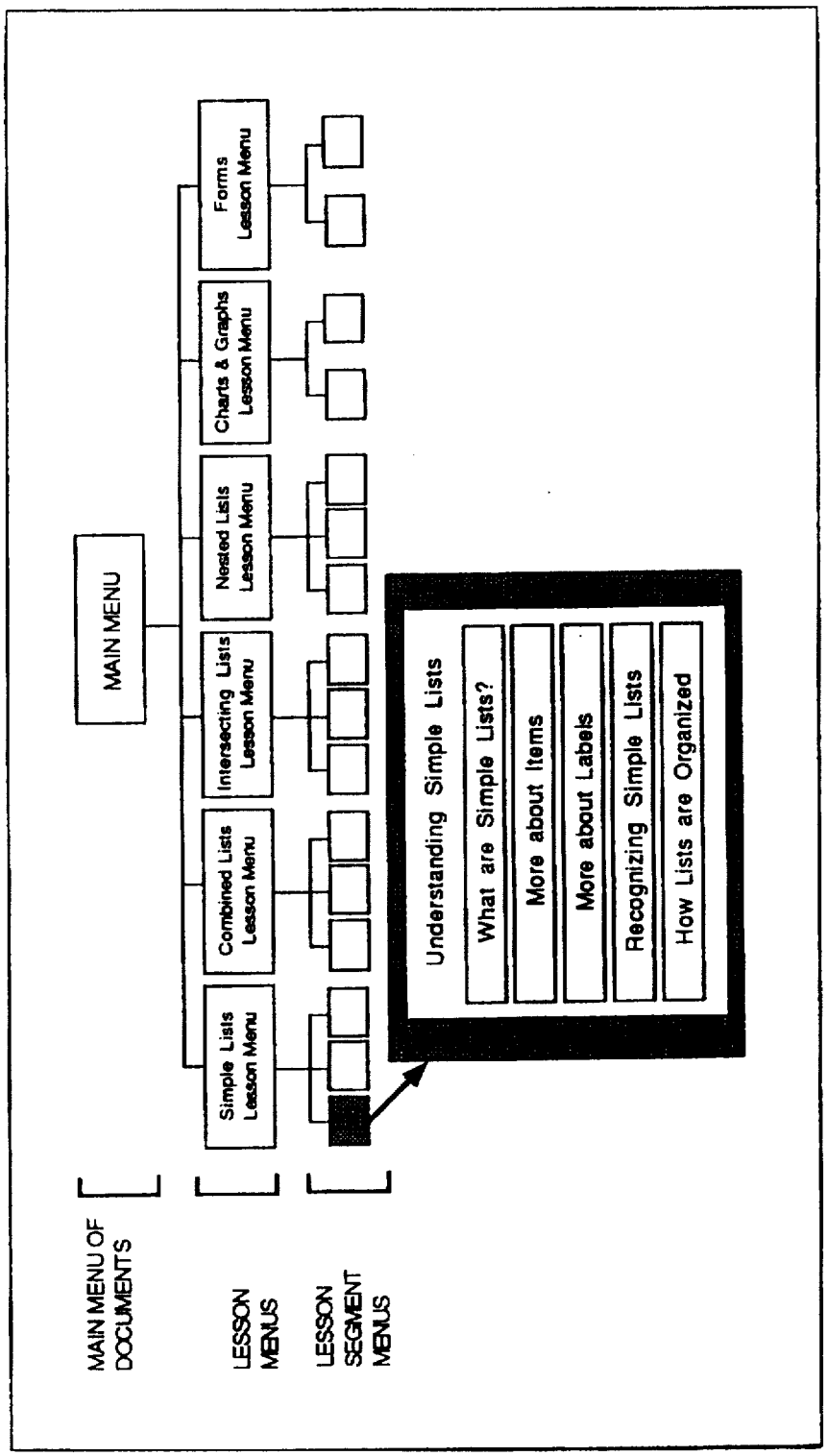
FIG. 4 is a flow chart showing the menu structure of one preferred embodiment of the Computerized Literacy System.

The equipment used in one preferred embodiment of the invention is briefly described above in the Summary section and is shown in FIGS. 2 and 3. This Hardware Reference contains a more detailed description of each part of the equipment, and a description of the connections between the parts.

The PIONEER® laser disc player FIG. 2a is used to play the videodisc which contains all the video images used by the system. The computer which in one preferred embodiment is the MACINTOSH® Quadra Series Centris or which can also be a MACINTOSH® IIci consists of three parts: the main unit FIG. 2b, the keyboard FIG. 2c, and the mouse FIG. 2d. The main unit FIG. 2b controls the display of all the course material, including sound, graphics and video images. A video display card in the main unit, which in one preferred embodiment is the Raster Ops 24STU Display Card controls the display of graphics and video on the video display screen. The video display card receives input data and outputs the graphics onto the display screen. The keyboard FIG. 2c is used to enter text. The mouse FIG. 2d is used to move a pointer around the screen and to click on menu choices and system specific icons. The computer display screen FIG. 2e is used to display images from the computer. The video display screen FIG. 2f is used to display both computer and video images. A surge protector FIG. 2g is used to protect the equipment from any damage due to changes in the electrical current supplying power to the equipment.

Although this embodiment of the present invention uses the hardware described in detail in this disclosure, any other suitable commercially available equipment an be used to practice the present invention. For instance, a personal computer such as that available through IBM Corporation of Armonk, N.Y., can be used instead of the MACINTOSH. In addition, a PC compatible video cassette recording device or compact disc player, such as that available through Sony Corporation of Park Ridge, N.J., can be used instead of the PIONEER laser disc player.

The video display screen FIG. 3a is connected to the PIONEER® laser disc player FIG. 3b via the cable FIG. 3c. This connection controls the playing of the sound from the laser disc player. It connects AUDIO OUT from the left channel of the laser disc player to AUDIO IN on the left channel of the video display screen. The same color plug is used to connect AUDIO OUT and AUDIO IN.

The computer FIG. 3d is connected to the video display screen FIG. 3a via the cable FIG. 3e. This connection plays sound from the computer through the video display screen. The connection is plugged into the sound connector on the back of the main unit and into the right channel of the AUDIO IN in the back of the video display screen.

The video display screen FIG. 3a is also connected to the computer FIG. 3d via the cable FIG. 3f. This connection controls the display of graphics and video on the video display screen. The wire is plugged into the bottom connector of the video display card and the VIDEO IN connector on the video display screen.

The computer monitor FIG. 3g is connected to the computer FIG. 3d via the cable FIG. 3h. This connection controls the display of graphics on the computer display screen. The 21-pin screw-in connector from the computer display screen is plugged into the 15-pin screw-in connector on the main unit.

The computer FIG. 3d is connected to the keyboard FIG. 3i via the cable FIG. 3j. This connection allows users to control the system from the keyboard and mouse. The keyboard connector is attached to the back of the main unit at the lower right. This connector can be plugged into either the right side or left side of the keyboard. The mouse is connected to the other side of the keyboard.

The PIONEER® laser disc player FIG. 3b is connected to the video card of the computer FIG. 3d via the cable FIG. 3k. This connection plays the video through the main unit so that it can be displayed with graphics on the video display screen. The wire is plugged into VIDEO OUT on the laser disc player and the top plug of the video display card.

The PIONEER® laser disc player FIG. 3b is also connected to the computer FIG. 3d via the cable FIG. 3l. This connection allows the computer to operate the laser disc player. A 15-pin interface plug from the back of the laser disc player is plugged into the telephone icon connector in the back of the computer.

ICON REFERENCE

The Computerized Literacy System of one embodiment of the present invention uses three types of icons developed by the inventors and briefly described above in the Summary section. The three type of system icons, each of which has a different function, are "location icons," "activity icons," and "clickable icons." They and their functions will be described in more detail in this Icon Reference.

The first type of system icon, "location icons," displays the document structure and type of lesson. There are two location icons for each document type, one representing the structure lessons and one representing the use lessons. They are displayed on lesson title screens and menus to help students visually associate each document type with its structure. The location icon for each particular document type is also displayed on lesson segment screens to remind users what document type is being taught. The location icons for the matrix documents, graphic documents, and forms are in FIG. 29b.

The second type of system icon, "activity icons," displays on lesson segment screens the type of class activity that is to be performed at a certain point in the lesson segment. These icons serve to notify and remind the users what action they are being asked to perform. In one preferred embodiment of the present invention, there are four activity icons. One activity icon FIG. 5c indicates that the students are being asked to perform an exercise, which can involve computer activities, class discussions, or paper and pencil exercises. A second activity icon, FIG. 5d, indicates that the students are being asked to perform the exercise using the computer, by clicking on a choice or part of a document, dragging an item from one screen to another, or typing in an answer to a question. A third activity icon, FIG. 5e, indicates that the students are being directed to discuss a possible answer to a question or problem. A fourth activity icon, FIG. 5f, indicates that the students are being directed to complete the exercise using paper and pencil.

The third type of system icon, "clickable icons," are used to move between the screens, to answer questions which are part of class exercises, and to activate presentation tools which can be used in the classroom. They allow users to control to some extent the manner in which they receive instruction from the system, thus serving to tailor the system to the specific needs of a given set of students.

Four clickable icons are used to move between the screens in the system. The NEXT ARROW icon displays the next screen of information in the current course. FIG. 5g. The MORE icon displays more information on the current screen. FIG. 5h. The PREVIOUS ARROW icon displays the previous screen of information in the current course. FIG. 5i. The MENU icon displays the previous menu. FIG. 5j.

Seven clickable icons are used during class exercises. The HINT icon displays information which will help the student answer the current question. FIG. 5k. The SHOW ME icon displays the correct answer to the current question. FIG. 5l. The ERASE icon is used to erase the correct answer which is displayed using the SHOW ME feature on some questions. FIG. 5m. The DONE icon indicates that the student is finished indicating all of the answers to the current question in questions with multiple answers. FIG. 5n. The NEXT QUESTION icon displays the next question when there are multiple questions about the same document. FIG. 5o. The SHOW STEPS icon displays the process which could have been used to answer a question after it has been answered. FIG. 5p. The ANOTHER PATH icon is used, in conjunction with the SHOW STEPS icon, to display an alternate process which could be used to answer a question. FIG. 5q.

Eight icons are used to control the presentation of text, graphics and video information on the screen. When an example of a document is used to illustrate a specific concept, the NEXT EXAMPLE icon displays another document which illustrates that concept. FIG. 5r. The DEFINITION icon displays a definition of an underlined word on the screen. FIG. 5s. The REVIEW SIMPLE LISTS icon displays the key principles which define the simple list document structure. FIG. 5t. The REVIEW COMBINED LISTS icon displays the key principles which define the combined list document structure. FIG. 5u. The REVIEW INTERSECTING LISTS icon displays the key principles which define the intersecting list document structure. FIG. 5v. When a document is highlighted to illustrate a specific concept, the HIGHLIGHT icon displays the appropriate highlighting. FIG. 5w. The VIDEO icon plays a motion video about the current lesson. FIG. 5x. While the video is playing, an image of a videodisc controller will be displayed. Clicking on the controller image allows one to rewind or stop the video at any point. The BLACKBOARD icon brings up a computer "blackboard" which provides space for typing text. FIG. 5y.

MICROFICHE APPENDIX

The MICROFICHE APPENDIX is to be found in separately bound volumes. It contains indexes generated for:

SYSTEM P.D.Q/RASTER OP (Section I.); SIMPLE LISTS—Understanding, Using and Practice Questions (Sections II.A, II.B and II.C, respectively); INTERSECTING LISTS—Understanding, Using and Practice Questions (Sections III.A, III.B and III.C, respectively); COMBINED (COMPLEX) LISTS—Understanding, Using and Practice Questions (Sections IV.A, IV.B and IV.C, respectively); NESTED LISTS—Understanding, Using and Practice Questions (Sections V.A, V.B and V.C, respectively); CHARTS & GRAPHS—Understanding, Using and Practice Questions (Sections VI.A, VI.B and VI.C, respectively); PIES—Understanding and Using (Sections VII.A and VII.B, respectively); LINES—Understanding and Using (Sections VIII.A and VIII.B, respectively); BARS—Understanding and Using (Sections IX.A and IX.B, respectively); FORMS—Understanding and Using (Sections X.A and X.B, respectively); WHOLE NUMBERS—System PQ, Basics and Everyday Life (Sections XI.A, XI.B and XI.C, respectively); PROSE—Visualizing Word Problems and Introduction to Newspapers (Sections IX.A and IX.B, respectively).

BIBLIOGRAPHIC REFERENCES

Authorware, Inc. (1987–1990). Reference: AUTHORWARE® PROFESSIONAL® for Macintosh.

Educational Testing Service (1985). National Adult Literacy Survey. Princeton, NJ.

Kirsch, I. S., & Guthrie, J. T. (1978). The concept and measurement of functional literacy. *Reading Research Quarterly*, 13, 485–507.

Kirsch, I. S., & Guthrie, J. T. (1980). Construct validity of functional reading tests. *Journal of Educational Measurement*, 17 81–93.

Kirsch, I. S., & Guthrie, J. T. (1984a). Adult reading practices for work and leisure. *Adult Education Quarterly*. 34, 213–232.

Kirsch, I. S., & Guthrie, J. T. (1984b). Prose comprehension and text search as a function of reading volume. *Reading Research Quarterly*, 19, 331–342.

Kirsch, I. S., & Jungeblut, A. (1986). *Literacy: Profiles of America's Young Adults* (NAEP Report No. 16-PL-02). Princeton, N.J.: Educational Testing Service.

Kirsch, I. S., Mosenthal, P. B., & Rock, D. A. (1988). *The influence of reading patterns on the proficiencies of young adults*. (Research Report RR-88-61). Princeton, N.J.: Educational Testing Service.

Kirsch, I. S., & Mosenthal, P. B. (1988). *Understanding document literacy: Variables underlying the performance of young adults*. (Research Report RR-88-62). Princeton, N.J.: Educational Testing Service.

Kirsch, I. S., & Mosenthal, P. B. (1990). Exploring document literacy: Variables underlying the performance of young adults. *Reading Research Quarterly*, 25, 5–30.

Mosenthal, P. B., & Kirsch, i.s. (1989). Lists: The building blocks of documents. *Journal of Reading*, 33, 58–60.

Kirsch, I. S., & Mosenthal, P. B. (1989). Building documents by combining simple lists. *Journal of Reading*, 33, 132–135.

Mosenthal, P. B., & Kirsch, I.s. (1989). Intersecting lists. *Journal of Reading*, 33, 210–213.

Kirsch, I. S., & Mosenthal, P. B. (1990). Nested lists. *Journal of Reading*, 34, 294–297.

Mosenthal, P. B., & Kirsch, I. S. (1990). Understanding graphs and charts, Part I. *Journal of Reading*, 34, 371–373.

Mosenthal, P. B., & Kirsch, I. S. (1990). Understanding graphs and charts, Part II. *Journal of Reading*, 34, 454–457.

Kirsch, I. S., & Mosenthal, P. B. (1990). Understanding forms, Part I. *Journal of Reading*, 34, 542–545.

Kirsch, I. S., & Mosenthal, P. B. (1990). Understanding forms, Part II. *Journal of Reading*, 34, 636–641.

Mosenthal, P. B., & Kirsch, i.s. (1990). Understanding general reference maps. *Journal of Reading*, 34:1, 60–63.

Mosenthal, P. B., & Kirsch, I. S. (1990). Understanding thematic maps. *Journal of Reading*, 34:2, 136–140.

Kirsch, I. S., & Mosenthal, P. B. (1990). Mimetic Documents: Pictures. *Journal of Reading*, 34:3, 216–220.

Kirsch, I. S., & Mosenthal, P. B. (1990). Mimetic Documents: Diagrams. *Journal of Reading*, 34:4, 290–294.

Kirsch, I. S., & Mosenthal, P. B. (1990). The Push, Pop, and Stacks of Mimetic Documents and their Texts. *Journal of Reading*, 34.

Kirsch, I. S., & Mosenthal, P. B. (1991). Mimetic Documents Process Schematics. *Journal of Reading*, 34:5, 390–397.

Kirsch, I. S., & Mosenthal, P. B. (1991). More Mimetic Documents Procedural Schematics. *Journal of Reading*, 34:6, 486–490.

Kirsch, I. S., & Mosenthal, P. B. (1991). Understanding Mimetic Documents through "Knowledge Modeling." *Journal of Reading*, 34:7, 552–558.

Kirsch, I. S., & Mosenthal, P. B. (1991). Understanding Documents, Information types in nonmimetic documents: A review of Biddle's wipe-clean slate. *Journal of Reading*, 34:8, 654–660.

Mosenthal, P. B., & Kirsch, I. S. (1989a). Designing effective adult literacy programs. *Poetics*, 18, 239–256.

Singer, H., & Donlan, D. (1989). *Reading and Learning from Text*. (2nd ed., Erlbaum).

We claim:

1. A method for teaching literacy skills comprising computerized multimedia instruction means, said method comprising:
   (a) providing literacy instruction for identifying the structures of printed material;
   (b) providing literacy instruction for understanding the structures of printed material;
   (c) providing literacy instruction for understanding the uses of printed material;
   (d) providing literacy instruction for applying strategies for locating and for processing information from printed material; and
   (e) selecting at least one of said literacy instructions and providing exercises and questions relating to said at least one of said literacy instructions.

2. A method according to claim 1 further comprising retrievably storing student responses to said exercises and questions.

3. A method according to claim 2 further comprising providing stored hints and answers to said exercises and questions.

4. A method according to claim 3 further comprising comparing said student responses to said stored answers and providing feedback based on the results of said comparison.

5. A method according to claim 1 wherein the printed materials are documents.

6. A method according to claim 5 wherein the documents are matrix documents.

7. A method according to claim 6 wherein the matrix documents are simple lists, combined lists, intersecting lists, and nested lists.

8. A method according to claim 6 wherein the strategies for processing literacy information from matrix documents are locating, comparing, connecting, and recycling.

9. A method according to claim 5 wherein the documents are graphic documents.

10. A method according to claim 9 wherein the graphic documents are pie charts, bar graphs, and line graphs.

11. A method according to claim 9 wherein the strategies for processing literacy information from graphic documents are locating, connecting, comparing, and getting the picture.

12. A method according to claim 5 wherein the documents are forms.

13. A method according to claim 5 wherein the documents are maps.

14. A method according to claim 13 wherein the maps are general reference maps and thematic maps.

15. A method according to claim 5 wherein the documents are mimetic documents.

16. A method according to claim 15 wherein the mimetic documents are pictures, diagrams, process schematics, and procedural schematics.

17. A method according to claim 1 wherein the printed material is in prose form.

18. A method according to claim 1 wherein the printed material comprises quantitative material in document form.

19. A method according to claim 1 wherein the printed material comprises quantitative material in prose form.

20. A computerized multimedia literacy skills teaching system, wherein said literacy skills comprise identifying the structures of printed material, understanding the structures of printed material; understanding the uses of printed material; and applying strategies for locating and processing information from printed material, and wherein operation of the system is controlled by a computer program, said system comprising:

(a) storage means for storing textual, graphical, sound, and video information relating to the teaching of said literacy skills in discrete lessons segments, and exercises and questions relating to the information;

(b) selecting means for providing a menu of said lesson segments;

(c) control means for users to control the textual, graphical, sound, and video information displayed on the output means;

(d) output means for displaying said textual, graphical, sound, and video information to a user; and (e) processing means for retrieving the textual, graphical, sound, and video information from the storage means and displaying the retrieved information on the output means for one of said lesson segments based on selections made by the user utilizing the selecting means and the control means.

21. A system according to claim 20 further comprising input means for accepting user responses to the exercises and questions;

wherein said storage means for retrievably storing the user responses and hints and answers to the exercises and questions; and wherein said processing means for comparing the user responses to the stored answers and providing feedback based on the results of this comparison.

22. A system according to claim 20 wherein the control means are a plurality of icons.

23. A system according to claim 20 wherein the output means for displaying the textual, graphical, and video information includes a plurality of different screen displays.

24. A system according to claim 20 wherein the computer program comprises the function structure of SYSTEM P.D.Q/RASTER OP; SIMPLE LISTS—Understanding, Using and Practice Questions; INTERSECTING LISTS—Understanding, Using and Practice Questions; COMBINED (COMPLEX) LISTS—Understanding, Using and Practice Questions; NESTED LISTS—Understanding, Using and Practice Questions; CHARTS & GRAPHS—Understanding, Using and Practice Questions; PIES—Understanding and Using; LINES—Understanding and Using; BARS—Understanding and Using; FORMS—Understanding and Using; WHOLE NUMBERS—System PQ, Basics and Everyday Life; and PROSE—Visualizing Word Problems and Introduction to Newspapers.

25. A computerized multimedia literacy skills method for teaching document literacy skills comprising providing literacy instructions for identifying the structure of a document, for understanding the structures of a document, for understanding the uses of a document, and for applying strategies for locating and processing information from a document; selecting at least one of said literacy instructions; providing exercises and questions relating to said at least one of said literacy instructions; retrievably storing student responses to said exercises and questions; providing hints and answers to said exercises and questions; and comparing said student responses to said stored answers and providing feedback based on the results of said comparison; wherein said document types are simple lists, combined lists, intersecting lists, nested lists, pie charts, bar graphs, line graphs and form, and wherein said strategies are locating, comparing, connecting, recycling, getting oriented, and getting the picture.

26. A method for teaching computerized multimedia literacy skills instructions comprising:

(a) providing interactive computerized literacy instructions for identifying the structure of printed materials;

(b) providing interactive computerized literacy instructions for understanding the structures of printed materials;

(c) providing interactive computerized literacy instructions for understanding uses of printed material;

(d) providing interactive computerized literacy instructions for understanding the uses of printed material;

(e) providing interactive computerized literacy instructions for applying strategies for locating and for processing information from printed material;

(f) selecting at least one of said interactive computerized literacy instructions and providing exercises and questions relating to said at least one of said interactive computerized literacy instructions; and (g) providing hints and answers to said exercises and questions.

27. A method according to claim 26 wherein the interactive computerized instructions are for simple lists.

28. A method according to claim 26 wherein the interactive computerized instructions are for intersecting lists.

29. A method according to claim 26 wherein the interactive computerized instructions are for combined lists.

30. A method according to claim 26 wherein the interactive computerized instructions are for nested lists.

31. A method according to claim 26 wherein the interactive computerized instructions are for charts and graphs.

32. A method according to claim 26 wherein the interactive computerized instructions are for pie charts.

33. A method according to claim 26 wherein the interactive computerized instructions are for line graphs.

34. A method according to claim 26 wherein the interactive computerized instructions are for bar graphs.

35. A method according to claim 26 wherein the interactive computerized instructions are for forms.

36. A method according to claim 26 wherein the interactive computerized instructions are for whole numbers.

37. A method according to claim 26 wherein the interactive computerized instructions are for prose.

38. A method according to claim 26 wherein the interactive computerized instructions are for simple lists, intersecting lists, combined lists, nested lists, charts and graphs, pie charts, line graphs, bar graphs, forms, whole numbers, and prose.

* * * * *